(12) United States Patent
Petrov et al.

(10) Patent No.: US 7,453,456 B2
(45) Date of Patent: Nov. 18, 2008

(54) SYSTEM AND METHOD OF THREE-DIMENSIONAL IMAGE CAPTURE AND MODELING

(75) Inventors: Michael Petrov, Princeton, NJ (US); Alexander Migdal, Princeton, NJ (US); Alexei Lebedev, New York, NY (US); Veronika Shelyekhova, Nutley, NJ (US); Leonid Polonskiy, Hamilton, NJ (US); Vadim Abadjev, Princeton, NJ (US)

(73) Assignee: Enliven Marketing Technologies Corporation, New York, NY (US)

( * ) Notice: Subject to any disclaimer, the term of this patent is extended or adjusted under 35 U.S.C. 154(b) by 132 days.

(21) Appl. No.: 11/444,239

(22) Filed: May 30, 2006

(65) Prior Publication Data
US 2006/0232583 A1    Oct. 19, 2006

Related U.S. Application Data

(62) Division of application No. 09/819,449, filed on Mar. 28, 2001, now Pat. No. 7,065,242.

(60) Provisional application No. 60/192,506, filed on Mar. 28, 2000.

(51) Int. Cl.
*G06T 15/00* (2006.01)
*G06K 9/00* (2006.01)
(52) U.S. Cl. .............. 345/419; 345/420; 382/199; 348/584
(58) Field of Classification Search ........ 345/619, 345/419, 420; 382/199, 154, 285; 348/584
See application file for complete search history.

(56) References Cited

U.S. PATENT DOCUMENTS

| 4,175,862 | A | 11/1979 | DiMatteo et al. |
| 4,238,147 | A | 12/1980 | Stern |
| 4,297,034 | A | 10/1981 | Ito et al. |

(Continued)

FOREIGN PATENT DOCUMENTS

CA    1295039    1/1992

(Continued)

OTHER PUBLICATIONS

Hoppe, Hugues, "Surface Reconstruction from Unorganized Points", Dissertation UW, pp. 1-116, 1994.

(Continued)

*Primary Examiner*—Phu K Nguyen
(74) *Attorney, Agent, or Firm*—Kenyon & Kenyon LLP

(57) ABSTRACT

Systems and methods for identifying the contour of an object that is depicted in an image. An object is placed on a rotating turntable and a camera, which is stationary, captures images of the object as it rotates on the turntable. In one pass, the system captures a number of photographic images that will be processed into image silhouettes. After a calibration procedure (used to determine the camera's focal length and the turntable's axis of rotation), a silhouette processing module determines a set of two-dimensional polygon shapes (silhouette contour polygons) that describe the contours of the object by comparing light intensity values in the images of the object with light intensity values from an image of the background without the object.

18 Claims, 73 Drawing Sheets

U.S. PATENT DOCUMENTS

| | | | |
|---|---|---|---|
| 4,529,305 A | 7/1985 | Welford et al. | |
| 4,529,316 A | 7/1985 | DiMatteo | |
| 4,575,805 A | 3/1986 | Moermann et al. | |
| 4,627,734 A | 12/1986 | Rioux | |
| 4,645,347 A | 2/1987 | Rioux | |
| 4,653,104 A | 3/1987 | Tamura | |
| 4,705,401 A | 11/1987 | Addleman et al. | |
| 4,737,032 A | 4/1988 | Addleman et al. | |
| 4,794,262 A | 12/1988 | Sato et al. | |
| 4,800,270 A | 1/1989 | Blais | |
| 4,800,271 A | 1/1989 | Blais | |
| 4,819,197 A | 4/1989 | Blais | |
| 4,825,263 A | 4/1989 | Desjardins et al. | |
| 4,871,256 A | 10/1989 | Grindon | |
| 4,948,258 A | 8/1990 | Caimi | |
| 4,952,149 A | 8/1990 | Duret et al. | |
| 4,961,155 A | 10/1990 | Ozeki et al. | |
| 4,965,665 A | 10/1990 | Amir | |
| 4,982,102 A | 1/1991 | Inoue et al. | |
| 4,982,438 A | 1/1991 | Usami et al. | |
| 5,018,854 A | 5/1991 | Rioux | |
| 5,027,281 A | 6/1991 | Rekow et al. | |
| 5,030,008 A | 7/1991 | Scott et al. | |
| 5,101,440 A * | 3/1992 | Watanabe et al. | 382/168 |
| 5,102,223 A | 4/1992 | Uesugi et al. | |
| 5,102,224 A | 4/1992 | Uesugi et al. | |
| 5,104,227 A | 4/1992 | Uesugi et al. | |
| 5,127,061 A | 6/1992 | Amir et al. | |
| 5,164,793 A | 11/1992 | Wolfersberger et al. | |
| 5,170,439 A | 12/1992 | Zeng et al. | |
| 5,177,556 A | 1/1993 | Rioux | |
| 5,187,364 A | 2/1993 | Blais | |
| 5,193,120 A | 3/1993 | Gamache et al. | |
| 5,196,900 A | 3/1993 | Pettersen | |
| 5,216,236 A | 6/1993 | Blais | |
| 5,218,427 A | 6/1993 | Koch | |
| 5,259,037 A | 11/1993 | Plunk | |
| 5,270,795 A | 12/1993 | Blais | |
| 5,280,542 A | 1/1994 | Ozeki et al. | |
| 5,303,386 A | 4/1994 | Fiasconaro | |
| 5,305,092 A | 4/1994 | Mimura et al. | |
| 5,321,766 A | 6/1994 | Fraas et al. | |
| 5,335,298 A * | 8/1994 | Hevenor et al. | 382/199 |
| 5,345,490 A | 9/1994 | Finnigan et al. | |
| 5,377,011 A | 12/1994 | Koch | |
| 5,381,236 A | 1/1995 | Morgan | |
| 5,381,526 A | 1/1995 | Ellson | |
| 5,410,358 A | 4/1995 | Shackleton et al. | |
| 5,416,591 A | 5/1995 | Yoshimura et al. | |
| 5,418,608 A | 5/1995 | Caimi et al. | |
| 5,424,835 A | 6/1995 | Cosnard et al. | |
| 5,436,655 A | 7/1995 | Hiyama et al. | |
| 5,444,537 A | 8/1995 | Yoshimura et al. | |
| 5,446,548 A | 8/1995 | Gerig et al. | |
| 5,446,549 A | 8/1995 | Mazumder et al. | |
| 5,465,323 A | 11/1995 | Mallet | |
| 5,473,436 A | 12/1995 | Fukazawa | |
| 5,481,483 A | 1/1996 | Ebenstein | |
| 5,489,950 A | 2/1996 | Masuda | |
| 5,506,683 A | 4/1996 | Yang et al. | |
| 5,509,090 A | 4/1996 | Maruyama et al. | |
| 5,511,153 A | 4/1996 | Azarbayejani et al. | |
| 5,513,276 A | 4/1996 | Theodoracatos | |
| 5,528,737 A | 6/1996 | Sfarti | |
| 5,528,738 A | 6/1996 | Sfarti et al. | |
| 5,589,942 A | 12/1996 | Gordon | |
| 5,615,003 A | 3/1997 | Hermary et al. | |
| 5,619,587 A | 4/1997 | Willoughby, Jr. et al. | |
| 5,671,395 A | 9/1997 | Kiyama | |
| 5,680,216 A | 10/1997 | Hierholzer et al. | |
| 5,684,933 A * | 11/1997 | Nagafusa | 358/1.9 |
| 5,699,444 A | 12/1997 | Palm | |
| 5,784,098 A | 7/1998 | Shoji et al. | |
| 5,940,139 A * | 8/1999 | Smoot | 348/584 |
| 6,044,170 A | 3/2000 | Migdal et al. | |
| 6,356,272 B1 | 3/2002 | Matsumoto et al. | |
| 6,424,746 B1 | 7/2002 | Nishida | |
| 2001/0005425 A1 | 6/2001 | Watanabe et al. | |

FOREIGN PATENT DOCUMENTS

| | | |
|---|---|---|
| CA | 1332633 | 10/1994 |
| EP | 0 632 349 A1 | 1/1995 |
| GB | 2264601 | 9/1993 |
| GB | 2264602 | 9/1993 |
| JP | 4-110707 A | 4/1992 |
| WO | WO 96/06325 | 2/1996 |

OTHER PUBLICATIONS

Eck, Matthias, et al., "Multiresolution Analysis of Arbitrary Meshes", Technical Report #95 01-02, pp. 1-25, 1995.

DeRose, Tony, et al., "Fitting of Surfaces to Scattered Data", University of Washington, pp. 212-220, 1994.

Hoppe, Hugues, "Generation of 3D Geometric Models from Unstructured 3D Points", pp. 424-431, 1992.

Turk, Greg, et al., "Zippered Polygon Meshes from Range Images", Stanford University, 8 pages, 1994.

Rioux, Marc, et al., "White Laser, Synced Scan", IEEE computer Graphics and Applications, vol. 13, No. 3, pp. 15-17, May 1995.

Carlbom, Ingrid, et al., "Modeling and Analysis of Empirical Data in Collaborative Environments", Communications of the ACM, vol. 35, No. 6, Jun. 1992, p. 1-13.

Jones, P.F., et al., "Comparison of Three Three-Dimensional Imaging Systems", J. Opt. Soc. Am. A., vol. 11, No. 10, Oct. 1994, pp. 2613-2621.

Hausler, Gerd, et al., "Light Sectioning With Large Depth and High Resolution", Applied Optics, vol. 27, No. 24, Dec. 15, 1988, pp. 5165-5169.

Motamedi, M. Edward, et al., "Miniaturized Micro-Optical Scanners", Optical Engineering, vol. 33, No. 11, Nov. 1994, pp. 3616-3623.

Rioux, Marc, et al., "Design of a Large Depth of View Three-Dimensional Camera for Robot Vision", Optical Engineering, vol. 26, No. 12, Dec. 1987, pp. 1245-1250.

Trepte, Oliver, et al., "Computer Control for a Galvanometer Scanner in a Confocal Scanning Laser Microscope", Optical Engineering, vol. 33, No. 11, Nov. 1994, pp. 3774-3780.

Strand, T.C., "Optical Three-Dimensional Sensing for Machine Vision", Optical Engineering, vol. 24, No. 1., Jan./Feb. 1985, pp. 33-40.

Busch, David D., "Getting the Picture", Windows Sources, Nov. 1995, pp. 114-136.

Marshall, G.F., "Scanner Refinements Inspire New Uses", Laser Focus World, Jun. 1994, pp. 2-6.

Ludwiszewski, Alan, "Standards for Oscillatory Scanners", General Scanning Inc., Feb. 1993, pp. 1-21.

"Cyberware Corporate Backgrounder", Cyberware WWW Support (Internet Site), Jan. 16, 1996 (last update), 11 pages.

Brosens, Pierre J., "Scanning Speed and Accuracy of Moving Magnet Optical Scanners" Optical Engineering, vol. 34, No. 1, Jan. 1995, pp. 200-207.

* cited by examiner

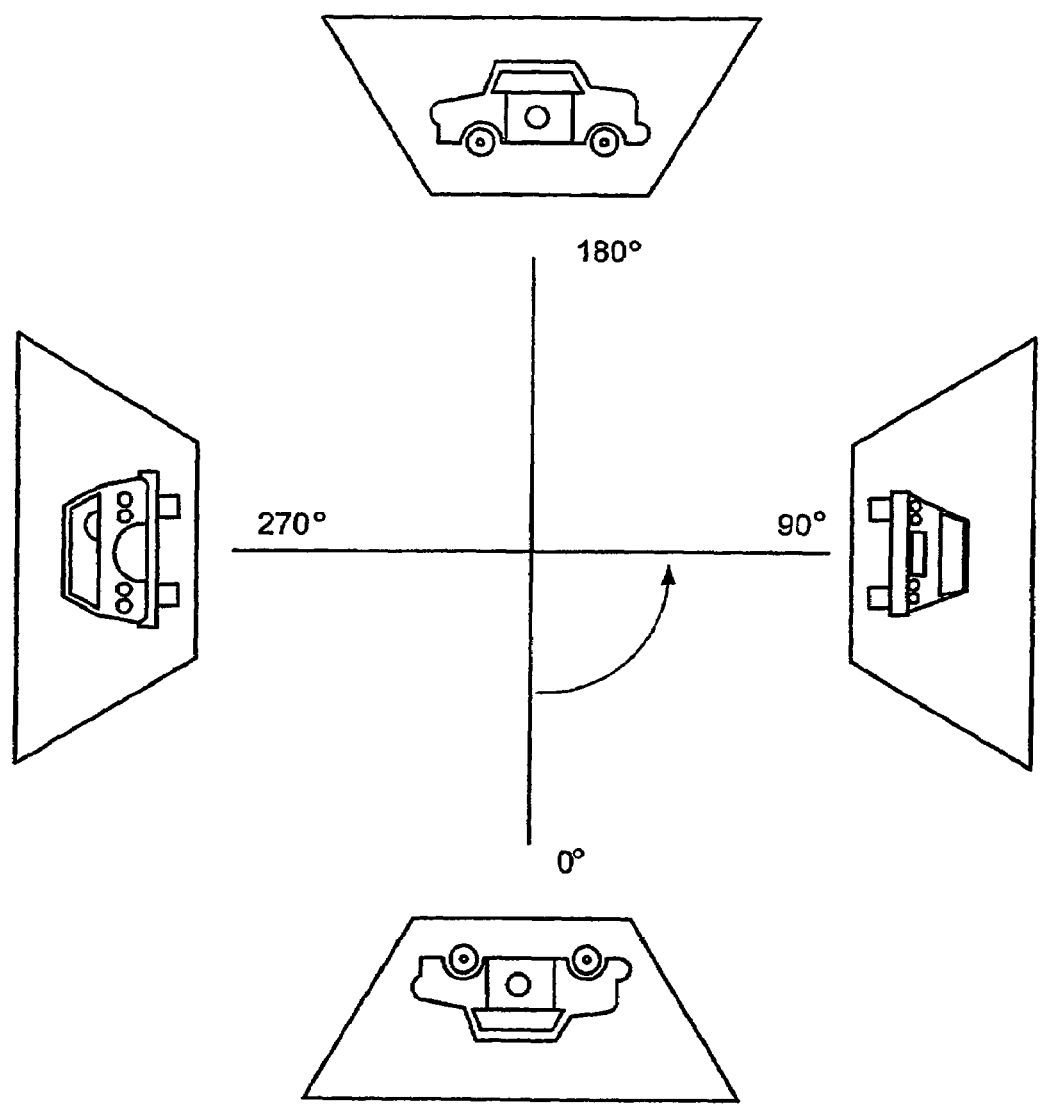
F I G. 6

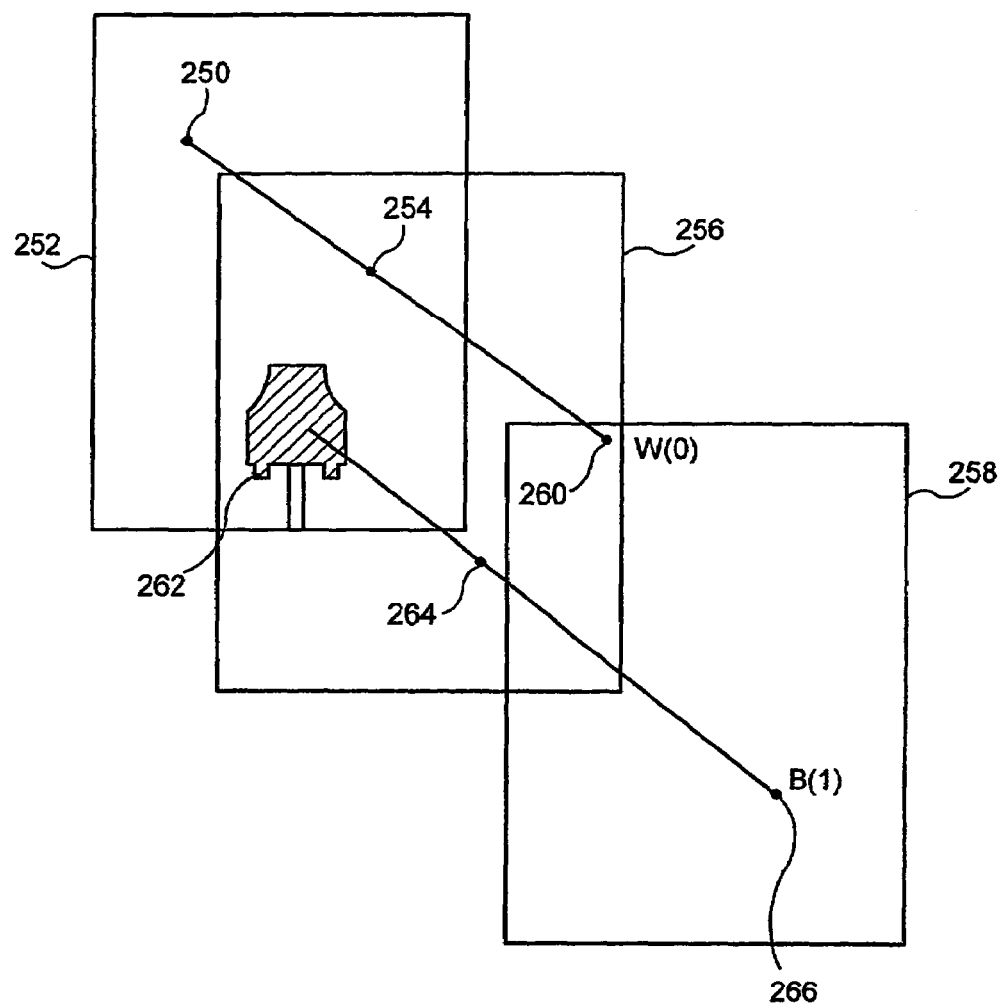
F I G. 17

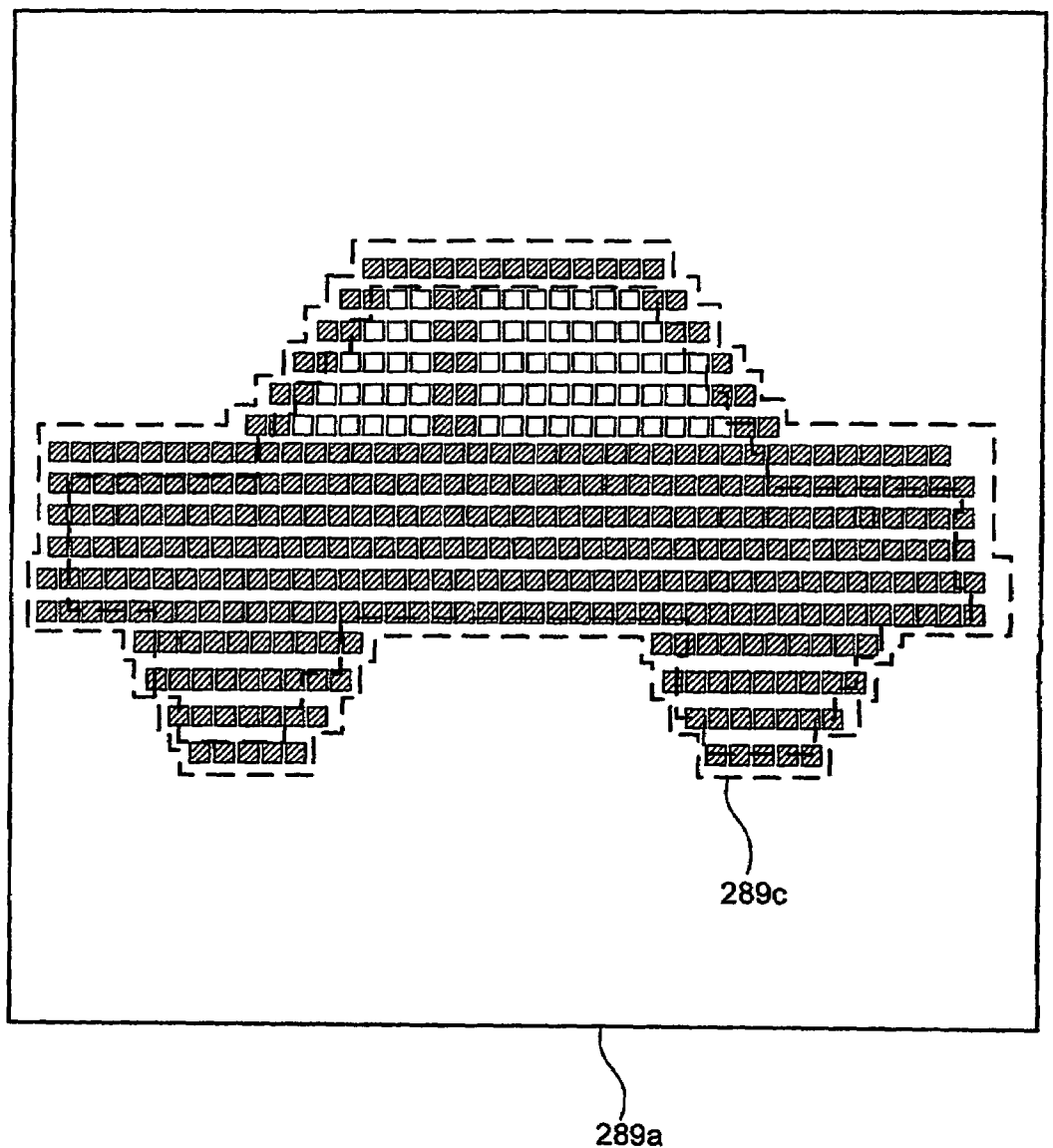
F I G. 19c

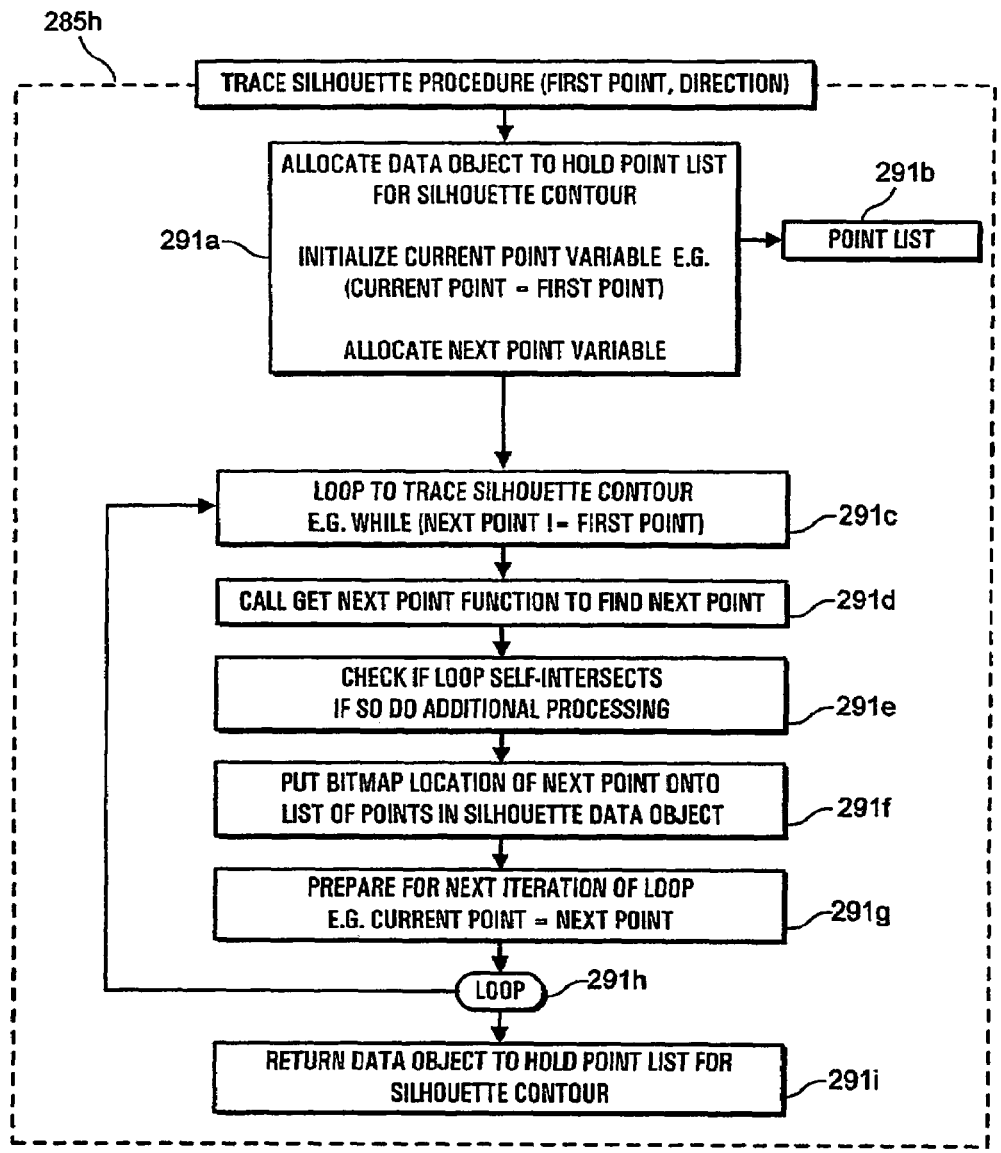
F I G. 20a

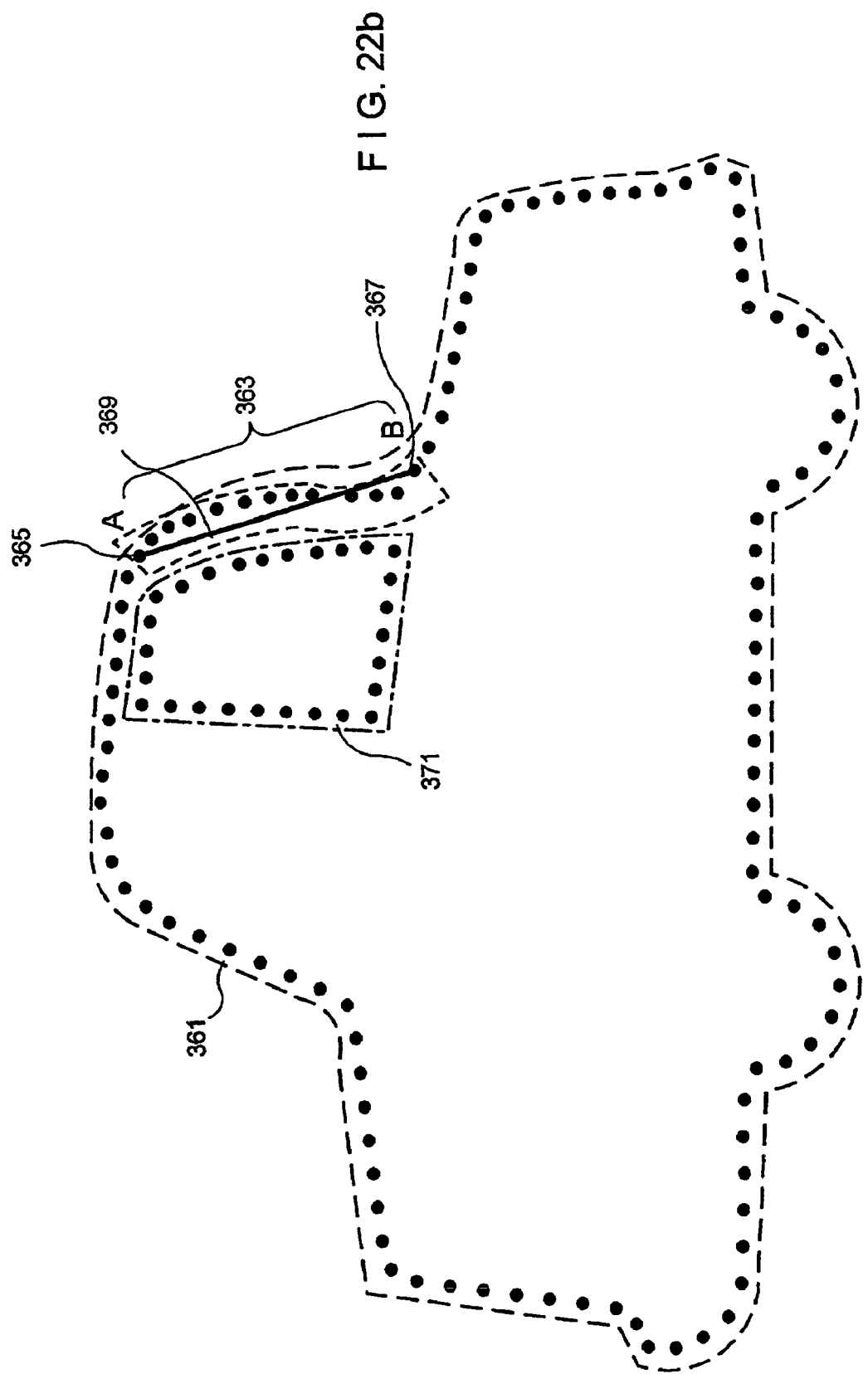

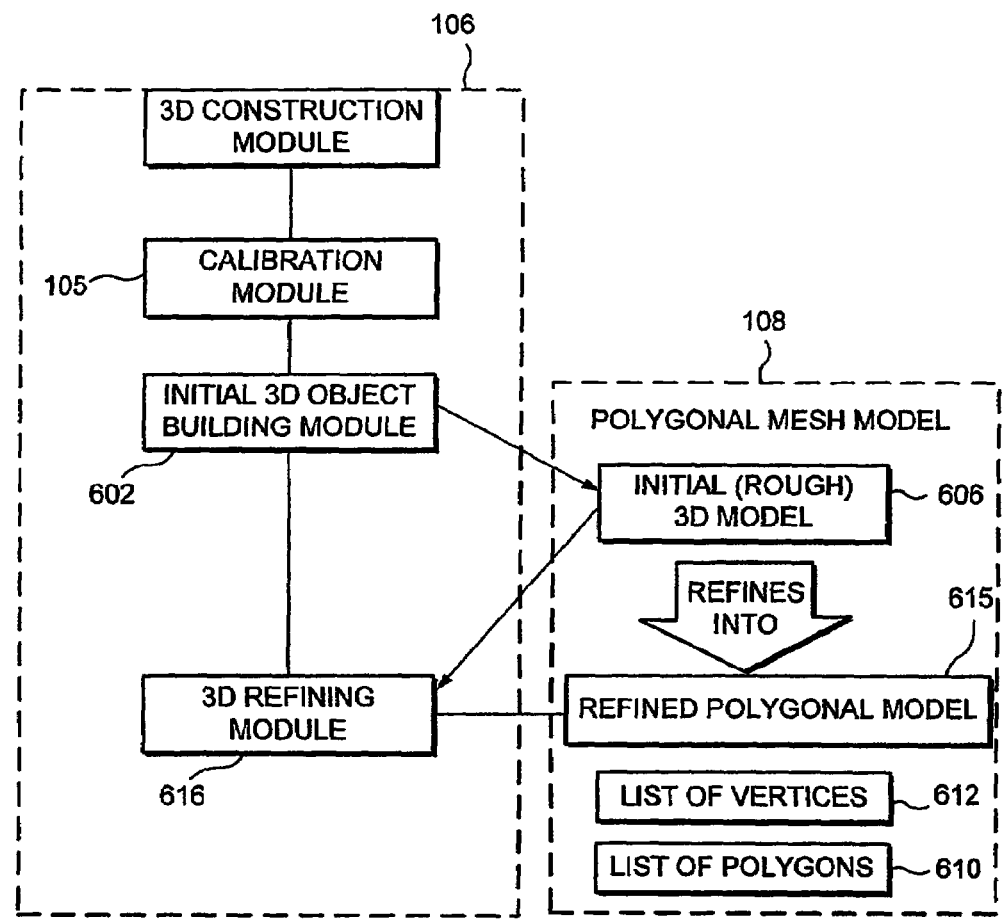
F I G. 23

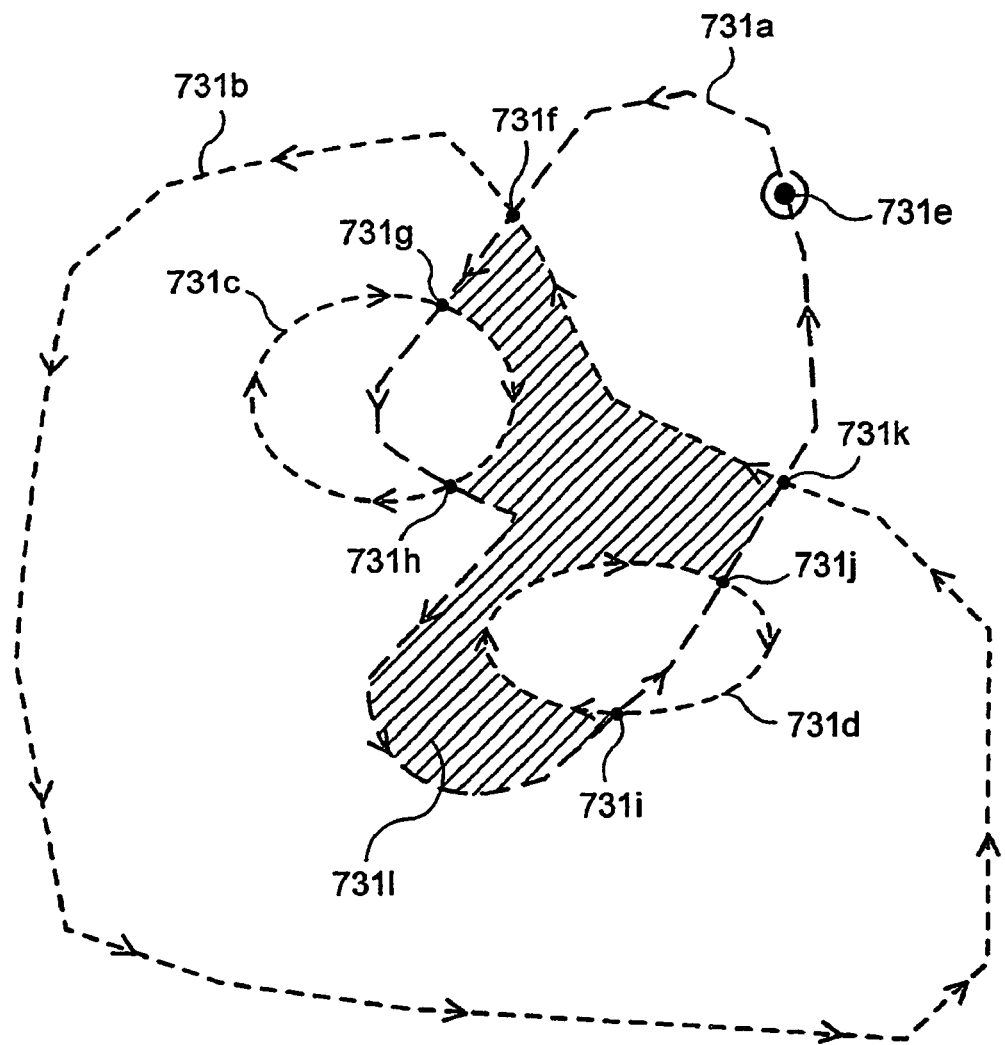
F I G. 29b

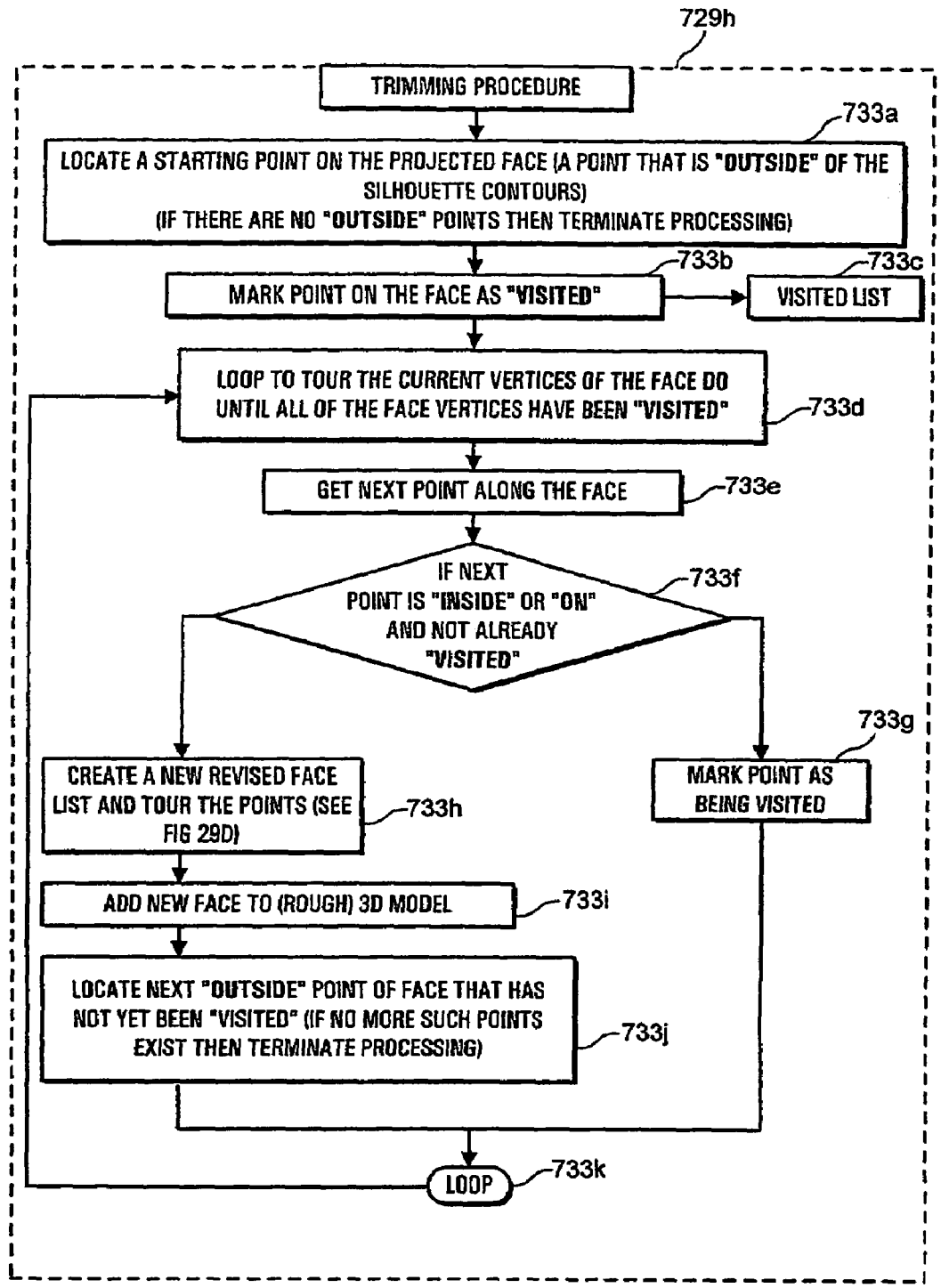
F I G. 29c

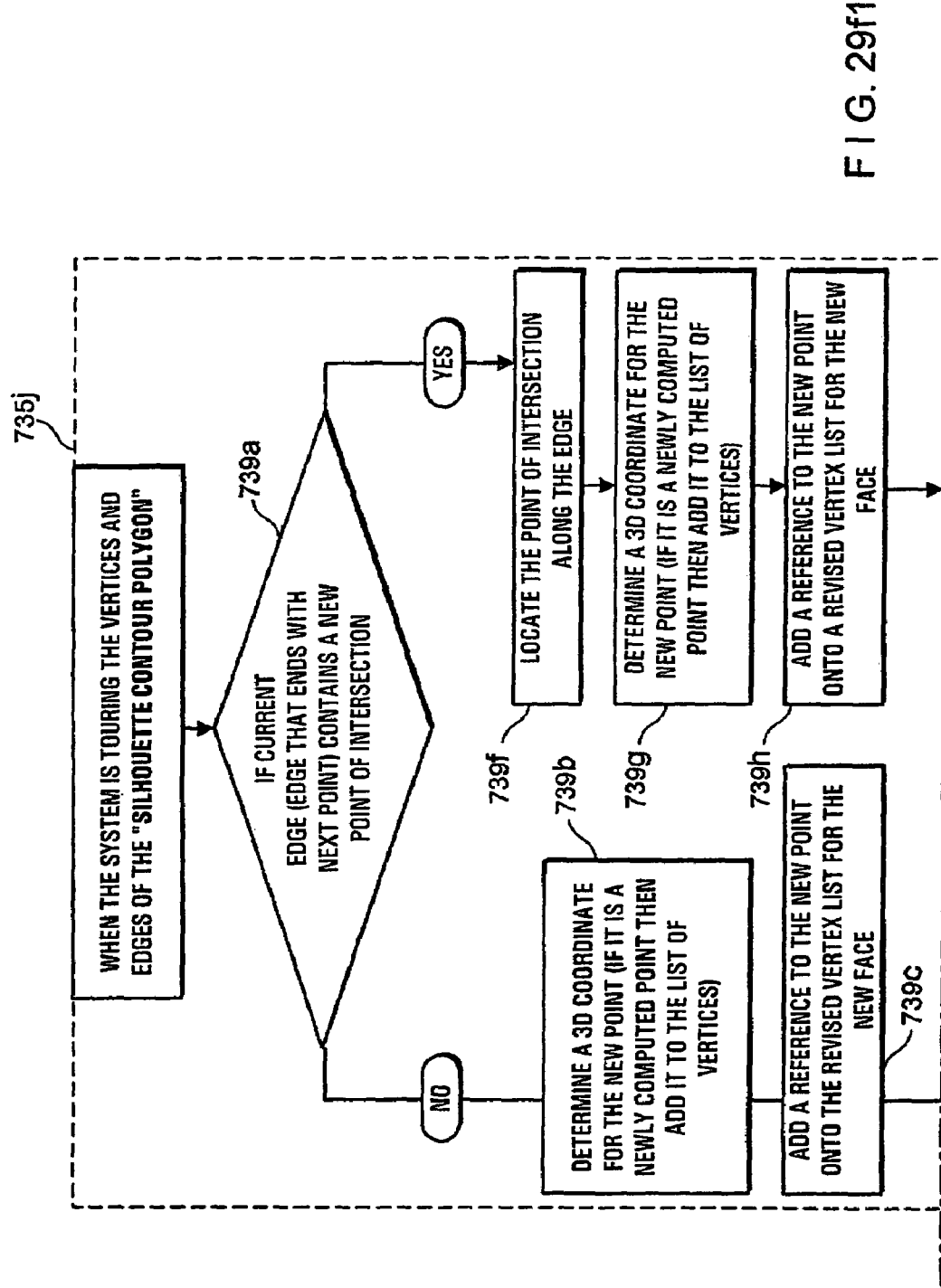
FIG. 29f1

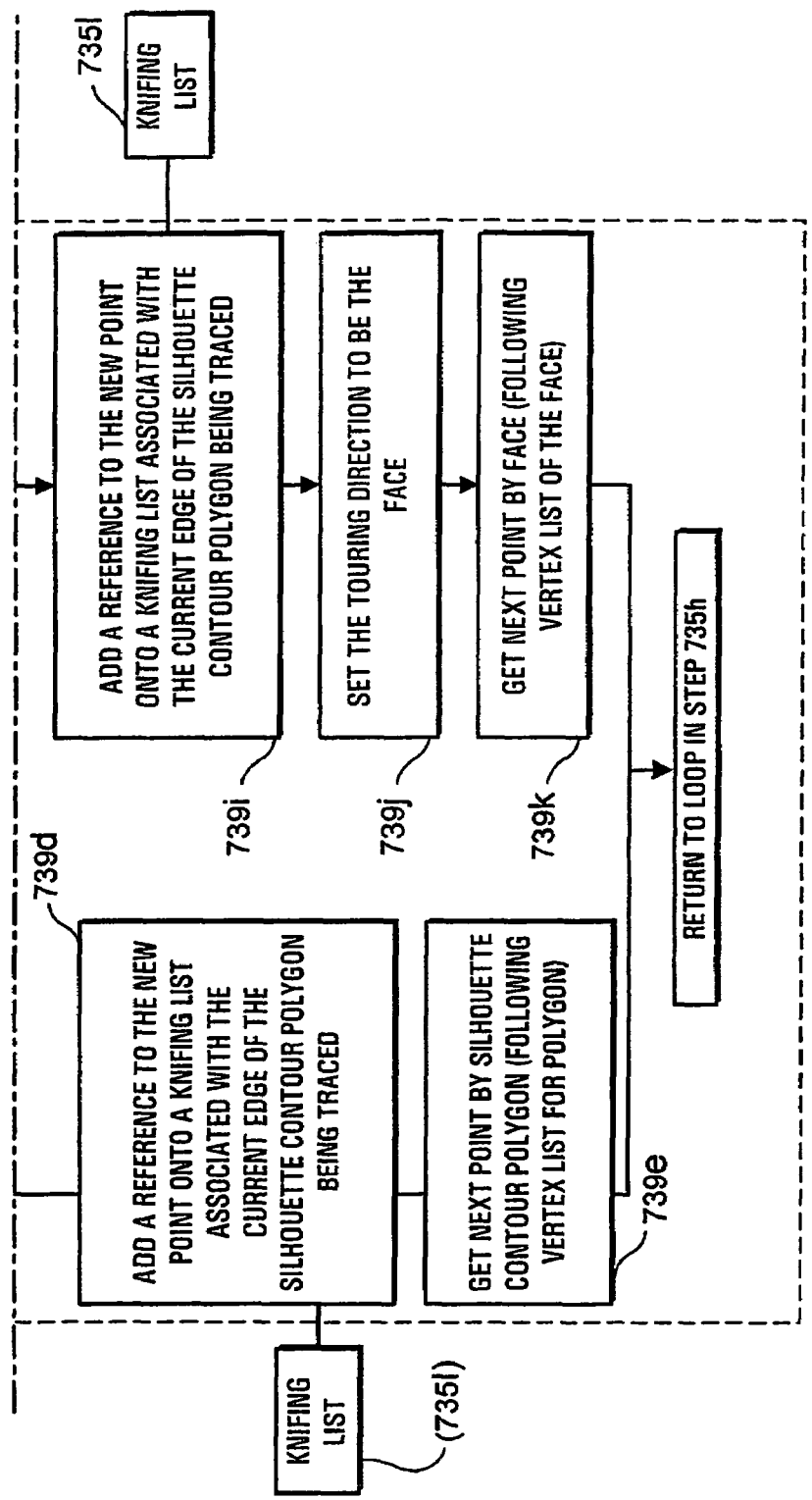
FIG. 29f2

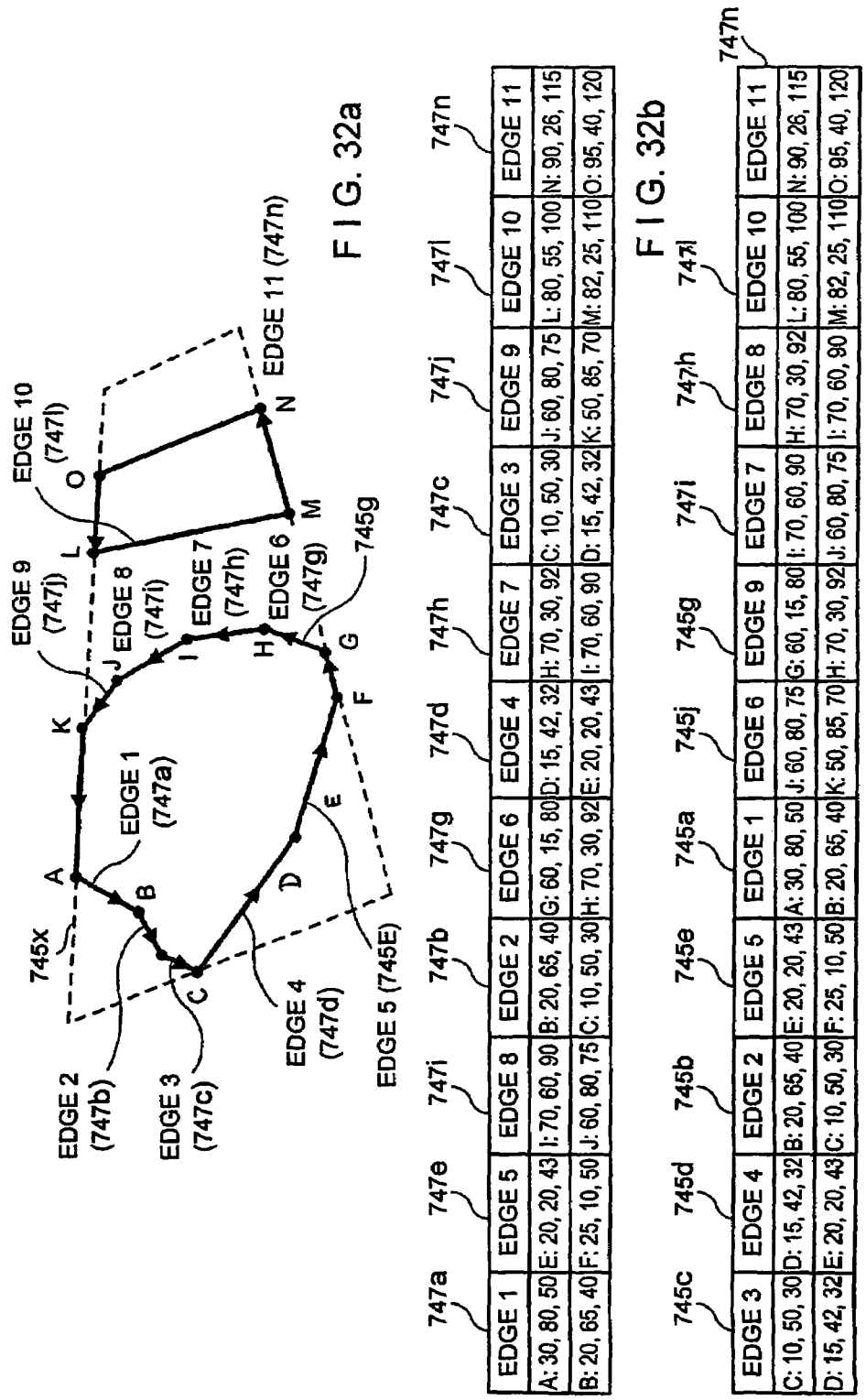

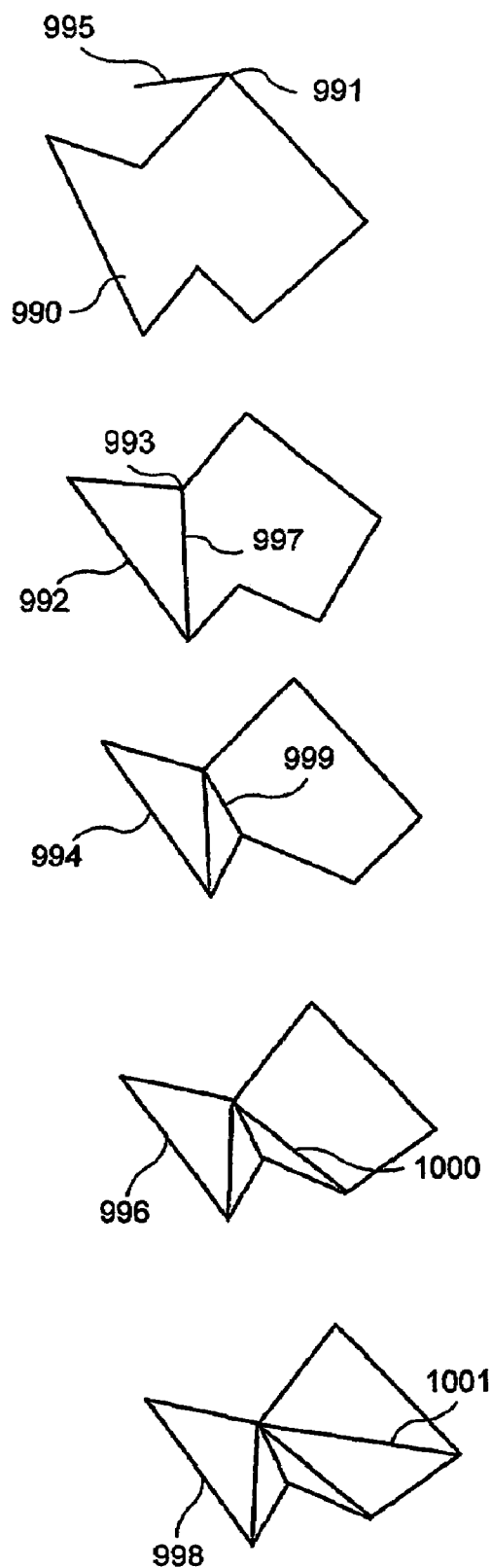
F I G. 39

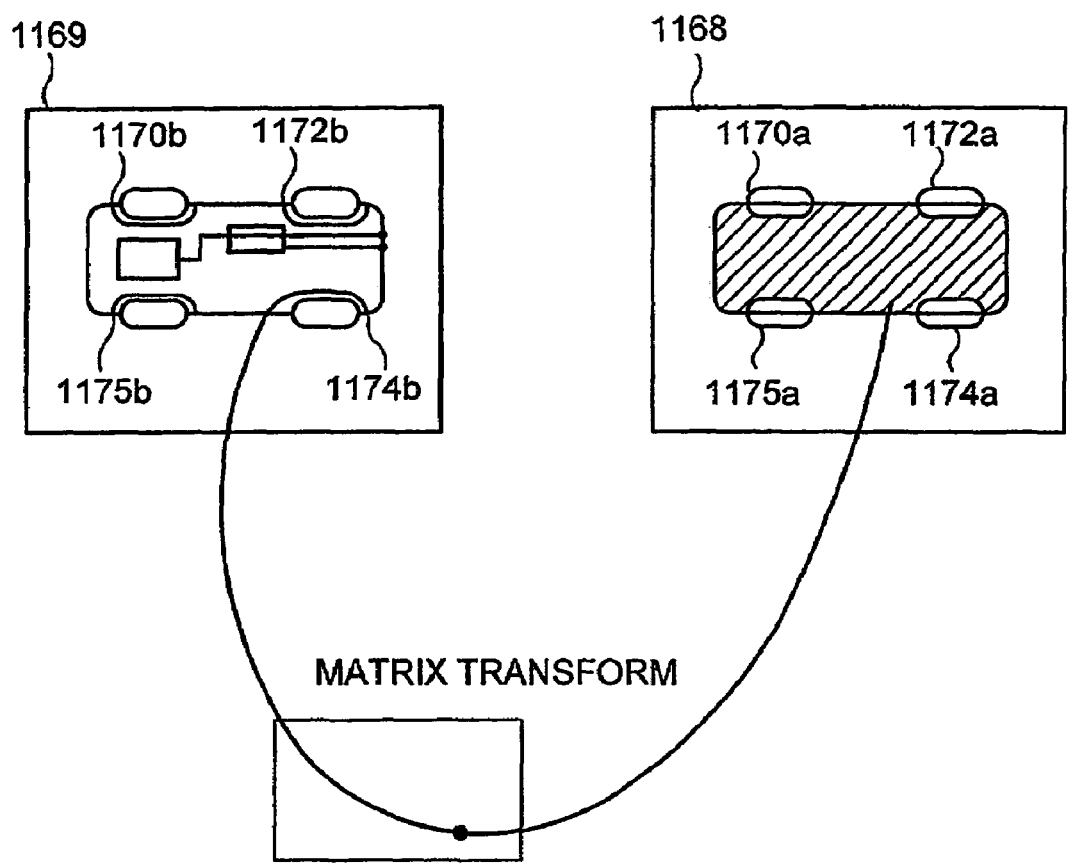
F I G. 42

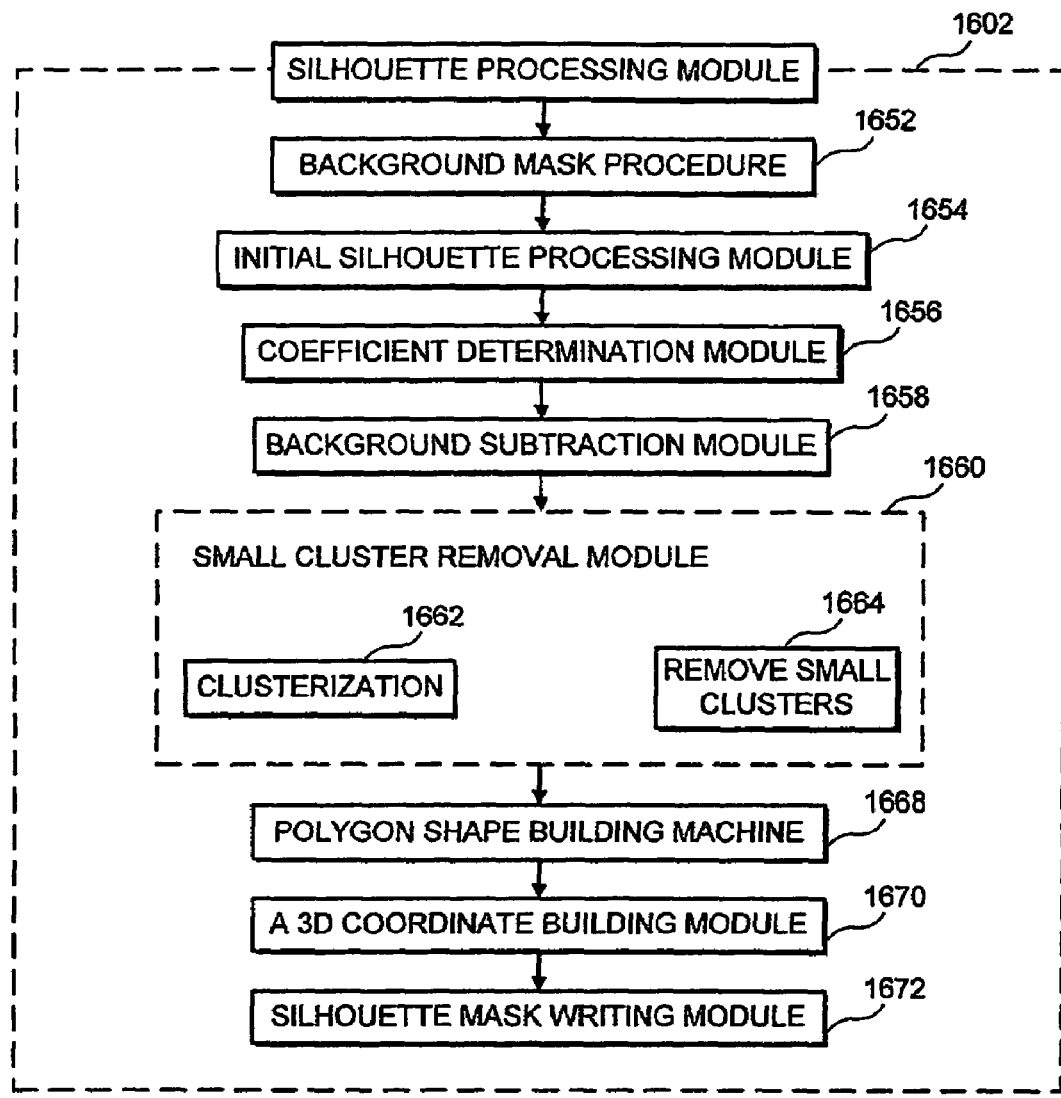
F I G. 44

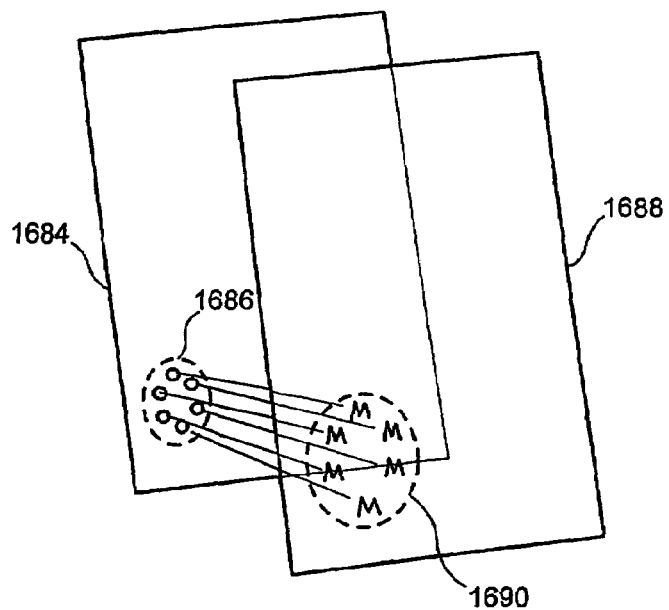
F I G. 46
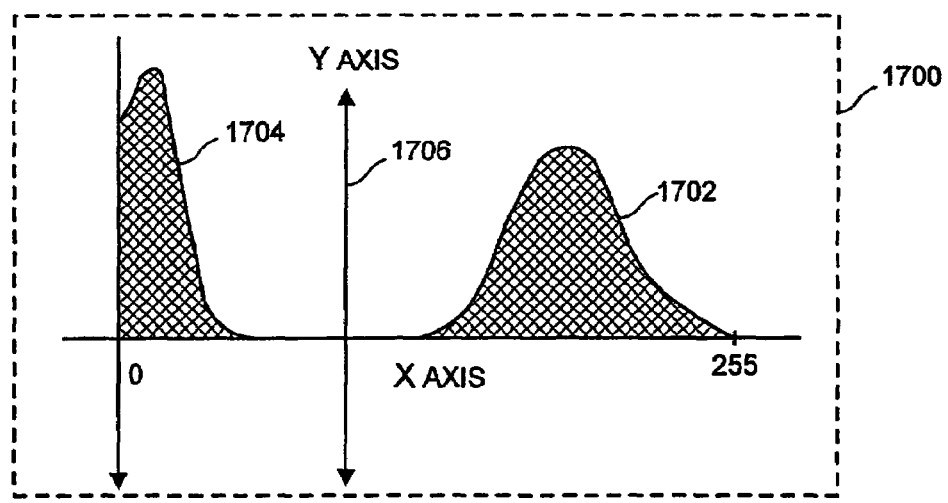
F I G. 47

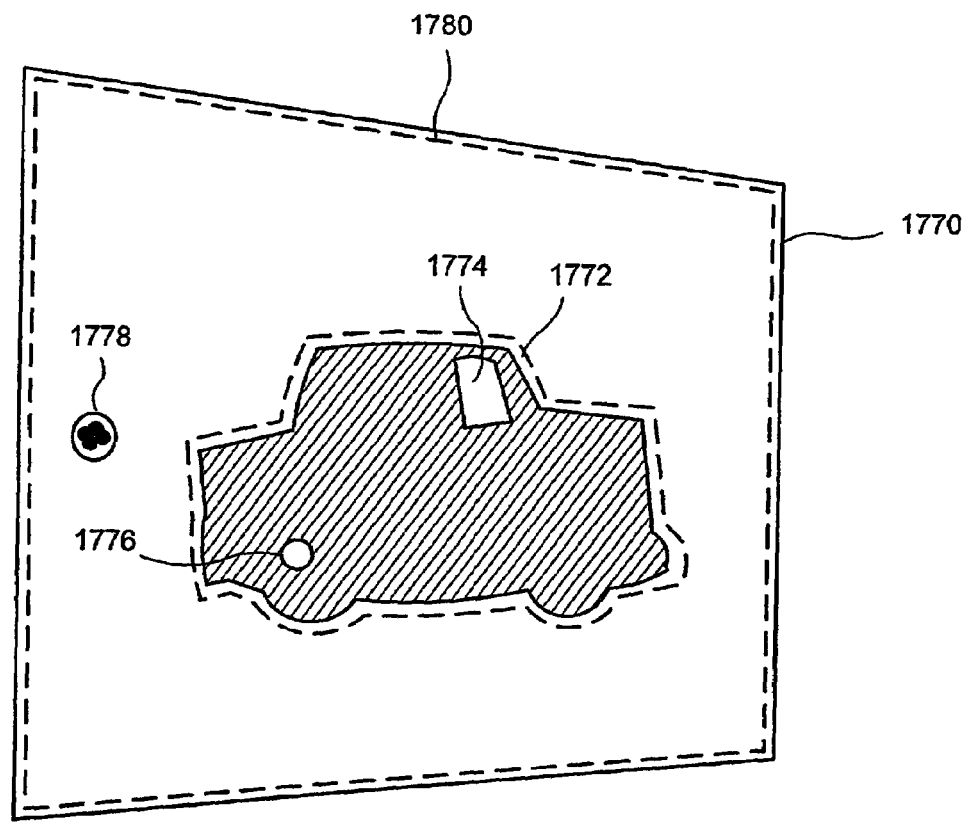
F I G. 51

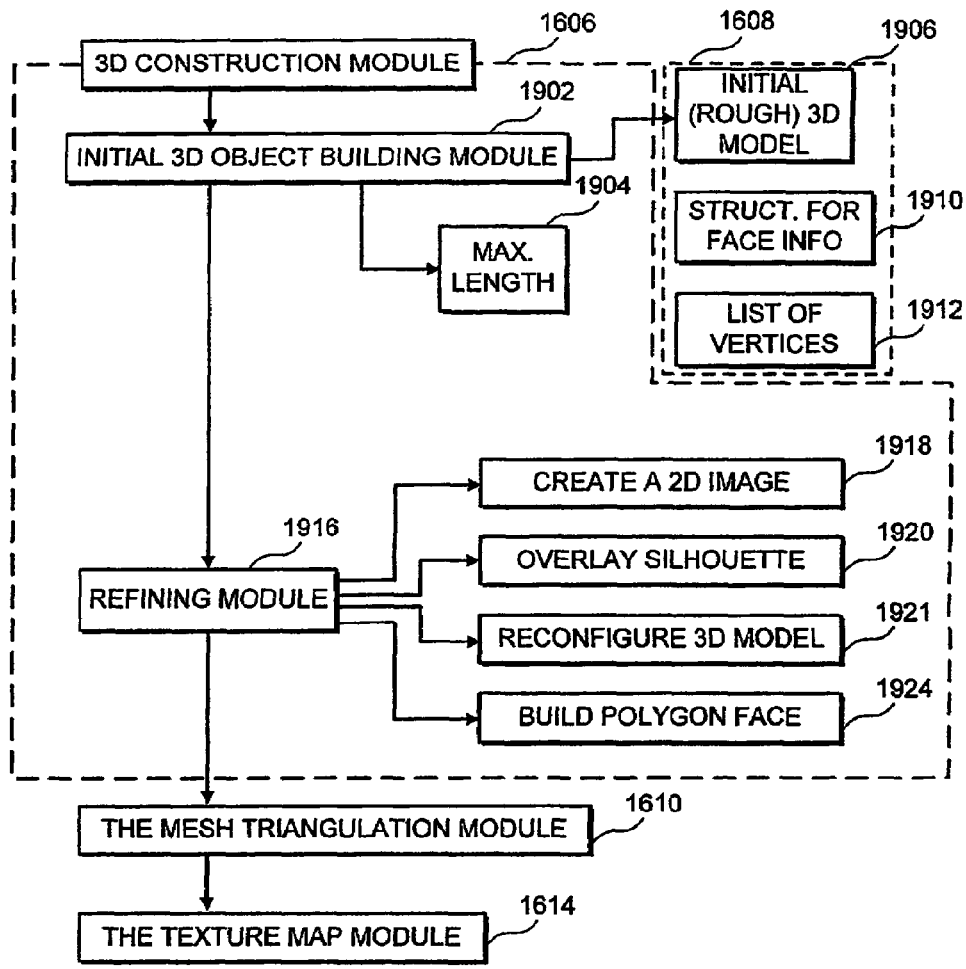
F I G. 56

SYSTEM AND METHOD OF THREE-DIMENSIONAL IMAGE CAPTURE AND MODELING

CROSS-REFERENCE TO RELATED APPLICATIONS

This application is a divisional of U.S. patent application Ser. No. 09/819,449, filed on Mar. 28, 2001 now U.S. Pat. No. 7,065,242.

This application claims the benefit of U.S. provisional Application No. 60/192,506, entitled "System and Method of Three Dimensional Image Capture and Modeling", filed Mar. 28, 2000.

FIELD OF THE INVENTION

This invention relates to three-dimensional ("3D") measuring systems and the imaging and modeling of objects and other 3D surfaces by computer. In particular, this invention relates to systems and methods for measuring and reproducing objects and other 3D surfaces by the capture and computer processing of photographic images which contain "silhouette" views of the object or surface.

COPYRIGHT NOTICE

Portions of this patent document contain material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

There is continued interest in the efficient and speedy creation by computer of accurate 3D models of objects and other 3D surfaces (hereinafter "objects"). Computer-generated 3D models of objects have useful application in many fields, such as digital imaging, computer animation, special effects in film, prototype imaging in marketing and product development, topography, reconstructive and plastic surgery, dentistry, architecture, industrial design, anthropology, milling and object production, biology and internal medicine.

In addition, with the explosion of usage of the Internet and the World Wide Web, there is a real demand for computer-generated 3D models in the display and marketing of products on Web sites. For such Web sites, 3D object modeling systems facilitate the construction of complex, interactive and animated displays, such as those created by simulators and other user choice based programs. Although 2D image generation systems currently predominate in the display and manipulation of graphic images on the World Wide Web, the use of 3D object models is perceived by some as a more efficient way to present graphic information for interactive graphics, animated special effects and other applications. The use of such 3D object modeling systems is growing in Web-based and other applications.

A 3D object modeling system typically constructs an object model from 3D spatial data and then associates color or other data (called "texture data") with the specific areas of the model (such texture data is used to render displays or images of the object). Spatial data includes the 3D X, Y, Z coordinates that describe the physical dimensions, contours and features of the object. Existing systems that collect 3D spatial and texture data include both scanning systems and photographic "silhouette" capturing systems. A scanning system uses a light source (such as a laser) to scan a real-world object and a data registration device (such as a video camera) to collect images of the scanning light as it reflects from the object.

A silhouette capturing system typically places an object against a background and then, using a data registration device (such as a digital camera), captures images of the object from different view points. The silhouette capturing system later processes each captured image to obtain a set of "silhouettes" which describe the contours of the object. Each digitized image from the camera contains a set of pixel assignments which describe the captured image. The silhouette capturing system attempts to identify those pixels within each captured image which make up the contours of the object.

For example, a silhouette capturing system typically uses those pixels within each image which form a boundary or outside edge (the "boundary points") for creating a silhouette contour of the object. The boundary point-based silhouette contours made from one image can be combined with the boundary point-based silhouette contours found in other images to determine a set of 3D X, Y, Z coordinates which describe the spatial dimensions of the object's surface. One typical approach begins with a cube of, for example, 1000× 1000×1000 pixels. Using this approach, the shape of the object is "carved" from the cube using silhouette outlines that are obtained from each silhouette image. Silhouette capturing systems can gather enough raw data from the silhouette contours to generate several hundred thousand 3D X, Y, Z coordinates for a full wraparound view of an object.

A typical 3D object modeling system uses the generated 3D X, Y, Z coordinates to create a "wire-frame" model that describes the surface of the object and represents it as a series of interconnected planar shapes (sometimes called "geometric primitives" or "faces"), such as a mesh of triangles, quadrangles or more complex polygons. Typical 3D object modeling systems use the 3D X, Y, Z coordinates either indirectly, in gridded mesh models, or directly, in irregular mesh models.

Gridded mesh models superimpose a grid structure as the basic framework for the model surface. The computer connects the grid points to form even-sized geometric shapes that fit within the overall grid structure. While gridded models provide regular, predictable structures, they are not well-suited for mesh constructions based on an irregular set of data points, such as those generated through laser scanning or silhouette capture. The need to interpolate an irregular set of data points into a regular grid structure increases computation time and decreases the overall accuracy of the model.

Hence, some 3D modeling systems for real-world objects create an irregular mesh model, such as an irregular triangulated mesh, to represent the real-world object. An irregular mesh model imposes no grid structure upon the model. Instead, the 3D X, Y, Z data points are used directly as the vertices in each planar shape or "face" of the mesh.

In addition to using spatial data, 3D object modeling systems also include texture data as a part of the object model. Texture data is color and pattern information that replicates an object's surface features. Some 3D object modeling systems maintain texture data separately from the "wire-frame" mesh data and apply the texture data to the mesh only when rendering the surface features. Those object modeling systems typically to distinct and separate processes: first, in a mesh building phase, the system constructs a "wire frame" mesh to represent the object's spatial structure using only 3D X, Y, Z values (and other related spatial information); and second, during a "texture map" building phase, the system assigns texture data to each of the faces of the mesh model so that when the model is later rendered, the displaying device can overlay texture data on the geometric faces of the model. The rough face of a brick, the smooth and reflective surface of a mirror and the details of a product label can all be overlaid onto a mesh wire frame model using texture mapping principles.

For models of real-world objects, texture data typically comes from 2D photographic images. The 3D spatial coordinate values of a mesh model face can be related and linked to specific points (i.e. two-dimensional x, y pixel locations) in the digitized versions of the collected photo images. Commercially available digital cameras output image frames, each of which includes a 2D matrix of pixels (e.g. 640×480 pixels in dimension). Each pixel in the matrix has, for example, a three-byte (24 bit) red, green and blue (R, G, B) color assignment. Such a 3D object modeling system will then store each photographic image for later use (such as in TIFF format). The 3D object modeling system links each mesh face in the generated 3D mesh model to a specific area in a selected image that contains the appropriate texture data. When showing a view of the 3D model, a displaying device clips relevant areas of the appropriate photo image file and overlays the clip on the associated mesh face.

The current effort in computer graphics to incorporate more images of real-life objects into applications has fostered a search to find improvements in collecting and processing 3D spatial data and texture data. As scanning systems typically require the use of specialized lighting equipment (such as a laser), some have perceived the systems based on silhouette capture as being more convenient to use and more readily adaptable to the current practices of the model designers and other professionals who currently produce and use 3D object models. Thus, there is interest in improving the those 3D modeling systems which use silhouette capture as their means of acquiring 3D spatial data.

In general, some currently available 3D modeling systems which use silhouette capture place an object in a specially colored environment, such as an all green background, and then collect a series of images of the object's shape and texture by either moving the camera around the object or moving the object (e.g., in 360 degree circular direction) in front of a stationary camera. In each image, the system attempts to determine those pixels which form the boundary contours of the object's silhouette and create from the multiple silhouette images a 3D mesh model of the object. Such systems capture all needed data (both spatial mesh construction data and texture data) in a single series of images. The brightly-colored background used in this silhouette capturing approach enables the system to differentiate (with some accuracy) those pixels which describe the boundaries of the object (the pixels which are used to generate the 3D X, Y, Z coordinates of the 3D model). In addition, the distinctive background also allows such a system to extract (with some accuracy) information about the texture data (used in later processing) from the same photographic image.

However, the use of brightly or specifically colored backgrounds (such as using an all green background) also introduces a level of error into the modeling procedure. It is known that when a background color is introduced, the color will also radiate on the object. When an object is placed in front of such a distinctive background, the object will typically reflect some of the background color. Thus, the 3D model created from the processing of such object modeling systems will sometimes be inaccurate, because those models will have some of the background color residue included in their texture. For example, when a green background color or light is used, some of the greenish hue can appear on the model's texture.

Further, in such an instance the reflection of such a green light color against the object can also hamper the system's efforts to collect the spatial data concerning the object. Such systems will sometimes have additional difficulty determining if a point within an image belongs to the object or the background—especially if the object has (or is radiating) a patch of color that is the same as the background. It would be an improvement in the art if a system could be developed that would improve the accuracy of the capturing of spatial and texture data and eliminate the need for the use of the brightly colored backgrounds.

In addition and as noted above, some currently available silhouette capture-based 3D modeling systems use a volumetric approach to calculate the spatial 3D X, Y, Z, points of the object model. The use of a volumetric approach can also cause difficulties in processing and inaccuracies in the final object model. As stated above, one typical volumetric approach begins with a cube of pixels (e.g., for example, 1000×1000×1000 pixels) and the shape of the object is "carved" from the cube using silhouette outlines. This approach has the limitation that it is necessary to start with a fixed-sized grid. The use of the grid limits the resolution of the final 3D object model to the resolution of the grid. It would be an improvement in the art if a system and method could be devised to determine the shape of the object without the use of the static cube structure; if, for example, the object could be determined analytically by using the silhouettes themselves.

Such an improvement would be found if the generated 3D X, Y, Z coordinates of the silhouette contours could be used directly to construct the 3D model. Such direct use of the 3D X, Y, Z coordinates would improve the accuracy of the model. It is understood that one of the challenges in creating a 3D modeling system based on silhouette capture which builds a 3D model with actual (non-gridded) 3D X, Y, Z coordinates is to perform the more accurate construction of the model with efficiency and speed of operation.

SUMMARY OF THE INVENTION

The present invention provides a system and method for constructing a 3D model of an object based on a series of silhouette and texture map images. One aspect of the present invention is a system and method for capturing silhouette and texture images which eliminates the need for special backgrounds, such as a brightly colored green or blue background. In two related image-taking sequences, a camera takes spatial (mesh construction) data in one pass and then texture data in a second image-taking pass.

In the exemplary embodiment (described in further detail below) an object to be modeled is placed on a rotating turntable. A camera, which is stationary, is focused on the object. The camera begins to capture images of the object as it rotates on the turntable. (In an alternative embodiment, the object is placed in a stationary position and the camera is rotated about the object.) In one pass, the system and method of the present invention captures a number of photographic images that will be processed into image silhouettes. In the pass to gather data for mesh construction, the present invention does not use a bright colored background, but instead uses backlighting that is typical for ordinary photography (e.g. white photographic lights on a white background).

In a second pass (using white photographic lighting and no specially colored background), the system and method of the present invention gathers texture data by photographing the object in a series of still photographs which can be spatially related to the mesh construction data. Further, in the exemplary embodiment, the system takes a number of additional images to calibrate the relative position of camera and axis of rotation of the object and a number of additional images to determine background lighting levels.

The image capture process of the present invention enables users to create 3D models that are highly accurate in terms of their spatial dimensions and also highly accurate in terms of their texture map color. The use of distinct passes for capturing mesh construction and, separately, texture data, also eliminates the need to use colored backgrounds, such as green backgrounds, during image capture.

Another aspect of the present invention is a system and method for processing the collected image data into a 3D mesh model. After a calibration procedure (used to determine the focal length of the camera and the turntable's axis of rotation), a silhouette processing module determines a set of silhouette image polygons that describe the contours of the object. The silhouette processing module of the present invention includes a background subtraction process which identifies and removes from consideration the background points in each image (distinguishing them from those points which describe the object), and a polygon shape building module which creates a polygonal shape from the object points within the image.

The system then takes the data from the processed silhouette images and creates a polygonal mesh model of the object. This initial form of the 3D model is made with a minimum number of irregular polygon shaped faces (e.g. faces that are triangular as well as square, pentagonal or trapezoidal in shape). It is an aspect of the system and method of the present invention that the procedures determine the shape of the 3D model analytically—by finding the areas of intersection of the edges of the model faces and edges of the silhouette outlines. As described in further detail below, the system takes an initial silhouette image polygon and then projects that silhouette image polygon along the lines of projection cone (described below) to create an initial (rough) model of the 3D object.

Then, through an overlaying process (which iteratively processes each of the remaining silhouette image polygons), a 2D projection of this initial (rough) model is overlaid on an image of each of the remaining silhouette image polygons. Each overlaying of the silhouette image polygon and object model in 2D allows the system to determine those areas that are extraneous and should be removed from the initial (rough) model—extraneous spaces will be removed from the initial object until the final space that is left will consist of an area bounded by the silhouette contours.

By computing the dimensions of the object analytically in the overlaying process—by finding the areas of intersection of the silhouette and model outlines—the present invention eliminates the need for a gridded block in determining the spatial contours of the 3D model. The present invention also provides a more accurate representation of the shape as compared to those systems which incorporate a gridded block, as the points of the contour lines do not have to be anchored to the cubic grid points.

After the processing of silhouettes into a polygonal model, the polygonal model can be transformed into triangulated mesh model. Then, in a subsequent step, the present invention provides a system and method for mapping texture from the texture images onto the triangles of the 3D mesh model. In this procedure, a computer program module links each triangle of the mesh model to a specific region in one of the various texture map images. Once linked, the triangles of the object can be displayed with a texture overlay from that texture map image. This procedure of the present invention uses a deterministic method to find the one area in the various texture map images that is "best" suited for each triangle. As the texture map images typically show overlapping views of the object, the main task of the procedure is to select texture area from the one texture map image which provides the "best" view of the object at that area. The detailed description provides further detail below.

BRIEF DESCRIPTION OF THE DRAWINGS

FIG. 6 shows each of the images of FIGS. 5a-5d placed about the object as if they had been taken by moving the camera instead of the image as described above;

FIG. 17 depicts comparison between pixels by the background subtraction module of the present invention to located object descriptive pixels in a given silhouette image;

FIGS. 19c-19d depict the process of "flipping" the bit values of a cluster bounded by a silhouette contour of the present invention;

FIG. 20a presents an exemplary process flow for the clusterization sub-module's tracing procedure;

FIG. 22b depicts a silhouette contour as it is altered by the polygonal shape module of the present invention;

FIG. 23 presents a diagram of the computer-programmed elements of the 3D construction module of the present invention;

FIGS. 29b-29c provide further depiction of the trimming procedure of the present invention;

FIGS. 29d-f provide exemplary process flows for the tracing procedure of the present invention;

FIGS. 32a-b depict an exemplary knifing list of the present invention and the changes that occur to it as the knifing procedure operates;

FIG. 33 depicts the knifing list of FIG. 32b with its point-pair segments ordered by their Z values;

FIG. 39 depicts a number of views of a 3D model face of the present invention which is transformed by the triangulation module 110;

FIG. 42 depicts a screen view of an exemplary model projection and special map image of the present invention and shows four point pairs which the user has selected to create special texture map areas for the 3D model of the present invention;

FIG. 44 presents a diagram of the computer programmed elements of the alternative silhouette processing module of the present invention;

FIG. 46 depicts a portion of a background image with an anomaly (such as a spec of dirt) and also a portion of the background masking image with a mask created for the anomaly;

FIG. 47 depicts an exemplary histogram mapped from the selected silhouette image in the alternative embodiment of the silhouette processing module;

FIG. 51 depicts an exemplary silhouette image mask and it identifies a number of cluster areas with in the image in the presented alternative embodiment;

FIG. 56 presents a diagram of the computer programmed elements of the 3D construction module of the present invention in the alternative embodiment;

DETAILED DESCRIPTION

I. System for Image Capture

Figure 1:
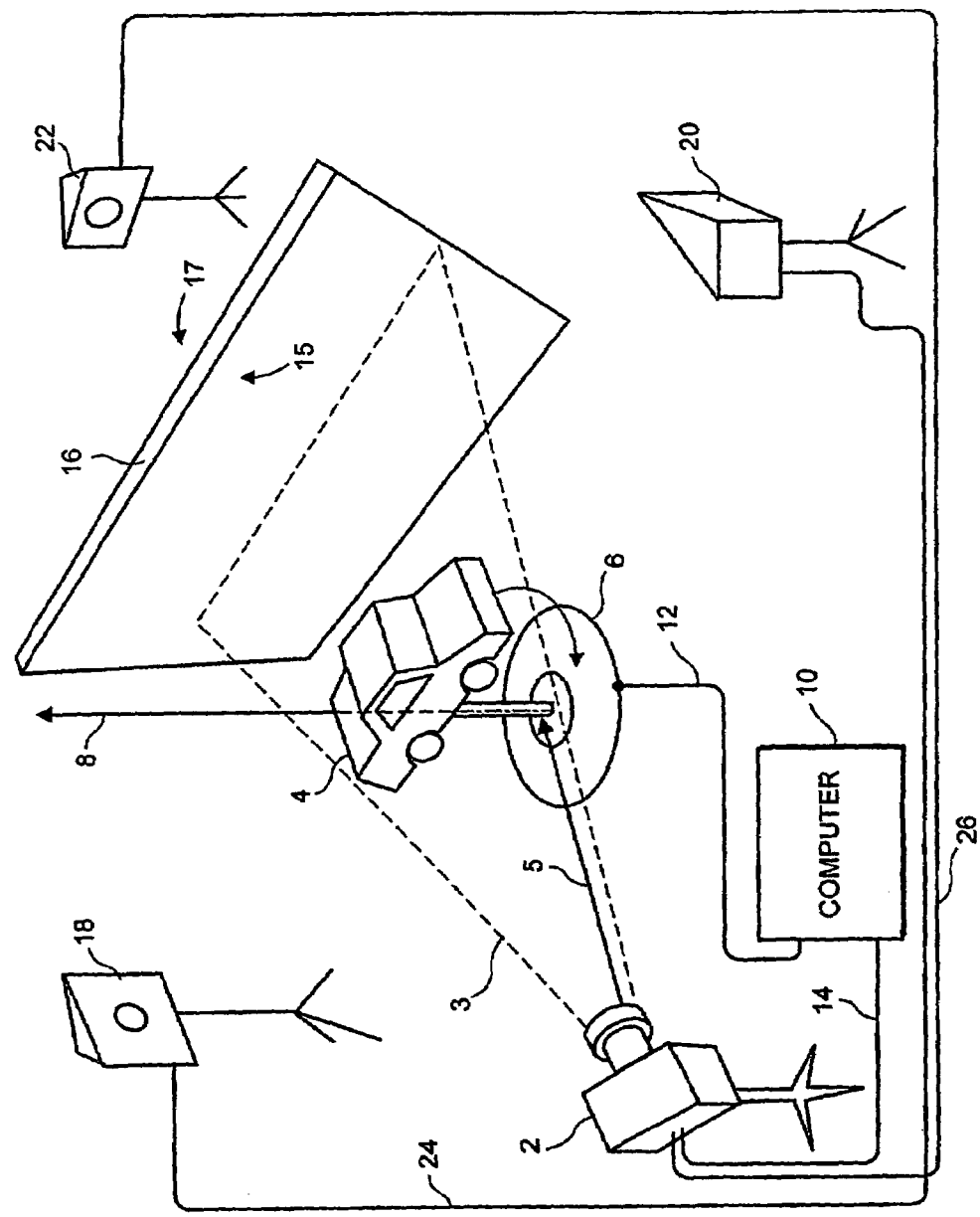
FIG. 1 depicts an exemplary system for image capture of the present invention.

FIG. 1 depicts an exemplary system for image capture of the present invention. A camera 2 is placed at a distance from an object 4. The camera 2 has a field of view 3 and is focused upon the object 4 along a line of focus 5. The object 4 is placed upon or affixed to a rotating turntable 6. The rotating turntable 6 turns the object 4 upon an axis of rotation 8. The rotating turntable 6's movement about the axis of rotation 8 moves the object 4 and presents a plurality of views of that object 4 to the camera 2 (such that different views of the object will appear within the camera's field of view 3). The rotating turntable 6 positions the object 4 in a plurality of different positions about the axis of rotation 8 and the camera 2 captures different views of the object 4 in a plurality of images—further processing of the data from those images creates (as described below) a 3D model of the object.

In the exemplary embodiment, a computer 10 is coupled to the rotating turntable 6 and the camera 2 by connection links 12, 14. The computer 10 is capable of outputting signals to the rotating turntable 6 (via connection link 12) to move the turntable (and, accordingly, the object 4) to different positions about the axis of rotation 8. The computer 10 is also capable of outputting signals to the camera 2 (via connection link 14) which will cause the camera 2 to capture an image (take a picture) of the object 4 in its current position. The computer 10, in an image capturing process (described in further detail below), controls the movement of the rotating turntable 6 and the imaging capturing of the camera 2.

In the exemplary embodiment, the system of the present invention also includes a background screen 16 (with a front side 15 and a back side 17), one or more foreground lighting devices 18, 20 and one or more background lighting devices 22 (one is shown). As shown in FIG. 1, the background screen 16 is placed (from the point of view of the camera 2) behind the object 4 and within the field of view 3 of the camera 2. During the silhouette image capturing process of the present invention (which is described in further detail below), the background light devices 22 illuminate the background screen 16. When the background lighting devices 22 are powered on, light from those sources hits the back side 17 of the background screen 16, causing it to glow and produce an illuminated background in each picture taken by the camera 2. During the texture capturing process of the present invention (described in further detail below), the foreground lighting devices 18-20 illuminate the object 4 and the background screen 16. In the exemplary embodiment, the foreground lighting devices 18-20 and the background lighting devices 22 flash, producing light each time they are powered on. In the exemplary embodiment, the foreground lighting devices 18-20 and the background lighting devices 22 are coupled to the camera 2 by connection links 24 and 26. The camera 2 is capable of outputting a signal to the foreground lighting devices 18-20 and/or the background lighting devices 22 so that they flash and illuminate during the camera 2's image capture. In alternative embodiments, photo flood lights, for example, can also be employed as the background and foreground lighting devices 18-22 of the present invention.

For the system of the present invention, the camera 2 can be any picture taking device capable of capturing a still photographic image that can be digitized. Digital cameras, of either professional quality or consumer quality, are particularly suitable. For purposes of an exemplary embodiment, a digital camera such as the Kodak DCS-330 camera (a professional quality digital camera) manufactured by Eastman Kodak Corp., Rochester, N.Y. would be suitable for use as the camera 2. The Kodak DCS-330 can be controlled by remote computer signal and can be connected to a computer (such as the computer 10) by a connection, such as by a "firewire" connection (e.g. an IEEE 13 connection). The computer signals for image capture are then transmitted to the camera 2 across that connection. The Kodak DCS-330 has the capability of outputting each captured digital image directly to the computer 10 (via the connection 14) and/or storing each captured image in its own memory for later downloading. The Kodak DCS-330 can also be coupled to and control lighting devices, such as photographic strobes. It is noted that while the Kodak DCS-330, a high resolution professional-grade camera, is suitable for an embodiment of the present invention, alternative embodiments can be constructed using other lower or higher resolution digital cameras, or other cameras such as film or video cameras.

For the system of the present invention, the rotating turntable 6 can be any device capable of turning the object 4 to determinable positions around the axis of rotation 8. For purposes of an exemplary embodiment, a rotating turntable known as the MDT-19, manufactured by the Kaidan Corp. of Feasterville, Pa. is suitable for the rotating turntable 6. The MDT-19 has an armature capable of holding an object. The MDT-19 turns the armature to move the object 4 about an axis of rotation (such as the axis 8). From an initial position (a position in which is has a rotation of zero degrees) the MDT-19 includes a motor and that motor can be signaled by the computer 10 to turn its armature (in a clockwise or counter-clockwise direction), to other positions about the axis of rotation 8. The armature can be rotated with great accuracy to any position measured in degrees or radians from the initial "zero" position.

The motor of the MDT-19 uses electrical voltage signals to rotate the armature. The rotating turntable 6's movement is controlled by different signals of voltages input to the motor of the rotating turntable, each different voltage signal corresponding to a specific angle of rotation position assignment (e.g. 0 degrees of rotation, 10 degrees of rotation, 20 degrees of rotation). It is noted that while the MDT-19 rotates about only one axis of rotation, it is possible that a turntable could rotate an object about more than one axis of rotation. Such a turntable would also be suitable for use in the system of the present invention.

For the system of the present invention the computer 10 can be any computer with a processor connected to a memory and capable (through an operating system or otherwise) of executing computer procedures for the capturing of spatial and image data concerning the object 4. In the exemplary embodiment, PC computers that have a Intel Pentium™ host processor, a graphics operating system, memory (e.g. 256 Mb of RAM or more and 1 Gb of hard disk space) operational capabilities of 200-400 MHZ (or higher), and graphics processing capabilities that support rendering such as Gouraud shading are suitable for implementing the present invention.

It is noted that for purposes of an exemplary embodiment it is also possible that the function of the computer 10 during the process of image capture could also be performed by the camera 2, if such a camera was equipped with a microprocessor (or other processing device) sufficient to execute the procedure for image capture described below. Such a microprocessor would be capable of controlling the movement of the rotating turntable 6 and the image capturing of the camera 2. Such a camera 2 would also have to have sufficient memory resources to permit its microprocessor to store the captured images or output them to another computer.

In addition, the foreground lighting devices 18-20 and background lighting devices 22 described above can be any lighting devices that suitable for photographic lighting. In the exemplary embodiment, the foreground lighting devices 18-20 and the background lighting sources 22 are photo flash units, such as tungsten flash units (e.g. units which emit a white colored light). Such lighting units may be affixed to tripods or boom arms and may also have attachments such as umbrellas or "soapboxes" to diffuse, restrict, direct or spread the beams of light. The background screen 16 can be any material capable of creating a backlit lighting effect; in the exemplary embodiment a professional photographer's backdrop capable of permitting a backlighting effect is suitable.

In addition to the equipment described above, there are also a number of computer program modules to execute procedures which are now presented below. In the exemplary embodiment, all of the presented software is written in the C++ computer language and can be used on computers for which a C++ compiler is supported. However, in alternative embodiments, the computer program modules could be written in other computer program languages which would provide similar functionality as that described herein (such as for example Java).

A. Procedure for Image Capture

In a procedure for image capture, the system of the present invention collects a set of photographic images. The system later processes those images to extract the spatial geometry data (3D mesh construction data) needed to construct a 3D model and texture data needed to render a 3D model. For the spatial geometry data, the system collects of a plurality of images ("silhouette images") in which the object is illuminated with backlighting so that an outline of the object, circumscribing its mass, is detectable. For the texture data, the system in the exemplary embodiment collects a plurality of images ("texture map images") in which the object is illuminated with foreground lighting. Additionally, and for greater accuracy in processing the silhouette and texture map images, the system in the exemplary embodiment also captures an image of the backlit background screen 16 without the object (a "background image") and a number of images to calibrate the focal length of the camera 2 and axis of rotation 8 of the rotating turntable 6 ("calibration images").

B. Capturing Silhouette Images

In the exemplary embodiment, the procedure for capturing silhouette images begins with the camera 2 being placed near the rotating turntable 6, with the background screen 16 appearing behind the object 4 as seen from the camera 2's field of view 3. The background lighting devices 22 are powered on so that the background screen 16 provides a backlit backdrop for photographing the object. Each object photographed will require some adjustment of the relative position of the camera 2 in relation to the object 4. For purposes of an exemplary embodiment, the object 4 occupies most of the camera 2's field of view 3 but does not cross the edges of that field of view 3. To achieve such positioning it may be necessary place the object 4 on the rotating turntable 6 and then observe the object through the camera 2 as rotating turntable 6 moves the object 4 through several three hundred and sixty degree rotations. The camera 2 may also be trained on the object 4 at an angle so that the views of the object 4 will include the object 4's top as well as its sides. Once the view of the object 4 has been checked, the positions of the object 4 and camera 2 will stay fixed during the procedure for collecting silhouette images (as well as during the procedure for collecting texture map images). The computer 10 then executes a procedure for capturing silhouette images. The system will rotate the object 4 on the turntable so that multiple sides of the object can be viewed by the camera 2 and photographed.

Figure 2:
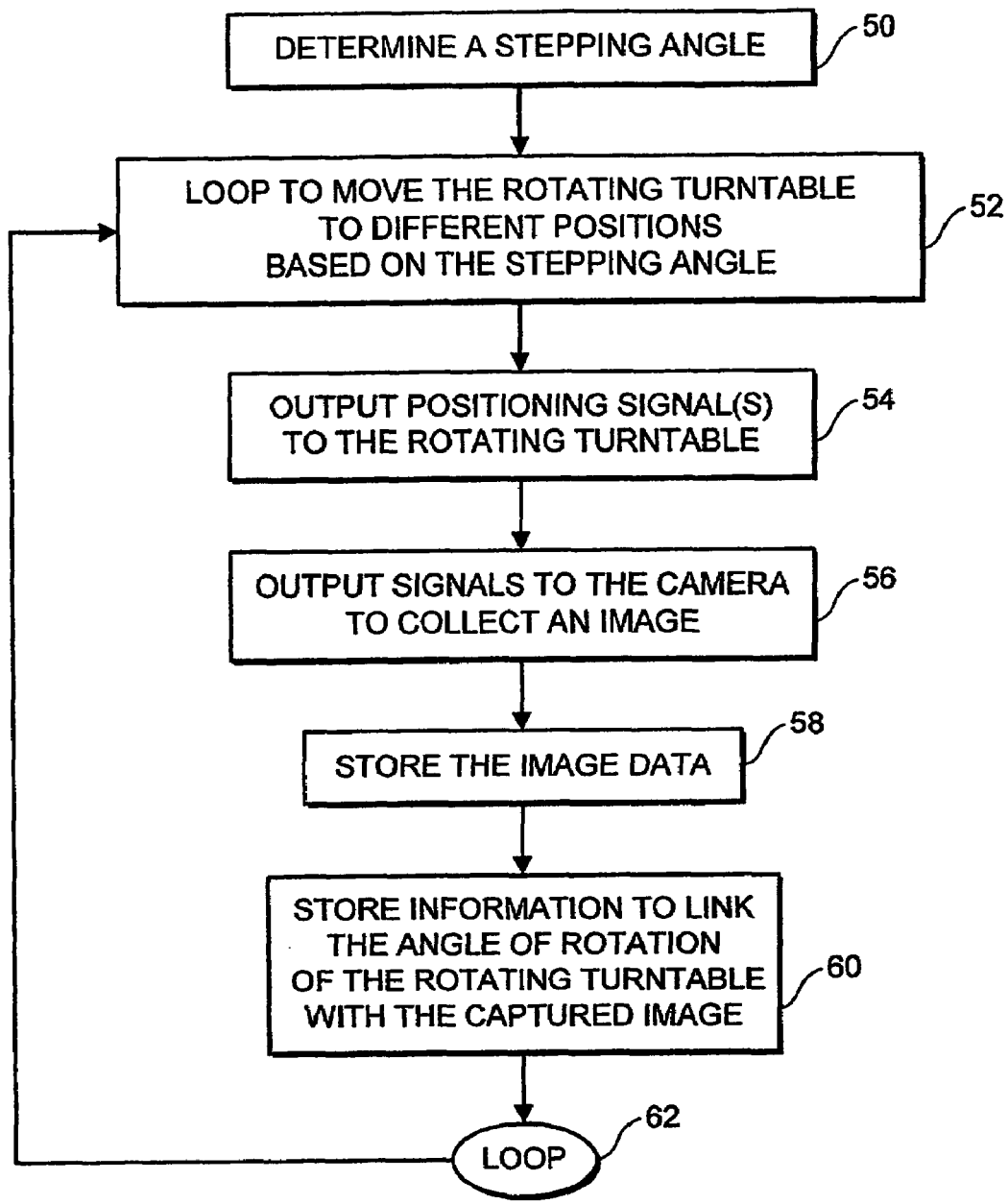
FIG. 2 depicts the process flow of an exemplary procedure for capturing silhouette images.

FIG. 2 depicts the process flow of an exemplary procedure for capturing silhouette images. The procedure begins in step 50 by determining a stepping angle used to incrementally move the rotating turntable 6. In the exemplary embodiment, the stepping angle is determined be dividing 360 degrees by the number of images which might be desired. However, in alternative embodiments the stepping angle could be fixed or determined by user input. In step 52, the computer 10 begins a loop to move the rotating turntable 6, capture an image of the object 4 and store that image with information for later processing. The computer 10 begins processing at a first position (such as zero degrees) and then continues the procedure, looping, for example, until a current position variable (which is incremented by the stepping angle) becomes greater than or equal to an ending position (such as 360 degrees).

Within the processing loop, the computer 10 in step 54 outputs a signal along connection link 12 to move the rotating turntable 6 to a position (such as a first position of zero degrees or a second position of 10 degrees and so on). In the exemplary embodiment the rotating turntable 6 (e.g the MDT-19) is signaled as described above with an electronic signal which will cause the turntable to rotate by a known incremental amount. (N.B. the computer 10 can output a number of electronic signals to move the rotating turntable 6 by the desired step angle amount.) In step 56, the computer 10 outputs a signal along connection link 14 to signal the camera 2 to take a picture of the object 4 (and capture an image of the object 4 at this particular angle of rotation). As noted above, the background light devices 22 are coupled to the camera 2 and the camera 2 will synchronize the flash of such lights with its capturing of an image.

Once the camera 2 captures the image, it executes a procedure to either output the image to the computer 10 or store the image. In the exemplary embodiment, the camera 2 (after receiving the signal in step 56), outputs the image data to the computer 10. Then, in step 58 the computer 10 writes that data to the computer 10's hard disk for storage. In one alternative embodiment, the computer 10 could be configured to immediately process the data (to gather the spatial 3D mesh construction data as described below) and discard the captured image rather than storing it for later processing. Such an embodiment of the present invention (which includes the step of immediately processing the image data) would be particularly suited for those applications where the number of silhouette images required are so many in number that storage of the images on the hard disk is not practical. Such a situation might occur when creating an extremely detailed, super-high resolution 3D model. For that task, the user typically wishes to rotate the object on the turntable at only a small of a degree at a time and collect a large number of silhouette images.

In a second alternative embodiment, camera 2 can be configured to store the silhouette images in internal memory and then download the images at a later time, instead of outputting each image as described in step 58 of FIG. 2.

In step 60, the computer 10 stores information concerning the turntable rotation position and associates the turntable rotation position information with the image taken. For example, in the exemplary embodiment the computer 10 in step 60 inserts a new line record into a table, such as the following:

| Degree of Rotation | image number | File Name | Type |
|---|---|---|---|
| 0 | 1 | car_s_pic0.tif | silhouette image |
| 10 | 2 | car_s_pic10.tif | silhouette image |

In the example above, the data table is created as a dynamically allocated array of n×4 dimension where n is the number of silhouette images (or total images to be taken). In alternative embodiments other data structures can be used. In step 62, the computer 10 returns to step 52 and continues the processing loop until it has rotated the turntable through a full set of the desired angles and has collected a silhouette image for each position.

Figure 3A:
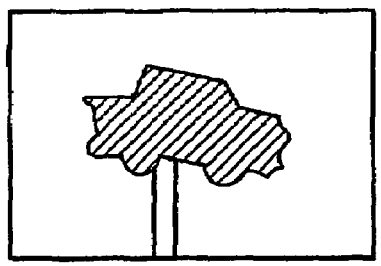
FIGS. 3a-3h depict an exemplary set of silhouette images collected by the system of the present invention.
Figure 3E:
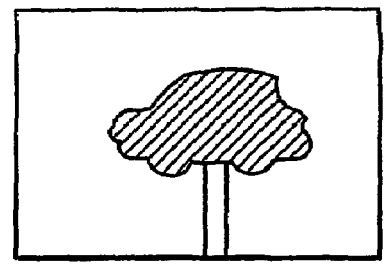
Figure 3B:
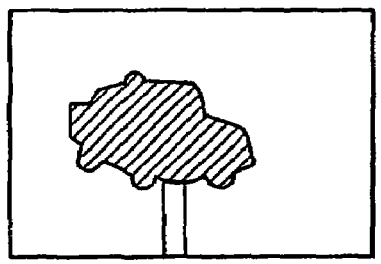
Figure 3F:
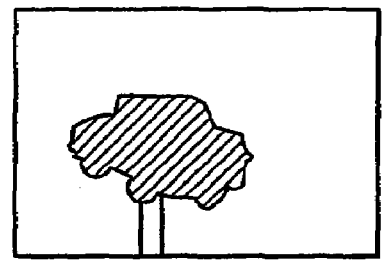
Figure 3C:
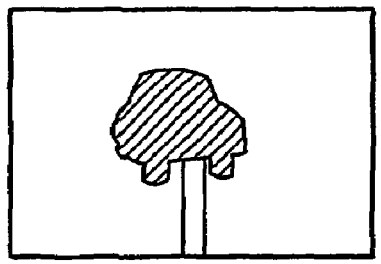
Figure 3G:
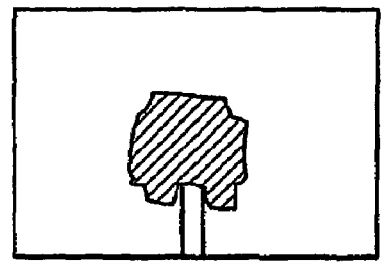
Figure 3D:
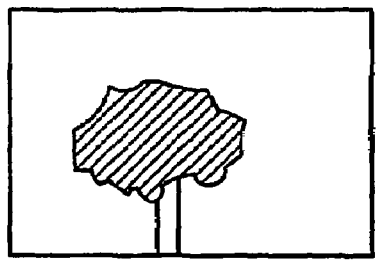
Figure 3H:
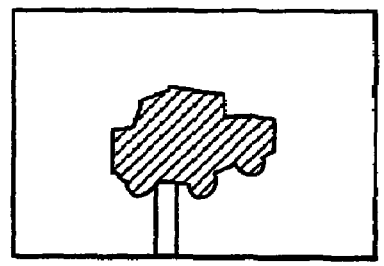

FIGS. 3*a*-3*h* depict an exemplary set of silhouette images collected by the system of the present invention. Using a toy car as an example, the system has captured 8 images. FIG. 3*a* shows the toy car with the turntable in the starting position and each subsequent image FIGS. 3*b*-3*h* shows the toy car from a view after the turntable has rotated by the subsequent amount of the stepping angle. In this example the stepping angle is 45 degrees and thus, views of the car are seen from the rotation of the turntable at its various angle positions: 45 (FIG. 3*b*), 90 (FIG. 3*c*), 135 (FIG. 3*d*), 180 (FIG. 3*e*), 225 (FIG. 3*f*), 270 (FIG. 3*g*) and 315 (FIG. 3*h*) degrees.

Figure 4:
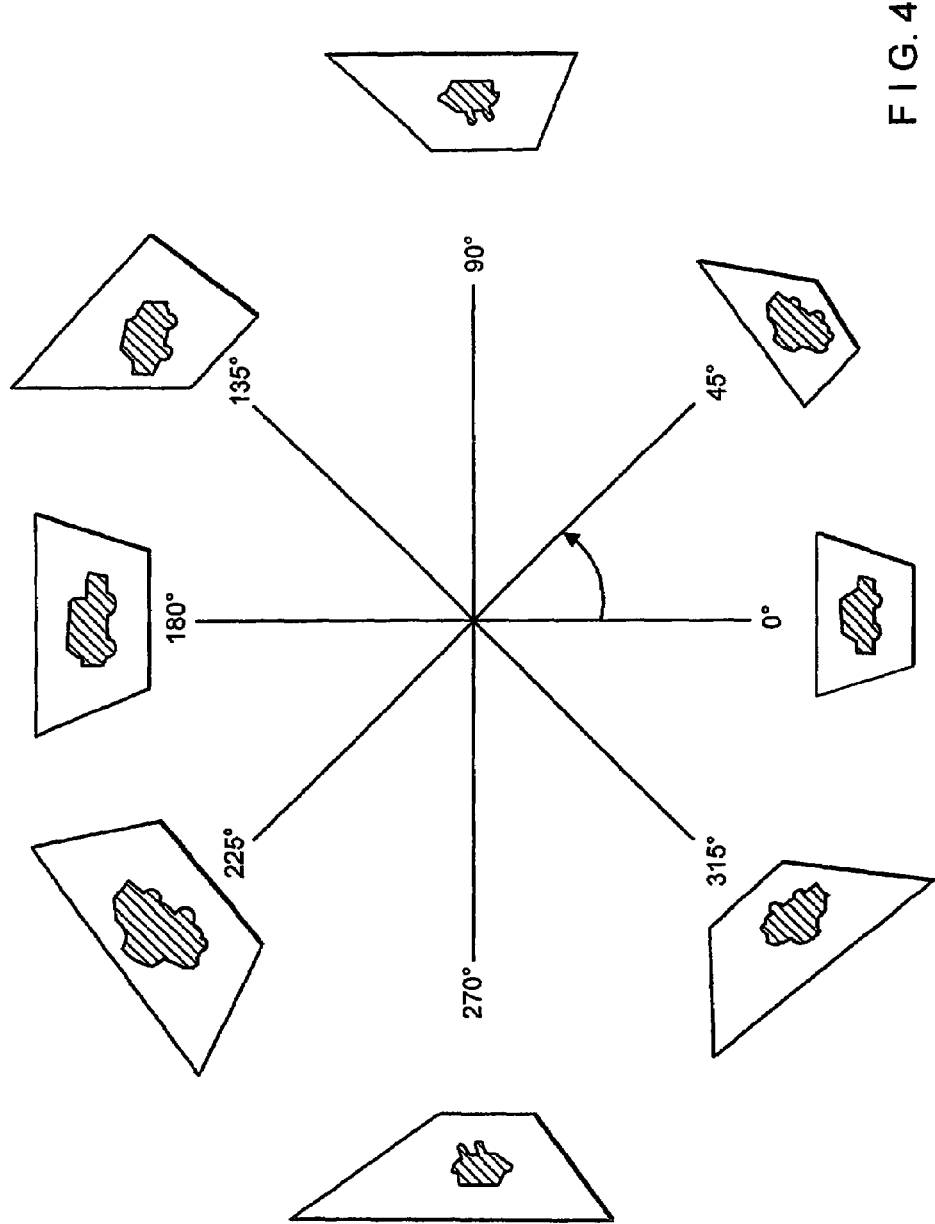
FIG. 4 shows each of the images of FIGS. 3a-3h placed about the object as if they had been taken by moving the camera instead of the image as described above.
Figure 5A:
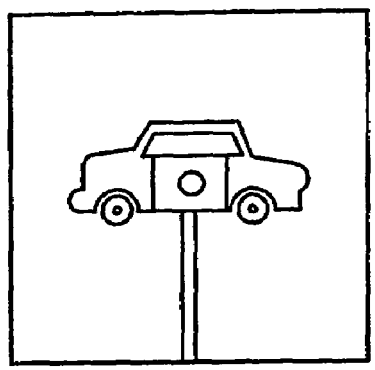
FIGS. 5a-5d depict an exemplary set of texture map images collected by the system of the present invention.
Figure 5B:
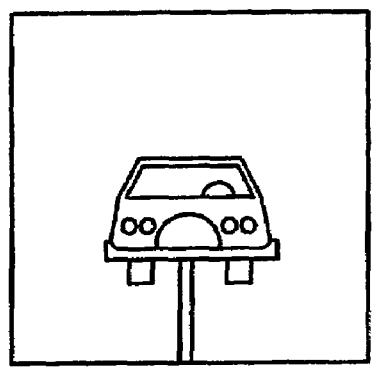
Figure 5C:
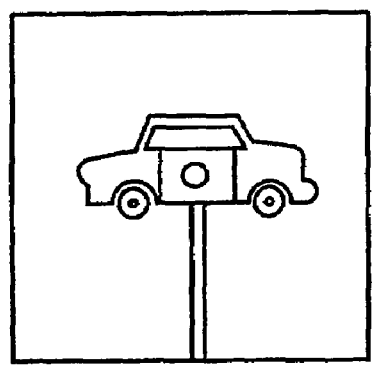
Figure 5D:
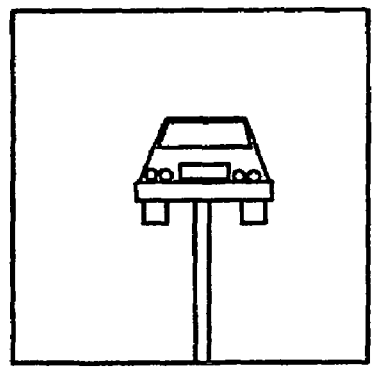

The process of capturing images of an object using a camera at a fixed location and a rotating turntable which moves the object about an axis of rotation enables the user to capture a set of images of the object from different viewpoints. Analytically, the set of images collected following this process is the same as the set of images that would be captured if the user had kept the object 4 fixed and had moved the camera 2 with extreme precision in a circle about the object (with such a circle having its center on the rotating turntable's axis of rotation 8). FIG. 4 shows each of the images of FIGS. 3*a*-3*h* placed about the object as if they had been taken by moving the camera instead of the image as described above. From FIG. 4 it is possible to see that each captured image represents a view of the object 4 from a given angle moving about the object. (In an alternative embodiment, the present invention could be implemented in a configuration which fixes the object 4 in a stationary location and rotates the camera 2 in a circular direction about the axis of rotation 8.)

C. Capturing Texture Map Images

In the exemplary embodiment, the procedure for capturing texture map images occurs in a procedure distinct from the capturing of silhouette images. For the capture of texture map images, the background lighting devices 22 are powered off, and the foreground lighting devices 18-20 are powered on so that the object itself is illuminated against the background screen 16. The object photographed may require some adjustment of the foreground light sources. In order to adjust the lighting, it may be necessary to observe the object 4 through the camera 2 as the rotating turntable 6 spins the object 4 through several full rotations. However, in the exemplary embodiment, the camera 2's position is not moved relative to the position of the rotating turntable 6 and the relative positions of the camera 2 and rotating turntable 6 remain the same for both the capturing of silhouette images and texture map images. Once the view of the object 4 has been checked, the computer 10 then executes a procedure for capturing texture map images, which follows with substantial similarity the procedure outlined with respect to FIG. 2.

As described above in step 60, FIG. 2 (with respect to the silhouette images), the computer 10 stores with respect to each captured texture map image information concerning the turntable's rotation position (the angle position of the rotating turntable 6 at the time when the camera 2 captured the texture map image) and associates that turntable rotation position with the new texture map image taken. For example, the computer 10 inserts a new line record into a table, such as the following:

| Degree of Rotation | image number | File Name | Type |
|---|---|---|---|
| 0 | 25 | car_texture0.tif | texture image |
| 35 | 26 | car_texture35.tif | texture image |

In the example above, the data table is created as a dynamically allocated array of n×4 dimension where n is the number of texture map images. Alternatively, the data table concerning the texture map images could be omitted and the data concerning the texture map images and rotation angles could be stored together in a data table along with the similar data concerning the silhouette images.

FIGS. 5*a*-5*d* depict an exemplary set of texture map images collected by the system of the present invention. Using a toy car as an example, the system has captured 4 images. As shown in the example, the number of texture map images (4) does not equal the number of silhouette images (8) which were previously captured and described above with respect to FIGS. 3*a-h*. Further, it is not necessary that the texture map images be taken from the same rotating turntable positions as the silhouette images. FIG. 6 shows each of the images of FIGS. 5*a*-5*d* placed about the object as if they had been taken by moving the camera instead of the image as described above. From FIG. 6, it is impossible to see that each captured texture map image represents a view of the object 4 from a given angle moving about the object 4 at the angle of rotation 8. (In an alternative embodiment, the present invention could be implemented to collect texture map images in a configuration which fixes the object 4 in a stationary location and rotates the camera 2 in a circular direction about the axis of rotation 8.)

D. Capturing Background and Calibration Images

Figure 7:
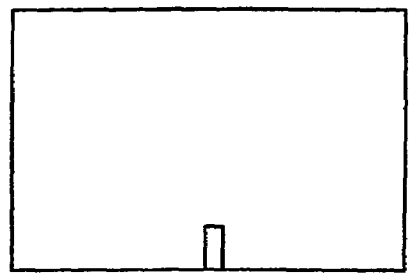
FIG. 7 depicts an exemplary background image of the present invention.

In the exemplary embodiment, the system collects additional background and calibration images before the camera 2 is moved (and while the relative positions of the camera 2 and rotating turntable 6 are the same). As will be described in further detail below, a background image is used when processing the silhouette images to help identify those pixels which describe the background and not the object 4. To collect a background image, the object 4 is removed from the armature of the rotating turntable 6 and the background lighting devices 22 are powered on. Then, the camera 2 captures one or more images of the scene (without the object 4). Those images are identified as background images (e.g., through a data table record or by file name) and then stored by the computer 10. FIG. 7 depicts an exemplary background image.

Figure 8A:
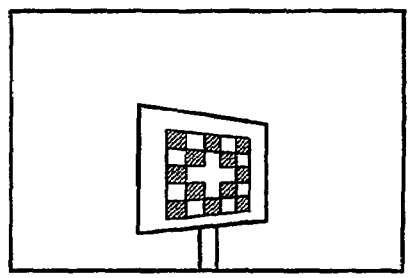
FIGS. 8a-8b depict two calibration images of the flat surface object at positions that are +45 and −45 degrees of the camera 2's line of focus.
Figure 8B:
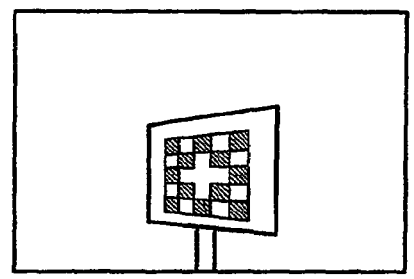

As will be described in further detail below, calibration images are used to determine the parameters of the camera 2's focal length and the rotating turntable 6's axis of rotation 8. The system of the present invention uses those parameters in calculating the 3D X, Y, Z coordinates of the vertices of the 3D object model—the coordinates that provide the spatial geometry of the 3D model. In the exemplary embodiment, the system of the present invention provides the step of displaying a flat surface object which is marked with a shape of known dimension (such as a checkerboard with one square that is colored opposite to the pattern). The flat surface object is placed onto the armature of the rotating turntable 6. An image is then taken of that object (and pattern) with the turntable rotated to a position where the flat surface is thought to be at a discernable angle (for example 45 degrees) to the camera 2's line of focus 5. Then, using the rotating turntable to re-position, the flat surface object is rotated to a position on the other side of the line of focus 5 (e.g. opposite to the first position). Using the example of a first calibration image taken with the flat surface object at 45 degrees to the line of focus 5, the calibration object might then be rotated 90 degrees to a position that is 45 degrees to the other side of the camera 2's line of focus 5 (or −45 degrees)—and thus it is known that the angle of rotation between the flat surface object in the first and second positions is 90 degrees (and that angle is known regardless of the flat surface object's position relative to the camera 2's line of focus 5). FIGS. 8*a* and 8*b* depict two calibration images of the flat surface object at positions that are +45 and −45 degrees of the camera 2's line of focus (such that there is a difference of 90 degrees between the position of the flat surface image in the first and second images.

E. Other Images

Figure 9:
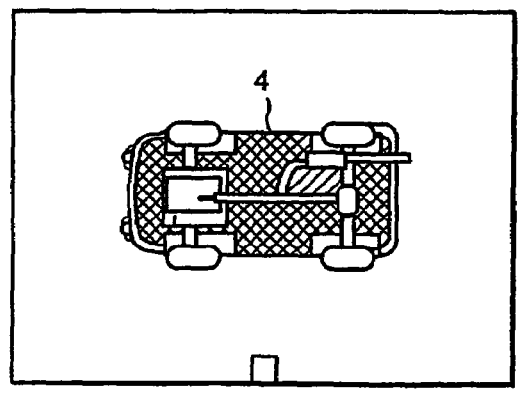
FIG. 9 depicts additional texture map image used to provide additional texture in the present invention.

Before the relative positions of the camera 2 and rotating turntable 6 are altered, it is also possible to capture additional images of the object 4 which may be used e.g. for editing purposes. For example, it may be useful to have additional texture images of the bottom of the object 4 which might be integrated into the final 3D model. FIG. 9 depicts such an additional image. In FIG. 9 the object has been removed from the armature of the rotating turntable 6 and a view of the bottom of the object 4 now appears—a view which otherwise would not have been seen while the object was attached to the rotating turntable 6. Such images can be used in editing processes, such as those described below.

F. Notes on Image Capture

It is noted that each of the procedures for capturing silhouette, texture map, calibration and background images are discrete and that different embodiments of the present invention can be created following different sequences for their capture. For example, in one embodiment the user may first capture silhouette images before texture map, background and calibration images. In an alternative embodiment of the present invention, background images and calibration images could be taken before the placement of the object 4 on the rotating turntable 6 (and the collection of silhouette and texture map images). However, with such an embodiment steps would have to be taken to ensure that the camera's position relative to the general position of the rotating turntable was not changed after the placement of the object 4 on the rotating turntable 6. For purposes of an exemplary embodiment, the system of the present invention proceeds by first capturing texture map images and then silhouette images. Thereafter, the system captures one or more background images (for silhouette processing) and the calibration images (for 3D coordinate processing). After the system has captured the needed images, it commences a procedure for building a 3D model from the images.

II. 3D Model Building

The present invention provides a 3D model builder application which processes the information contained in the images collected above to produce a 3D model of the object 4. The 3D model builder application includes a plurality of computer programmed modules that control the processor of the computer 10 and enable it to execute the tasks described below needed to create the 3D model.

Figure 10:
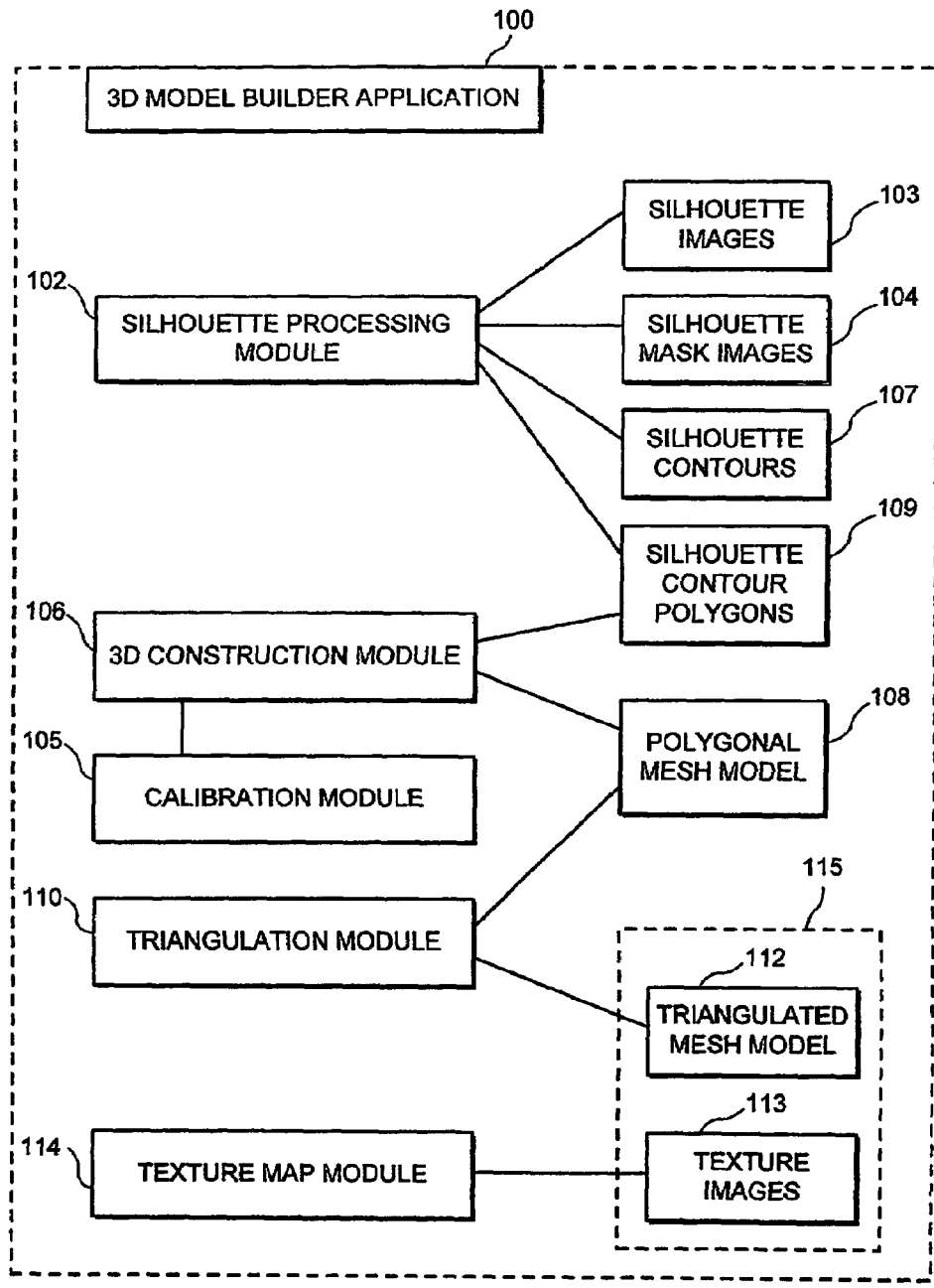
FIG. 10 depicts an exemplary set of computer programmed elements included in a 3D model builder application of the present invention.

FIG. 10 depicts an exemplary set of computer programmed elements included in a 3D model builder application 100 of the present invention. It is noted that the processing of the 3D model builder application 100 could be performed on the computer 10 of the image capturing system or, alternatively, the computer programmed elements of the 3D model builder application 100 could be stored and operated on another computer that is remote to the computer 10.

Referring to FIG. 10, a silhouette processing module 102 analyzes the silhouette images (captured above) and locates within those images the contours which describe the object. As an initial step, the silhouette processing module 102 processes the silhouette images (represented at 103 in FIG. 10) data to identify within each images those pixel points that describe the object 4—distinguishing such pixels from those which describe the background. For each silhouette image, the silhouette processing module 102 creates a silhouette mask image: a bitmap containing light-colored bits for the points describing the background and dark-colored bits for the points which describe the image. (A set of silhouette mask images are represented at 104 in FIG. 10).

In a further processing step, the silhouette processing module 102 analyzes each of the silhouette mask images to locate each object silhouette within the image and trace its contours. The silhouette processing module 102 (upon locating a cluster of points for an object silhouette) will trace the perimeter of that cluster and create a list of points that describe the contour. (A set of silhouette contours is represented at 107 in FIG. 10.) Thereafter, the silhouette processing module 102 builds a 2D polygon shape from the points of each silhouette contour. As a given silhouette contour (the linear list of points which describes each contour of the object 4) may contain hundreds of points, the further step of building a 2D polygon shape selects from those points the ones that are most significant in terms of describing the basic geometric shape of the contour. Those selected points are then grouped to form the vertices of a polygon shape—a silhouette contour polygon. It is with those silhouette contour polygons (polygon shapes which describe each contour of the object 4) that the system builds the 3D model of the object 4. (A set of silhouette contour polygons for the object 4 is represented at 109 in FIG. 10.)

The 3D model builder application 100 also includes a 3D construction module 106 which uses the information contained in the plurality of silhouette contour polygons 109 to construct a 3D polygonal mesh model 108 of the object 4. It is noted that in the present invention the 3D construction module 106 uses an analytic approach to determine the 3D model based on the silhouette contour polygon data; the 3D construction module 106 builds an initial (rough) 3D model using one of the silhouette contour polygons and then creates additional model faces using the remaining silhouette contour polygons. The approach of the present invention (described in detail below) permits boundaries of the 3D model to be determined with a high degree of accuracy. Further, with the system of the present invention, it is not necessary to use approaches like the volumetric cube approach which relies on a fixed-size grid in making the model. The output from the 3D construction module 106 is the polygonal mesh model 108. The polygonal mesh model 108 describes the object with a series of polygons which are not necessarily triangles.

After 3D model construction, the 3D model builder application 100 provides a triangulation module 110 to create a triangulated mesh model (a mesh containing only triangular faces) from the polygonal mesh model 108. A representative triangulated mesh model is represented at 112. Additionally, the 3D model builder application 100 provides a texture mapping module 114, which uses the texture map images (collected as described above) and associates specific pixel points of a given texture map image with the specific vertices of each triangle in the triangulated mesh model 112. (A set of texture map images is represented at 113 in FIG. 10.) The triangulated mesh model 112 together with the texture map images 113 are included in the completed 3D mesh model 115 of the object 4.

Procedures for the silhouette processing module 102, the 3D construction module 106, the triangulation module 110 and texture mapping module 114 are described in further detail below. It is noted that after execution of such procedures, the 3D model builder application 100 outputs a 3D mesh model 115 of the object 4, such as a triangulated mesh model, which can be stored in one of a number of 3D formats such as the Viewpoint Media Player format of Viewpoint Corporation, or any other format which combines a 3D mesh geometry with texture information for display.

It is noted that the Viewpoint Media Player format permits a multi-resolution display of a mesh model (multi-resolution allows a 3D model to be displayed at different levels of detail resolution). The mesh construction system and method of the present invention is suitable for the creation of 3D object models which have such multi-resolution display capabilities. For more information concerning the construction of 3D mesh models with multi-resolution display capabilities the reader is directed to the following patents/applications which are hereby expressly incorporated by reference: U.S. Pat. Nos. 5,886,702, 5,945,996, and 6,208,347.

In addition, there are alternative techniques for mesh construction which permit color and/or texture to be included within the geometry (3D coordinates) of the mesh model. One such format is that described in U.S. Pat. No. 6,208,347, in which texture data is incorporated to the mesh model of the object. In an alternative embodiment, the triangulated mesh model of the present invention can incorporate color and other texture data within the mesh model. For example, in such an embodiment the texture mapping module 114 of the present invention would be configured to associate additional data points containing color or other texture information into the mesh model. For more information concerning such an alternative technique for mesh construction, the reader is directed to the following patent which is hereby expressly incorporated by reference herein: U.S. Pat. No. 6,208,347.

A description of each of the modules of the 3D model builder application 100 is now presented.

A. Silhouette Processing Module

Figure 11:
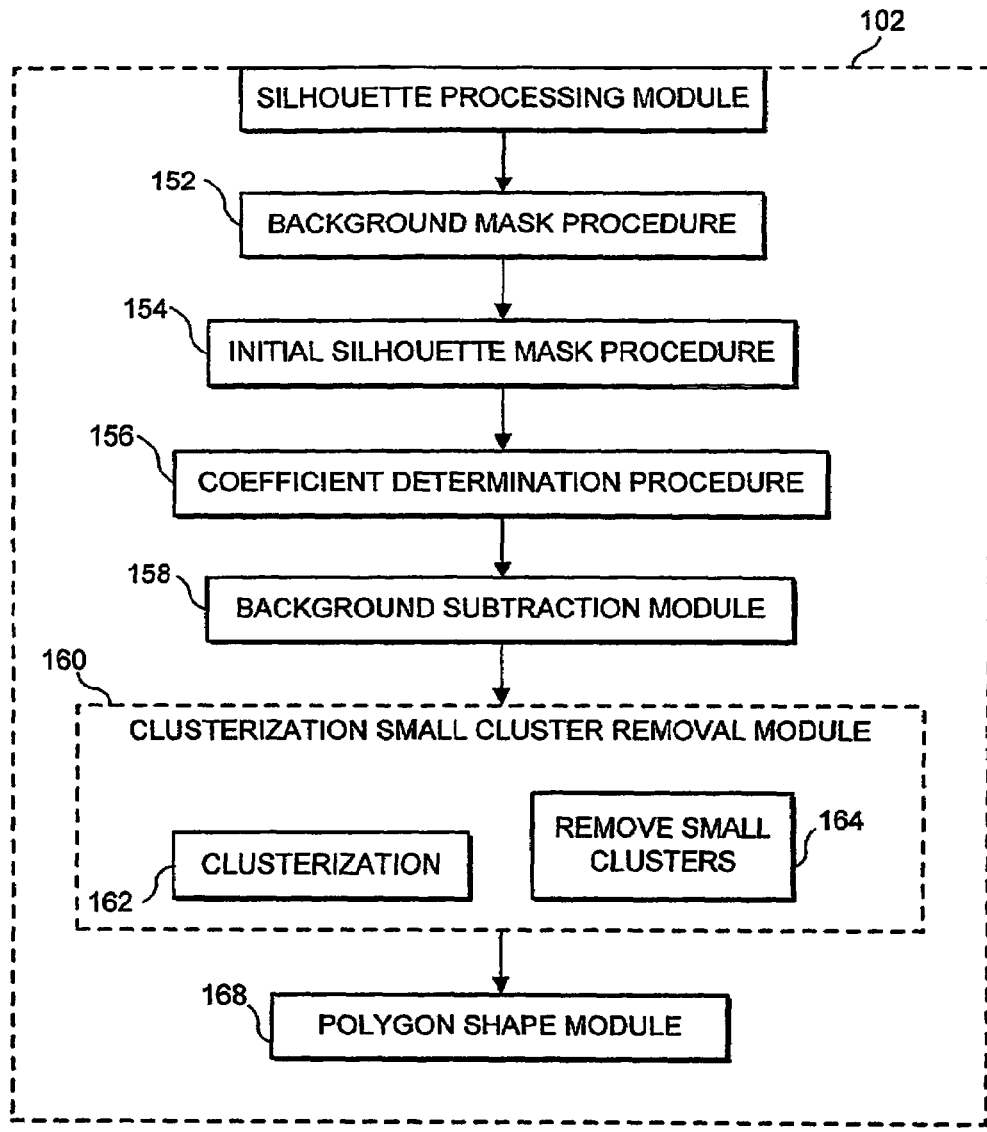
FIG. 11 presents a diagram of the computer programmed elements of the silhouette processing module of the present invention.

As stated above, the silhouette processing module 102 analyzes the data in the silhouette images and in a number of steps creates a set of silhouette contour polygons (2D polygon shapes) which the system later uses to create the 3D model. FIG. 11 presents a diagram of the computer programmed elements of the silhouette processing module 102 of the present invention. Included is a background mask procedure 152, an initial silhouette mask procedure 154, a coefficient determination procedure 156, a background subtraction module 158, a clusterization/small cluster removal module 160 and a polygonal shape building module 168. Each of these programmed elements is now described.

1. Preparation of a Background Mask and Silhouette Image Mask

The silhouette processing module 102 analyzes the silhouette images to create a set of silhouette mask images—bitmaps which have dark-colored bits to identify the object and light-colored bits to identify the background. To create the silhouette mask images, the silhouette processing module 102 executes a background subtraction process which determines the points of the object in each captured image—even where the color of the object nearly matches the color of the background. In preparation for the background subtraction process, the system executes the background mask procedure 152, initial silhouette mask procedure 154 and coefficient determination procedure 156, all of which enable the system to identify the points in each silhouette image which describe the object (and distinguish the object points from others which describe the background).

It has been observed that given two different images of the same object and same background, there may be a large difference in the light intensity of the two images. The light intensity of two images might be different, for example, due to the intensity variations of light sources (flashes). The present invention determines, on the fly, a set of coefficients which enables the present invention to separate background points from object points even in situations where the light intensity varies from photo to photo. In the background mask procedure 152, the silhouette processing module 102 processes one of the background images (see, FIG. 7, above) to identify those points which can be used later in the process to determine the coefficients for background subtraction.

The background mask procedure 152 examines the background image for the presence of pixels which represent "noise" or anomalies (describing unwanted objects, such as specs of lens dirt/or bad or noisy pixels). The procedure employs a thresholding technique to mask out the pixels which are darker than a given intensity value. To threshold, the background mask procedure 152 builds a histogram to group the light intensity of all the pixels in the background image. For example, the system can build the histogram for the background image when the file containing the background image is read into the computer's RAM memory. The data element for each pixel in the background image file contains a red, green and blue (RGB) color assignment. In the background mask procedure 152, the computer reads the RGB color assignment and computes a grayscale equivalent for that color. In the exemplary embodiment, the procedure maps each pixel color assignments to one of 256 grayscale values (e.g. a value between 0 and 255). (Alternatively, the RGB values can be mapped to other scales that measure light intensity.) The histogram determines the distribution of pixel assignments along this scale.

Figure 12:
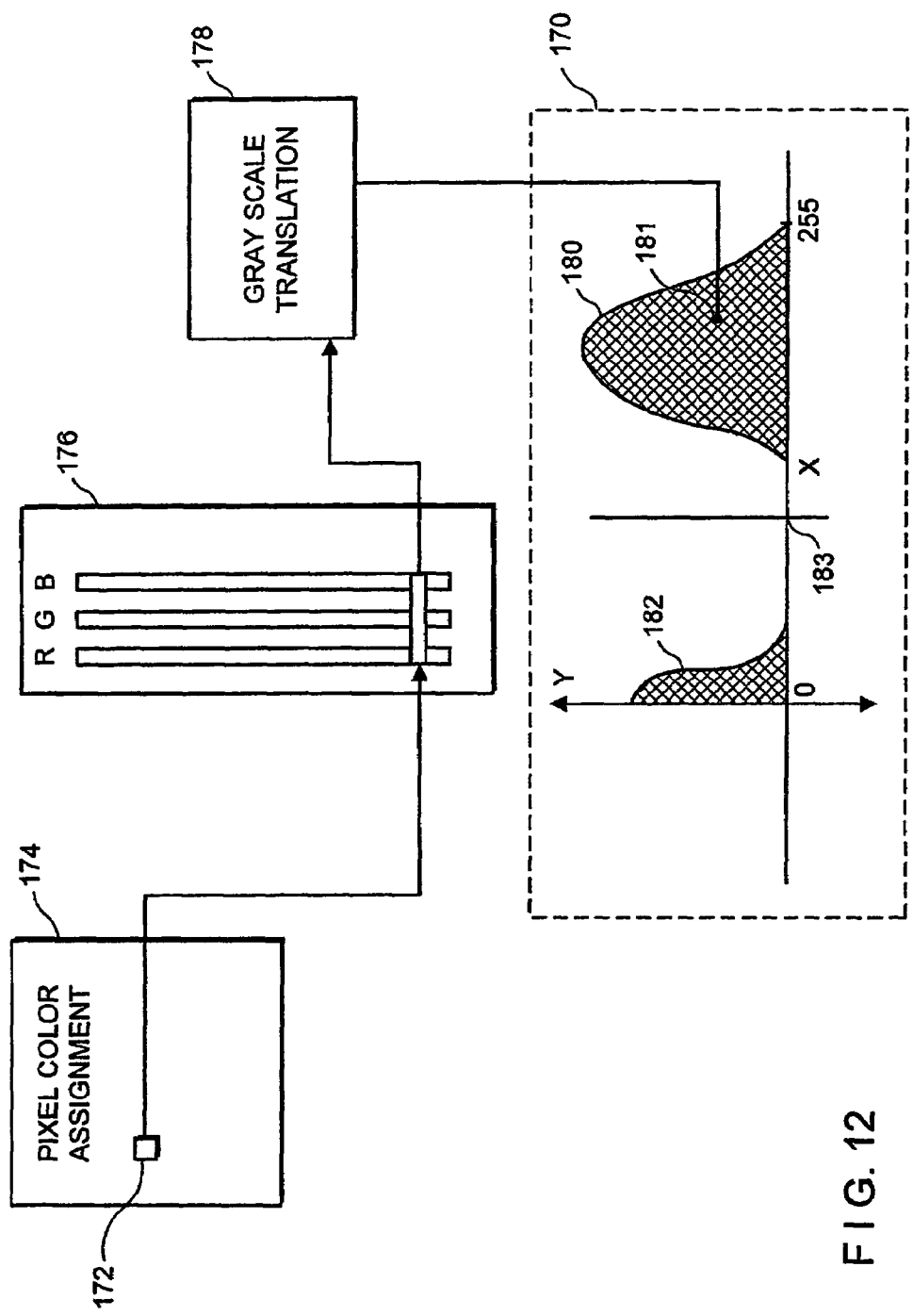
FIG. 12 depicts an exemplary histogram mapped from a background image of the present invention.

FIG. 12 depicts an exemplary histogram 170 mapped from a background image. The 0 to 255 grayscale is charted along the x axis. The number of pixels for each grayscale increment is charted on the y axis. A pixel color assignment 172 from the background image file 174 maps to a set of RGB color settings in a color palette 176 contained in the background image file. As the system reads those values into the memory of the computer, it applies a translation formula 178 to the RGB color settings, obtains a grayscale value for that pixel (e.g. 0 to 255) and then maps that value to the histogram scale 170. There are many techniques currently available for building histograms of the pixel intensities within an image.

Referring to FIG. 12, the exemplary histogram 170 for the background image has two significant areas. Area 180 shows the distribution of pixels having an intensity which is that of middle gray (those values indicate pixels that describe the background). Area 182 shows a distribution of pixels having an intensity which is that of black or near black (those values indicate pixels that would be anomalies, such as dirt or shadows). The background mask procedure 152, after building the histogram 170 then determines a threshold value for the background image. Pixels which fall in the histogram area below the threshold value will be masked so they will not be included in further calculations. In the exemplary embodiment, the background mask procedure 152 sets a threshold value, such as the midpoint between the highest distribution values in areas 180 and 182 (e.g. see point 183). In alternative embodiments, other threshold values, e.g. based on statistical distribution functions can also be used for computing the threshold value. Picking the midpoint value (as described above) provides a conservative method for determining those pixels that describe the background and those pixels that describe an anomaly.

Figure 13:
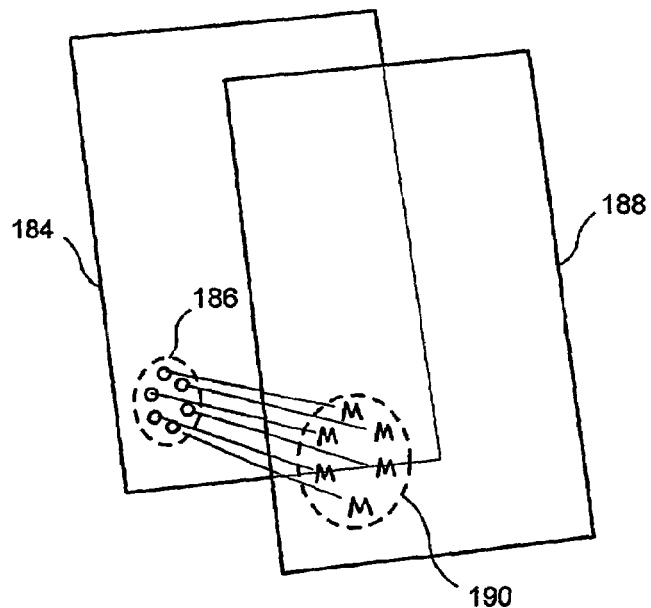
FIG. 13 depicts a portion of a background image (with an anomaly such as a spec of dirt) and a portion of the background masking image (with a mask created for the anomaly)

With the threshold value determined (see FIG. 12 at 183), the background mask procedure 152 constructs a masking frame (a bitmap) to mask off those pixels which have values that fall below the threshold. FIG. 13 depicts a portion of the background image 184 with an anomaly 186 (such as a spec of dirt) depicted and also a portion of the background masking image 188 with a mask 190 created for the anomaly. The mask 190 blocks those pixels which might contain images of dirt or other anomalies from being included in any analysis to determine the background calculation coefficients. When all of the pixels of the background image have been analyzed and have been either masked or left unmasked, the process of the background masking procedure 152 (FIG. 11) is complete.

Continuing with the process to determine the coefficients, and referring again to FIG. 11, the initial silhouette mask procedure 154 (after completion of the background masking procedure) prepares one of the silhouette images for use in the coefficient determination process (described below). The initial silhouette mask procedure 154 processes one of the silhouette images to locate, to a rough approximation, those pixels which belong to the image of the object and not the background.

Figure 14:
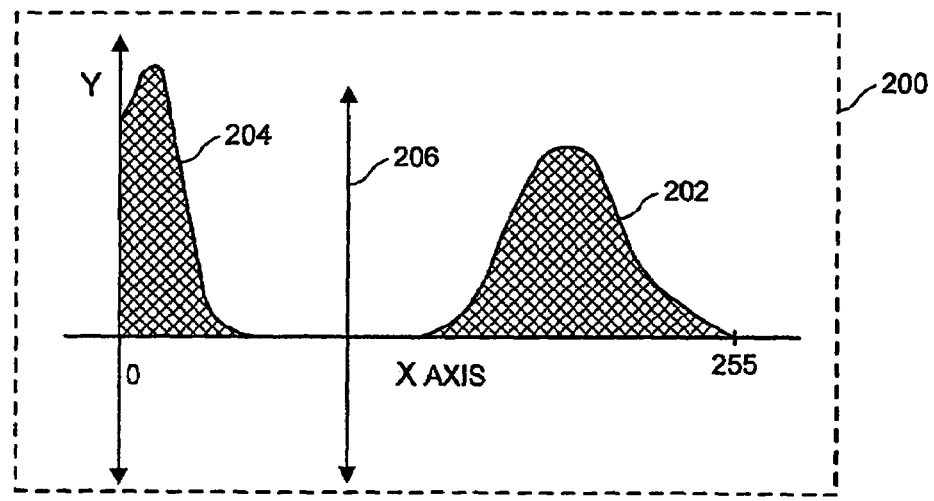
FIG. 14 depicts an exemplary histogram of the present invention mapped from a selected silhouette image of the present invention.

To construct the rough object mask for the chosen silhouette image, the initial silhouette mask procedure 154 builds a histogram from its point data. The histogram building procedure employs the thresholding technique described above to mask out the pixels which are darker than a given intensity value (and are thus considered to belong to the object 4). Using a procedure substantially similar to that described above (with respect to FIGS. 12 and 13), the background mask procedure 152 builds a histogram to group the light intensities of the pixels in the silhouette image. The histogram determines the distribution of pixels intensities in a manner similar to that described above. FIG. 14 depicts an exemplary histogram 200 mapped from the selected silhouette image. The 0 to 255 grayscale (showing intensity) is charted along the x axis. The number of pixels for each grayscale increment is charted on the y axis.

The exemplary histogram 200 for the silhouette image has two significant areas. Area 202 shows a distribution of pixels having an intensity which is that of middle gray (those values indicate pixels that describe the background). Area 204 shows a distribution of pixels having an intensity which is that of black or near black (those values indicate pixels that would be those that are thought to describe the object). The black/near black pixels could also include small anomalies such as images of dirt. The initial silhouette mask procedure 154, after building histogram 200 then determines a threshold for the silhouette image. Pixels which fall below the threshold will be masked—and they will not be included in further calculations. In the exemplary embodiment, the initial silhouette mask procedure 154 sets the threshold by computing the midpoint between the highest distribution values in areas 202 and 204. Picking this midpoint value provides a conservative method for determining what is a point that describes the background and what is a point that describes the object. In alternative embodiments, the initial silhouette mask procedure 154 determines the threshold by other approaches such as statistical functions of distribution.

Figure 15:
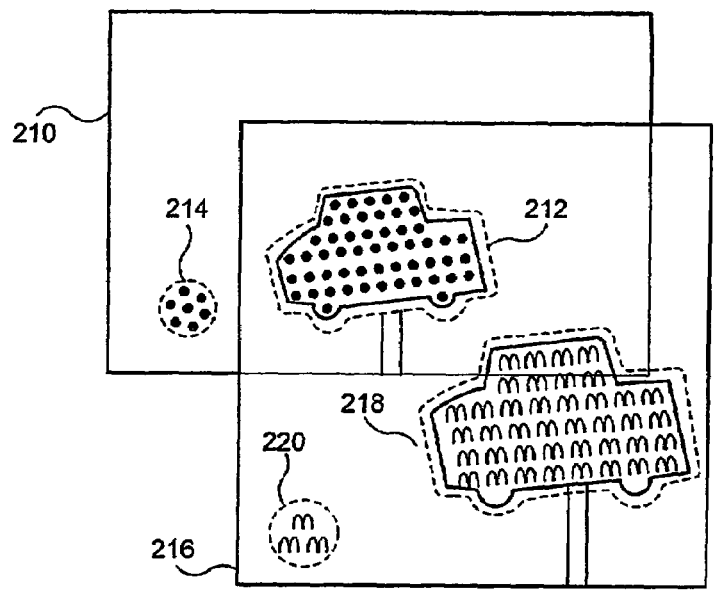
FIG. 15 depicts a portion of a silhouette image of the present invention with an area of dark colored pixels representing the object and an anomaly such as a spec of dirt depicted.

Once the threshold value is determined, the initial silhouette mask procedure 154 constructs a masking frame to mask off those pixels which have values that fall below the threshold. FIG. 15 depicts a portion of the silhouette image 210 with an area of dark colored pixels representing the object (area 212) and an anomaly 214 (such as a spec of dirt) depicted. FIG. 15 also depicts a portion of the silhouette masking image 216 with a mask created for the object (area 218) and the anomaly (area 220). The mask 216 blocks those pixels which might describe the object or the anomaly from being included in any analysis to determine the background calculation coefficients.

2. Determining Coefficients for Background Subtraction

Referring again to FIG. 11, the coefficient determination procedure 156 uses the masked background and silhouette images to determine the coefficients used in the background subtraction procedure. The coefficient determination procedure 156 uses a minimization process to find the coefficients of k (a scaling factor) and S (an offset). (Additionally, the minimization process will also yield σ, a standard deviation factor.) In the exemplary embodiment, this process takes each unmasked pixel in the background image and attempts to pair each of those pixels with its corresponding pixel from the selected silhouette image. If the corresponding pixel in the silhouette image is also unmasked, the coefficient processing module 156 then uses the intensity values (0-255) of each of those pixels in the pixel pair to solve the following function:

$$\min \Sigma(bg_i \cdot k + S - obj_i)^2$$

and also to determine

σ(standard deviation).

Where $bg_i$ represents the intensity value (0-255) of each background pixel used and $obj_i$ represents the intensity value (0-255) of each pixel used from the silhouette image.

Figure 16:
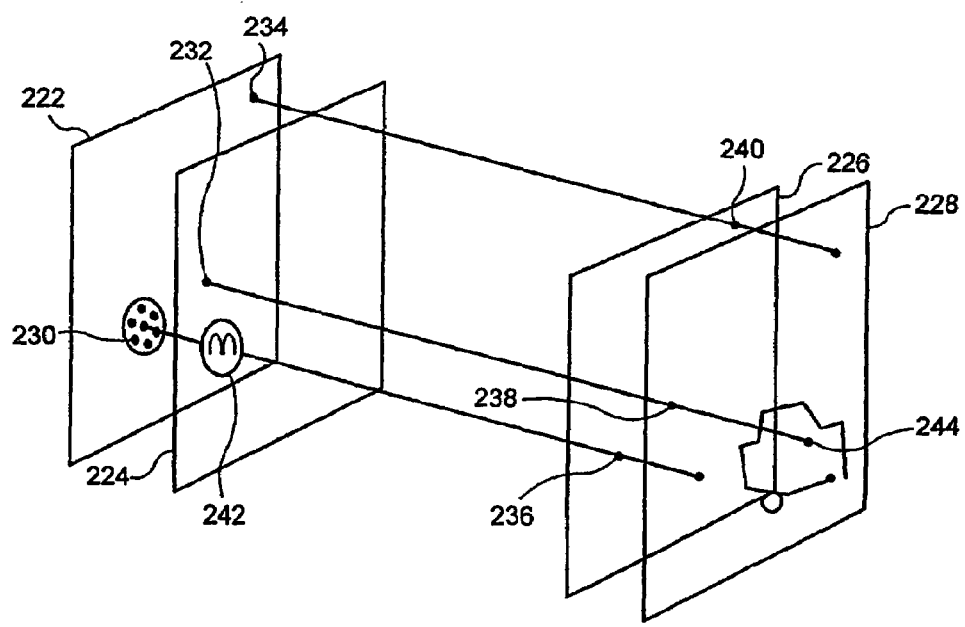
FIG. 16 provides a graphic representation of the coefficient determination procedure's selection process for locating pixel pairs.

FIG. 16 provides a graphic representation of the coefficient determination procedure 156's selection process for locating pixel pairs. FIG. 16 shows a background image 222 and its corresponding background image mask 224. Also depicted is the silhouette image 226 and its corresponding silhouette image mask 228 created by the initial silhouette mask procedure 154. In this example, the coefficient processing module 156 examines three pixels on the background image pixels 230, 232 and 234 to determine if those pixels and the corresponding pairs 236, 238 and 240 from the silhouette image 226 will be included in the calculation of the minimum function. In this example, only one pixel pair will be included in the calculations. Pixel pair 230-236 will not be included, because pixel 230 (on the background image) is a masked pixel. The background image mask at 242 has masked pixel 230 as it represented an anomaly (such as a speck of dirt). Pixel pair 232-238 also will not be included in the minimum calculation, because pixel 238 (on the silhouette image) is a masked pixel. The silhouette image mask at 244 has masked pixel 238 as it represents a pixel from the object. Pixel pair 234-240, on the other hand, will be included in the minimum calculation, because neither pixel is masked.

Following the above described technique, the coefficient determination procedure 156 examines each unmasked pixel in the background image to determine if it can be paired with a corresponding pixel in the initial silhouette image. If so, the intensity values for those pairs are used to solve the minimum function described above.

3. Background Subtraction

With the coefficients k and S (and the standard deviation σ) determined, the background subtraction module 158 processes the pixels in each silhouette image comparing them to corresponding pixels in the background image to locate to an accurate approximation those pixels that describe the object 4. The background subtraction module 158 separates the pixels that describe the object 4 from the pixels that describe the background by creating a separate silhouette mask image (a bitmap) for each input silhouette image. In the silhouette mask image, the pixels describing the background are assigned one value (such as the bit 0 for "white") and the pixels describing the object are assigned another value (such as the bit 1 for "black"). After further processing (such as clusterization and polygonal shape recognition described below) the final group of pixels which describe the object can be written and stored in a file.

To locate the object-descriptive pixels in a given silhouette image, the background subtraction module 158 executes a procedure to compare each pixel in a given silhouette image. Such a comparison is represented in FIG. 17. In that figure, the background subtraction module 158 examines a pixel 250 of a silhouette image 252 to determine whether it describes the object or the background. To make such a determination, the background subtraction module 158 obtains the intensity value for the pixel in question (pixel 250) and it also obtains the intensity value for the corresponding pixel (pixel 254) in the background image (depicted as 256). Having obtained a silhouette image and background intensity value for the pixel in question, the background subtraction module 158 then "subtracts" the silhouette intensity value from the background intensity value according to a deterministic formula which adjusts for such factors as the varying intensities of the background lighting. In the exemplary embodiment, the process compares the intensity values according to the following formula:

$$bg_i \cdot k + S - obj_i - 3 \cdot \sigma$$

where k, S and σ are the coefficients determined above, $bg_i$ is the intensity value (0-255) of each background pixel used and $obj_i$ represents the intensity value (0-255) of each pixel used in the silhouette image being processed. If the result of the equation is a value less than zero, the pixel on the silhouette image is thought to be one that describes the object 4 because the pixel in the silhouette is darker than its counterpart in the background image. If the result of the equation is a value greater than or equal to zero, the pixel on the silhouette image is thought to be one that describes the background.

Based on the result of the equation, the background subtraction module 158 then places a value in a new image frame, the silhouette mask image, in the corresponding location of that pixel. If the result is greater than or equal to zero, the background subtraction module 158 places a value (such as the bit assignment for the color white) in the location for the point in question to indicate that the point describes the background. In FIG. 17 the system places the bitmap code for the color white (such as the number "0") in a frame for the silhouette mask image 258 at location 260. (See the indication "W(0)" at 260.) In the example, the bitmap code indicates "white" at location 260, as the comparison for pixels 250 and 254 in the silhouette and background images (252 and 256) has returned a result that was greater than zero. However, in FIG. 17 the background subtraction module 158 also compares silhouette image pixel 262 with its background image counterpart, pixel 264. In the comparison of the intensity values for those pixels, the equation above has yielded a result that was less than zero, thus, the background subtraction module 158 places the bitmap code for the color black (such as the number "1") in the frame for the silhouette mask image 258 at location 266. (See the indication "B(1)" at 266.)

The background subtraction module 158 processes each pixel in a given silhouette image and in turn processes each silhouette image in the same manner. Thus, for each silhouette image the background subtraction module 158 creates a separate image frame containing the B/W indications of the silhouette image mask.

4. Processing of Silhouettes for Clusters and Polygonal Geometry

The clusterization/small cluster removal module 160 locates point clusters within the silhouette mask images, traces the edge of each cluster to create a silhouette contour (or loop) for each cluster and removes (from further processing) small clusters, such as images of lens dust and other anomalies. A cluster is a group of adjacent pixels within a silhouette mask image which describes either the object, the background or an anomaly. For example, a group of all dark-colored pixels, which are adjacent to each other and describe the object, can be considered one cluster. Included as part of the clusterization/small cluster removal module 160, a clusterization sub-module 162 identifies the point clusters in an image and traces the edges of each cluster (generating a list of points that make up the perimeter of the cluster). A small cluster removal sub-module 164 removes from further processing those clusters that the system determines to be "small"—e.g., in the exemplary embodiment, clusters of less than a threshold number, such as 100 points.

Figure 18:
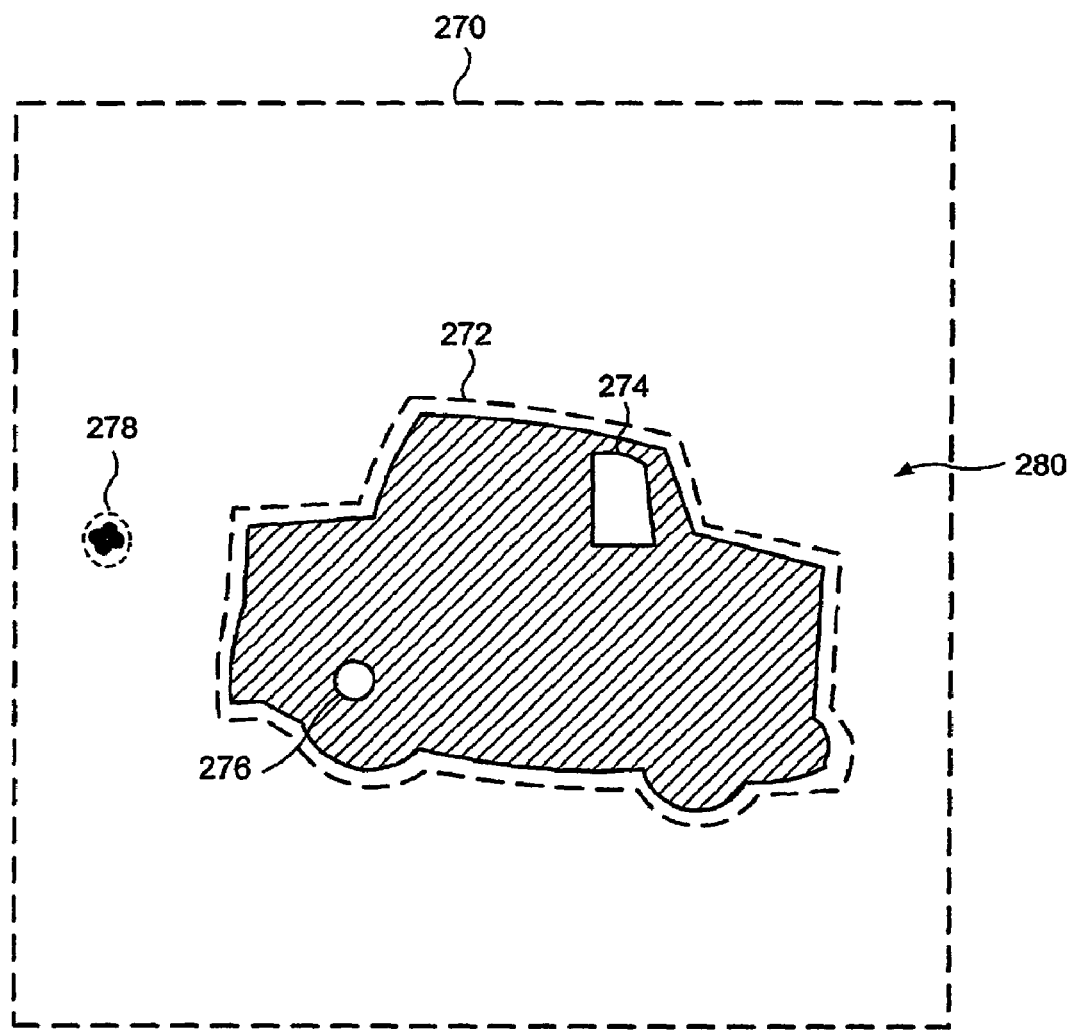
FIG. 18 depicts an exemplary silhouette image mask and shows a number of point clusters that are within the image.

FIG. 18 depicts an exemplary silhouette image mask 270 and shows a number of point clusters that are within the image. A first cluster 272 represents all of the dark colored "object" points, which form the outer silhouette of the object. However, within that mass there is a second cluster 274 of light colored "background" points, which show a hole in the object for the open car window. A third cluster 276 represents a group of points which have been identified by the background subtraction module 158 as light colored "background" points—however, in truth, those points processed as white because of an anomaly (such as glare from the lens).

Another cluster is seen at 278; it also represents an anomaly. A fifth cluster in FIG. 18 is the large set of light colored "background" points 280 which surround the object cluster 272 (and the inside cluster component 274) and anomaly cluster 278. The clusterization sub-module 162 of the present invention processes the points of the silhouette mask image to trace the edge of each contour and create a silhouette contour (loop) for each edge. The small cluster removal sub-module 164 "removes" from further processing those clusters determined to be "small."

Figure 19A:
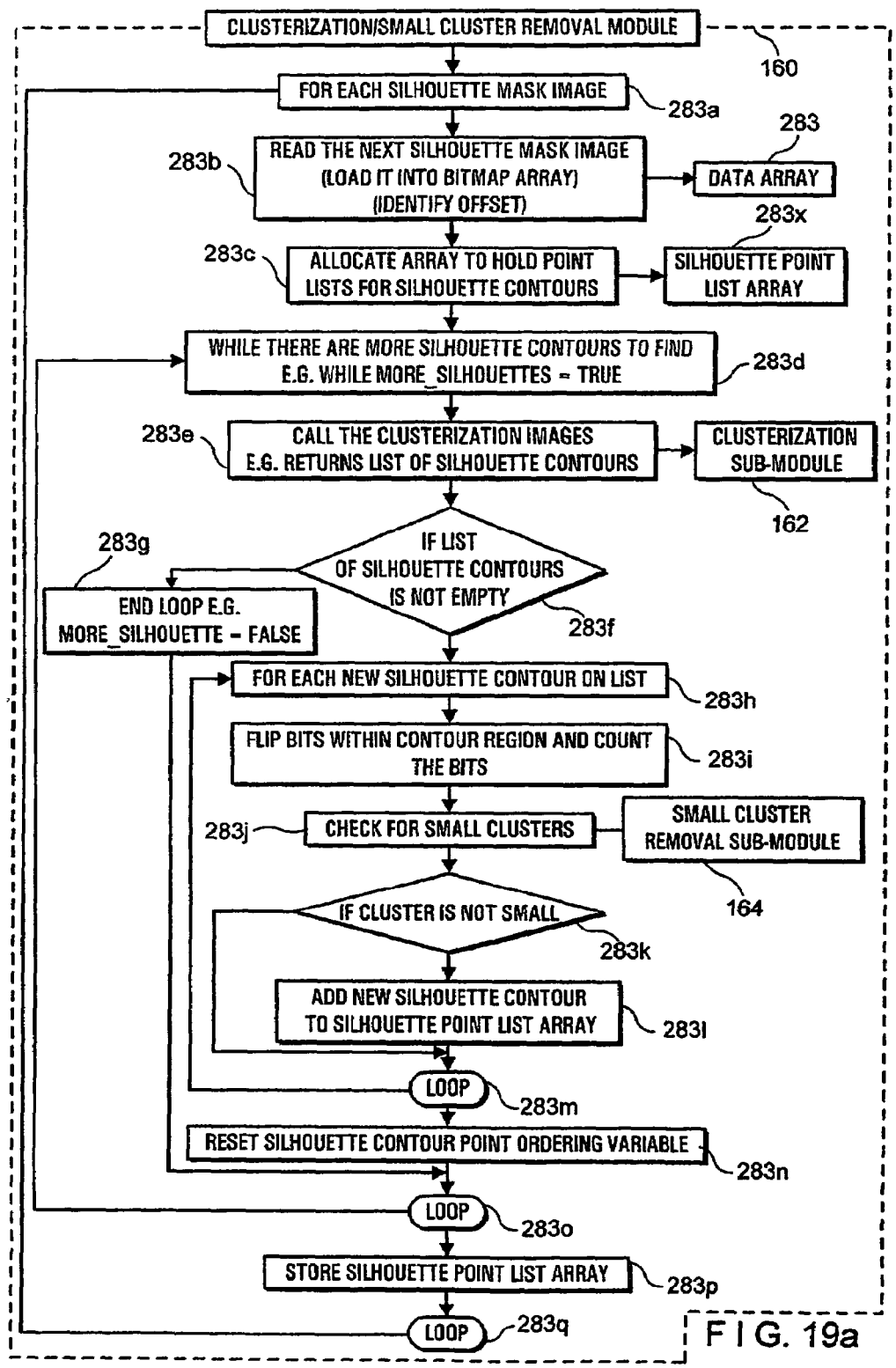
FIG. 19a provides an exemplary process flow for the clusterization/small cluster removal module of the present invention.

FIG. 19a provides an exemplary process flow for the clusterization/small cluster removal module 160 of the present invention. For each silhouette mask image submitted, the clusterization/small cluster removal module 160 determines a set of points to describe each silhouette contour in that image. As shown in FIG. 18, there may be a number of silhouette contours within a given silhouette mask image. Also, one silhouette contour may be contained within the bounds of another. For example, in FIG. 18 the contour of the window (contour 274) is within the contour of the car (see contour 272) and those two contours together describe the object.

The clusterization/small cluster removal module 160 uses the clusterization sub-module 162 (described below) to trace the edge of each (non-background) point cluster in the image and build a silhouette contour (or loop) for each edge—a list of points that describe the edge of the point cluster. The clusterization/small cluster removal module 160 (along with its sub-modules) generates the silhouette contours (loops) in a number of search passes. For example, in FIG. 18 where the silhouette contour for the window (contour 274) is within the silhouette contour for the car (contour 272) the module 160 first traces the points which make up the silhouette contour for the car-shape (contour 272) in one search pass and then traces the silhouette contour for the window-shape (contour 274) in a second search pass. After tracing the points for a given silhouette contour, the clusterization/small cluster removal module 160 of the present invention establishes an ordering for the points (contour orientation) of the silhouette contour (loop). For example, in FIG. 18 after the present invention locates a point along the edge of the car-shape cluster (contour 272), it traces around the perimeter of the silhouette contour and, then, establishes a list of points for the silhouette contour that follows a counterclockwise ordering. Thereafter, in the second search pass when the present invention has located the points belonging to the contour of the window-shape (e.g. contour 274), it traces around the perimeter of the window silhouette and then orders those points in an opposite, clockwise direction. Using this ordering process and operating through a series of searches passes, the clusterization/small cluster removal module 160 identifies those silhouette contour (loops) which bound internal object spaces and those silhouette contours (loops) which bound empty (external) spaces or "holes."

Referring again to FIG. 19a, the exemplary process flow for the clusterization/small cluster removal module 160 begins in step 283a with a procedure to process each silhouette mask image. In step 283b, the clusterization/small cluster removal module 160 reads a silhouette mask image into a bitmap array 283w (bitmap 1). (A second bitmap is utilized as is described below). The data in bitmap array 283w is a stream of bit assignments where each bit contains a black or white color assignment for each pixel of the silhouette mask image. Bitmap 283w in the exemplary embodiment is sized to the number of point assignments that are in the file for the silhouette mask image. (For example, a silhouette mask image that is e.g. 1248×1536 points in dimension (one image size output by available professional digital cameras) will read and be used to generate a corresponding bitmap array containing 1,916,928 bit assignments). There also is a one-to-one correspondence by point x, y in the image to the bitmap position (B) as follows: B=x+y*(image width).

When the procedure traces the perimeter of a cluster of points, it will create silhouette point list for that perimeter. Each list will contain a set of integers (the bitmap position numbers (B)) that specify the coordinates of the points for that silhouette contour. As noted above, there may be a number of silhouette contours within a given silhouette mask image. Accordingly, the clusterization/small cluster removal module 160 in step 283c allocates a silhouette point list array 283x to hold the silhouette point lists that the system generates in the clusterization process.

In step 283d, the clusterization/small cluster removal module 160 begins a loop to process the bitmap for the current silhouette mask image and generate silhouette contours (loops) from the point clusters found within the image. The process begun in step 283d continues to generate silhouette contours while there are more point clusters to locate within the bitmap for the silhouette mask image. In the exemplary embodiment the loop of step 283d will process (locating contours) until the processing step 283e (described below) returns an empty list of loops (indicating that there are no more silhouette contours to be found).

In step 283e, the clusterization/small cluster removal module 160 calls the clusterization sub-module 162 to locate point clusters within the silhouette mask image at the current level of searching and generate silhouette contours for those located clusters. To call the clusterization sub-module 162 the clusterization/small cluster removal module 160 passes as arguments a starting position in the bitmap for the search (e.g. the position of one "background" bit) and a contour-point-ordering variable which indicates the direction in which the silhouette contour points will be ordered when the system has completed the tracing the silhouettes at the given level of searching. In the exemplary embodiment, the clusterization sub-module 162 searches the bitmap point color assignments for a point which belongs to a dark-colored point cluster. Upon locating a point belonging to such a cluster, the clusterization sub-module 162 traces the edge of the cluster to gain a list of all of its points. Each call by the clusterization/small cluster removal module 160 to the clusterization sub-module 162 represents a new level in the search for silhouette contours. The processing of the exemplary clusterization sub-module 162, along with an exemplary process flow, is presented below.

The clusterization/small cluster removal module 160 expects the clusterization sub-module 162 to return a list of new silhouette contours found at a given level of searching or an empty list (indicating that no new silhouette contours are to be found). If in step 283f the list of silhouette contours returned by the clusterization sub-module 162 is empty, then the clusterization/small cluster removal module 160 proceeds to step 283g and terminates the loop begun in step 283d. If in step 283f the list of silhouette contours returned by the clusterization sub-module 162 is not empty, then the clusterization/small cluster removal module 160 will continue to process the data in steps 283h-283o.

In step 283h the clusterization/small cluster removal module 160 begins to process each new silhouette contour returned by the clusterization sub-module 162 (in step 283e). In step 283h the clusterization/small cluster removal module 160 obtains a reference to one of the newly located silhouette contours. In step 283i the clusterization/small cluster removal module 160 counts the number of bits of the cluster bounded by this new silhouette contour (currently being processed by the loop of step 283h) and also prepares these bits for further processing by "flipping" the bit assignments in bitmap array 283w (bitmap 1). To "flip" a bit assignment, the clusterization/small cluster removal module 160 changes in bitmap array 283w the value of each current bit color assignment within the cluster to its opposite value. In this step 283i, the clusterization/small cluster removal module 160 works between the boundaries set by the points of the current silhouette contour and flips for those bits the values previously set.

Figure 19B:
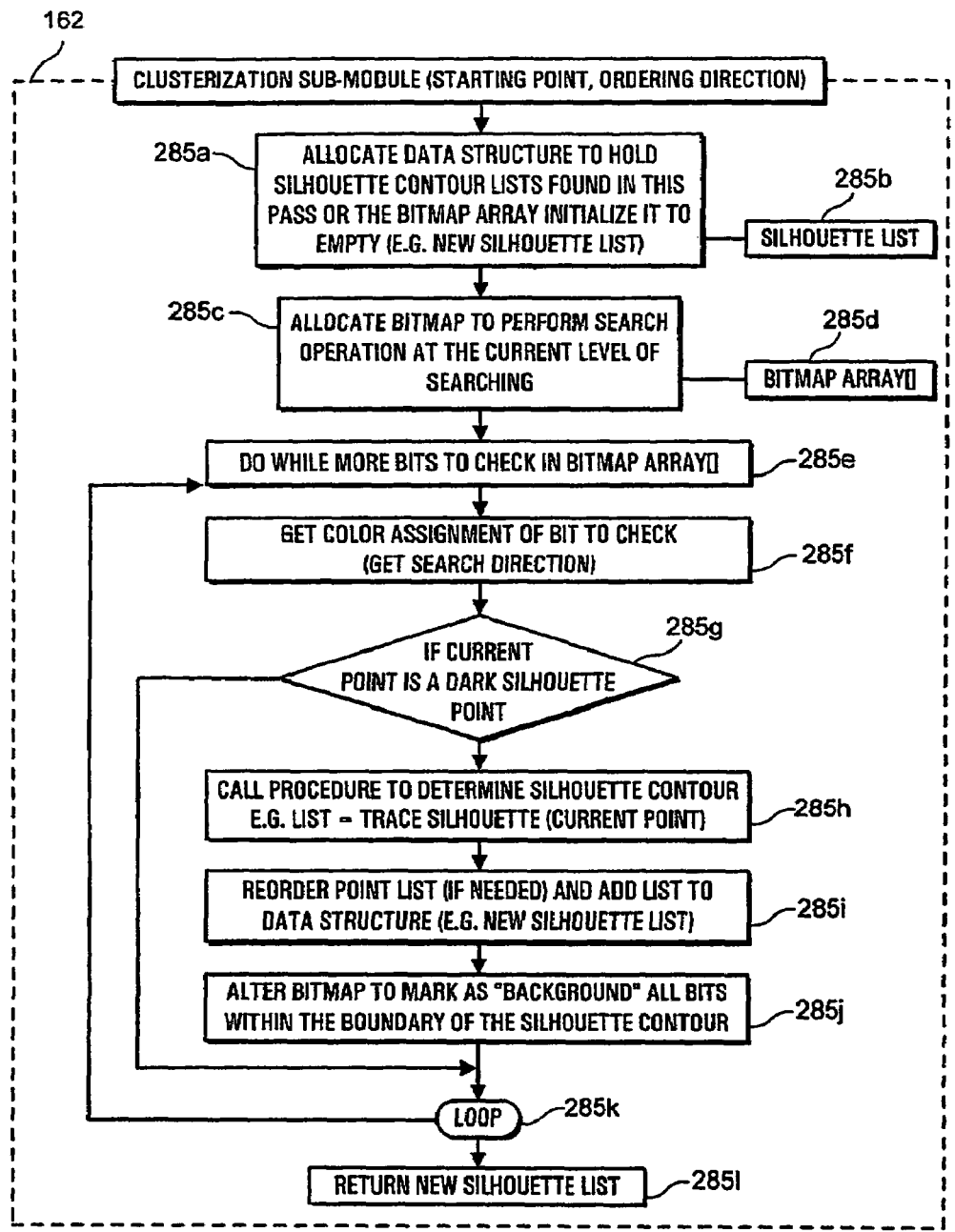
FIG. 19b depicts an exemplary process flow for the clusterization sub-module of the present invention.
Figure 19D:
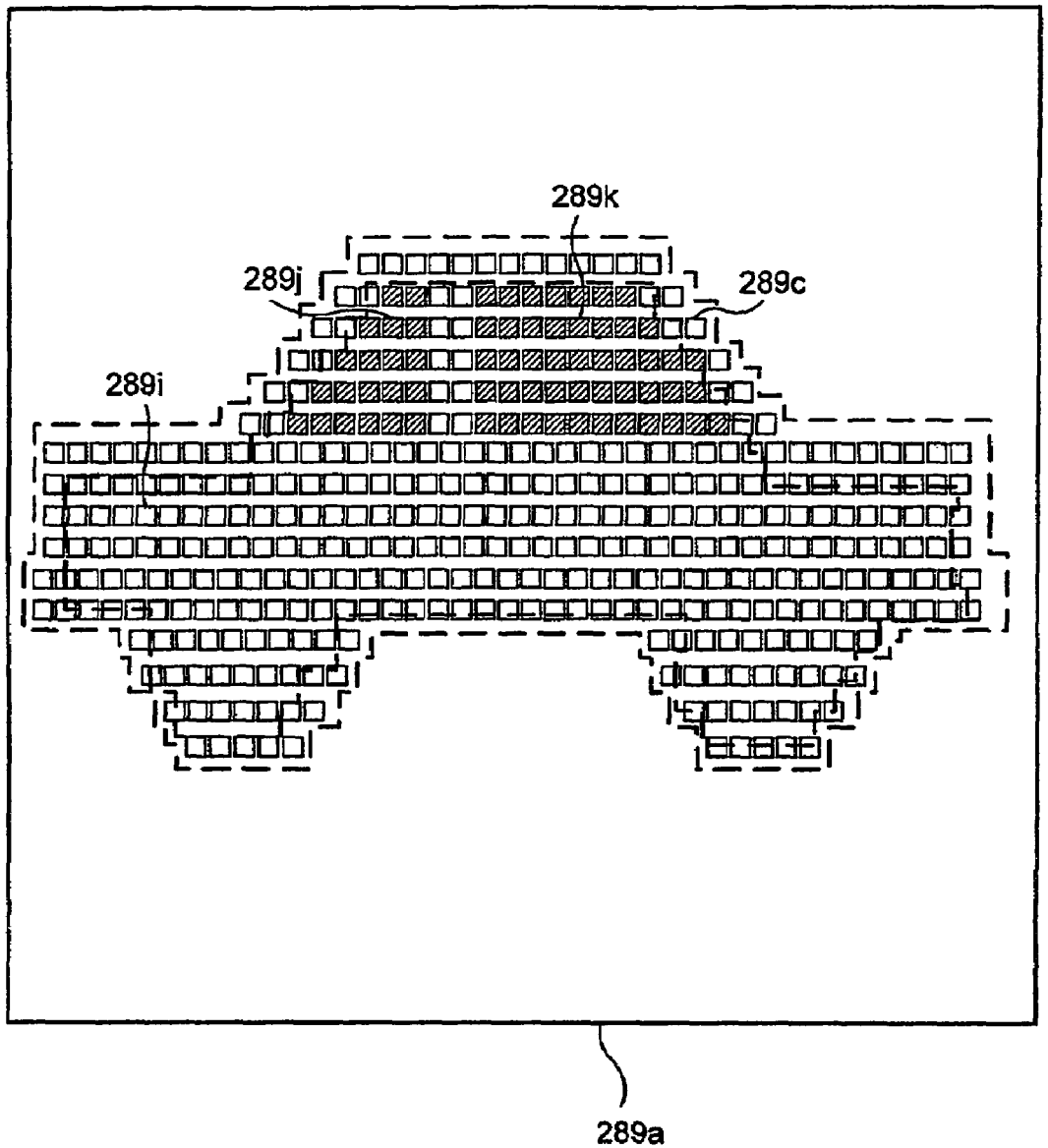

For example, FIGS. 19c and 19d depict the process of "flipping" the bit values of a cluster bounded by a silhouette contour 289c. FIG. 19c depicts an exemplary bitmap 289a and which contains a number of bit clusters including the cluster bounded by silhouette contour 289c. After the processing of step 283e (see FIG. 19a) the clusterization sub-module 162 returns to the clusterization/small cluster removal module 160 a list of points describing silhouette contour 289c. In the "flipping" procedure of step 283i (see FIG. 19a), the clusterization/small cluster removal module 160 will change the settings of each bit bounded by silhouette contour 289c. Where a bit was originally dark-colored (e.g. having an assignment of "1") it will now be set to have a light color (e.g. having an assignment of "0"). Where a bit was originally light-colored (e.g. having an assignment of "0") it will now be set to have a dark color (e.g. having an assignment of "1").

FIG. 19d depicts the cluster of bits bounded by silhouette contour 289c, after the clusterization/small cluster removal module 160 has flipped the pixel color assignments in step 283i (of FIG. 19a). In this example, the clusterization/small cluster removal module 160 has flipped the color assignments for all of the pixels within regions 289i and 289c that were previously dark colored (e.g. having an assignment of "1"). Those pixels have now been reset to have a light color assignment (e.g. an assignment of "0"). In addition, all of the pixels in regions 289j and 289k that were previously light colored (e.g. having an assignment of "0") have now been reset to have a dark color assignment (e.g. an assignment of "1").

When all of newly generated silhouette contours have been processed in this fashion (and all the bits within those regions "flipped"), the bitmap for the image (bitmap 283w) system of the present invention will have, effectively, erased the just-found clusters from the bitmap and the search for point clusters will continue at the next level of searching. As shown in FIG. 19d, all the bits of silhouette contour 289c have been effectively erased from bitmap 283w and now the bits pertaining to silhouette contours 289j and 289k are now dark-colored. They remain to be located and processed in the next level of searching.

To "flip" the bit settings in step 283l of FIG. 19a, the clusterization/small cluster removal module 160 processes the points of each newly-discovered silhouette contour. From a given point of a silhouette contour (the segment beginning point), the clusterization/small cluster removal module 160 moves through the list of points of the contour (in the list's ordering direction) until it locates another point along the silhouette contour (the segment end point) which shares the same scan line position as the segment's beginning point. After the clusterization/small cluster removal module 160 has located the beginning and ending points of a segment along a scan line, it flips (in bitmap 283w) color settings of all of the bits along that segment.

As noted above, when the clusterization/small cluster removal module 160 in step 283l resets bit values within the cluster bounded by the silhouette contour and executes the "flipping" procedure, it also counts the corresponding number of pixels from the silhouette mask image "flipped" to determine a total point count for the cluster bounded by the silhouette contour (e.g. silhouette contour 289c of FIGS. 19c and 19d).

Referring again to FIG. 19a, after the clusterization/small cluster removal module 160 completes the "flipping" procedure of step 283i, it proceeds in step 283j to call the small cluster removal sub-module 164 and determine whether the silhouette contour should be added to the silhouette point list array 283x. In step 283j, the clusterization/small cluster removal module 160 sends to the small cluster removal sub-module 164 the total number of points for the cluster (determined in step 283i). If in step 283k the cluster area is greater than a minimum threshold amount, the clusterization/small cluster removal module 160 in step 283l adds a reference to the list of bits that describe the current silhouette contour to the silhouette point list array 283x.

In step 283m the clusterization/small cluster removal module 160 loops, returning to step 283h to retrieve the next new silhouette contour (found by the clusterization sub-module 162 in step 283e.) The clusterization/small cluster removal module 160 continues to process in this fashion, i.e. repeating steps 283h-283m, until all of the new silhouette contours found in step 283e have been processed.

After the clusterization/small cluster removal module 160 has processed all of the new silhouette contours, i.e. completed the bit "flipping" process and identified and removed from further processing any "small" clusters, the module 160 prepares for the next level of silhouette contour searching. In the search for silhouette contours using the above described process, it is noted that the "level" searching procedure of the present invention will converge within a relatively low number of search passes when it is applied to the task of generating models of real world objects. For a real world object, the system of the present invention will proceed to a solution (identifying and tracing the silhouette contours) in a relatively few number of passes and thus the technique of the present invention converges upon the solution in just a few search levels.

In step 283n, the clusterization/small cluster removal module 160 resets a contour-point-ordering variable (e.g. previously initialized before the loop step 283d) to prepare for the next level search. For example, if the point ordering variable was set to "counterclockwise," the clusterization/small cluster removal module 160 in step 283n resets the direction variable to "clockwise" for the next search.

In step 283o, the clusterization/small cluster removal module 160 loops, returning to step 283d and repeats steps 283d-283o to search for silhouette contours during a new level of searching. For example, the clusterization/small cluster removal module 160 calls the clusterization sub-module 162 (sending the revised bitmap and contour-point-ordering variable) in step 283e to determine if any further silhouette contours can be located in the revised bitmap. If the clusterization sub-module 162 returns any further silhouette contours, the clusterization/small cluster removal module 160 processes those contours and, again, modifies bitmap 283w for a next level search. When the clusterization sub-module 162 returns in step 283e having found no additional contours, then the processing of the bitmap for the current silhouette mask image is complete.

In step 283p, the clusterization/small cluster removal module 160 stores the current silhouette point list array 283x for the current silhouette mask image and then in step 283q loops, returning to step 283a to process the next silhouette mask image. The clusterization/small cluster removal module 160 repeats steps 283a-283q for all subsequent silhouette mask images. To prepare for the construction of the 3D model of the object 4, the polygon shape module 168 (as described in detail below) will further refine the information generated by the clusterization/small cluster removal module 160.

5. The Clusterization Sub-Module

As described above, the clusterization sub-module 162 searches the bit assignments within a given bitmap to locate point clusters. Upon locating one of the bits belonging to a cluster of dark-colored bits, the clusterization sub-module 162 traces the edge of that cluster to gain a list of all of its edge points—the points that make up the silhouette contour. FIG. 19b depicts an exemplary process flow for the clusterization sub-module 162 of the present invention. As noted above, in the exemplary embodiment, the clusterization sub-module 162 receives as arguments both a starting position in the bitmap for the search (e.g. the position of one "background" bit) and the contour-point ordering variable to indicate in which direction of the points of the silhouette contour will be ordered (counterclockwise or clockwise) after a silhouette has been traced.

In step 285a, the clusterization sub-module 162 initializes a data structure to hold silhouette contour data ("a list of silhouette contour lists") 285b. The "list of lists" data structure 285b will reference each silhouette contour point list generated during the current search pass. Initially, this data structure will be empty (and reference no point list). However, when the clusterization sub-module 162 locates a silhouette contour within the bitmap array it will add a reference to the list of points for that silhouette contour onto the "list of list" data structure 285b.

In step 285c the clusterization sub-module 162 allocates a second bitmap array 285d (bitmap 2) and copies the data from bitmap array 283w (bitmap 1) into this bitmap. Bitmap array 285d will be used to perform the searching for point clusters by the clusterization module 162.

In step 285e, the clusterization sub-module 162 begins to check each of the bits of bitmap array 285d. With reference to step 285e, it is noted that the clusterization sub-module 162 receives as input one bit that will serve as the starting point for the search (and that bit will be designated as the initial "current point"). The clusterization sub-module 162 can begin on any bit that is a "background" point. It is not necessary that a special point be selected to begin the search for silhouettes. In the exemplary embodiment, the first bit from the bitmap array (e.g. point (0,0)) is selected as the starting point. The procedure continues until all of the bits within the bitmap array have been checked (e.g. while a loop counter is less than the bitmap size). The clusterization sub-module 162 begins from the bit designated as the starting point, checking the assignments of the bits until the sub-module 162 reaches a dark-colored bit (representing a point on the object).

Figure 19E:
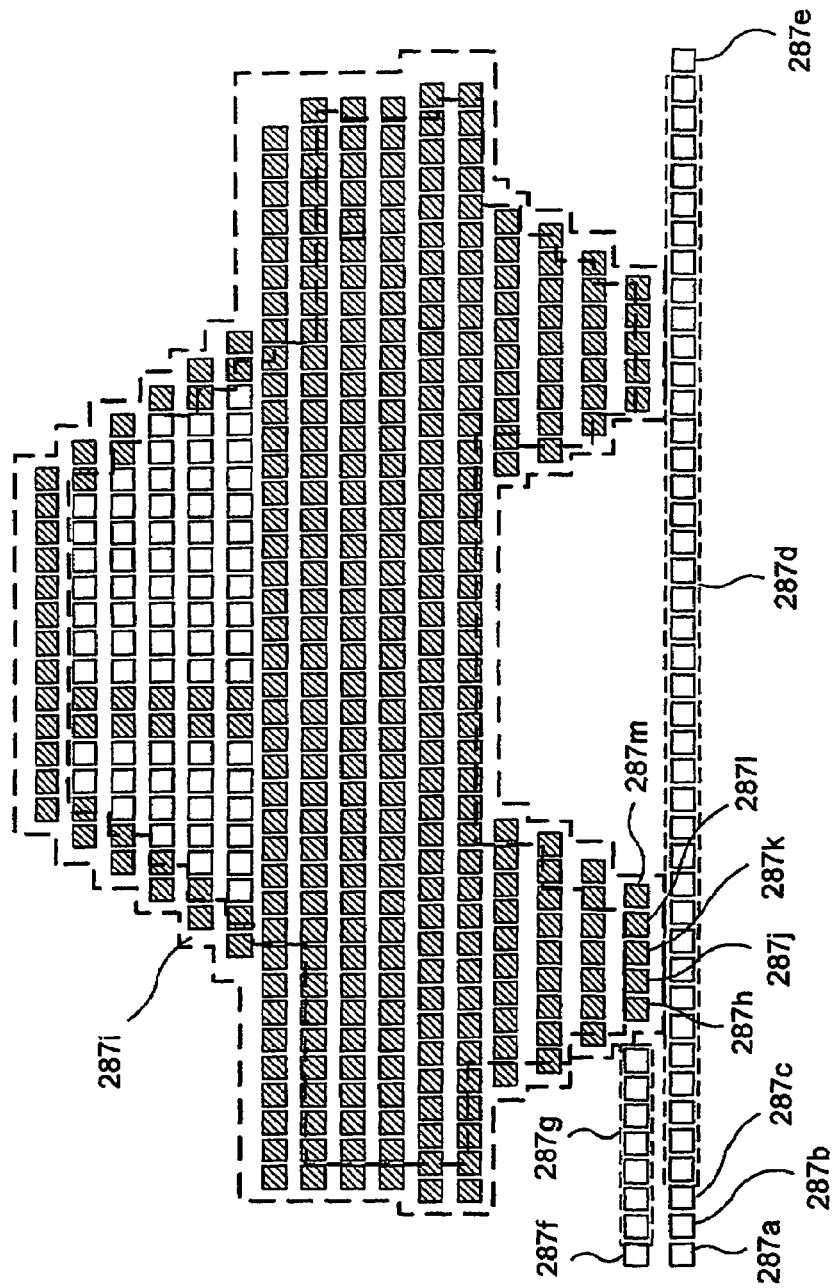
FIG. 19e depicts an exemplary path of the search of the clusterization sub-module of the present invention as it proceeds from a given starting point.

FIG. 19c depicts an exemplary path of the search as it proceeds from a given starting point (bit 287a). The clusterization sub-module 162 in the loop of step 285e (see FIG. 19b) advances sequentially through the bitmap array, effectively proceeding in a direction, e.g. "right" along a given scan line and then "up" to the next scan line. In the example of FIG. 19e, the clusterization sub-module 162 checks bit 287a and then hits 287d, 287c, and so forth, e.g., proceeding in the "right" direction checking all the bits in region in 287d until it has checked bit 287e, the final bit of that scan line. By proceeding to the next bit in the bitmap array, the search effectively moves at that point in the "upward" direction, proceeding to the first bit of the next scan line, bit 287f. In the exemplary embodiment, the search then proceeds in the "right" direction, checking the bits in region 287g, until it encounters bit 287h, a dark-colored bit that is part of the object (see 287i). Through every movement of the checking procedure the clusterization sub-module 162 maintains in memory a search direction variable to track the direction of the checking process, e.g. "right" or "upward," and uses this directional information as a starting point for the tracing procedure of step 285e described below.

Referring again to FIG. 19b, the clusterization sub-module 162 in the loop of step 285e moves through bitmap 285d bit-by-bit, executing the checking procedure. After commencing the loop in step 285e, the clusterization sub-module 162 in step 285f obtains the color assignment of a bit (the "current point") from the bitmap array 285d. In step 285f the clusterization sub-module 162 also obtains information indicating the current search direction, e.g. "right" or "up." In step 285g, the clusterization sub-module 162 checks the color assignment of the bit. If, in step 285g, the bit contains a light color assignment (e.g. an assignment of "0" or "white") the clusterization sub-module 162 determines that the bit does not reveal any silhouette contour. In such a case, the clusterization sub-module 162 skips steps 285h-285j and proceeds to step 285k, where it loops, returning to steps 285e and 285f to get the location of the next bit to check (the next "current point"). Thereafter, the clusterization sub-module 162 continues the checking procedure for the next current point.

If, in step 285g, the bit contains a dark color assignment (e.g. an assignment of "1" or "black"), the clusterization sub-module 162 determines it has located a point belonging to a point cluster which the clusterization sub-module 162 must trace. In step 285h, the clusterization sub-module 162 in the exemplary embodiment calls a procedure to trace the points of the silhouette contour. This "tracing" procedure (which is described in further detail below) creates a list of bit locations which describes the contour of the silhouette. The silhouette tracing procedure of step 285h returns a silhouette point list, which contains the bit locations for all the points that make up the silhouette contour. It is noted that when the silhouette contour to be traced in step 285h is "self-intersected" or "connected"—such as a silhouette contour that is figure "8" shaped the tracing procedure will return, as described below, a list for one non-self-intersected component of that silhouette contour. For example, where a silhouette contour is figure "8"-shaped, the loop tracing procedure returns a lists of points describing one of the "0"-shaped components of the figure "8". (The other "0"-shaped component will be traced in a subsequent iteration of the checking procedure.

In the example depicted in FIG. 19e, upon locating bit 287h and determining it is one point of contour silhouette 287k, the clusterization sub-module 162 initiates the tracing procedure of step 285h to yield the list of points which describes the silhouette contour. The procedure moves in a counterclockwise direction and yields points 287j, 287k, 287l, 287m and so on until all the points along silhouette contour 287k have been identified.

Referring again to FIG. 19b, after the silhouette contour has been traced, the clusterization sub-module 162 in step 285i checks the setting of the direction variable and then (if necessary) reverses the ordering of the list of points returned by the tracing procedure. If the current setting of the direction variable is "counterclockwise" the clusterization sub-module 162 does no reordering and simply adds the list of points to the "list of lists" data structure (the silhouette list 285b). If the current setting of the direction variable is "clockwise," the clusterization sub-module 162 in step 285i will reverse the ordering of the points in the silhouette contour before adding the list to the "list of list" data structure (the silhouette list 285b).

After the clusterization sub-module 162 has traced and processed a new silhouette contour in steps 285h and 285i (FIG. 19b), it then proceeds in step 285j to modify bitmap 285d (bitmap 2) before searching for additional contours that might be identified at the current search level. The clusterization sub-module 162 can, once it has identified and traced a silhouette contour, effectively "erase" the cluster of points bounded by that silhouette contour from the bitmap it uses in the checking procedure.

One benefit of this step 285*j* is efficiency, because the clusterization sub-module 162, by altering the bitmap to "erase" the just-traced silhouette contour, prevents itself from "rediscovering" the same silhouette contour (and the components that may be inside) in subsequent bit-checking. When a contour that has just been traced also contains additional silhouette contours within its boundaries, those additional contours will be identified and traced in subsequent calls to the clusterization sub-module 162—not in the search at the current level. Accordingly, by erasing the cluster from bitmap 285*d* once it has been discovered, the clusterization sub-module 162 in step 285*j* prevents those internal clusters from being discovered at the current level of searching. Locating the silhouette contours in a series of level searches allows the system to properly order the points of each silhouette contour and identify those silhouette which bound positive space and those which bound "holes."

To modify bitmap 285*d* (bitmap 2) in step 285*j*, the clusterization sub-module 162 does not execute the "flipping" procedure described above (see step 283*i*, FIG. 19*a*). Instead, the clusterization sub-module 162 in step 285*j* executes a procedure to mark as "background" all of the bits that are bounded by the identified silhouette contour. In the exemplary embodiment, the clusterization sub-module 162 in step 285*j* will change any bit within the cluster that originally had a dark-color assignment (e.g. an assignment of "1" or "black") to a light-colored assignment (e.g., an assignment of "0" or "white"). Additionally, any light-colored bits within the region will be left alone. The result of step 285*j* is an entire region of light-colored, "background" bits which effectively erases the cluster (and its sub components) from bitmap 285*d*.

After completing the tracing procedure and modifying the bitmap in step 285*j*, the clusterization sub-module 162 returns to the process of checking the bitmap for additional point clusters. In step 285*k* the clusterization sub-module 162 loops, returning to steps 285*e* and 285*f* to obtain the location of the next bit to check (see discussion above). In step 285*g*, the clusterization sub-module 162 again checks to determine if the new bit constitutes a point on a silhouette contour. The process continues, following steps 285*e*-285*k*, until all the bits in bitmap 285*d* have been checked. In step 285*l* the clusterization sub-module 162 completes its process by returning to the clusterization/small cluster removal module 160 the "list of lists" data structure 285*b* containing a point list for each of the silhouette contours it found in this level of searching.

6. The Tracing Procedure

As stated above, the clusterization sub-module 162 in step 285*h* "traces" the silhouette contour. FIG. 20*a* presents an exemplary process flow for the clusterization sub-module 162's tracing procedure. The clusterization sub-module 162's tracing procedure receives as data the location in the bitmap (cf. 283*y*) of the first found dark colored pixel (the "first point"), and the search direction (e.g. "right" or "up") that the clusterization sub-module 162 had taken when it located the point belonging to the silhouette contour.

In step 291*a* of FIG. 20*a*, the tracing procedure of the clusterization sub-module 162 initializes a number of variables used in the exemplary tracing procedure. For example, in step 291*a* the tracing procedure of the clusterization sub-module 162 allocates a "silhouette contour point list" 291*b* to store the bitmap locations of the points that describe the silhouette contour. In step 291*a* the tracing procedure of the clusterization sub-module 162 also allocates a current point variable to hold the bitmap location of the current point as the procedure traces and locates each point of the silhouette contour. In the exemplary embodiment, before the loop begins, the current point variable is set to equal the bitmap location of the first point.

In step 291*c*, the tracing procedure of the clusterization sub-module 162 begins to tour the perimeter of the silhouette. In the exemplary embodiment, the loop continues to process until the "current point" location is again equal to the location of the "first point" initially passed to the clusterization sub-module 162. In step 291*d* the tracing procedure of the clusterization sub-module 162 obtains the bitmap location of the next point along the perimeter of the silhouette and loads this bitmap location into the next point variable. In this step 291*d* (which is explained in further detail below), a get next point function, moving along the perimeter of the silhouette in a counterclockwise direction locates the next adjacent dark colored point.

In step 291*e*, the tracing procedure of the clusterization sub-module 162 performs a check to determine whether the point just located reveals that the silhouette contour being traced is "self-intersected" (e.g. has the shape of a figure "8"). If so, the tracing procedure of the clusterization sub-module 162 performs additional processing in step 291*e* (described below) to bisect the components of the self-intersected loop and make a complete tour of just one of the non-self-intersected components of the silhouette contour. (The other component(s) of the self-intersected loop will be traced in later iteration(s) of the clusterization sub-module 162.)

After the checking step, the tracing procedure of the clusterization sub-module 162 in step 291*f* adds the bitmap location of the next point onto the silhouette contour point list 291*b*. Thereafter, in step 291*g*, the tracing procedure of the clusterization sub-module 162 sets variables for the next processing iteration. In step 291*g*, the tracing procedure of the clusterization sub-module 162 copies the bitmap location of the next point into the current point variable.

In step 291*h*, the tracing procedure of the clusterization sub-module 162 loops and returns to step 291*c*. The process continues (looping through steps 291*c*-291*h*) to locate points along the perimeter of the silhouette until the tracing procedure of the clusterization sub-module 162 returns to the first point. In step 291*i*, the tracing procedure returns to the clusterization/small cluster removal module 160 and yields the list of bitmap locations that describe the perimeter of the silhouette contour.

Figure 20B:
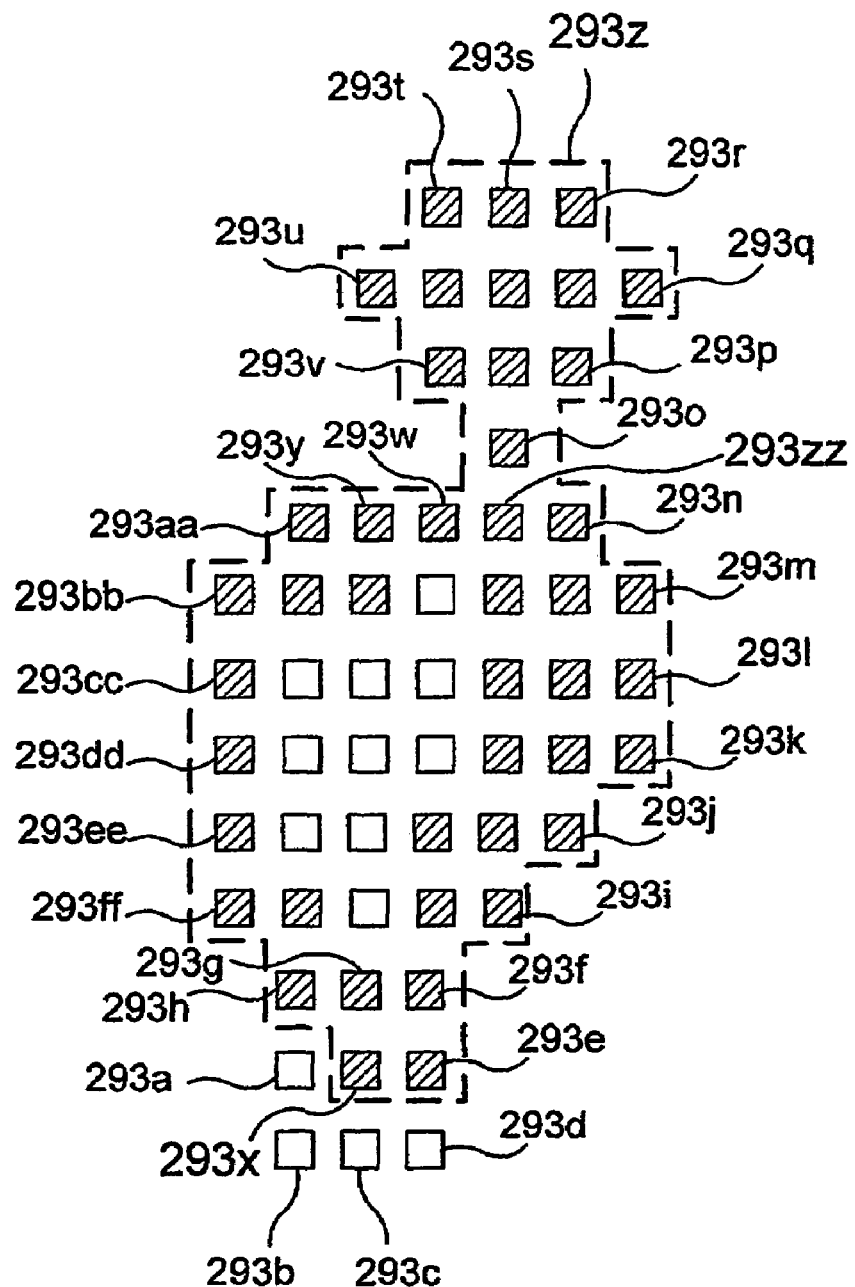
FIG. 20b depicts an exemplary bit cluster of the present invention within a bitmap being processed by the clusterization sub-module of the present invention (and its tracing procedure)

As mentioned above, the tracing procedure of the clusterization sub-module 162 calls a get next point function (in step 291*d*) to obtain the next point of the silhouette perimeter, moving in counterclockwise direction from a given point. To illustrate the process of an exemplary get next point function (of step 291*d*), FIG. 20*b* depicts an exemplary bit cluster 293*z* within a bitmap being processed by the clusterization sub-module 162 (and its tracing procedure). The get next point function of step 291*d* locates from a given location, e.g. bit 293*x*, the "next" adjacent bit along the silhouette's perimeter. It is noted that there are eight bits, which are adjacent to and surround any given bit used as a starting point for the get next point function. Each of the surrounding bits also has a position that can be determined in relation to the identified starting bit (e.g. RIGHT, LEFT, UP, DOWN, UP-RIGHT, DOWN-RIGHT, UP-LEFT, DOWN-LEFT). Using bit 293*x* as an example, there are eight bits corresponding to the eight surrounding locations, e.g. bit 293*a* (position LEFT), bit 293*b*. (position DOWN-LEFT), bit 293*c* (position DOWN), bit

293*d* (position DOWN-RIGHT), bit 293*e* (position RIGHT), bit 293*f* (position UP-RIGHT), bit 293*g* (position UP) and bit 293*h* (position UP-LEFT). The get next point function examines those locations to identify one of those bits as the next point along the silhouette's perimeter.

In the exemplary embodiment, when the tracing procedure's get next point function is called in step 291*d* it receives the location of the current bit and it also has access to a tracing direction variable (showing the direction that the system was following when it found that current bit—initially the tracing direction variable is set to be equal to the direction of the clusterization sub-module 162's checking procedure "UP" or "LEFT," see step 285*f*, FIG. 19*b* and related text). With this information, the task of the get next point function is to locate the next bit after 293*x*, moving around the edge of the mass of bits 293*z*, which make up the point cluster.

The get next point function executes a loop that moves in a counterclockwise direction around the current bit, starting the rotation from the "last" bit's location (a location which the function determines using location of the current point and the tracing direction variable). For example, when searching for the next bit after bit 293*x*, the loop will begin from the location of bit 293*b*—the bit that is one counterclockwise position above the "last" bit (bit 293*a*). Upon determining that the "last" bit was bit 293*a*, the get next point function moves counterclockwise to check the color assignments for the following bits: bit 293*b*, bit 293*c*, and bit 293*d* (all light colored bits), until it locates bit 293*e*. In the example depicted in FIG. 20*b* the get next point function returns the bitmap location of bit 293*e* to step 285*d* of the clusterization sub-module 162 (see FIG. 20*a*). The get next point function also resets the tracing direction variable to indicated that the direction was found while moving "RIGHT".

Referring again to FIG. 20*b*, as the tracing procedure of clusterizaton sub-module 162 continues its counterclockwise tour of the edge of cluster 293*z*, it calls upon the get next point function each time it needs to find the next bit along that edge. In the example presented in FIG. 20*b*, the clusterization sub-module 162 continues calling the get next point function, moving around the perimeter of cluster 293*z* from bit 293*e* to bit 293*o* following the procedure outlined above. For example, when the get next point function receives bit 293*e* as the current bit and "RIGHT" is the tracing direction setting, the function moves counterclockwise, checking the color assignments until it locates bit 293*f*. In like fashion, when the get next point function receives bit 293*f* as the current pixel and "UP" is the tracing direction setting, the function moves counterclockwise, checking the color assignments until it locates bit 293*i*. The process advances accordingly: when the get next point function receives bit 293*i* as the current pixel and "UP and RIGHT" is the tracing direction setting, the function moves counterclockwise, checking the color assignments until it locates bit 293*j*.

When the get next point function receives bit 293*j* as the current bit and "UP and RIGHT" is the tracing direction setting, the function moves counterclockwise, checking the color assignments until it locates bit 293*k*. When the get next point function receives bit 293*k* as the current bit and "UP and RIGHT" is the tracing direction setting, the function moves counterclockwise, checking the color assignments until it locates bit 293*l*. When the get next point function receives bit 293*l* as the current bit and "UP" is the tracing direction setting, the function moves counterclockwise checking the color assignments until it locates bit 293*m*. When the get next point function receives bit 293*m* as the current bit and "UP" is the tracing direction setting, the function moves counterclockwise checking the color assignments until it locates bit 293*n*. When the get next point function receives bit 293*n* as the current bit and "UP and LEFT" is the tracing direction setting, the function moves counterclockwise checking the color assignments until it locates bit 293*o*.

It is noted that as the tracing procedure of the clusterization sub-module 162 proceeds, it checks in step 291*e* (FIG. 20*a*) each point yielded in step 291*d* to determine whether the silhouette contour being traced is a self-intersected contour (such as a figure "8"). Referring to FIG. 20*b* silhouette contour 293*z* is such a self-intersected contour; it is figure "8" shaped and made up of two non-self-intersecting sub-contours: sub-contour A (made up of points 293*w*, 293*y*, 293*aa*-293*ff* and 293*h*) and sub-contour B (made up of points 293*o*-293*v*). The point of self-intersection is point 293*o*.

In step 291*e* (FIG. 20*a*) the tracing procedure of the clusterization sub-module 162 checks to determine if the new point reveals a self-intersecting silhouette contour. To execute the check, the tracing procedure step 291*e* compares the bitmap location of this new point (e.g. point 293*o*) with each point that has been previously located (those point locations which are currently stored on the point list (291*b*) for the silhouette contour. If this current point has already been visited by the tracing procedure, then its location will match one of the locations already on the point list. If the tracing procedure of the clusterization sub-module finds a match, then it has located a point of self intersection and executes addition processing to "cut" the self-intersected loop and trace only one of the non-self-intersected components.

The example in FIG. 20*b* depicts such a determination procedure. The first time that the tracing procedure locates point 293*o*, it will perform the check of step 291*e*, to determine that point 293*o* has not yet been encountered. Thus, at this initial stage, the system surmises that the silhouette contour is not self-intersecting. As the process continues, the tracing procedure in step 291*d* calls the get next point function which returns in subsequent iteration points 293*p*, 293*q*, 293*r*, 293*s*, 293*t*, 293*u* and 293*v*. The tracing procedure in step 291*e* executes checks for each of those points as they are located and, again, has no evidence to determine that the silhouette contour is self-intersecting.

However, when the tracing procedure in step 291*d* calls the get next point function after locating point 293*v*, it will receive the location for point 293*o*-*a* second time. In step 291*e* (see FIG. 20*a*), the tracing procedure examines point 293*o* for the second time and determines that the point has already been visited. At this juncture, the tracing procedure in step 291*e* has located a point of self-intersection and executes additional processing in this case. The tracing procedure in step 291*e* deletes from the point list 291*b* those just-traced points that are "bounded" by the point of self-intersection. For example referring to FIG. 20*b* the tracing procedure deletes points 293*o*-293*v* from the point list (that sub-contour will be traced in a later iteration of the clusterization sub-module 162). Also in step 291*e*, the tracing procedure marks the point of intersection (point 293*o*) as "background" (in the bitmap used by the clusterization sub-module bitmap 2, 285*d*). Thereafter, the tracing procedure loops in step 291*h* and proceeds to trace the remaining portion of the silhouette contour from the point that immediately proceeds the point of self intersection (e.g. point 293*n*). Following the steps outlined above, the tracing procedure in steps 291*c*-291*h* then locates point 293*zz* and then points 293*w*, 293*y*, 293*aa*-293*ff* and point 293*h*.

As described above, the get next point function yields the points of the silhouette contour to the tracing procedure of the clusterization sub-module 162, which in turn yields an identified and traced silhouette contour to the clusterization submodule 162. The clusterization sub-module 162 collects each silhouette contour located in a given level of searching and returns the list of points describing each such contour to the clusterization/small cluster removal module 160 (see step 283h, FIG. 19a). In an exemplary embodiment, the above-described functions and processes identify silhouette contours which are further refined as described below.

7. Building Polygonal Shapes from the Contour Data

After the clusterization/small cluster removal module 160 has completed processing, the polygonal shape module 168 builds a 2D polygonal shape from the points of each silhouette cluster. The polygon shape module 168 processes the list of points for each silhouette contour (the list of bitmap locations determined above by the tracing procedure of step 285e) and selects from those points a set of vertices for a polygon that best describes the silhouette's perimeter. As a given silhouette contour for an object can be made up of hundreds of points, the polygon shape module 168, when constructing a new polygon, selects from those hundreds of points the ones which are most significant in terms of describing the basic shape of the silhouette contour and disregards those which it determines are non-essential.

In the exemplary embodiment, the polygonal shape module 168 of the present invention uses an epsilon approximation to construct a polygon for each of the silhouette contours found above. Such a technique builds a list of polygon vertices from the list of corresponding silhouette contour points, choosing a number of points such that all points of original silhouette contour will deviate from the new 2D polygon shape by no more than a distance of epsilon. In the exemplary embodiment, the technique examines the bits of the silhouette contour to determine whether they should be included as a vertex of the approximation polygon. The polygon shape module 168 of the present invention uses a threshold value E (epsilon) to assess the significance of each point of the silhouette contour and determine whether a given point of the silhouette contour should also serve as a vertex of the polygon.

Figure 21A:
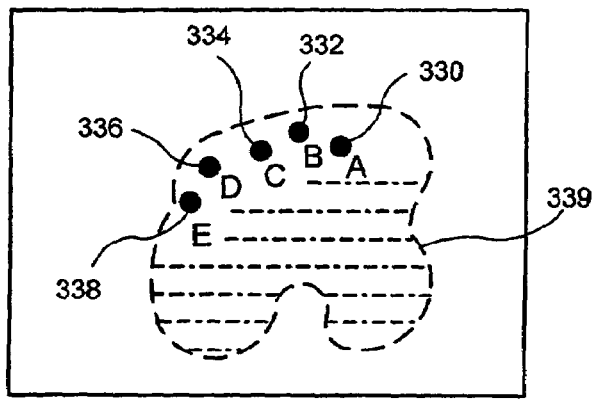
FIGS. 21a-e depict the progression of the polygonal shape module of the present invention as it proceeds through the list of points ("border points") which make up an exemplary silhouette contour.

FIGS. 21a-e depict the progression of the polygonal shape module 168 as it proceeds through the list of points ("border points") which make up an exemplary silhouette contour. The polygonal shape module 168 processes those border points, moving through the list of points for each silhouette contour. FIG. 21a shows a cluster from a silhouette mask image including border point 330 (point A), 332 (point B), 334 (point C), 336 (point D) and 338 (point E)—these points describe the silhouette contour of cluster 339.

To construct the epsilon-approximation of the polygon, defined by a discrete set of points, the system utilizes the following property that between any two given points of the silhouette contour (e.g. points X and Y) all lines passing through point X and having a distance of no more than epsilon from point Y (and thus fit the constraint of epsilon approximation) must fit within a sector (e.g. an angle or 2D cone), formed by the tangent lines from point X to a circle that has a center at point Y and a radius of epsilon.

Figure 21B:

Applying this property in FIG. 21b, the polygonal shape module 168 begins processing at point A (330). In the exemplary embodiment, the polygon shape module 168 allocates a data structure (e.g. a C++ object) to hold the vertices of the polygon. The polygonal shape module 168 adds point A (330) to the list of vertices for the polygon and retrieves (from the silhouette contour list determined above) the next border point, point B (332). As there is no current edge from point A (330) to any other point, the polygon shape module 168 creates an initial "edge" for the polygon starting at point A (330) and having its current end point at point B (332). This "edge" is considered a temporary edge, subject to change as the polygonal shape module 168 examines additional border points.

Figure 21C:
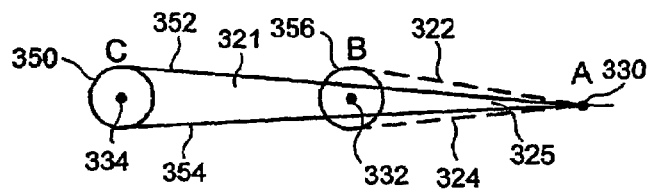

In FIG. 21c the polygonal shape module 168 examines the next border point, point C (334). At this juncture the polygon shape module 168 must determine whether the line segment from point A (330) should have its end point at point B (332) as determined above or should move the end point to point C (334). To make this determination, the polygon shape module 168 constructs a circle 350 having radius E (the epsilon value) about the new point C and it further constructs two lines 352 and 354 beginning at point A and touching circle 350 at tangent points on the circle to form a cone shape; cone 321. Then, the polygon shape module-168 constructs a second circle 356 having a radius E about point B (332) and two additional lines, line 322 and line 324 which intersect the circle 356 to form a second cone shape, cone 325. If the cone 321 intersects with cone 325, then the polygon shape module 168 determines that point B (332) is not significant to the shape of the polygon because the distance between new edge AC and point B is not more than epsilon. Thus, the polygon shape module 168 determines it is possible to construct the edge from point A (330) to point C (334) and omit point B (332). The line segment AC becomes the current edge from point A.

It is noted that the constraint mentioned above applies as follows when the system processes a number of points. All lines that pass through point A and are "e-close" to point B (i.e. those lines having a distance of no more than epsilon from point B) form one cone (cone 325) and all the lines that pass through point A and are e-close to point C form another cone (cone 321). The overlap of those cones forms an "intersection cone" and the lines which fall within the bounds of that intersection cone are e-close to both points B and C. The system of the present invention moves point by point until resulting "intersection" cone (the cone that is the result of the intersection of all cones) is not empty.

As the system proceeds it stores the indices of the points from the silhouette contour that lie in resulting cone on a new list; the new list provides the vertices for the e-approximation polygon. It is noted here that as the system generates the points of the new 2D polygon shape, it will also take steps to ensure that the new shape does not self-intersect (when points of the silhouette contour was generated in the tracing procedure, see discussion above with reference to FIGS. 20a and 20b, it was also checked to avoid self-intersection). To avoid such problems, the system checks for self-intersection on each segment it generates. When the system finds that a segment (for example a segment A A') of the polygon contains a point of self intersection, it moves backward through the original list of points L until it finds a segment A"A'. (replacing points A . . . A' with shorter segment A" . . . A' that does not has a contour self-intersection). To check for self-intersection the system uses a rasterization technique (which is described in further detail below).

In the exemplary embodiment, the polygon shape module 168 uses a monotonic function technique to determine whether the areas of the cones overlap. The polygon shape module 168 calculates an angle value for each of the tangent lines associated with the two cones under evaluation. For example, in FIG. 21c for cone 321 the polygon shape module 168 calculates an angle corresponding to each of the lines 352 and 354. For cone 325, the polygon shape module 168 calculates an angle value for each of the lines 322 and 324. For each of the cones the polygon shape module 168 also determines which of the angles is a minimum and which of the angles is a maximum value. Referring again to FIG. 21c, for cone 321 the angle corresponding to line 354 would represent the minimum value and the angle value corresponding to line 352 a maximum value. For cone 325, the angle value corresponding to line 324 would represent the minimum value and the angle value corresponding to line 322 a maximum value. In order to determine if an overlap exists between the cones, the polygon shape module 168 employs monotonic functions, e.g, functions to analyze the current maximum and minimum angle values and generate new minimum and maximum angle values. For example, as is described by the following function calls:

new_max=minimum(max_angle$_{cone1}$,max_angle$_{cone2}$)

new_min=maximum(min_angle$_{cone1}$,min_angle$_{cone2}$)

Using the above formulas, if the "new_min" is less than or equal to the "new_max," the polygon shape module 168 determines that there is a intersection between the two cones, as is depicted in FIG. 21c.

Figure 21D:
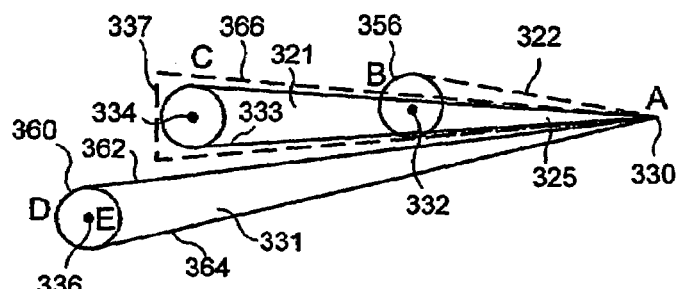
Figure 21E:
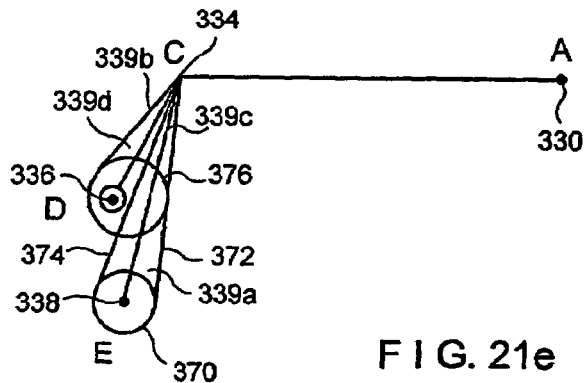

In FIG. 21d and FIG. 21e the process continues to construct a polygon that approximates the shape of the silhouette contour 339 (FIG. 21a). Having processed points 332 and 334 in FIGS. 21b and 21c, the polygon shape module 168 in FIG. 21d examines the next border point, point D (336). At this juncture the polygon shape module 168 must assess whether the line segment from point A (330) should have its end point at point C (334) as determined above or should move the end point to point D (336). To make this assessment, the polygon shape module 168 again constructs a circle 360 having radius E about new point D (336) and it further constructs two tangent lines 362 and 364 beginning at point A (330) and intersecting circle 360 to form a cone shape, cone 331. The polygon shape module 168 determines whether an "intersection" cone can be formed from cone 331 and the cones previously created (cones 325 and 321). The polygon shape module 168 must then determine whether cone 331 intersects in any way cone 337, an intersection cone formed by cones 325 and 321.

In the example depicted in FIG. 21d, cone 331 does not intersect cone 337, thus the polygonal shape module 168 determines that point C (334) is significant to the polygonal shape (as it lies within the bounds of intersection cone 337). In such a case, the polygonal shape module 168 recognizes that the new edge AD that omits point C would deviate by more than the set epsilon distance parameter from the original silhouette contour running from point A to point D. Accordingly, the polygonal shape module 168 prepares to add point C to the list of vertices in the data structure allocated for the polygon. However, in the exemplary embodiment before it does so the polygonal shape module 168 makes an additional check to determine if the new edge AC will collide with any other silhouette contour found in the current silhouette mask image or will collide with any other portion of the silhouette contour currently being processed.

Figure 22A:
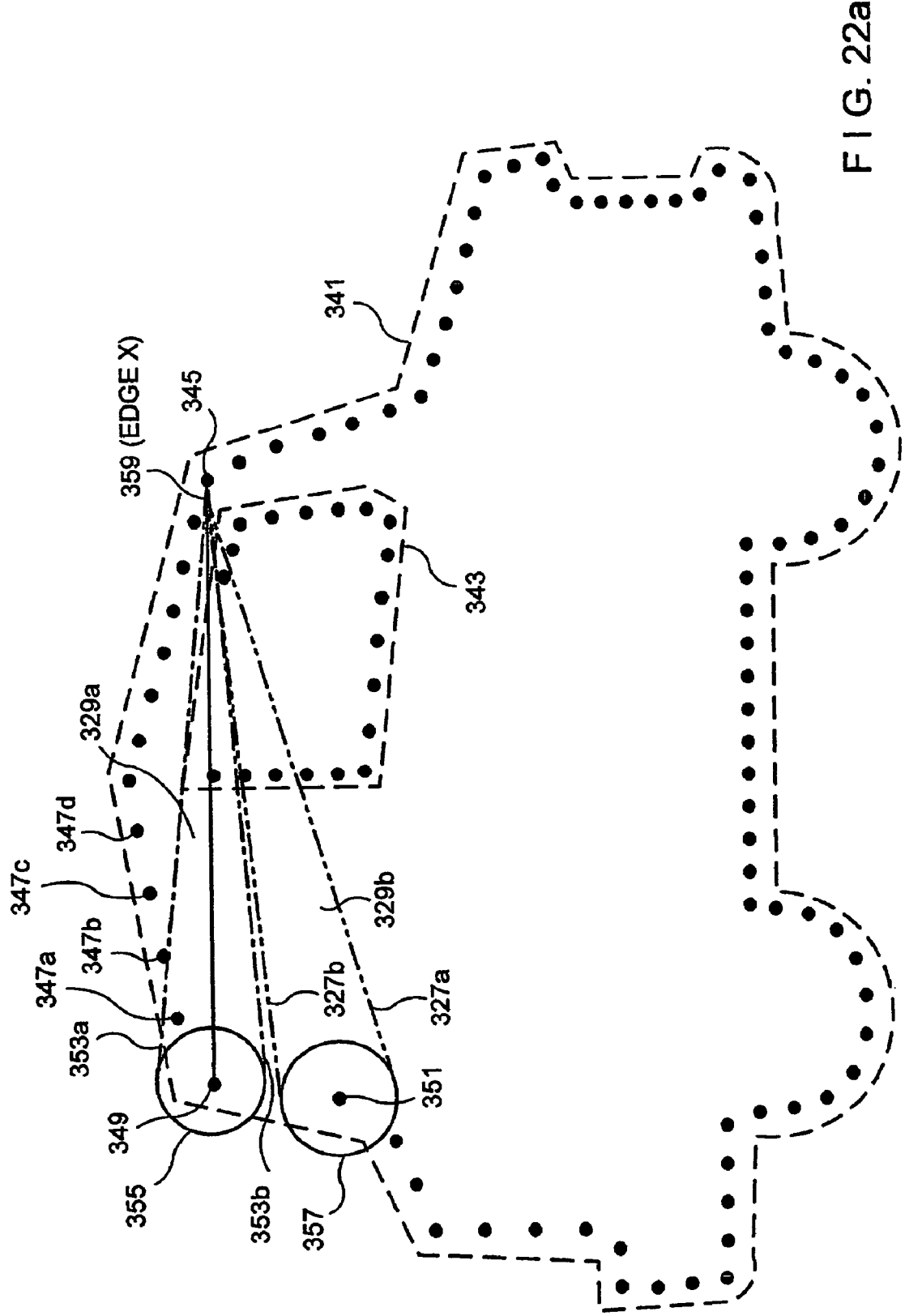
FIG. 22a depicts two silhouette contours as they are altered by the polygonal shape module of the present invention.

With reference to this process, there are instances when the edges of the new polygon being constructed by polygon shape module 168 might intersect other silhouette contour segments, which exist in a given silhouette mask image. For example, FIG. 22a depicts two silhouette contours, 341 and 343. Silhouette contour 341 has a number of border points, including points 345, 347a-d, 349 and 351. As the polygonal shape module 168 proceeds to determine the vertices for a polygon that describes silhouette contour 341, the polygon shape module 168 may determine that point 349 is essential.

For example, the polygon shape module 168 might determine that the cone 329a formed by the circle 355 and lines 353a and 353b does not in any way intersect the cone (329b) formed by circle 357 (drawn around point 351) and lines 327a and 327b. In that case, the polygonal shape module 168 will also check to determine whether the edge from point 345 to point 349 (edge X, 359) intersects any other silhouette contour found within the silhouette mask image. In FIG. 22a, edge X (359) does intersect silhouette 343 and thus there exists an edge collision. In such a situation, the polygonal shape module 168, in order to avoid an edge collision, effectively reverses its point checking procedure, rasterizing and evaluating edges between point 345 and the following points: point 347a, then point 347b, then 347c until it arrives at point 347d, where the edge constructed meets the criteria of the edge collision check, i.e. does not intersect with any silhouette contour. Accordingly, the polygonal shape module 168 will include pixel 347d on the list of vertices which make up the polygon for silhouette 341.

To check for edge collisions, the polygonal shape module 168 maintains a bitmap array having the same size as the silhouette mask image being processed. At the commencement of the procedure the polygonal shape module 168 marks in the bitmap all the points that form silhouette contour (in addition to the other silhouette contours for the silhouette mask image). As the system generates the points of the new polygonal shape, some of the points from the initial silhouette contour will be replaced in the bitmap by linear segments. A rasterization process defines which bits should be marked to represent linear segment (e.g. AA'). When the points of a new segment have been marked, the polygon shape module 168 will then unmark in the bitmap the points from the original silhouette contour A . . . A'; if the pixels from the rasterized segment pixels intersect any other portion of the silhouette contour in the bitmap, the polygonal shape module 168 will adjust the bounds of the polygon (and move to the previous point of the silhouette contour) to avoid the intersection.

For example, FIG. 22b depicts a silhouette contour 361, including a series of points 363 between points A 365 and B 367. In FIG. 22b, the polygonal shape module 168 determines that all points between point A 365 and point B 367 (i.e., the series of points 363) are non-essential to describing silhouette contour 361 and therefore simplifies the contour line from the original subtle curve to a straight line segment 369 where only point A 365 and point B 367 need be added to the list of points for the polygon that describes the silhouette 361. In the bitmap array, the polygonal shape module 168 removes the points of contour section 363 and rasterizes an edge, straight line 369, between points A and B in order to maintain an image that can be referenced when determining possible edge collisions from additional silhouettes (e.g. silhouette 371). The polygonal shape module 168 employs the above process to check for edge collisions during its evaluation of potentially essential points.

Referring again to FIG. 21d, the polygonal shape module 168 executes the above-referenced edge collision check to determine whether an edge can be constructed between point A 330 and point C 334 without an edge collision. Assuming that no edge collision exists, the polygonal shape module 168 adds point C 334 to the list of vertices in the polygonal object and moves to point C and begins the process to determine an endpoint for a line segment beginning at this new point. The polygonal shape module 168 retrieves (from the silhouette list determined above) the next border point, point D (336). As there is no current edge from point C (334), the polygon shape module 168 draws an initial edge starting at point C (334) and having its current end point at point D (336). This edge is considered a temporary edge.

In FIG. 21e the polygonal shape module 168 examines the next border point, point E (338). At this juncture the polygon shape module 168 must determine whether the line segment from point C (334) should have its end point at point D (336) as determined above or should move the end point to point E (338). To make this determination, the polygon shape module 168 calculates a circle 370 having radius E about the new point E (338) and it further constructs two tangent lines 372 and 374 beginning at point C (334) and intersecting circle 370 to form a cone 339*a*. Then, the polygon shape module 168 constructs a second circle 376 having a radius E about point D (336) and two additional tangent lines 339*b* and 339*c* which together form a second cone shape, cone 339*d*. The polygonal shape module 168 then determines whether cones 339*a* and 339*d* intersect. If so, the polygonal shape module 168 determines that point D (336) is not significant to the shape of the polygon and construct a new edge from point C (334) to point E (338)—omitting point D (336). The line segment CE becomes the current segment from point C.

This process continues for each of the border points until the last border point is examined and a line segment is connected again to point A (330). After such processing, the polygon object will contain a list of vertex points for the polygon that approximates the current silhouette contour.

The polygon shape module 168 continues processing as described above. For every silhouette mask image the polygonal shape module 168 accesses the silhouette point list array 283*x* for that image and computes a set of polygon coordinates to describe each silhouette contour found therein. The polygonal shape module 168 then saves the data for each polygon for additional processing as described below.

B. Combining the Silhouette Polygons to Construct the 3D Model

In the exemplary embodiment, the 3D construction module 106 of the 3D model builder application 100 uses the polygons generated-above (the "silhouette contour polygons" (109) corresponding to each silhouette contour in the silhouette mask images) to construct the polygonal mesh model 108 (see FIG. 10). It is noted that the 3D construction module 106 uses an analytic approach to construct the 3D model, the 3D construction module 106 finds the areas of intersection between the silhouette contour polygon outlines and the faces of the model being constructed and by those intersections determines the three dimensional boundaries of the object 4.

FIG. 23 presents a diagram of the computer-programmed elements of the 3D construction module 106. The calibration module 105 calibrates certain parameters (e.g. focal length) and sets up a system of local (camera coordinate system) and global (platform/rotating turntable 6 system) coordinates in preparation for the 3D construction process. An initial 3D object building module 602 creates from one of the silhouette contour polygons an initial, (rough) 3D model 606 to represent the object 4. A 3D refining module 616 processes the remaining silhouette contour polygons and uses them to refine the (rough) 3D model 606 and transform it into the refined polygonal model 61. It is noted that the polygonal mesh model 108 (see FIGS. 10 and 23) is created by the building of the initial, (rough) 3D mesh model 606 and the transforming of this initial model into the refined polygonal model 615 (and both states of construction are included in the polygonal mesh model 108 depicted in FIG. 23).

The resulting refined polygonal model 615 consists of a series of polygonal faces or "loops". The data structures for the 3D, polygonal mesh model 108 (the initial, (rough) 3D model 606 and the refined polygonal model 615) includes a list of all vertices for the 3D model (a list of vertices 612) and a list of all polygons (a list of polygons 610) that form the faces of the 3D, polygonal mesh model 108. It is not guaranteed that the 3D, polygonal mesh model 108, when completed, will be in a state of refinement such that it can be considered a fully "triangulated mesh" model. Instead, it is more likely that each face of the 3D, polygonal mesh model 108 will be a polygon having more vertices than three. The mesh triangulation module 110 (described in further detail below) further processes the polygons of the 3D, polygonal mesh model 108 (the refined polygonal model 615) and transforms it into the triangulated mesh model 112 such that each mesh face has only 3 vertices (see FIG. 10). Each of the programmed elements of the exemplary 3D construction module 106 is now described in further detail.

1. Calibration Before the Model Building Process

The calibration model 105 finds the rotation axis of the rotating turntable 6 (the platform of rotation) and sets values for the relative position of the camera 2 and the rotating turntable 6. In addition, the calibration module 105 calibrates the camera's focal length. By the relative positions of camera 2 and rotating turntable 6's axis of rotation, the present invention can introduce systems of coordinates, one for the camera 2 (a local system dependent on rotation angle) and one for the rotating turntable 6 (a global system which is independent of camera view), and then find a transform (rotation matrix and translation vector) and an inverse transform (rotation matrix and translation vector) that convert coordinates from one system to another. It is noted at the outset that when the system constructs the initial, (rough) 3D model 606 and transforms it into the refined polygonal model 615, it performs all calculations in the local (camera-connected) coordinate system that corresponds to the platform rotation position for each silhouette image that the system captured. The coordinates are translated to the global coordinate system for storage and for display (visualization of the object).

The calibration module 105 establishes a local coordinate system based on the physical properties of the camera 2. In the exemplary embodiment, the calibration module 105 designates the focal point of the camera 2's lens as the origin (0,0,0) of this local coordinate system. Directions of the X and Y axes are the same as those of the CCD chips's coordinate system (within the camera 2); the direction of the Z axis is chosen to make a positive XYZ coordinate system (one in which the coordinates processed will be positive values).

The establishment of a local coordinate system enables the system of the present invention to use basic principles of triangulation to generate a real-world, 3D X, Y, Z local coordinate system coordinate for each 2D coordinate in an image output by the camera 2 (and the points of the corresponding silhouette contour polygons which were yielded from those images). U.S. Pat. No. 6,044,170 entitled "System and Method for Rapid Shape Digitizing and Adaptive Mesh Generation" and U.S. Pat. No. 5,886,702 entitled "System and Method for Computer Modeling of 3D Objects or Surfaces by Mesh Constructions Having Optimal Characteristics and Dynamic Resolution Capabilities" and U.S. Pat. No. 6,208,347 entitled "System and Method for Computer Modeling of 3D Objects and 2D Images by Mesh Constructions that Incorporate Non-Spatial Data such as Color or Texture" all of which are expressly herein incorporated by reference—detail the principles of triangulation established using a camera-based coordinate system. The principles and descriptions of each system in above-referenced patents are suitable for the creation of a system for triangulation according to the present invention and each of those patents and applications are expressly herein incorporated by reference for describing the principles of triangulation and the related calibration techniques.

One of the parameters used to generate 3D coordinates by the triangulation principles described above is focal length.

Focal length, also known as focal distance, is that distance (typically expressed in millimeters) from the principle point of a camera to its focal point. For a camera, the focal point of a lens is a point on the axis of the lens where all incident light rays converge or appear to diverge. The focal point exists at a location that is a distance away from the principle part of the lens. The location of the focal point for light reflecting into the camera (and the related focal length) plays a part in the triangulation techniques mentioned above and used herein. In the exemplary embodiment, the calibration module 105 of the present invention determines the location of the focal point and additionally a value D for the focal length with a high degree of accuracy through a calibration process. By knowing the location of the focal point in relation to the location of the camera's light collector (e.g. the CCD chip within the camera 2), the location of a point on a given 2D image taken by the camera 2 can be used to determine a 3D X, Y, Z location of that same point on the object 4.

However, to create an accurate point reading, it is necessary in some systems to accurately calibrate the focal point location and a focal length. Generally, lens manufacturers calibrate a lens' focal length, but that factory-determined value often does not provide the most accurate reading for any particular lens and camera configuration. In addition, when the system incorporates a zoom lens, focal length must be determined for any zoom setting. Thus, in the exemplary embodiment, the calibration module 105 calibrates a value D for focal length as is further described below.

In the exemplary embodiment, the calibration module 105 also calibrates a vector to describe the rotating turntable 6's axis of rotation 8. As noted above, the camera 2 takes a series of images of the object 4 as it moves about the rotating turntable 6 (e.g. see FIGS. 3a-h and related description). Each of the images collected by the camera 2 represent a different view of the object 4, taken as if the camera had been moved to different locations about the object. (See FIG. 4 and related description above). Although the local coordinate system established above provides a basis for generating 3D coordinates for each of those views, there is also a need in the system of the present invention to relate each separate view of the object 4 to form one convex whole. As the camera 2 has captured all of the images of object 4 relative to one axis of rotation 8, that axis of rotation provides one way to link the coordinate information from each image view and create a 3D model from all of the polygonal shapes found in the 2D images.

In the exemplary embodiment, the calibration module 105 locates and creates a vector for the axis of rotation 8 using the same processes it employs to establish the local coordinate system and calibrate a value for focal length D (the procedures for calibrating focal length and axis of rotation are described below). Once the calibration module 105 has determined the local coordinates for the axis of rotation 8, it then establishes the global coordinate system to link coordinate information for each view of the object 4. In a global coordinate system, the axis of rotation 8 serves as one of the three primary axes, e.g., the Y-axis. The calibration module 105 establishes an origin (0,0,0) along this axis (e.g. the point on the axis of rotation that is closest to the camera 2's origin point), sets a Z-axis perpendicular to the Y axis (e.g. where the plane YZ contains the origin of camera 2's coordinate system) and sets an X-axis as the cross product of Y and Z axes (with positivity guaranteed). Further, the calibration module 105 determines a "local to global" transform (mentioned above) to translate local coordinates to the global coordinate system. The calibration module 105 also creates a "global to local" inverse transform to translate global coordinates to the local coordinate system. These transforms are adjustable as necessary to take into account the angle of rotation of the turntable as it differs from one image view to another. For more information on creating transforms (rotation matrices, translation vectors and the global to local, local to global translation of coordinates), the reader is referenced to the following publication, which is hereby expressly incorporated, by reference: *Linear Algebra*, Third Edition, John B. Fraleigh, Raymond A. Beauregard. Addison-Wesley Publishing Company, 1995. ISBN 0-201-52675-1.

In order to perform the above-described calibrations (for focal length and axis of rotation), the system of the present invention provides, as mentioned above, the step of displaying a flat surface object, a calibration object, which is marked with shapes of known dimensions (such as a "checkerboard" pattern having squares of known dimensions and also having one square that is colored opposite to the pattern). Characteristics about the geometric shapes are known, such as distance between the equidistant corners of each square on the checkerboard pattern. In the exemplary embodiment, the system of the present invention captures two photographic images of the calibration object (see FIGS. 8a-8b above and related description). The present invention captures one image of the calibration object and then rotates the turntable a predetermined amount, e.g. 90 degrees, about the camera 2's line of focus before capturing a second image of the calibration object. The system of the present invention takes photographic images of the calibration object and performs computations to analyze points from the set of geometric patterns; it uses the those computations to calibrate the initial settings and positions used for high-accuracy scanning.

After the system gathers the images of the calibration object, a set of computer-programmed elements performs operations to determine the different initial setting parameters. Although it is also understood that all the parameters can be calibrated at once by a single computer procedure, in an exemplary embodiment the system calibrates the focal length and axis of rotation parameters in distinct processes. One reason to subdivide the problem is to limit the number of parameters to be optimized in a given procedure, as too many parameters might make optimization unstable. One set of programmed elements determines a value for the camera's focal length. Another set of programmed elements determines direction and passing point values for the axis of rotation. In an alternative embodiment, additional programming elements might determine parameters such as settings to adjust for lens distortion. It is noted that a value for the turntable 6's angle of rotation is known and is not calibrated; each silhouette image has associated with it a value for the turntable's angle of rotation.

Using a number of selected points on the calibration object (e.g the four corner points of the square whose color is opposite to that of the checkerboard pattern), the calibration module 105 uses the square edge lengths and the lengths of the diagonals formed by those points (all lines that line on the plane of the calibration object and which have known dimensions) to find a focal distance value (one parameter) and equations for the plane (three parameters for each plane) of the calibration object as it is oriented vis-a-vis the line of focus in the two calibration images. (For example, in one image the calibration object was photographed at an angle that was roughly 45 degrees to the line of focus, in the second, the calibration object was rotated by a known amount e.g. 90 degrees to that initial angle). In the exemplary embodiment, the calibration module 105 employs the equation $Mx=1$, where M is an unknown vector. Such a plane equation is used in this instance because the plane does not pass through the origin. It is also noted that the origin here is equivalent to the focal point. Using the plane equations, the calibration module 105 next defines 3D point positions for the selected points of the calibration object (e.g. the 4 points chosen above). The system finds corresponding pairs of points from the different images taken of the calibration object (e.g. matching each corner point from the selected checkerboard image square in one image to the corresponding point in the second image). The system locates an axis (direction and a point, 5 parameters) that will minimize the sum of squares of distances between corresponding points after rotating the calibration object the amount of a known angle (e.g 90 degrees). To find the above set of parameters, the present invention solves the above-mentioned equation to minimize the sum of the squares of the differences of the point positions.

Where the distances between the points are known (e.g. as the distances between the corner points of the selected square of the calibration object are known), the triangulation equations for each of the points can be related and solved simultaneously. In solving the equations simultaneously, the calibration module 105 optimizes the solution to find a set of parameters that best fit the equations and that describe constraints (for example, that all selected points from one image object lie on the same plane and that distances between the points are known). For example, for generating the D value for focal length, the calibration module 105 generates triangulation equations for a number of selected points from one of the calibration images and then solves all those equations simultaneously so that the equations which generated the 3D coordinates would have one D value that would allow them all to fit on the same plane.

In determining a vector for the axis of rotation 8, the calibration module 105 solves a set of equations to triangulate points in the two calibration images (e.g., the images of FIGS. 8*a* and 8*b* which were taken by rotating the turntable 90 degrees) and solves those equations to find a best fit for the axis of rotation under the constraint that the points in one image must lie on one plane and the points on the other image also lie on a plane that has been rotated by a known amount away from the plane of the first image, e.g. 90 degrees.

There are a number of both commercially and publically available software packages for optimization problems, which can be used to solve this system of nonlinear equations. Software for optimization in libraries, such as MINPACK, IMSL and NAG, are suitable. However, any other method for finding "zeroes" in nonlinear functions would work as well. The instructions accept as input the equations data specifying the known shape of the object used for calibration (e.g. the plane with the checkerboard pattern). In addition, the program instructions incorporate information concerning the relative distances between each vertex of the geometric shapes (e.g. the distance between the vertices of a given square of the checkerboard). By incorporating the constraint information, programmed elements execute to determine the location for the four corners of each marked square on the calibration object and a "best fit" of coefficient values (such as focal length) needed to solve the triangulation equations to yield those coordinates.

U.S. Pat. No. 6,044,170, entitled "High Accuracy Calibration for 3D Scanning and Measurement Systems" referenced above, describes a system for computing a focal point and focal length using a system of solving simultaneous equations. Such a technique is suitable for the present invention and the entire description from the above application is expressly incorporated herein by reference. That patent application additionally describes techniques for determining the angle of rotation of a galvanometric scanner and a system for calibrating multiple scanning devices. The teachings of those techniques and systems are also suitable for determining the parameters of an axis of rotation (and further the rotation matrix and translation vector to translate between the local and global coordinate systems). Again the descriptions of such techniques found in the above patent application are expressly incorporated herein by reference. With the above calibrations and other computations complete, the system of the present invention can begin construction of the 3D model.

2. Constructing the Initial (Rough) 3D Model (Initial State)

Figure 24:
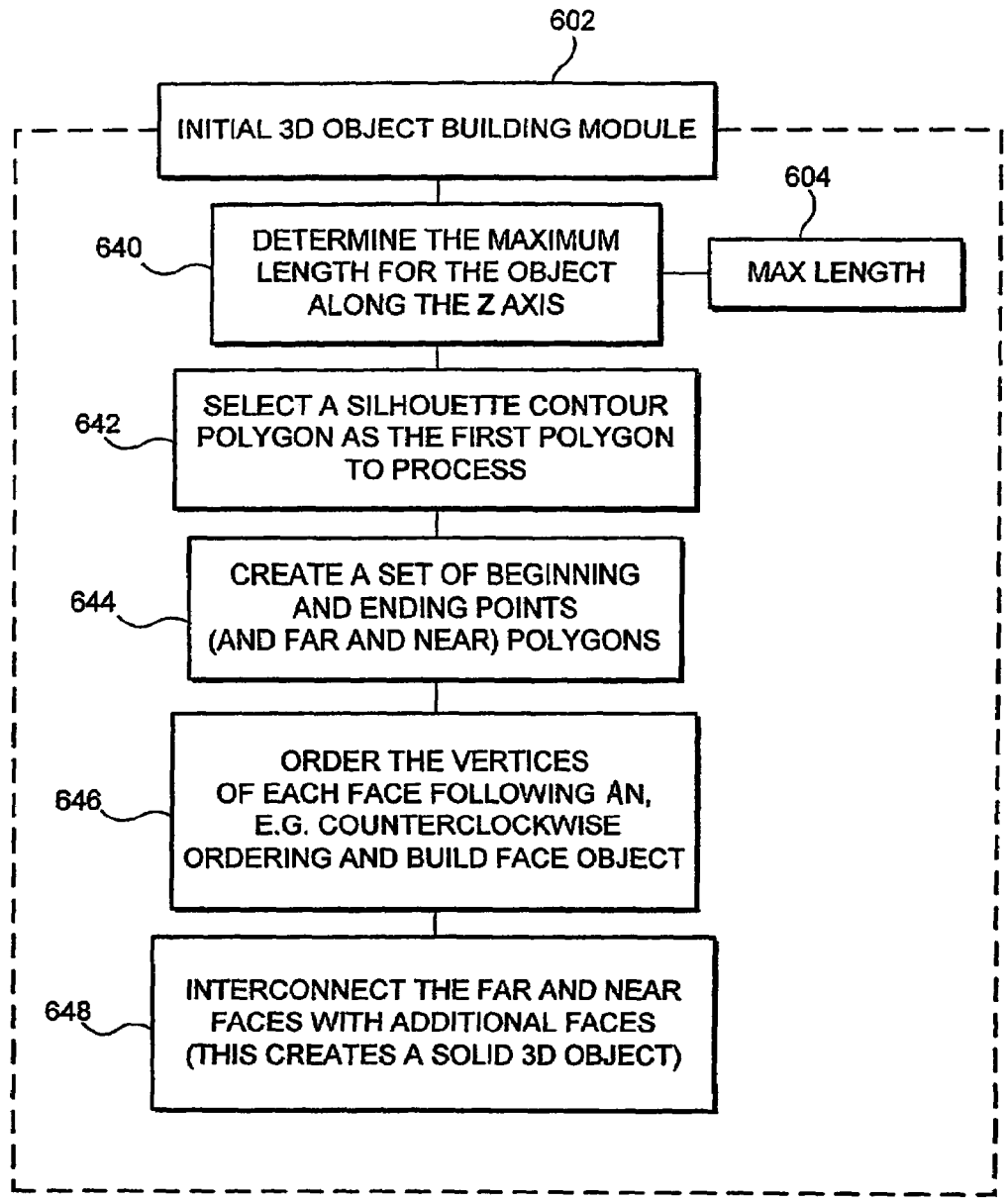
FIG. 24 depicts an exemplary process flow for the initial 3D object-building module of the present invention.

As noted above, the initial 3D object building module 602 creates from one of the silhouette contour polygons 109 (e.g., one that was constructed from the first silhouette mask image with an associated angle of rotation of 0 degrees) an initial, (rough) 3D model 606 to represent the object 4. FIG. 24 depicts an exemplary process flow for the initial 3D object-building module 602 of the present invention.

In step 640 of FIG. 24, the initial 3D object building module 602 determines a value L that represents the maximum possible length of the object 4 along the Z-axis in the local coordinate system for the current silhouette mask image. In step 640 a maximum length determination module 604 calculates the L value based on the calibration parameters (i.e. the location of the axis of rotation 8 in the local coordinate system). In determining the L value, it is observed that since the object 4 was rotated 360 degrees on the rotating turntable 6, the object 4's size cannot exceed twice the distance from the axis of rotation 8 to the camera 2. The determination of the L value permits the proper projection (loop orientation) of the points to the plane of the CCD chip in the camera 2. No one point of the object 4 can be "behind" the plane of the CCD chip during platform rotation (for any rotation angle).

Using parameters for the axis of rotation 8 (obtained during the calibration procedure 105), the system calculates a distance value M which represents a distance from the axis of rotation 8 (of the rotating turntable 6) to a predetermined point that is just in front of the camera 2 (e.g. 5 centimeters in front of the camera 2's CCD chip plane). With this value M, it is possible to solve for the maximum length value L, which is 2 times the value M (L=2*M).

After step 640, the initial 3D object building module 602 in step 642 uses one of the silhouette contour polygons 109 to create the initial (rough) 3D model 606. In step 644, the initial object building module 602 projects the selected silhouette contour polygon onto "near" and "far" planes and uses those projections as the first two polygon faces (or polygon "loops") in the initial, (rough) 3D model 606. In the exemplary embodiment, the near and far planes are parallel to the plane of the CCD chip, perpendicular to the Z axis and located in front of the camera 2 (as no one face plane of the object can be found behind the CCD chip during camera rotation).

Figure 25:
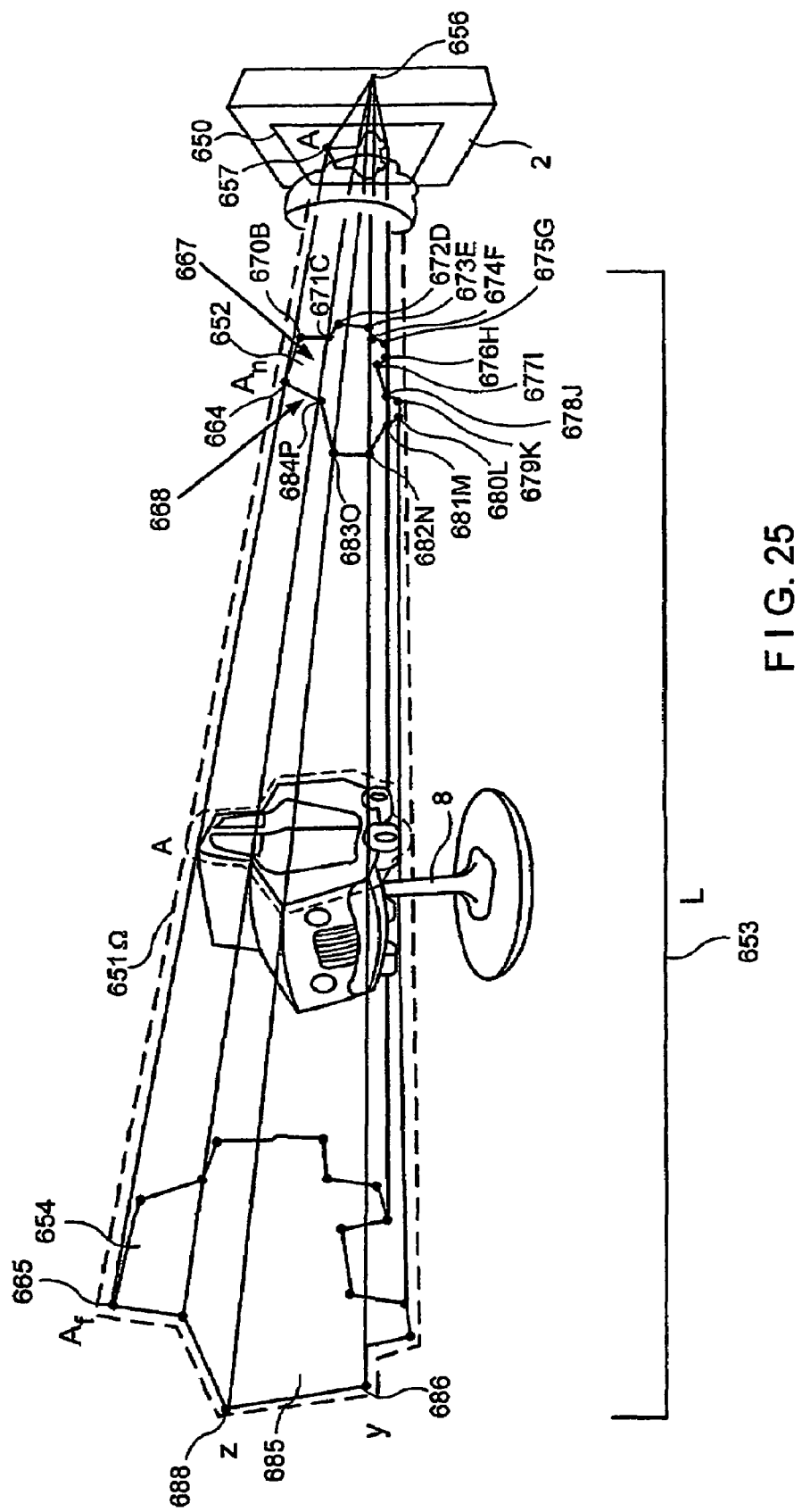
FIG. 25 depicts a 2D projection of a silhouette contour polygon of the present invention and also shows images of the near and far polygon faces created by the projection process of the present invention.

FIG. 25 depicts a 2D projection of a silhouette contour polygon 650 and also shows images of the near and far polygon faces (652 and 654, respectively) created by the projection process of the present invention. In FIG. 25, a convex whole created by the near and far plane projections is shown as $\Omega$ (651). In the present invention, it is observed that an entire space for the object 4 can be bounded in the space of a cone 651 which projects from the focal point 656 of the camera 2 through the points' of the near face 652, along length L 653, and out to the points of the far face 654. To form the convex whole $\Omega$ 651 of the object, the system crops the beginning and end of the cone across the near and far planes using the projections of the selected silhouette contour polygon (e.g. see near and far projections 652, 654).

In step 644 of FIG. 24, the initial 3D object building module 602 executes a procedure to examine each point of the current silhouette contour polygon (e.g. polygon 650) and for each such point determine 3D point positions that project the point on both the near and far planes (thereby creating a set of points for the near and far faces of the initial, (rough) 3D model 606). For each point on the near and far faces, it is known that:

$$v=1p, p=(x,y,-f) \text{ and } v=(X,Y,Z),$$

where x and y are the 2D coordinates for a point of the silhouette contour polygon (on CCD plane), f is the focal distance and X, Y, Z are coordinates of the 3D point positions. In computing such positions, another equation defines each of the "front" and "rear" planes that are parallel to CCD plane:

$$Z=-D$$

Where D is a distance to the "near" of the plane, the system solves as follows:

$$X=xD/f, Y=yD/f, Z=-D.$$

For example, in FIG. 25, the process computes near and far plane positions for a point on the silhouette contour polygon 650 (e.g. point A, 657). As described above, the process computes corresponding 3D X, Y, Z points for the near face (e.g. point A(n) 664 and point A(f) 665. The process continues in this fashion to compute near and far point locations corresponding to each of point of silhouette contour polygon 650.

Continuing in step 644 of FIG. 24, the initial 3D object building module 602 adds the 3D X, Y, Z values for each computed near and far face vertex onto a list of coordinates (an array maintained for the vertices of the 3D object—the list of vertices 612 (see FIG. 23)). The 3D object building module 602 in step 646 builds a face object (a polygon loop object) for each of the near and far faces. In the exemplary embodiment, a face object includes a data structure (e.g. an array) to hold information concerning the face's vertices.

In the exemplary embodiment, the vertices of each face are ordered so that the normals for each face direct outward from the object. Thus, each face is always "counter-clockwise-oriented" as if viewed from the outside of the object. Such an ordering enables later processes of the present invention to maintain that the normals for each face direct outside the object. For example, the system orders the vertices in near polygon face 652 to have a "counter-clockwise orientation" when viewed from outside the object as follows: $A_n$(664) to vertex B(670) to vertex C(671) to vertex D(672) to vertex E(673) to vertex F(674) to vertex G(675) to vertex H(676) to vertex I(677) to vertex J(678) to vertex K(679) to vertex L(680) to vertex M(681) to vertex N(682) to vertex O(683) to vertex P(684).

In building the set of 3D coordinates for this near face, the initial 3D object building module 602 loads a face object (a polygon "loop") with references to its vertices. The vertices follow the "counter-clockwise-orientation" ordering (as described above) as if they were being viewed from that face's exterior. For the far face, the initial 3D object building module 602 will also load another face object (a second polygon loop) with references to its vertices—those vertices will also follow the ordering technique presented above to establish a "counter-clockwise-orientation" so that the face's normal vector directs outside the object model. Following this procedure, an exemplary face object includes the following data:

Face Object (Polygon Loop)
    vertices [ ] an array of indices to locations in the list of
        vertices 612 where n is the number of vertices in the polygon. (Following a counter-clockwise ordering as if the face was viewed from the exterior)

The system can also store other data for the face such as normal data. To complete step 646 of FIG. 24, the initial 3D object building module 602 adds references to the newly created near and far face objects to the list of polygons 610 of the initial, (rough) 3D model 606.

In step 648, the initial 3D object building module 602 proceeds to build additional faces to enclose the space between the near and far faces. Each of the new faces has four points. In step 648 the initial 3D object building module 602 constructs each new face from one point pair in the near face and its corresponding point pair in the far face. For example, referring to FIG. 25, the initial 3D object building module 602 processes the pair of points creating edge C-D (points 671 and 672) from the near face and the pair of points creating edge Y-Z (points 686 and 688) from the far face to create a new face 685. In this example, point 671 and point 688 are "linked" points, as are points 672 and 686. In this procedure, the initial 3D object building module 602 creates the new face object (a new polygon loop object) and orders the vertices to maintain the orientation that keeps the normal for the face directed outward from the object model. In the example of FIG. 25 the vertices of the new face have the ordering (C-D-Y-Z). Then, the initial 3D object building module 602 adds the face object to the list of polygons 610.

Figure 26:
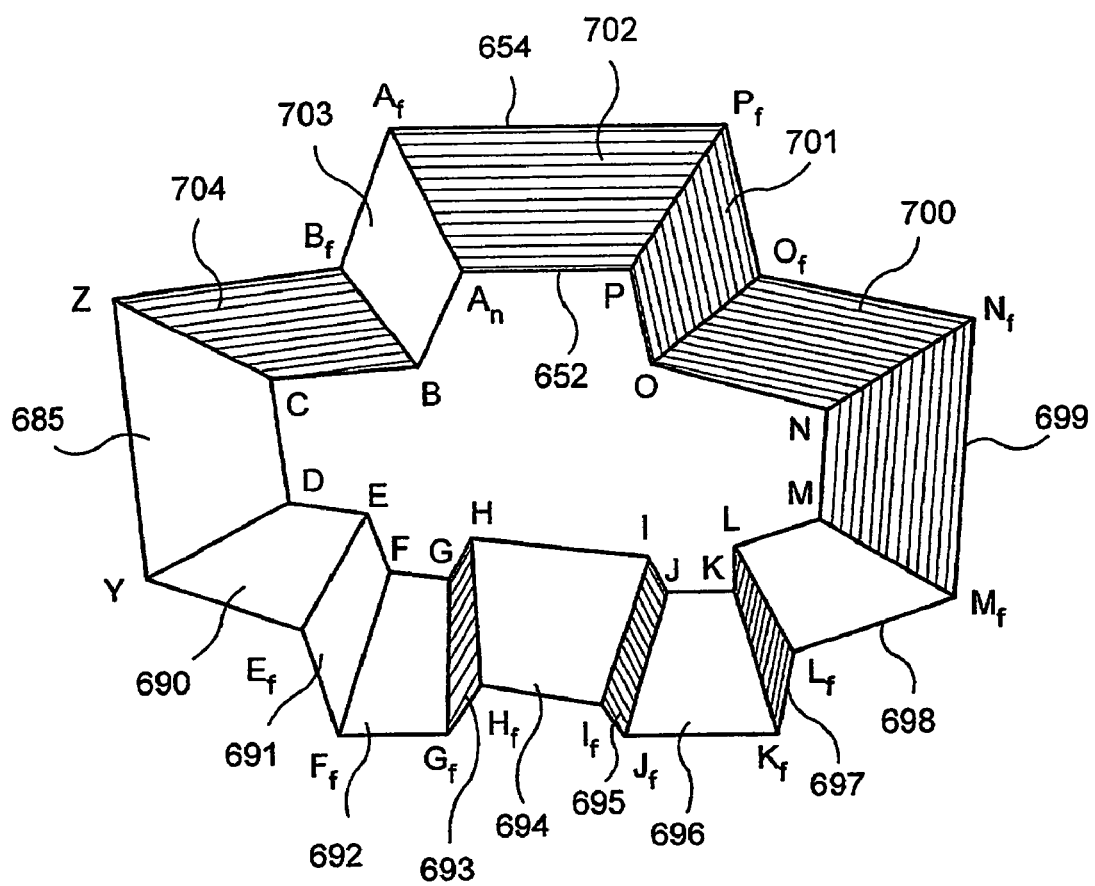
FIG. 26 depicts a second view of the near and far faces of the conical project with creates the initial, (rough) 3D model of the present invention.

In step 648, the initial 3D object building module 602 continues processing as described above, creating additional faces for each "link" (point pair) on each of the near and far faces. In the exemplary embodiment, the initial 3D object building module 602 proceeds through the list of vertices of the near face, pairing each near face vertex with one in the far face and creating new faces to span the space between the near and far faces. FIG. 26 depicts a second view of the near and far faces 652 and 654 showing face 685 (described above) and a set of additional new faces 690-704.

After completing the processes described above, the initial 3D object building module 602 will have created an initial, (rough) 3D model 606 from a single silhouette image. At this point, the initial 3D object building module 602 can store the coordinates of the initial, (rough) 3D model 606 (here using the local to global transform described above to compute a global coordinate for each vertex of each face of the initial, (rough) 3D model 606). The initial, (rough) 3D model 606 will be further refined with the processing of additional silhouette images as described below.

3. The Refining Procedure—Overview

Figure 27:
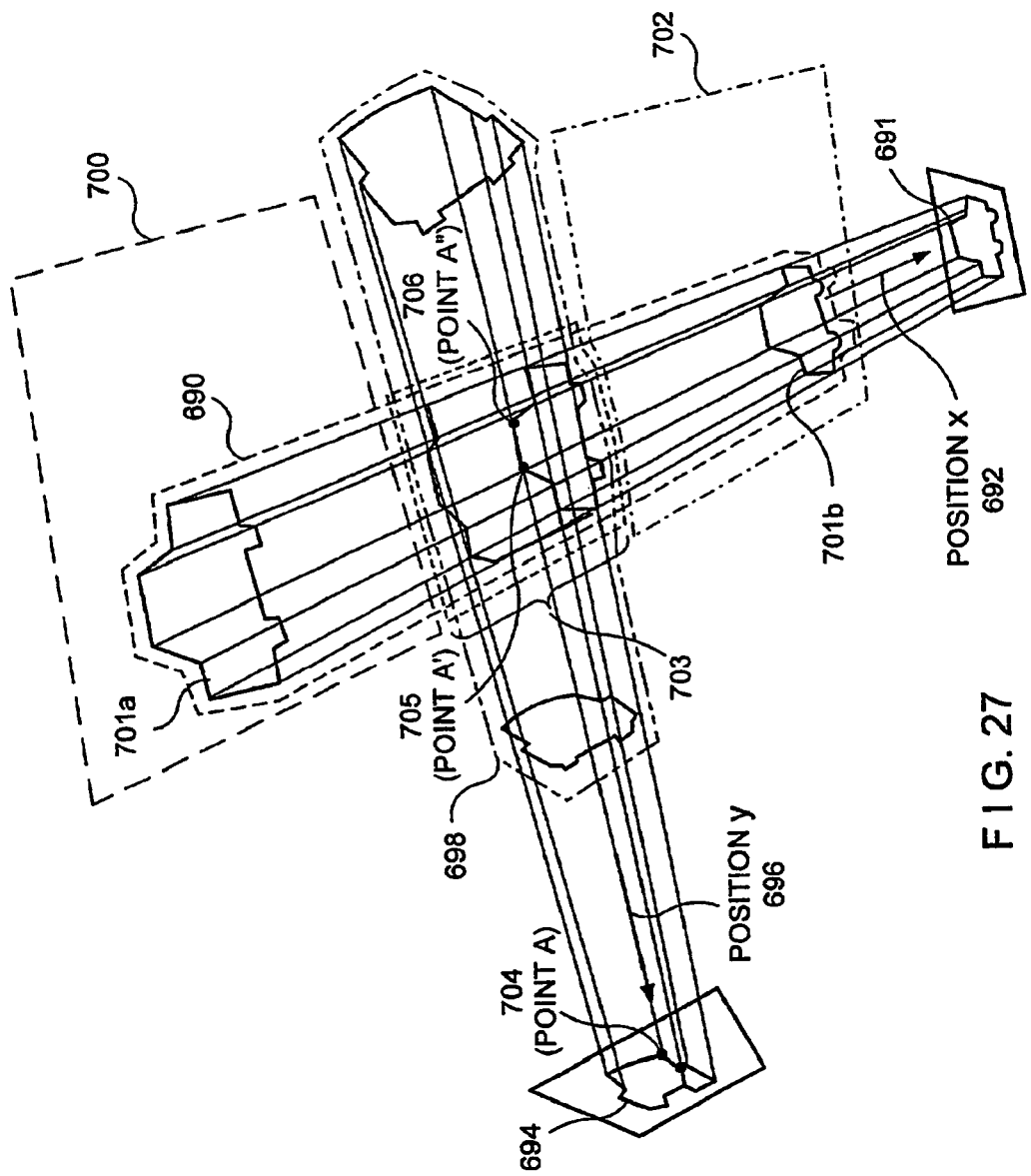
FIG. 27 provides a visual depiction of the process of model refinement of the present invention.

Referring again to FIG. 23, the 3D refining module 616 of the present invention processes the remaining silhouette contour polygons to strip excess area from the initial, (rough) 3D model 606 and shape that model into the refined polygonal model 615. FIG. 27 provides a visual depiction of the process of model refinement. FIG. 27 shows the initial, (rough) 3D model at 690. It is noted that the initial 3D object building module 602 created such a model from silhouette contour polygon 691 (which was processed from a silhouette mask image captured by the camera 2 when the rotating turntable 6 was at position X (692)). The 3D refining module 616 processes additional silhouette contour polygons, such as silhouette contour polygon 694. As depicted in FIG. 27, the system of the present invention created this second silhouette contour polygon 694 from a silhouette mask image captured by the camera 2 (when the rotating turntable 6 was at position Y (696)).

To refine the initial, (rough) 3D model depicted at 690 based on the second silhouette contour polygon 694, the system and method of the present invention uses a procedure (described in further detail below) that in effect projects the initial (rough) 3D model depicted at 690 through a conical projection of the second silhouette 694. The system then adjusts the initial, (rough) 3D model depicted at 690, clipping from the model those areas that do not intersect the volume formed by the second projection.

FIG. 27 depicts a conical projection 698 created from silhouette contour polygon 694, which has been projected through the initial, (rough) 3D model depicted at 690. The system and method of the present invention refines the initial 3D model based on the intersection of the model and the projection of the new silhouette contour polygon. For example, in FIG. 27, the system of the present invention clips volumes 700 and 702 from the initial, (rough) 3D model depicted at 690. As will be described in further detail below the system of the present invention revises the coordinates of each face of the initial, (rough) 3D model, deleting old points and adding new points to each face (and also adding new faces to plug "holes" as needed as the procedure trims volumes from the initial, (rough) 3D model).

For example, in FIG. 27, all the longitudinal faces of the initial, (rough) 3D model depicted at 690 have been clipped so that they will describe only the volumes within the area 703 (and the system removes from the model the points which define the volumes within regions 700 and 702). The 3D model refining module 616 of the present invention processes each of the remaining silhouette contour polygons to remove the excess volume from the (rough) 3D model 606 and produce a refined polygonal model (e.g. see 615 in FIG. 23).

In performing the refining process, the system and method of the present invention does not perform the calculations in 3D. Instead, the present invention uses two-dimensional projections of the faces of the 3D object to determine the points of intersection between the (rough) 3D model 606 and a given silhouette contour polygon.

It is an aspect of the present invention that the refining procedure takes place on a 2D projection plane, where the calculations to determine boundary intersections and overlaps can occur with great speed. The present invention projects each face of the (rough) 3D model 606 onto the projection plane that contains the silhouette contour polygons for a given silhouette image. Points of intersection between the projected face of the (rough) 3D model 606 and the current silhouette contour polygons in the 2D projection plane indicate the face overlaps and areas which lie outside the boundaries of the silhouette contour polygons (and therefore need to be trimmed).

Figure 28:
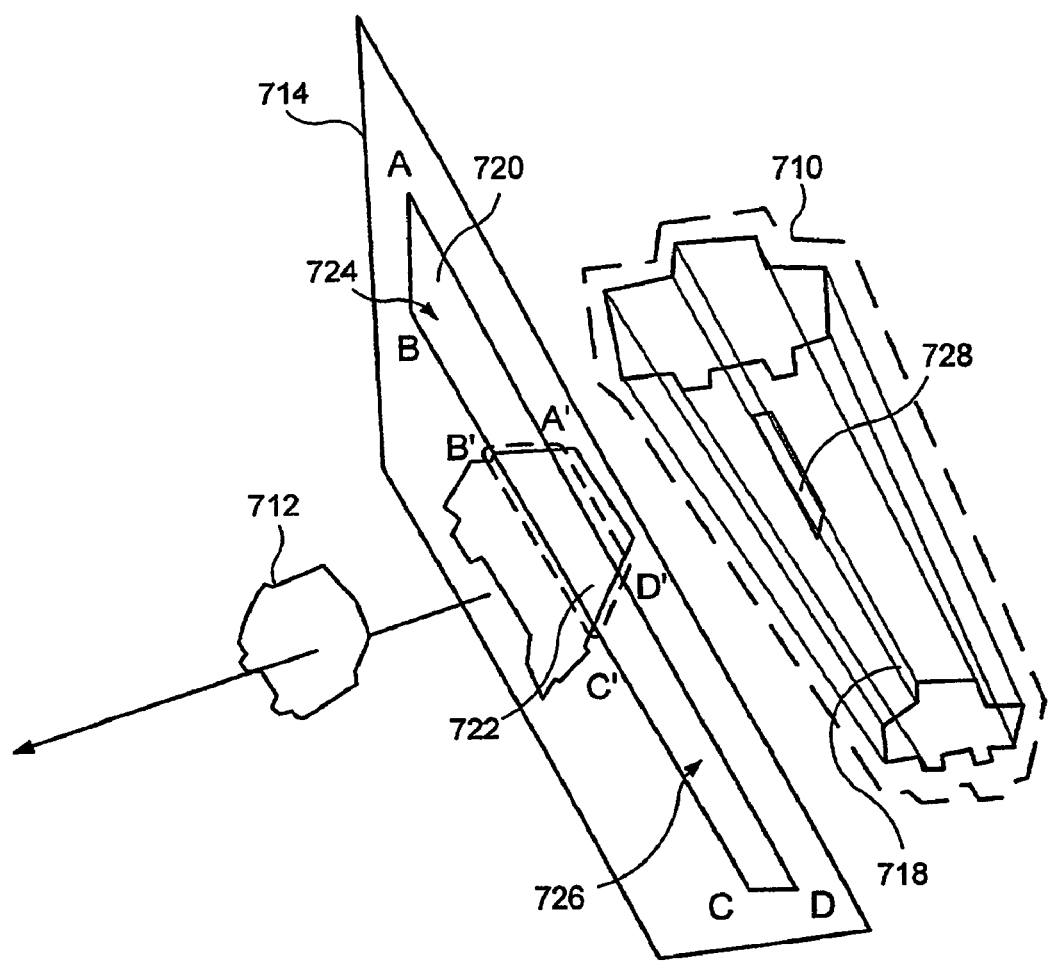
FIG. 28 provides a graphic representation of a 2D projection used in the refining process of the present invention.

FIG. 28 provides a graphic representation of a 2D projection used in the refining process. In FIG. 28 an initial, (rough) 3D model is depicted at 710 and a silhouette contour polygon, which will be used for the refining process, is depicted at 712. In the exemplary embodiment, the system of the present invention selects this silhouette contour polygon 712 and marks each of its points into an array for computation. The bitmap coordinates of the silhouette contour polygon map to the plane of the silhouette mask image which yielded the silhouette contour polygon 712. In this coordinate system, the plane, in effect, replicates the plane of the CCD chip within the camera 2 at the location where the silhouette mask image was originally captured.

The 3D refining module 616 then projects each face of the (rough) 3D model 606 onto the plane of the silhouette contour polygons 712 (the CCD chip plane) and clips each face using the coordinates of the silhouette contour polygons contained in that image. To project each face, the 3D refining module 616 uses the translation matrices to translate each coordinate of the given face into the local coordinate system of the silhouette contour polygons. It is noted that before clipping with the silhouette contour polygons, the system transforms all coordinates of the (rough) 3D model 606 to the coordinate system of the camera at the angle of rotation at which the silhouette was taken.

Next, (in a procedure described in further detail below) the 3D refining module 616 projects each edge of the face onto the CCD chip plane and then clips and refines the edges, deleting old points and adding new points as needed to alter the face. To clip and refine, the system and method of the present invention intersects the edges of each silhouette contour polygon contained in the current image with the projected face from the (rough) 3D model 606, calculating the intersection points that exist between the silhouette contour polygons and the face. For example in FIG. 28, face 720, as projected, has points A, B, C and D. Silhouette contour polygon 712 intersects the projected face 720 and the area of overlap is bounded by the shape 722, having points A', B', C' and D'. Since intersections have occurred, the 3D refining module 616 will remove face 720 and create a new face to reflect this overlap. The 3D refining module 616 removes areas 724 and 726 by changing the vertices in this new face.

The system generates new three-dimensional coordinates to create a revised face projection 728. The 3D refining module 616 uses the intersection points calculated from the CCD plane projection (and the current local coordinates of the face) to compute values for A', B', C' and D'. Face 718 is thus revised after this procedure and is replaced with the smaller face 728. As the system processes each of the faces, it will refine the entire 3D model (and where the system has created "holes" in the model it will fill them through a procedure as described below).

4. Refining Module Procedure

Figure 29A:
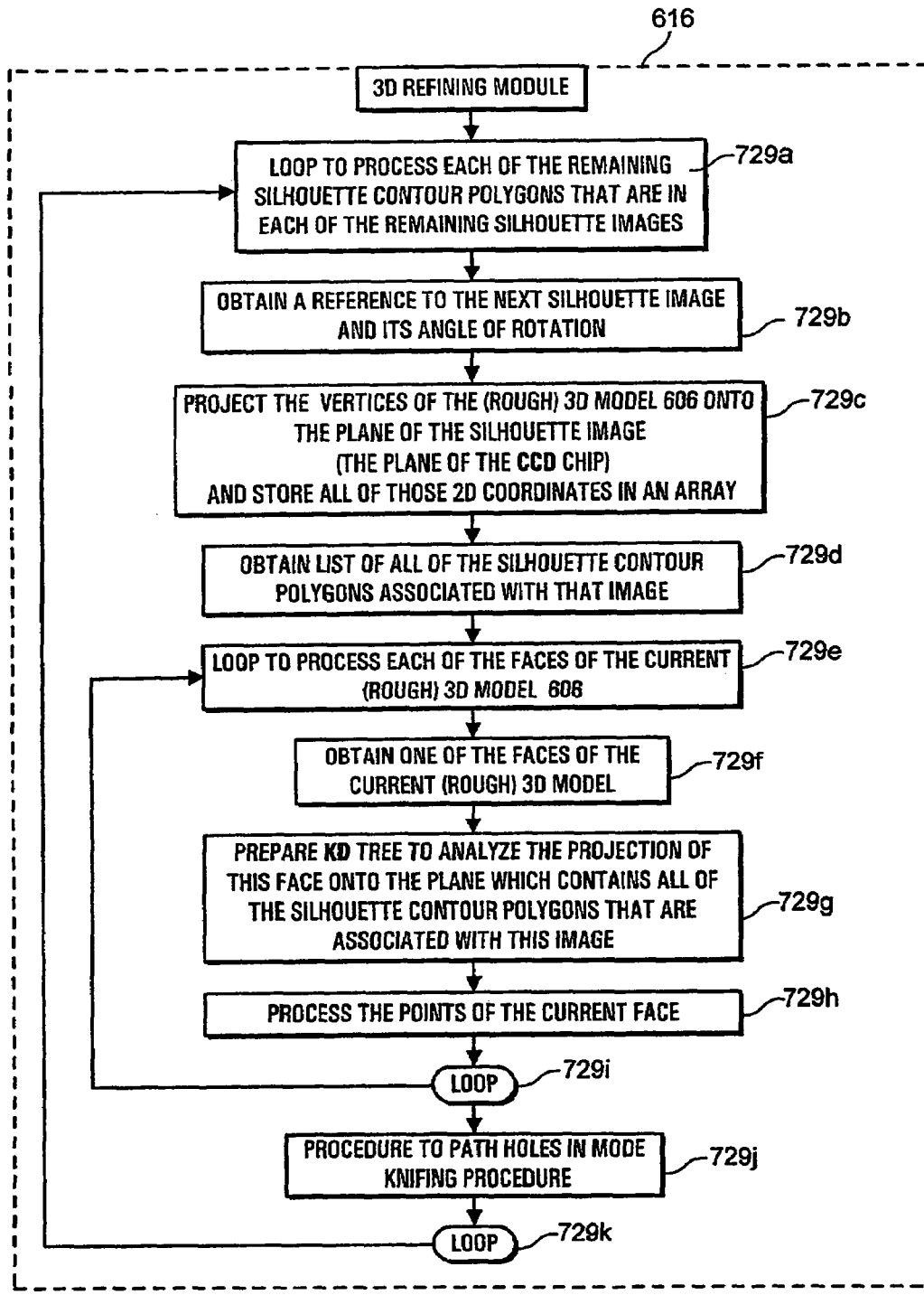
FIG. 29a depicts an exemplary process flow for the 3D refining module of the present invention.

FIG. 29a depicts an exemplary process flow for the 3D refining module 616. In step 729a the 3D refining module 616 begins a loop to process the silhouette contour polygons that are associated with each silhouette image. In step 729b, the 3D refining module 616 obtains the data for the silhouette contour polygons associated with next silhouette image and obtains the angle of rotation for that silhouette image. In step 729c, the 3D refining module projects all of the vertices of the (rough) 3D model 606 onto the plane of the silhouette image (i.e. the plane of the camera's CCD chip at the angle of rotation for the silhouette image). The system stores the newly generated 2D coordinates on a point list which parallels (by its indices) the list of vertices 612 of the (rough) 3D model 606. The step of projecting the coordinates in step 729c effectively maps the (rough) 3D model 606 onto the same plane as the points of the silhouette contour polygons for this silhouette image. In step 729d, the 3D refining module 616 obtains the list of silhouette contour polygons associated with the current silhouette mask image and they will be used to refine the faces of the (rough) 3D module 606 as is described below.

Step 729e begins a loop to process each of the faces of the (rough) 3D model 606 and refine those faces according to the silhouette contour polygons associated with the current silhouette image. The process seeks to intersect each face of the model with all of the silhouette contour polygons associated with the image and then trim the face accordingly. In step 729f, the 3D refining module 616 obtains the point list to one of the model faces (from the list of polygons 610). The 3D refining module 616 in step 729g next submits the selected point list to a function that analyzes the points of the current face and silhouette contour polygons and creates a KD tree to provide information concerning the intersections between those shapes. A KD tree algorithm partitions the perimeters of the submitted face, subdividing its edges into separate tree partitions. For any segment of the model face, the KD tree will provide information concerning those silhouette contour polygons which may intersect the face segment. The system of the present invention uses the tree to quickly check if a given edge of the face being analyzed intersects any silhouette contour polygon of the current image. For example, when an edge of one of the silhouette contour polygons intersects an edge of a model face, the KD tree provides an intersection object containing information such as the following:

Information for the Edge of the Face:
Face Edge Index Number An index number for the particular edge segment of the face (where the vertices are ordered point 0, point 1, point 2 etc. each edge will have a corresponding index number—e.g. edge 0 formed by point 0 and point 1);
Face Edge Alpha Number A number to indicate the where on the face edge the intersection occurs. For example when the intersection occurs ¾ of the way from the first point of the segment the face edge alpha number will be 0.75;

Information for the Intersected Silhouette Contour:
Polygon Number An index to identify the particular silhouette contour polygon that has been intersected;
Edge Number An index number for the particular edge segment of the silhouette contour polygon that has been intersected; and
Polygon Alpha Number A number to indicate the where on the silhouette contour polygon edge the intersection occurs.

As an additional part of the KD tree construction process, the 3D refining module 616 also maintains data on each of the vertices of the model face which is being analyzed. The system maintains a list which indicates whether a point of the model face lies "INSIDE", "OUTSIDE" or "ON" a silhouette polygon contour. For each vertex that lies "INSIDE" or "ON", the system also stores an indication of the particular silhouette contour polygon that is intersected.

KD trees have had previous use in other computer applications. For more information concerning KD tree construction and manipulation algorithms, the reader is referred to the following publication which is expressly incorporated by reference herein: *Computational Geometry: An Introduction* (*Texts and Monographs in Computer Science*), Franco P. Preparata, Michael Ian Shamos, R. Shamos Preparata, (Jan. 1991) Springer Verlag, ISBN: 0387961313.

With the KD tree constructed, the 3D refining module 616, in step 729*h*, examines the current face of the (rough) 3D model 606 and determines whether the given face must be altered relative to the silhouette contour polygons it intersects. The process examines each edge of the current face using the KD tree to locate any intersections the edge may have with the edges of the silhouette contour polygons being examined. When examining an edge of a face from the (rough) 3D model 606, the process of step 729*h* employs a continuous loop parameterization: any point P from edge segment [Pi, Pi+1] can be represented by the equation P=Pi+a (Pi+1−Pi) or parameterized with the number t=i+a (where 0<=a<1). Thus, when the system processes a face edge in step 729*h*, it accesses the KD tree to locate any intersections the edge may have with any of the silhouette contour polygons in the image. Thereafter, the system in step 729*h* uses a process (such as the parameterization loop described above) to sort the intersections (if more than one intersection is located for the edge). After the intersections have been sorted, the system uses the information contained in the intersection objects (associated with each intersection) to trim the face.

The process of the trimming procedure of step 729*h* is described in further detail below with reference to FIGS. 29*b* and 29*c*.

Referring to FIG. 29*a*, after the 3D refining module 616 has processed the current face it loops in step 729*i*, returning to step 729*e* and repeating steps 729*e*-729*i* until all of the current faces of the (rough) 3D model 606 have been processed. When the trimming procedure of step 729*h* is complete, the 3D refining module 616 executes a procedure to patch any holes in the (rough) 3D model 606, which may have been created by the trimming process. As noted above, the trimming of the model faces causes the removal of areas from the (rough) 3D model 606. Where an face lies entirely outside of the bounds of the silhouette contour polygons for a given silhouette image, that face will be removed from the model and the trimming that caused its removal will cause a "hole" which the system needs to patch. It can be observed that as the system trims the faces of the (rough) 3D model 606 using the set of silhouette contour polygons in an image, the edges of those silhouette contour polygons act as "knives" to shear away unwanted areas of the (rough) 3D model 606. In step 729*j*, the 3D refining module 616 executes a knifing procedure that creates new faces to patch holes which may be created by the trimming procedure. The knifing procedure is described in further detail below with reference to FIGS. 30*a*-*b*, 31*a*-*f* and 32.

Referring again to FIG. 29*a*, when the knifing procedure is complete, the 3D refining module 616 loops in step 729*k*, returning to step 729*a* to further refine the (rough) 3D module 606, using the silhouette contour polygons that are associated with another silhouette image. When all of the remaining silhouette contour polygons have been processed, the 3D refining module 616 will have completely transformed the (rough) 3D model 606 into the refined polygonal model 615.

5. The Trimming Procedure Overview

As noted above, the 3D refining module 616 in step 729*h* executes a procedure to trim the shape of each face of the (rough) 3D model 606, and redefine its contours based on the intersections that occur between the face and the silhouette polygon contours. FIG. 29*b* depicts an exemplary face 731*a* from the (rough) 3D model 606 and shows how it will be trimmed by silhouette contour polygons 731*b*, 731*c*, and 731*d*. At the outset it is noted that the model face (731*a*) and each of the silhouette contour polygons (731*b*-*d*) has a set of vertices which were ordered, clockwise or counterclockwise by the clusterization procedure (See FIG. 19*b* above and related description).

In FIG. 29*b*, the 3D refining module 616 begins the process from a point on the model face (e.g. point 731*e*) which lies outside the bounds of the silhouette contour polygons. From this position, the 3D refining module 616 begins a tour of the current edges and vertices of the model face to refine its boundaries. The 3D refining module 616 follows the ordering of the model face (e.g. face 731*a*) examining its vertices and edges until it reaches an edge which is intersected. (As noted above, the system of the present invention uses the KD tree to identify any intersections that may exist for a given edge of the face. If the system identifies more than one intersection for a given face, the system sorts the intersections using the parameterization process described above.) Upon reaching an intersected edge, the system locates the point of intersection, e.g. point 731*f*. (When the system locates more than one intersection for the edge, the system selects the first intersection point after sorting, the one that is closest to the first vertex of the edge.) This point (731*f*) will be the first vertex in the revised face for the (rough) 3D model.

To add this point to the (rough) 3D model 606, the 3D refining module 616 projects this point into the three-dimensional coordinate system of the (rough) 3D model 606 and creates a set of 3D X, Y, Z coordinates for this intersection point. It is noted that as many faces may intersect the same silhouette contour edge in exactly the same place, it is possible that the 3D coordinates for an intersection point once computed can be used by other faces when reconfiguring those faces. Thus, in some cases the 3D refining module 616 during the refining process of step 729*h* will use the coordinates for a previously computed point rather than computing new 3D X, Y, Z values for the intersection point.

In addition, when determining a set of 3D X, Y, Z coordinates for the new point, the 3D refining module 616 will also make an indication that an intersection has occurred on a "knifing list" which is maintained for each edge of each silhouette polygon contour being analyzed by the 3D refining module 616. This indication is used to construct the faces that patch holes in the (rough) 3D module 606. The knifing procedure of step 729*j* is described in further detail below.

With the intersection point located, the 3D refining module 616 adds the point on a revised list of vertices for the face and then proceeds to follow the vertices for the face adding those points to the revised face list, until it reaches another point of intersection, such as point 731*g*.

The intersection at point 731*g* indicates that the vertices and edges of the original face (731*a*) which follow point 731*g* will now lie outside of the area of the silhouette contours polygons and must now be trimmed. To trim, the 3D refining module 616 makes a turn in its tour and now follows the edges and vertices of the intersected contour polygon (polygon 731*c*) until it reaches the next intersection point (point 731*h*). For each of the vertices of silhouette contour polygon 773*c* which lies between point 731*g* and 731*h*, the 3D refining module 616 determines 3D X, Y, Z coordinates for those points and adds references to the new points onto the list of vertices for the revised face. The 3D refining module 616 also adds an indication of the new points onto the "knifing list" for the relevant edges of the silhouette contour polygon that is currently being traced.

Upon reaching the next intersection point (731*h*), the 3D refining module 616 makes another turn in its tour of vertices and returns to the vertices of the current model face (face 713*a*). The 3D refining module 616 adds the points of current face onto the revised point list for the face until it reaches the next intersection point 731*i*. From this intersection point, the 3D refining module 616 (following the procedure described above) tours the vertices of the intersected silhouette contour polygon (polygon 731*d*) until it reaches the next intersection point (point 731*j*). At this juncture, the 3D refining module 616 returns to the vertices of the current face, adding those vertices to the revised point list until it reaches intersection point 731*k*.

Following the procedure described above, the 3D refining module 616 next turns to tour the vertices and edges of the intersected silhouette contour polygon. Following the procedure described above, the 3D refining module 616 tours silhouette contour polygon 731*b*, adding the newly generated vertices onto the revised list of vertices for the face (and making knifing list indications) until it reaches intersection point 731*f*. Upon reaching point 731*f*, the 3D refining module has completed its tour. Face 731*a* now has a new vertex list which bounds the area indicted by 731*l*.

6. Trimming Procedure Process

FIGS. 29*c*-29*f* provide exemplary process flows for the face trimming procedure of step 729*h* of the 3D refining module 616. As noted above, the trimming procedure redefines the shape of each face of the (rough) 3D model 606 based on the intersections that occur between the face and the silhouette polygon contours currently being analyzed. In FIG. 29*c* the trimming procedure begins visiting each point of the model face. In step 733*a* the 3D refining module 616 locates a starting point on the model face to begin a tour of the face's vertices. In the exemplary embodiment and as noted above, the system begins the tour from a point that lies outside the boundaries of the silhouette contour polygons in the image. (See, e.g. point 731*e* in FIG. 29*b*). As noted above, the 3D refining module (in step 729*g*) sets a flag for each point of the face indicating whether the point was "INSIDE", "OUTSIDE" or "ON" the bounds of any silhouette contour polygon in the current image. If no point of the face is found to lie "OUTSIDE" of the silhouette contour polygons, then processing terminates as the face lies entirely within the bounds of the current silhouette contour polygons and thus does not require any trimming.

If in step 733*a* the 3D refining module 616 locates a face point that is "OUTSIDE" the bounds of the silhouette contour polygons, it proceeds in step 733*b* to mark this point as "visited" (e.g on a "visited" list 733*c*). Next, in step 733*d*, the 3D refining module 616 begins a loop to visit all of the points of the face, starting from the first found "OUTSIDE" point. This loop continues until all of the points of the face have been visited.

In step 733*e*, the 3D refining module obtains the next point in the list of vertices for the face (following the ordering of points established for the face by the clusterization module). If, in step 733*f*, the next point of the face is again "OUTSIDE" the bounds of a silhouette contour polygon, the 3D refining module 616, will move to this next point and continue its tour of the face's vertices. In step 733*g*, the 3D refining module 616 marks the new point as being "visited" (making the indication on the "visited list" 733*c*) and then continues the tour of the face's vertices (looping in step 733*k* and returning to step 733*d*).

If, in step 733*f*, the next point lies "INSIDE" or "ON" a silhouette contour (and it has not been already "visited"), then the 3D refining module 616 has identified the beginning point of the revised face which must be toured to collect the new vertices. (Such a beginning point can be seen at 731*f* in FIG. 29*b*.) In step 733*h*, the 3D refining module 616 allocates a new face object to hold the revised list of vertices and, in addition, executes a process to trace and collect the vertices of this revised face. (An exemplary process flow for the tracing procedure of step 733*h* is described below with reference to FIGS. 29*d*-*f*).

After the tracing procedure, the 3D refining module 616, in step 733*j* add the face object containing the new list of points for the revised face onto to the list of polygons 610 of the (rough) 3D model 606. Thereafter, the 3D refining module 616 executes a procedure to locate the next point from the face which lies "OUTSIDE" of the bounds of the silhouette polygon contours and has not yet been "visited". If there are additional points on the face that lie outside of the bounds of the silhouette contour polygons, then there may be additional faces to be created by the trimming process. (It is noted that when a face is refined, the boundaries of the silhouette contour polygons may split the face into a number of smaller faces). In step 733*j*, the 3D refining module 616 prepares for this contingency and searches for any remaining, unvisited "OUTSIDE" points. If such points remain, the 3D refining module 616 loops in step 733*k* and returns in step 733*d* to process those points as described above. If no such points are found in step 733*j*, then processing terminates and the face has been completely revised. At this juncture the 3D refining process 616 will have created one or more new faces that revise the current face. Thus upon completion of this process the original face (which has just been analyzed) can be deleted from the (rough) 3D model 606).

Figure 29D:
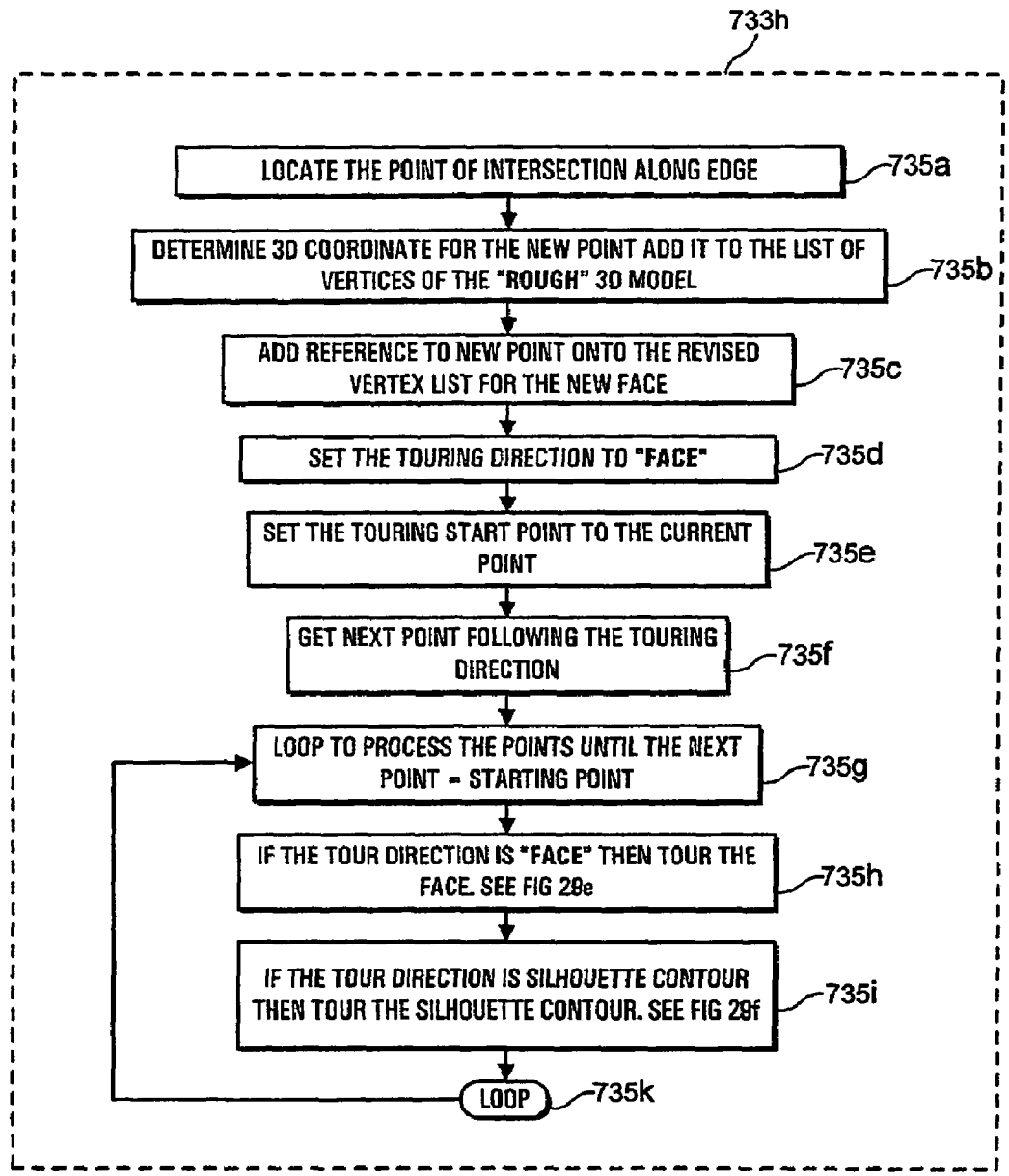
Figure 29E:
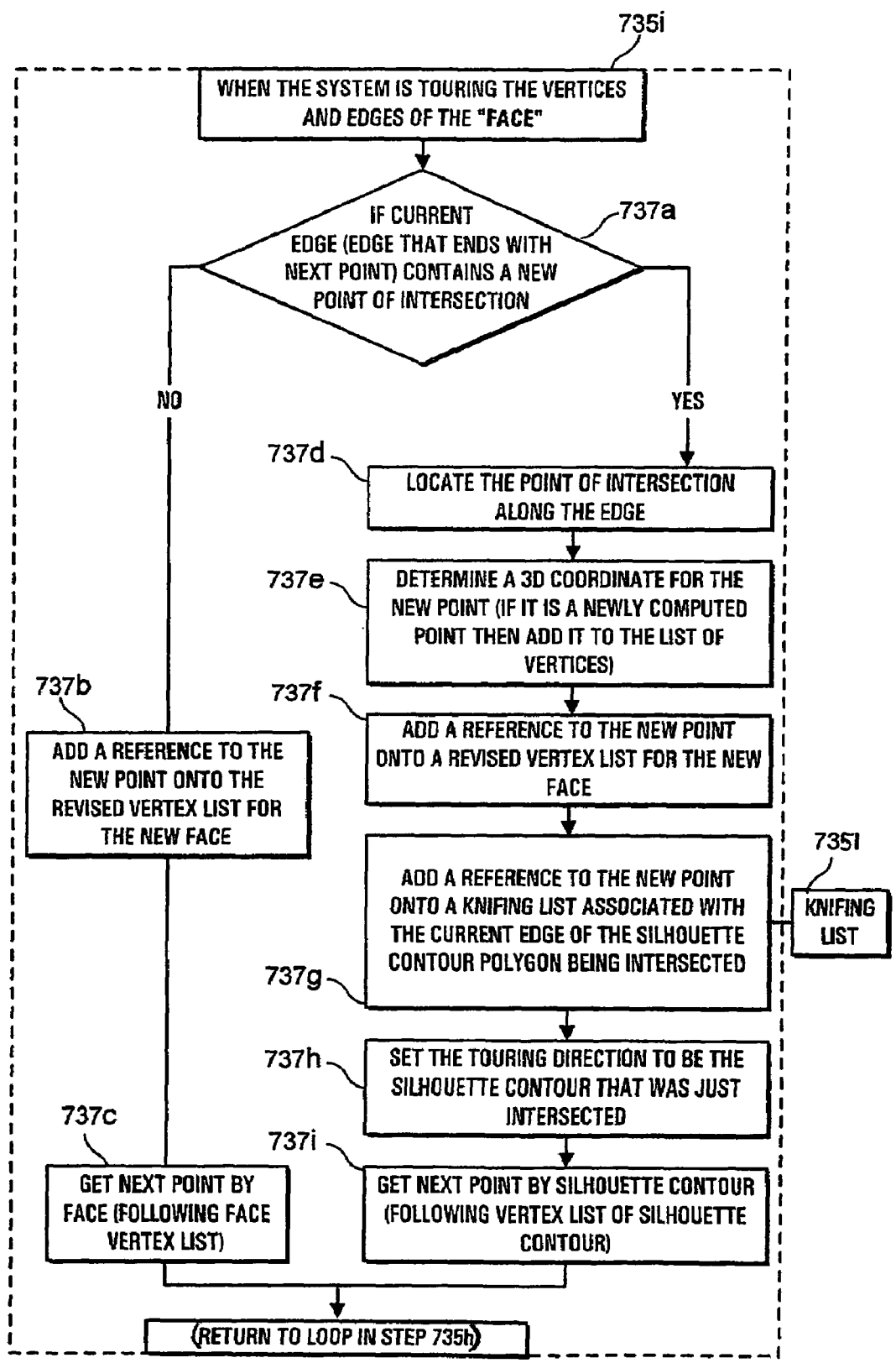

As noted above, the 3D refining module 616 in step 733*h* executes a procedure to create a new, revised face by touring the points of the current face and the points of intersection and overlap that occur between the current face and the silhouette contour polygons in the current image. FIGS. 29*d-f* provide exemplary process flows for such a tracing procedure. The process begins in FIG. 29*d*. Once a segment of the face is found to move from "OUTSIDE" to "INSIDE", the 3D refining module 616 in step 735 locates the point of intersection along the edge of the face. As noted above the KD tree created in step 729*g* provides a data object identifying the point of intersection and containing information about the silhouette contour polygon which intersected the face. In step 735*a*, the 3D refining module 616 obtains the index+alpha number for the segment (the Face Edge Index Number and Face Edge Alpha Number contained in the intersection object as mentioned above) and thereby determines the point of intersection.

In step 735*b*, the 3D refining module 616 uses the index+alpha number (described above) concerning the point of intersection to compute 3D X, Y, Z coordinate values for this new intersection point. When computing the 3D coordinates, the 3D refining module 616 accesses the 3D coordinates for the beginning and end points of the intersected face segment and from those point values computes the coordinates for the new point. It is noted that as potentially many model faces may be trimmed by the same silhouette contour polygon, it may be true that adjacent faces of the model will intersect the same silhouette contour polygon in the same location. Thus, some of the intersection points during the trimming process can share the same vertex.

To enable this re-use of vertex point positions, the 3D refining module 616 in step 735*b* (after computing the new 3D X, Y, Z coordinates but before assigning those new coordinates to the new point) will check all of the 3D coordinates that have been previously generated and placed on the "knifing list" for the edge of the silhouette contour polygon that was intersected. If coordinates of the new point fall within a predetermined tolerance of any of the previously generated points, then the 3D refining module 616 will use the X, Y, Z coordinates of that previously-generated point as the coordinates for the new point of intersection. If the coordinates calculated in step 735*b* do not match any point previously generated, the 3D refining module 616 will also add the coordinates of this new point onto the list of vertices 612 of the (rough) 3D model 606.

With the 3D X, Y, Z, coordinates for the intersection point determined, the 3D refining module 616 in step 735*c* adds a reference to this new 3D coordinate onto the list of vertices for the revised face. This is the first vertex of the revised face. After completing step 735*c*, the 3D refining module 616 next commences a tour of the vertices of the revised face. In step 735*e*, the 3D refining module 616 sets a touring direction variable to "FACE" (to begin touring the vertices of the current face that lie "INSIDE" the bounds of silhouette contour polygon that has been intersected. In step 735*f*, the 3D refining module 616 sets a starting point variable to the point of intersection. In step 735*g*, the 3D refining module 616 gets the next point of the face ("get next point by FACE") and begins a tour to identify the vertices of the revised face.

Step 735*h* commences a processing loop that will continue until the next point returns to the starting point. Where the touring direction is set to follow the points of the FACE, the 3D refining module 616 in step 735*i* follows the face vertices until it reaches an intersection point. Upon reaching an intersection point, the 3D refining module will change its touring direction and follow the points of the intersected silhouette contour polygon. (e.g. as in step 735*j*) until it reaches another intersection point. (When following the points of an intersected silhouette contour, the system also stores information concerning these points on a "knifing list" 735*l*, which is used to create the faces that patch "holes" in the model as is described below.) The process loops in step 735*k* moving from the points of the face to the points of the silhouette contour polygons, until the 3D refining module 616 completes the tour and returns to the starting point.

FIGS. 29*e* and 29*f* depict exemplary process flows for tracing the points of the face and silhouette contours during the tracing procedure described above: FIG. 29*e* depicts an exemplary process flow for tracing the points of the face. In step 737*a*, the 3D refining module 616 examines the current edge of the face to determine if there is a new point of intersection along the current edge. To make this determination, the 3D refining module 616 submits these edge coordinates to a function that accesses the KD tree and thereby determines whether the edge in question intersects any of the edges of the current silhouette contour polygon partitioned in the KD tree. The function called in step 737*a* submits back a response after searching the KD tree, indicating either the absence of an intersection (in which case the routine returns "null") or the existence of intersections (in which case the routine returns a data object set containing information about the intersection(s), such as one or more intersection object(s) described above).

If no intersection point is found, the 3D refining module 616 simply continues the tour of the face's vertices. In step 737*b*, the 3D refining module 616 adds to the list of vertices for the revised face a reference to the 3D coordinate for the current point. In step 737*c* the 3D refining module then obtains the next point from the list of points for the face (get next by FACE). Thereafter, the 3D refining module 616 returns to the loop of step 735*h* (See FIG. 29*d*) and the process continues checking the edges of the face for intersections.

If in step 737*a* of FIG. 29*e* the 3D refining module 616 locates a point of intersection, it will prepare to follow the points of the intersected silhouette contour polygon. In step 737*d* the 3D refining module 616 locates the point of intersection along the edge of the face (which is provided by the intersection data maintained by the KD tree). In step 737*e*, the 3D refining module 616 computes 3D X, Y, Z coordinate values for this new intersection point (or alternatively uses a previously computed 3D point from the "knifing list" as described above). In step 737*f*, the 3D refining module 616 adds a reference to this new 3D coordinate onto the list of vertices for the revised face.

In step 737*g*, the 3D refining module 616 also adds a reference to this new point to the "knifing list" (735*l*) that is associated with the segment of the silhouette contour polygon that has been intersected. In the exemplary embodiment and as mentioned above, the system stores "point pairs" concerning the points of intersection on the knifing list 735*l*. For each edge of each silhouette contour polygon, the system maintains a list of point pairs showing the beginning and ending points of the that portion of the silhouette contour polygon edge which intersects the face being trimmed.

When a given segment of a silhouette contour polygon intersects a given face, the knifing list collects the beginning and ending points of that part of the edge of the silhouette contour polygon that lies inside the bounds of the current face. When the first intersection point is located in step 735, the system of the present invention places a reference to that point onto a knifing list point pair data object—in the position for the first point of the point pair. (When the system encounters another point of intersection along the silhouette contour polygon, or it reaches the end point of the edge of the silhouette contour polygon, the system places a reference to the end point in the second position of the point pair data object.) As will be described below, the knifing procedure of step 729k uses the list of point pairs associated with the segments of the silhouette contour polygons to construct faces which patch "holes" in the rough 3D model 616 that are create by the trimming process.

In step 737h, the 3D refining module 616 readies itself for touring the vertices of the silhouette contour polygon that has been intersected. In step 737h, the 3D refining module 616 sets the touring direction variable to indicate the silhouette contour polygon that has been intersected. In step 737i, the 3D refining module 616 gets the next point that lies along the silhouette contour that has been intersected ("get next point by SILHOUETTE CONTOUR POLYGON"). Thereafter, the process of trimming the face continues by following the vertices of the intersected silhouette contour polygon.

FIG. 29f depicts the process of following the points of the silhouette polygon contour during the tracing procedure. In step 739a, the 3D refining module 616 examines the current edge of the silhouette contour polygon being toured to determine if there is a new point of intersection along the edge. (The 3D refining module 616 again searches the KD tree constructed above to determine if an intersection point exists for the current edge). If no intersection point is found, the 3D refining module 616 adds the new point onto the list of vertices for the revised face and continues moving through the points of the silhouette contour polygon. In step 739b, the 3D refining module 616 determines the 3D coordinates for the new point (or locates a previously calculated 3D coordinate that matches the coordinates of the current point). In step 739c, the 3D refining module 616 adds to the list of vertices for the revised face a reference to the 3D coordinate for this point of the silhouette contour polygon. In step 739d, the 3D refining module 616 also adds a reference to this new point to the "knifing list" (735l) that is associated with the segment of the silhouette contour polygon that is being currently analyzed (e.g. putting a reference in the second slot for the point pair). In step 739e, the 3D refining module then obtains the next point from the list of points for the silhouette contour polygon (get next by POLYGON) and then proceeds to examine that edge of the silhouette contour polygon. Thereafter, the 3D refining module 616 returns to the loop of step 735h (See FIG. 29d) and the process continues checking the points of the silhouette contour polygon. For each edge of the silhouette contour polygons which the system visits during the tour (but which is not intersected) the system computes 3D coordinates for the beginning and end points of the edge of the silhouette contour polygon and then adds those beginning and end points of the edge as a new point pair on the knifing list. The process continues to follow the edges of the silhouette contour polygon until it reaches an edge which intersects the face.

If in step 739a of FIG. 29f, the 3D refining module 616 locates a point of intersection it will create a new 3D coordinate for the point of intersection and prepare to turn the touring procedure so that it will now follow the points of the just-intersected face. In step 739f the 3D refining module 616 locates the point of intersection along the edge of the intersected face (which is provided by the intersection data maintained by the KD tree). In step 739g, the 3D refining module 616 computes 3D X, Y, Z coordinate values for this new intersection point (or alternatively uses a previously computed 3D point as described above). In step 739h, the 3D refining module 616 adds a reference to this new 3D coordinate onto the list of vertices for the revised face. In step 739i, the 3D refining module 616 also adds a reference to this new vertex to the "knifing list" (735l) that is associated with the segment of the silhouette contour polygon that has been intersected.

In step 739j The 3D refining module 616 commences to tour the edges (and vertices) of the intersected face. In step 739j, the 3D refining module 616 sets the touring direction variable to indicate that "FACE" will now be toured. In step 737i, the 3D refining module 616 gets the next point that lies along the face ("get next point by FACE"). Thereafter, the process of trimming the face continues by following the vertices of the face. This process continues until the tour of the new face is complete.

7. The Knifing Procedure

As noted above, the 3D refining module 616 trims the faces of the (rough) 3D model 606 and this trimming procedure creates "holes" in the model. The edges of each of the silhouette contour polygons used to trim the faces act as "knives" slicing away from the mesh the areas outside the boundaries of those silhouette contour polygons. Referring again to FIG. 29a, the 3D refining module 616 executes the knifing procedure in step 729j to create the additional faces that patch the model when holes have been created by the trimming process.

Figure 30A:
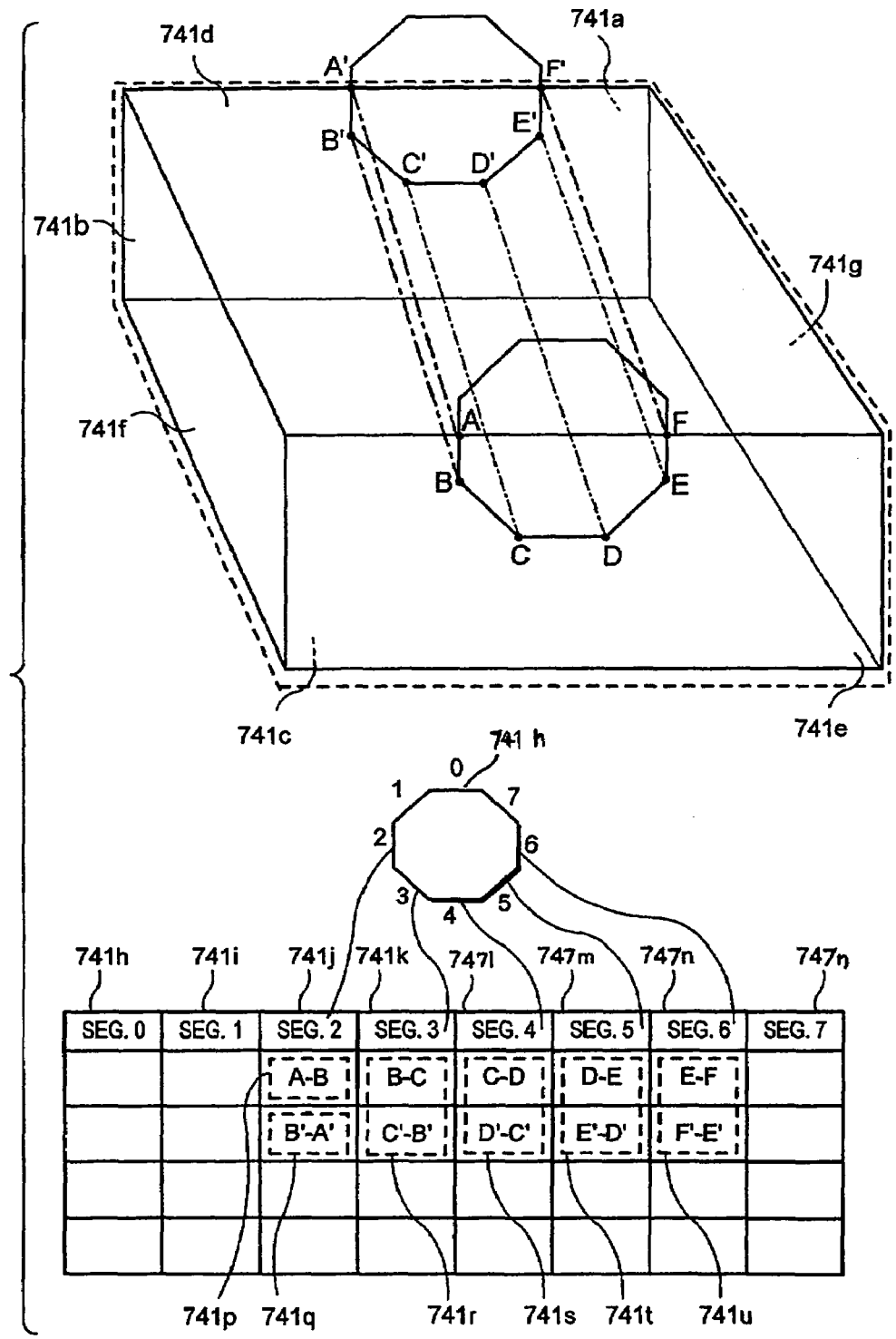
FIG. 30a provides a graphical representation of the knifing procedure of the present invention.

FIG. 30a provides a graphical representation of the knifing procedure of step 729j. In FIG. 30a an initial, (rough) 3D model 606 is depicted at 741a; it has cubic form that includes the following faces: 741b (back), 741c (front), 741d (top), 741e (bottom), 741f (left side) and 741 g (right side).

In this example, the system of the present invention trims the (rough) 3D model depicted at 741a using silhouette contour polygon 741h-a polygon having eight edges. During the trimming procedure (of step 729h) the 3D refining module 616 projects each of the model faces (741b-g) onto the plane of the silhouette polygon and trims to remove excess area. The system trims face 741e (the front face) so that it has vertices A, B, C, D, E, and F. The system also trims face 741d (the back face) so that it has vertices A', B', D', E' and F'. Face 741d (the top face) now has points A, F, F' and A'. In this example, the 3D refining module 616 during the trimming process removes face 741e (the bottom face), face 741f (the right side face) and face 741g (the left side face). The trimming of faces 741c-741d and the removal of faces 741e-g has created holes in the model. The 3D refining module 616 must now construct new faces A'-B'-B-A, B'-C'-C-B, C'-D'-D-C, D'-E'-E-D, E'-F'-F-E to make the (rough) 3D model 616 a solid volume again. The knifing procedure (in step 729j) creates those additional faces.

As noted above, the 3D refining module 616 collects the points needed to create the new faces on the "knifing lists" it maintains for each of the edges of the silhouette contour polygons in the current image. When a given edge of a silhouette contour polygon intersects or lies within a projected face from the (rough) 3D model 616, the trimming process places on the knifing list a point-pair entry. A point-pair provides the beginning and ending points of the portion of the silhouette contour polygon segment that lies within the model face being trimmed. (See 735l and steps 735d, 737g, 739d and 739i in FIGS. 29d-f).

FIG. 30a depicts the set of "knifing lists" that the 3D refining module 616 created for silhouette contour polygon 741h as it was used to trim faces 741b-g. Silhouette contour polygon 741h has eight sides (edges 0-7) and the 3D refining module 616 maintains, accordingly, eight knifing lists (741h-

741*o*)—one for each edge of the silhouette contour polygon. As can be see in FIG. 30*a*, the knifing lists for segments 2-6 (see 741*j*, 741*k*, 741*l*, 741*m* and 741*n*) contain a set of point pairs showing the beginning and end points of the portions of the silhouette contour polygon edge that lie within the boundaries of the faces that the 3D refining module 616 processed. For example, edge 2 of silhouette contour polygon 741*h* intersects face 741*c* along a segment defined by points A and B and it also intersects face 741*d* along a segment defined by points A' and B'. Thus, the knifing list for segment 2 of polygon 741*h* contains two point pairs: A-B (pair 741*p*) and B'-A' (pair 741*q*). Likewise, the knifing lists for segments 3, 4, 5 and 6 of polygon 741*h* also contain point pairs describing the intersections that those edges had with the model faces: List 741*k* (for edge 3) contains two point pairs B-C and C'-B' (see 741*r*); List 741*l* (for edge 4) contains two point pairs C-D and D'-C' (see 741*s*); List 741*m* (for edge 5) contains two point pairs D-E and E'-D' (see 741*s*); List 741*n* (for edge 6) contains two point pairs E-F and F'-E' (see 741*t*). The knifing procedure of the 3D refining module 616 accesses the knifing list for each of the segments of a silhouette contour polygon and constructs new faces from the point pairs contained on each list—in this case building the faces A'-B'-B-A, B'-C'-C-B, C'-D'-D-C, D'-E'-E-D, E'-F'-F-E.

Figure 30B:
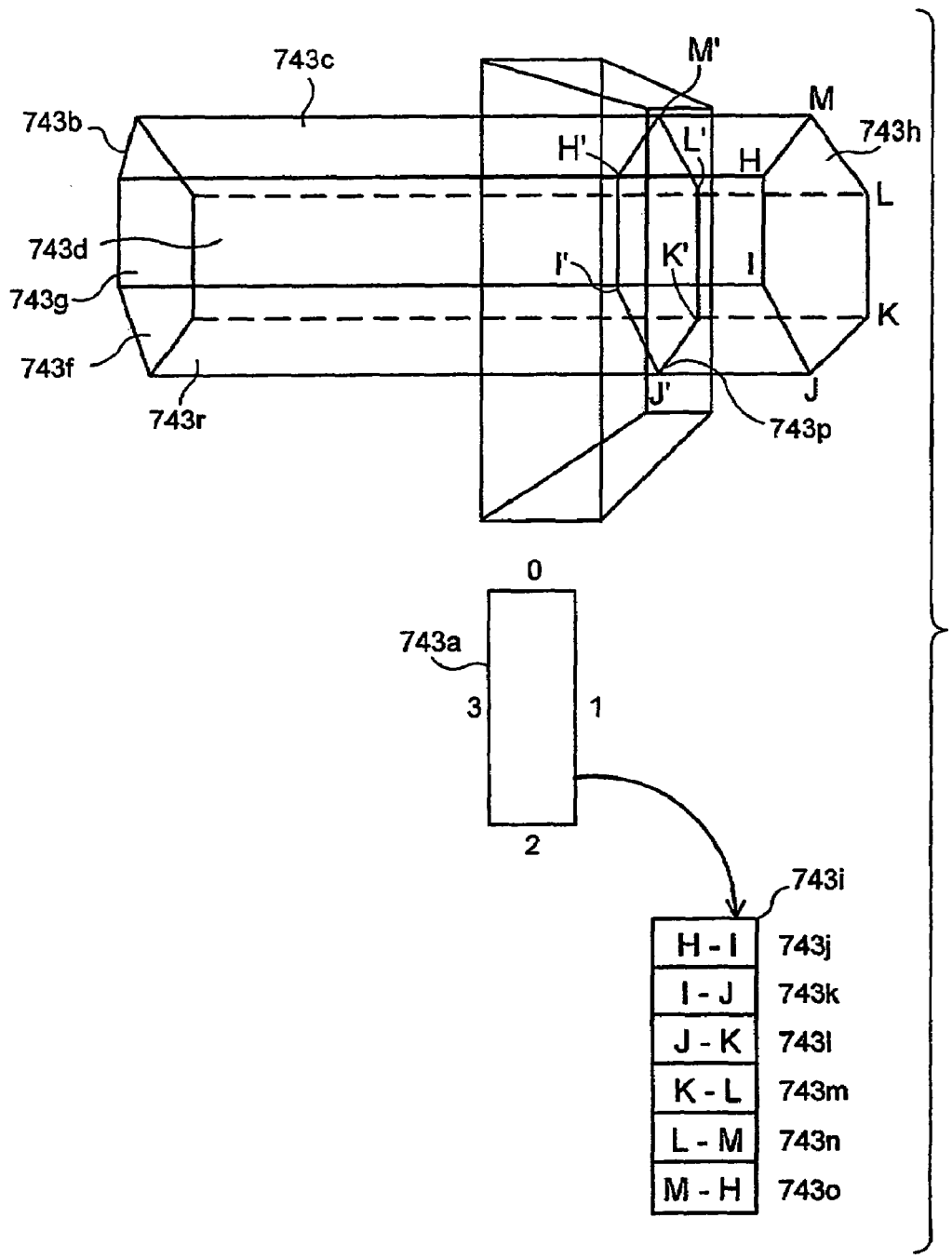
FIG. 30b depicts an example in which the 3D refining module of the present invention creates a face along a "knifing plane" which has more than four vertices.

With the knifing procedure of the present invention (step 729*j*), it is also possible that a given edge of a silhouette contour polygon might "knife" through the (rough) 3D model 606 and create a new face that has more than four vertices. FIG. 30*b* depicts an example in which the 3D refining module 616 creates a face along a "knifing plane" (the plane that would be formed by projecting a segment of the silhouette contour polygon through the model) which has more than four vertices. In FIG. 30*b*, the 3D refining module 616 uses silhouette contour polygon 743*a* to trim the (rough) 3D model 606. As depicted in FIG. 30*b*, the (rough) 3D model 606 has eight faces, including faces 743*b*-743*g* (each a face with 4 vertices) and face 743*h* which has 6 vertices—points H, I, J, K, L, M, and N. As the trimming procedure of the 3D refining module 616 projects each face of the model onto the plane of silhouette contour polygon 743*a*, it prepares knifing lists for each of the edges of the silhouette contour polygon. For example, for edge 1 of the polygon, the 3D refining module 616 creates knifing list 743*i*. When the 3D module 616 trims face 743*b*, it determines that edge 1 intersects face 743*b* along segment H'-I' and that point pair is added to the knifing list edge 1 (see 743*j*). When the 3D refining module 616 trims the other faces 743*c*-743*g*, it determines that edge 1 intersects those faces along the following segments: I'-J', J'-K', K'-L', L'-M', M'-H'. The system also places the point pairs for those segments on the knifing list for edge 1 (see 743*k*-743*o*).

From the entries on the knifing list 743*i*, the knifing procedure of 3D refining module 616 (step 729*j*) builds new faces to create a solid 3D model. It can be seen that in the list of point pairs there are some overlaps. For example between point pair 743*j* (H'-I') and point pair 743*k* (I'-J') there is an overlap concerning point I'. Point I' occurs as the second point in pair 743*j* and then as the first point in pair (743*k*). When constructing a new face from a knifing list, the 3D refining module 616 in the knifing procedure of step 729*j* can recognize such overlaps and create a new face (e.g. face 743*p*) having no redundancies (i.e. face 743*p* will have only the following vertices H', I', J', K', L' and M').

Figure 31:
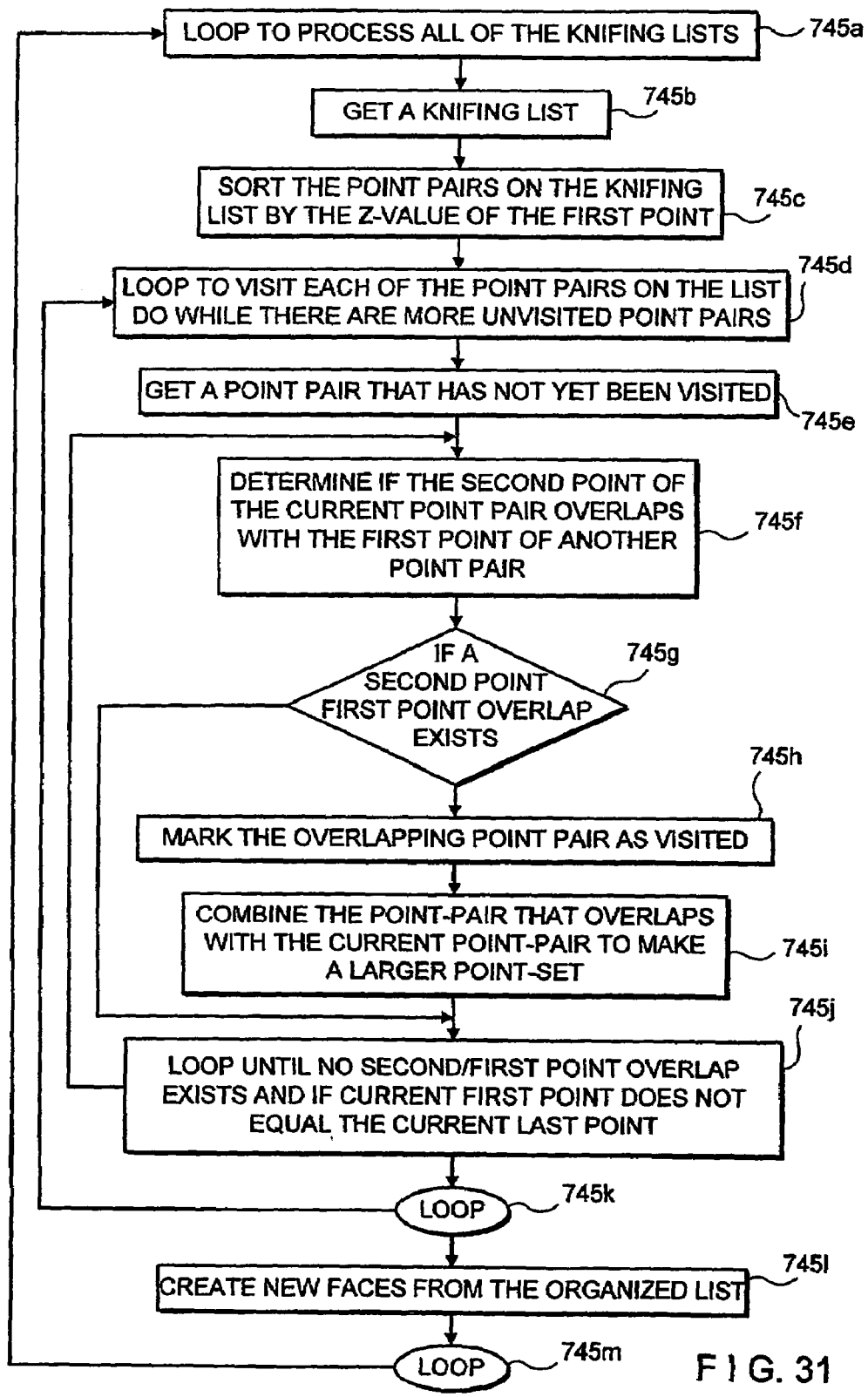
FIG. 31 depicts an exemplary process flow for the knifing procedure of the present invention.

The knifing procedure of the 3D refining module 616 (step 729*j*) processes each of the knifing lists created during the trimming procedure and creates one or more faces for the (rough) 3D model 606 from the points on each list. FIG. 31 depicts an exemplary process flow for the knifing procedure of step 729*j*. FIGS. 32-36 depict an exemplary knifing list and the changes that occur to it as the knifing procedure operates.

FIG. 32*a* depicts a knifing plane (plane 747*x*) and shows a set of edge segments: edge 1 (with vertices A-B) 747*a*, edge 2 (with vertices B-C) 747*b*, edge 3 (with vertices C-D) 747*c*, edge 4 (with vertices D-E) 747*d*, edge 5 (with vertices E-F) 747*e*, edge 6 (with vertices G-H) 747*g*, edge 7 (with vertices H-I) 747*h*, edge 8 (with vertices I-J) 747*i*, edge 9 (with vertices J-K) 747*j*, edge 10 (with vertices L-M) 747*l*, edge 11 (with vertices N-O) 747*n*. The edges were formed by the intersections of the faces of the (rough) 3D model 606 and one of the edges of a silhouette contour polygon. During the refining procedure described above, the system places onto a knifing list a set of "point-pairs" marking the beginning and ending points of each line segment formed by intersecting the edge of a silhouette contour polygon with the faces of the (rough) 3D model 606 (see FIGS. 29*d*-*e* steps 735*d*, 737*g*, -739*d* and 739*i*). In this example, the intersections will create two new faces along the knifing plane: A-B-C-D-E-F-G-H-I-J-K (Face 1) and L-M-N-O (Face 2).

Notice that to create those faces the knifing procedure must organize the vertices from the appropriate segments and distinguish between the vertices of one face and the vertices of the other. In FIG. 32*a* segment A-B-C-D-E-F must be joined with segment G-H-I-J-K to form Face 1 and segment L-M must be joined with segment N-O to form Face 2.

Referring to the exemplary process flow of FIG. 31, the knifing procedure in step 745*a* begins a loop to process each of the knifing lists and organize the point pairs in each list and form new faces. In step 745*b*, the knifing procedure obtains a new knifing list (for one of the edges of a silhouette contour polygon).

FIG. 32*b* depicts an exemplary knifing list for the edge of the silhouette contour polygon which yielded the edges 1-11 depicted in FIG. 32*a*. The point pairs 747*a*-747*n* correspond to each of the edges depicted in the previous figure. Each vertex slot in each point pair contains a reference to the 3D X, Y, Z coordinate for that vertex. For example, point pair 747*a* (for edge 1) contains two points: A (whose X, Y, Z coordinates are 30, 80, 50) and B (whose X, Y, Z coordinates are 20, 65, 40). Notice that as the 3D refining process trims the faces of the model, it does not follow any particular ordering of the faces while processing. Accordingly, the point-pairs that are on the knifing list in FIG. 31*b* also have no particular order. Further processing is needed before the system can create additional faces which will patch holes along the knifing plane.

In step 745*c* of FIG. 31, the knifing procedure orders the point-pairs on the knifing list. This procedure orders the point pairs according to the Z coordinate of the first point of the point pair. Because the Z coordinate (in the local coordinate system for the silhouette contour image) provides the distance that a given point has from the camera 2 (as the origin in the local coordinate system is located at the camera), the ordering procedure of step 745*c* provides a method to organize the point pair segments according to the distance each first point has in relation to the camera 2. This ordering also provides a spatial organization for the points that will make up the new faces along the knifing plane. As can be seen in FIG. 32*a*, ordering by Z-value is one part of the process to distinguish the segments of the knifing list to ensure that, for example, segment A-B-C-D-E-F-G is paired with segment G-H-I-J-K. FIG. 33 shows the knifing list of FIG. 32*b* with its point-pair segments ordered by their Z values: Edge 3 (747*c*, with Z value 30), Edge 4 (747*d*, with Z value 32), Edge 2 (747*b*, with Z value 40), Edge 5 (747*e*, with Z value 43), Edge 1 (747*a*, with Z value 50) Edge 9 (747*j*, with Z value 75), Edge 6 (747g, with Z value 80), Edge 8 (747i, with Z value 90), Edge 7 (747h, with Z value 92), Edge 10 (747l, with Z value 100) and Edge 11 (747n, with Z value 115).

After the knifing procedure sorts the point-pairs, the procedure in steps 745d-745k next examines the point pairs to make additional groupings where point-pair overlaps occur. It can be observed that where one point-pair contains points A and B and a second pair contains points B and C, those two point pairs can be combined to form a new point-set: A-B-C. The combination at the point of overlap (the point B) eliminates the redundant listing of the point B within the knifing list and also organizes the two edges A-B and B-C into a new, more complex segment which can be used to construct a new face along the knifing plane. In step 745d of FIG. 31, the knifing procedure begins a loop to visit each of the point pairs on the knifing list. For this loop the knifing procedure maintains a boolean array to mark each point-pair examined as "visited". In step 745e, the knifing procedure obtains the next "unvisited" point-pair on the list (and marks it as "visited").

In step 745f, the knifing procedure determines whether a point-pair overlap can be found for the current point pair. To make the determination, the knifing procedure in step 745f accesses the second point value in the current point pair and attempts to locate the same point value in the first point slot in the other point pairs on the list. If in step 745g, the knifing procedure locates a match (which indicates that a point-pair overlap exists), the knifing procedure in step 745i marks the newly-located point-pair as "visited" and then in step 745i combines the point values in that newly-located point-pair with the values of the current point-pair to form a new point-pair which "joins" the two point-pair edges.

In this combination step, the knifing procedure removes the newly-found point pair from the links of the knifing list and then re-links that point pair to tie it to the current point pair. The step of re-linking chains the two point pairs, so that the current point pair becomes a conglomerate (e.g. A-B-B-C). The second point of the newly-found point pair now becomes the second point of the current point pair. The search for overlapping point-pairs can now continue using this new second point value as the current second point. Thus, in step 745j the knifing procedure loops, returning to step 745f (and repeating steps 745f-745j) until no more overlaps can be found for the current point-pair. When the current point-pair has been processed in this manner, the knifing procedure loops in step 745k and returns to step 745d to process the next "unvisited" point pair. When each of the point pairs has been "visited" the process to locate point overlaps is complete.

Figure 34:
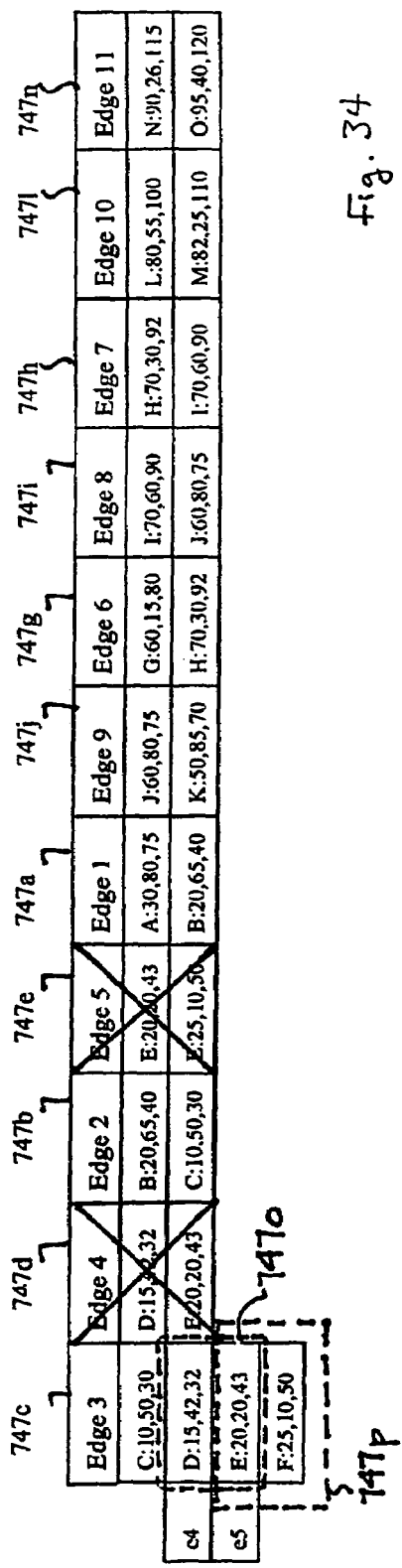
FIG. 34 depicts the exemplary knifing list of FIG. 33 with the knifing procedure further processing the list beginning on edge number 3.
Figure 35:
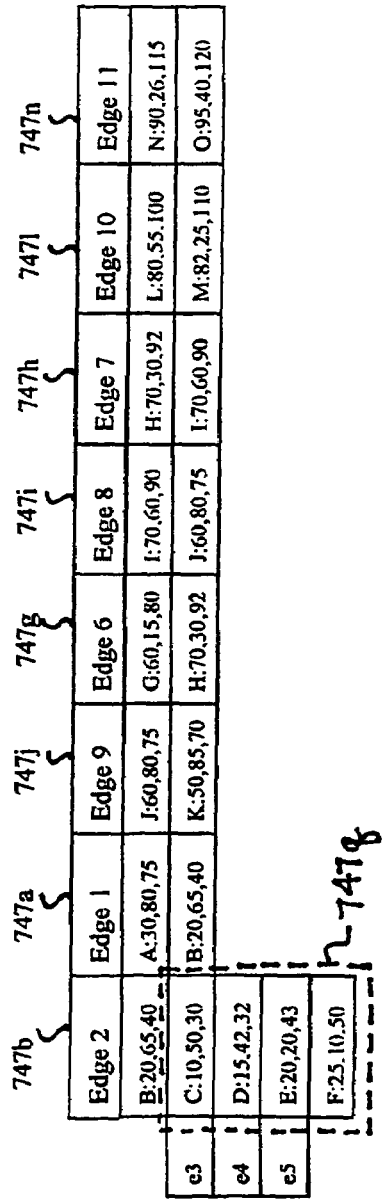
FIG. 35 depicts the knifing list of FIG. 34 as the system attempts to locate edge overlaps at edge 2.
Figure 36:
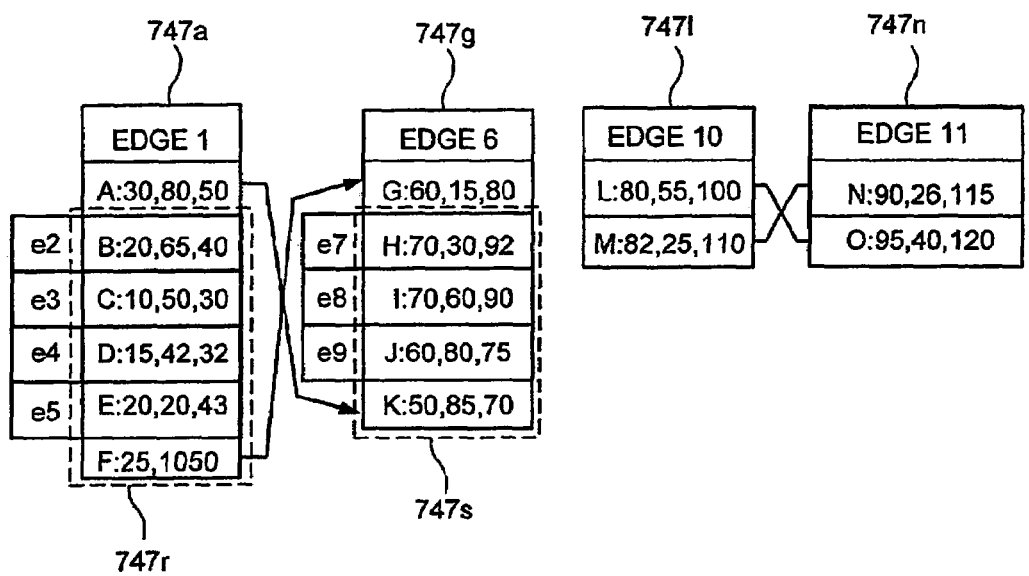
FIG. 36 depicts the knifing list of FIG. 35 as the system continues processing from edge 1.

FIGS. 34-36 depicts the changes that occur to the exemplary knifing list of FIG. 33 as the knifing procedure searches for point-pair overlaps (following the procedure described by steps 745d-745k). In FIG. 34, the knifing procedure begins processing at the beginning of the sorted list-on edge 3 (747c). Edge 3 has point D as its second point in the point-pair, and thus the knifing procedure will examine the first point of the other point-pairs on the knifing list to locate a match on point D. As shown in FIG. 33, edge 4 (747d) does have point D as the first point in the point-pair. Thus, the system combines edge 4 with the points of edge 3 (as shown at 747o). Point E (the second point from edge 4) now becomes the current second point and the knifing procedure continues the search for point-pair overlaps. The knifing procedure searches the other point-pairs on the knifing list and determines that edge 5 (747e) contains point E as its first point. Thus, the system has located a second point-pair overlap for the current edge. The knifing procedure adds the vertices of edge 5 (747e) to the vertices of the current edge (as shown at 747p). The search continues from point F (which was the second point of edge 5). In this example, the knifing list contains no point-pair with a first point that matches point F. Thus, the knifing procedure will move to the next "unvisited" point pair, edge 2 (747b) and repeat the process for that edge.

FIG. 35 depicts the knifing list as the system attempts to locate edge overlaps at edge 2 (747b). Edge 2 has point C as its second point in the point-pair, and thus the knifing procedure examines the first point of the other point-pairs on the knifing list to find a match on point C. As shown in FIG. 35, edge 3 (which was processed through the overlap process to now include points C-D-E and F) does have point C as its first point. The knifing procedure adds the vertices of edge 3 to the vertices of the current edge (as shown at 747q). Thus, an edge segment which contains a multitude of vertices can used in this merging process and in same manner as a two-vertex point-pair. The search continues from point F. In this example, the knifing list contains no point-pair with a first point that matches point F. Thus, the knifing procedure moves to the next "unvisited" point pair, edge 1 (747a) and repeats the process for that edge.

FIG. 36 depicts the knifing list as the system continues processing from edge 1 (747a). Edge 1 has point B as its second point in the point-pair, and thus the knifing procedure examines the first point of the other point-pairs on the knifing list to find a match on point B. As shown in FIG. 36, edge 2 (which was processed through the overlap process to now include points B-C-D-E and F) does have point B as its first point. The knifing procedure adds the vertices of edge 2 to the vertices of the current edge (as shown at 747r).

Thereafter, the knifing procedure continues to process the "unvisited" point pairs. In FIG. 36 it can be seen that upon reaching edge 6 (747g), the knifing procedure locates point overlaps which combines edge 7 (747h), edge 8 (747i) and edge 9 (747j) with edge 6 (see 747s). There are no point overlaps for edge 10 (747l) and edge 11 (747n). When the point-pair overlap locating process is complete the knifing list will now be organized into a set of point segments which can be joined to form faces.

It is noted that as the knifing procedure locates point overlaps for a given edge it may gather a set of points that completely traces the points of a face (such a case was depicted in FIG. 30b). When the points have been combined on the point-pair list in such a case, the first point of the point set will be the same as the last point of the point set. To identify such a case, the knifing procedure tests (e.g. in step 745j, before looping) whether the last point of the current point-pair set has returned to the first point of that set. If the first and last points are equivalent, the knifing process will break from the loop to locate point overlaps for this point pair point set and proceed to the next unvisited point pair. Such a "complete knife edge loop" is also subject to further processing when creating a 3D face from its points.

Referring again to FIG. 31, the knifing procedure (upon completing the point-pair overlap procedure of steps 745d-745k) creates in step 745l new faces from the information contained in the organized knifing list. For example, as can be seen in FIG. 32a (and as noted above), the set of intersections between the edge of the silhouette polygon contour and the faces of the (rough) 3D model 606 require the creation two new faces along the knifing plane: A-B-C-D-E-F-G-H-I-J-K (Face 1) and L-M-N-O (Face 2). As can be seen from the knifing list depicted in FIG. 36, the procedures described above have organized the relevant point pairs into a set of point segments which follow closely the sequence of points in those faces. The ordering of the point pairs by the Z-axis coordinate of the first point of the point-pair (see step 745c) has enabled each of the point segments to also follow this Z-axis ordering. As can be seen in FIG. 32a, segment A-B-C-D-E-F precedes segment G-H-I-J-K and segment L-M precedes segment N-O.

To create new faces in such a case, the knifing procedure of the 3D refining module 616 (in step 729j) couples point-pair segments. For example, the knifing procedure joins the first segment (A-B-C-D-E-F) with the second segment (G-H-I-J-K) to form Face 1 and the third segment (L-M) with the forth segment (N-O) to form Face 2. To create new face 1, the knifing procedure in step 745l creates a new face object, loads the vertices from the first segment (the edge 1 segment) onto the face object and then loads the vertices from the second segment (the edge 6 segment) onto the face object.

Notice that when pairing point segments (e.g. edge 1 and edge 6), the last point of the first segment (e.g point F) can be followed by the first point of the second segment (e.g. point G). As can be seen in FIG. 32a, the points F and G represent one end point the edge of the silhouette contour polygon which has been projected or "drilled" through the faces of the (rough) 3D model. Thus, points F and G were actually created based on the same end point of the edge of the silhouette contour polygon. Because the faces of the (rough) 3D model 606 have vertices that are ordered in a manner that directs the normal for the face "outside" the object) and because the point-pairs of the knifing list have been ordered according to the Z-axis of the first point of the point pair, the point segments when they are encountered in the face creation step of 745l have the property that the last point of the first segment to join will be directly related to the first point of the second segment, as those points will be points that have been "drilled" from the same 2D vertex of the silhouette contour polygon.

The end point of the second segment (e.g. Point K of the edge 6 segment) also relates to the first point of the first segment (e.g. point A of the edge 1 segment) in the same manner. Both are points that have been "drilled" from the same end point of the silhouette contour polygon edge. The same kind of "drilled point" can be seen when joining of the point segments for edge 10 (747l) and edge 11 (747n). Referring again to FIG. 36 the knifing procedure joins the vertices of edge 10 (747l) and edge 11 (747n) in the manner described above to form face 2. The last point of edge 10 (point M) and the first point of edge 11 (point N) join the two point segments together. They are also points that are "drilled" from the same end point of the silhouette contour polygon edge.

It is noted that in certain cases one of the point pair sets that is encountered by the knifing process in step 745l may be a "complete knife edge loop" which does not need to be joined to any other point-pair point set. During the processing of each point set on the knifing list the knifing procedure in step 745l will check the point set to determine whether first point of that point set is equivalent to the last point of that same point set. In such a case the knifing procedure will make a complete face from the list of vertices, rather than pairing the beginning and ending points of that point set with the beginning and ending points of another point set.

Upon completion of the step to create new faces for a given edge of a silhouette contour polygon, the knifing procedure loops in step 745m and returns to step 745a to process the next knifing list (for the next edge of the silhouette contour polygon). When the system has completed the processing of each knifing list for each edge of each silhouette contour polygon of a given silhouette image, then the processing is complete for that silhouette image and the system has revised the (rough) 3D model according to the silhouette contour polygons that are associated with that image.

III. Creating the Triangulated Mesh Model

Figure 37:
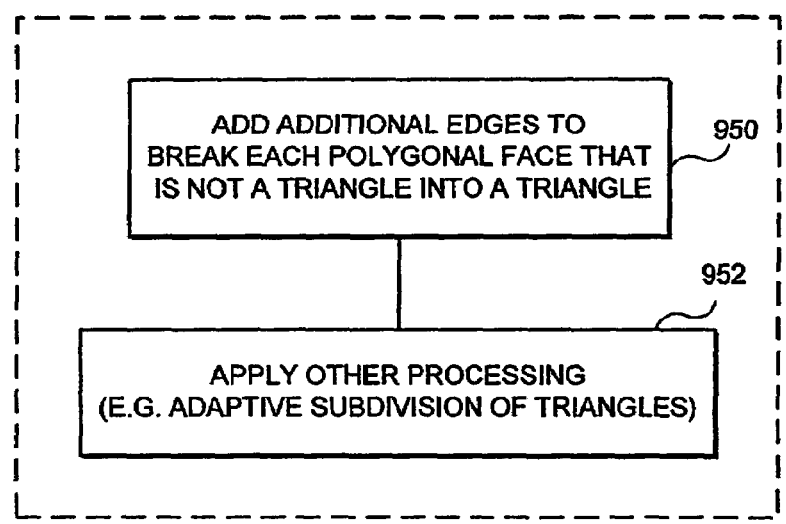
FIG. 37 depicts an exemplary process flow for the triangulation module of the present invention.

Referring to FIG. 22, upon completion of the 3D refining module 616's processing, the system of the present invention executes the triangulation module 110 (FIG. 10) to transform the 3D model (now consisting of polygons) into a triangulated mesh model. FIG. 37 depicts an exemplary process flow for the triangulation module 110. In step 950, the triangulation module 110 executes a procedure to create additional edges to break up each face consisting of more than three vertices into a set of faces which have only three faces. In step 952 the triangulation module 110 executes a procedure to smooth the triangles by adding additional points (e.g. in a procedure using the adaptive subdivision of triangles).

Figure 38:
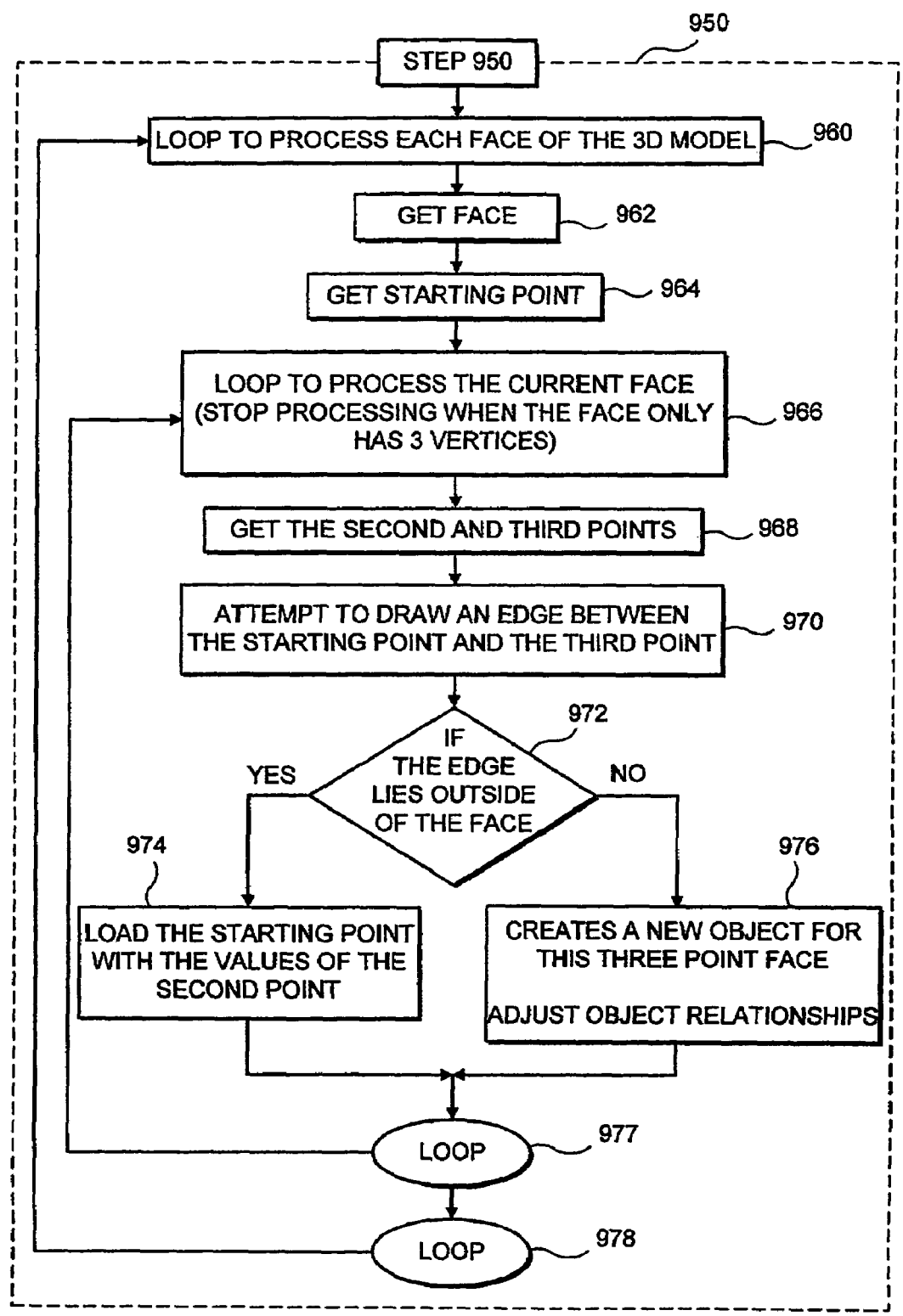
FIG. 38 depicts an exemplary process flow of an exemplary procedure for triangulating the polygonal mesh model of the present invention.

To create the additional edges, the triangulation module 110 in step 950 executes a procedure to tour the face and generate new edges. FIG. 38 depicts a process flow of an exemplary procedure for triangulating the polygonal mesh model 108. In step 960, the triangulation module 110 begins a loop to process each current face of the 3D model. In step 962 the module obtains a reference to a face to process ("the current face"). In step 964 the triangulation module 110 identifies one of the vertices of the face as the "starting point" (e.g. the starting point could be the first point in the current face's vertex array).

In step 966 the triangulation module 110 begins a second loop to process the face until it has only three points in its vertex array. In step 967 a loop begins that will process the vertices of the face until a new triangle face is created. In step 968, the triangulation module 110 proceeds from the starting point in the vertex array (following the ordering of the vertices of the face, e.g. counter-clockwise) to identify two additional vertices (a "second point" and a "third point"). The triangulation module 110 in step 970 then attempts to create an edge between the initial point and that third point.

If in step 972 the edge between the starting point and the third point falls outside of the bounds set by the points of the current face polygon (a test which can be determined by mapping the face onto a 2D reference plane and determine whether the edge falls within the bounds of the shape of the face on the 2D plane), then the triangulation module 110 cannot make a new triangle face from this point grouping and the module must readjust the starting point. In step 974, the triangulation module 110 reassigns the "starting point" to be the next point in the vertex array (i.e., the second point). Then, the module 110 loops in step 977 to return to step 967 where the module attempts grab a new set of points that may create a new triangle.

If in step 972 the triangulation module 110 determines that this new edge lies within the bounds of the face, then the triangulation module 110 creates in step 976 a new face data object and makes a new face object for the triangle. The vertices for this face are the starting point, the second point and the third point. The triangulation module 110 inserts a reference to the starting, second and third points bounded by the triangle into the list of vertices for this new face. The triangulation module 110 also removes the references to the starting point, second point and third point from the original face's list of vertices. The triangulation module 110 loads the new face object so that it maintains the same ordering of the vertices as was maintained in the current face (e.g. counter-clockwise).

Upon creating the new face, triangulation module 110 loops in step 977 and proceeds to step 967 where it checks to determine the current faces requires any further triangulation processing. Where the face contains more than three vertices, then further processing is required. If in step 967 the triangulation module determines that further processing is required, the system loops and returns to step 966 to process the current face object until it has only three vertices in its vertex array. If in step 966 the triangulation module 110 determines that only three vertices remain in the current face, the module moves to step 980 and returns to step 960 to process the next face.

FIG. 39 depicts a number of views (990-998) of the 3D model face which is transformed by the triangulation module 110. The face as depicted at 990 shows an initial state of the face with the procedure (e.g. in step 950) beginning with the starting point 991. After the first pass, edge 995 lies outside of the bounds of the face and the procedure readjusts the starting point to point 993 as shown in view 992. Looking further at view 992, it can be seen that edge 997 does lie within the bounds of the face and a new triangular face can be created. In view 994, edge 999 lies within the bounds of the face and a second new triangular face can be created. In view 996, edge 1000 lies within the bounds of the face and a third new triangular face can be created. In view 998, edge 1001 lies within the bounds of the face and a fourth new triangular face can be created.

After the 3D model has been transformed in to a mesh made of triangles, the system and method of the present invention can execute additional procedures, e.g., to smooth the triangulated surface. For purposed of an exemplary embodiment, the system and method of the present invention executes a procedure to smooth the newly created triangulated mesh using an adaptive subdivision process. U.S. patent application Ser. No. 09/238,232, entitled "Adaptive Subdivision of Mesh Models", filed on Jan. 27, 1999, which is hereby expressly incorporated by reference herein, describes a system and method describes a system and method for the adaptive subdivision of a mesh model of a three-dimensional (3D) object or surface (including, e.g., a triangulated mesh model) that results in a smooth interpolation of the mesh model. Such a procedure is suitable for the additional processing step 952 in FIG. 37.

IV. Texture Map Construction

Referring to FIG. 10 the texture map module 114 of the 3D model builder application 100 completes the 3D model (115) by processing the texture images 113 so that each face of the triangulated mesh model 112 is assigned a face texture. The texture images 113 are a group of photographs taken of the object 4 from different angles. When displaying the object with texture, a display system clips areas from those images and overlays those clipped texture areas on the faces of the triangulated mesh model. The location of the area clipped from the images corresponds to the location of the face in the model. As the different texture images 133 contain different views of the object 4, it is desired that for each face of the 3D model, the system locate the one texture image (113) that provides the best view of the area to be clipped for that particular face. The texture map module 114 of the present invention executes a process to search the texture images 113 and locate for each face, the "best" view for clipping.

Figure 40:
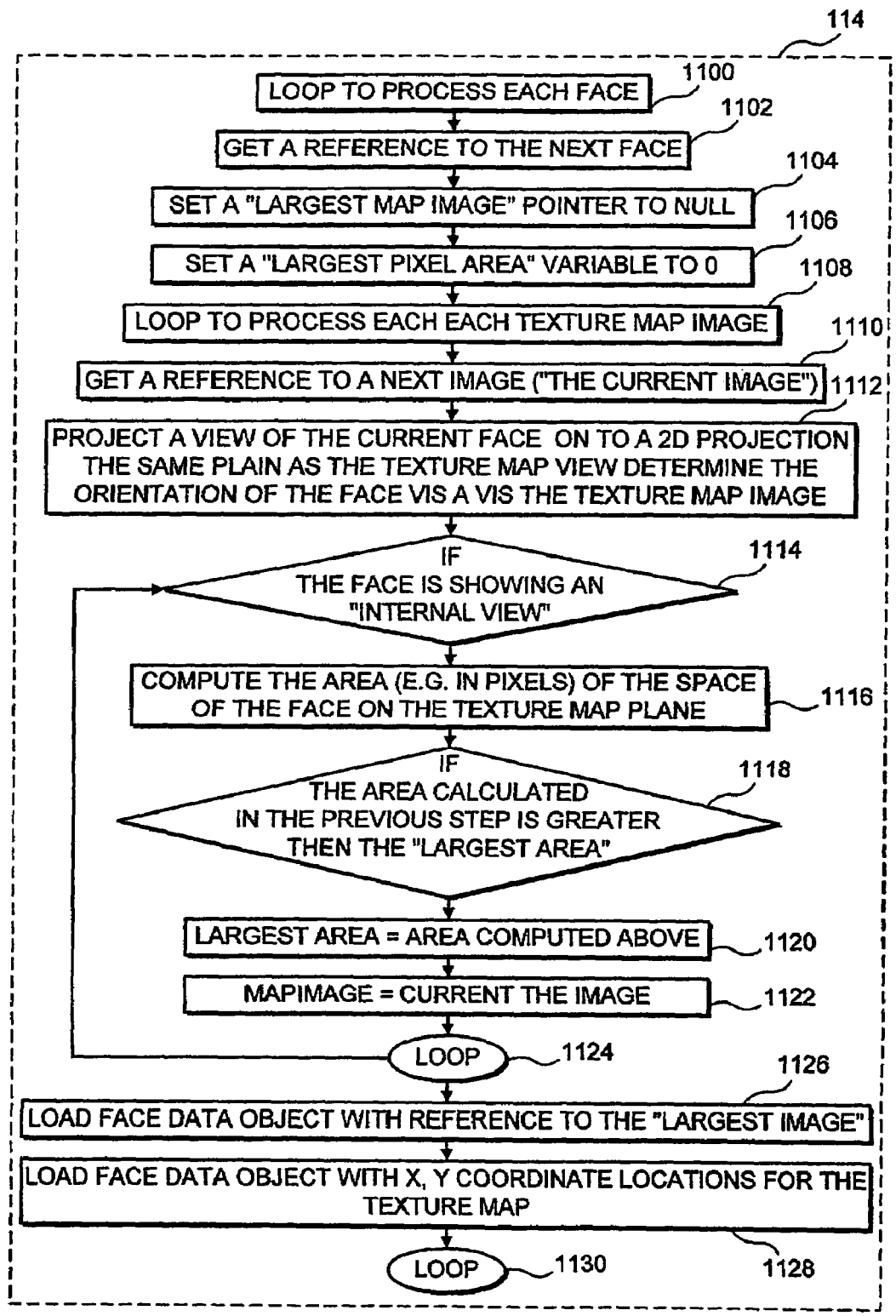
FIG. 40 presents an exemplary process flow for the texture map module of the present invention.

FIG. 40 presents an exemplary process flow for the texture map module 114. In step 1100 the texture map module 114 begins a loop to process each of the faces of the triangulated mesh model 112. In step 1102 the texture map module 114 gets a reference to a face data object ("the current face") and then allocates a number of loop variables. In step 1104, the texture map module 114 sets a pointer to the desired texture map image that is to be assigned to this face (the "best map"). Initially, the best map is set to null. In step 1106, the module 114 sets a largest area variable ("largest area") and initializes it to 0. As the system analyzes each of the texture images (113) it will be possible to identify an area within a given texture map that corresponds to and can be associated with a given mesh face. If a given texture image (113) does have a clip area that can be associated with a given mesh face, then the system can calculate the area (in pixels) that the clip area spans. As the system analyzes the texture images (113) for a given face, the largest area variable tracks that clip area that has the largest pixel area.

In step 1108, the texture map module 114 executes a loop to examine each texture map image and find among those images the one image that is "best" for the current face. In step 1110, the texture map module 114 obtains a reference to a texture map image (the "current texture map image"). In step 1112, the texture map module 114 then creates a 2D projection of the current face to map an image of that face onto the plane of the texture map image. Using a translation matrix, the texture map module 114, determines a pair of x-y, coordinates for each vertex of the face. In addition, in step 1112 the texture map module 114 also determines the orientation of the face as it is mapped to the plane (i.e. whether it is an "interior" or "exterior" view of the face as seen from the point of view of the camera 2 when it captured the texture map image). Because of the predetermined ordering of the points in the face image (which is the ordering for an "external" view), the texture map module 114 can determine whether that same ordering is found in the 2D projection of the face.

If, in step 1114, the texture map module 114 determines that the projection of the current face has yielded an "interior" view, the module 114 proceeds to step 1124 and loops (returning to step 1108 thereby terminating further processing of the current texture map image. If in step 1114, the texture map module 114 determines that the projection of the current face is an "exterior" view, the module 114 proceeds in step 1116 to calculate a value representing the pixel area (the number of pixels) bounded by triangular face in the current 2D projection. If, in step 1118, the texture map module 114 determines that the area calculated in step 1116 above is not larger that the value stored in the "largest area" variable (which is initially 0), the texture map module 114 loops in step 1124 and terminates further processing of the current image. (Thereafter, the texture map module 114 returns to step 1108 to process the next texture map image.)

If, in step 1118, the texture map module 114 determines that the area calculated in step 1116 above is larger that the value stored in the "largest area" variable, the module 114 in step 1120 sets the "largest area" variable to be the value determined in step 1116. In step 1122, the texture map module 114 also sets the best map variable (cf. step 1104) to point to the current texture map (obtained in step 1110). Thereafter, the texture map module 114 loops in step 1124 and return is to step 1108 to process the next image. Processing continues (following steps 1108-1124) until the system compares all of the images in this manner.

In step 1126, after completion of the loop to determine the largest texture map area, the module 114 places a reference to texture map image pointed to by the "best image" variable in the data object for the current face. Further, in step 1128 the texture map module 114 loads the x-y, coordinates of the 2D face projection (created in step 1112) into an array within the face object for the current face. The ordering of the 2D x-y coordinates follows the ordering of their corresponding 3D X, Y, Z coordinate values so that each 3D coordinate can be associated and linked to a corresponding 2D x-y texture map coordinate. With the texture map image and x-y coordinates assigned to the face, the texture map module 114 loops in step 1130 and returns to step 1100 to process the next face of the triangulated mesh model 112. Processing continues (following steps 1100-1128) until all of the faces are processed.

In addition, the texture map module 114 can be further configured in alternative embodiments to process special or additional texture map images. Such special or additional texture map images would be, for example, texture map images taken or the top or bottom of the 3D object, when the 3D object had been removed from the rotating turntable. In addition, if the procedure of FIG. 40 did not yield satisfactory results, it would be possible to re-map those previously processed map images to the 3D module, using the process now described.

Figure 41:
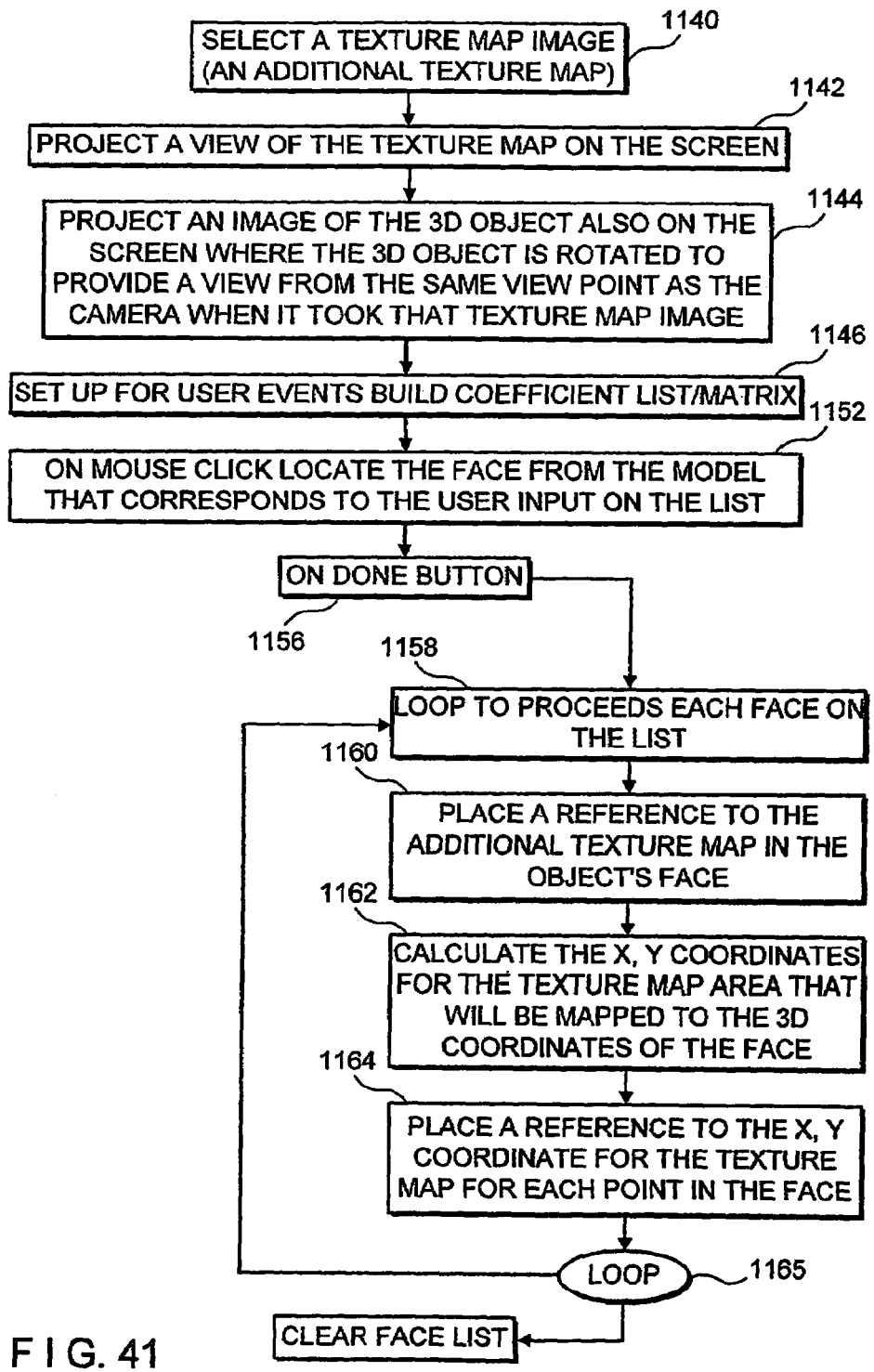
FIG. 41 depicts an exemplary process flow of the present invention for mapping a particular (e.g., user selected) texture map image to the 3D model.

FIG. 41 depicts an exemplary process flow for mapping a particular (e.g., user selected) texture map image to the 3D model. In step 1140, the texture map module 114 presents to the user a list of texture map images and receives input from the user information (such as a mouse click) concerning his or her selection. The texture map module 114 locates a reference to this selected texture map image (the "special map image"). In step 1142 the texture map module 114 projects a view of the special map image on a computer output device, such as the computer display terminal. In step 1144 the texture map module 114 projects a 2D image of the 3D model on the computer output device (the "model projection image"). In the exemplary embodiment, the system projects the special map image and model projection so that the user can see those images sided by side and at the same time (such that two viewing windows are placed on the screen). In the exemplary embodiment, the window which depicts the model projection image has controls (e.g., an enabled mouse or scrollbars) to allow the user to rotate the 3D model to a view that corresponds to the special map image (with the texture map module projecting that view of the 3D model in its screen window).

In step 1146 the texture map module 114 provides event handling routines that enable the user to select a set of points on the model projection image and the special map image. For example, in the exemplary embodiment the user clicks with a mouse on a point within the special map image and then clicks on a corresponding point in the model projection image. In step 1146, event handling routines in the texture map module, process those mouse clicks to obtain a 2D x-y coordinate that corresponds to each click. For purposes of an exemplary embodiment, the user clicks on a number of points between the two images (e.g. 4 points). FIG. 42 depicts a screen view of an exemplary model projection image 1168 and an exemplary special map image and shows four point pairs which the user has selected between the two images: point pairs 1170a/1170b, 1172a/1172b, 1174a/1174b and 1176a/1176b. Each point pair represents from the model projection image a point from a given 3D model face and from the special map image that model points corresponding point from the image.

Using the points identified by the user in step 1146 (FIG. 41), the texture map module in step 1148 builds a matrix to that best maps each of the points selected from the model projection image onto the special map image. In step 1148, the texture map module 114 stores the values of the coefficients in a coefficient list 1150.

With coefficients determined to map the model projection image onto the special map image, the texture map module can now process some or all of the faces that are visible from the view of the model projection image to locate within the special map image areas of texture that could be linked to each face. In step 1152, the texture map module 114 provides set of event handling routines to process user input on selected face. The event handling routines process user input events, such as mouse clicks. In the exemplary embodiment, the user can use the mouse to move the cursor over a desired face of the 3D model, which is depicted in the model projection image. When the user mouse clicks on a given face shown in the model projection image, the event handling routines of step 1152 determines the face on which the user clicked and places a reference to that face on a "selected face list" 1154. In step 1156, the texture map module 114 provides an event handling routine to determine when the user has completed his or her face selection process (e.g. such as an enabled "done" button).

In step 1158, the texture map module 114 begins a loop to process each face that has been referenced by the selected face list. In step 1160, the texture map module gets a reference to a face from the selected face list 1154. In step 1162, the module 114 places a reference to texture map image (from which the special image map was created) in the data object for the current face. Further, in step 1163 the texture map module 114 determines a set of 2D x, y coordinates that will map the vertices of the face to specific locations on the texture map image. In step 1164, the texture map module then loads the values of those 2D x, y coordinates into an array within the face's data object. The ordering of the 2D x, y coordinates follows the ordering of their corresponding 3D X, Y' Z coordinate values so that each 3D coordinate can be associated an linked to a corresponding 2D x, y texture map coordinate.

With the texture map image and x, y coordinates assigned to the face, the texture map module 114 loops in step 1165 and returns to step 1158 to process the next face referenced on the selected face list 1154. Processing continues (following steps 1158-1165) until all of the faces on the selected face list 1154 are processed.

In accordance with the exemplary embodiment of the present invention, textures not visible to the camera can be obtained by repositioning, for example, the object. This texture can then be projected on the otherwise complete 3D model using physical camera parameters obtained from the silhouette operation.

V. Alternative Embodiments

The present invention provides in an alternative embodiment a 3D model builder application which also processes the information contained in the silhouette images collected above to produce a 3D model of the object. The 3D model builder application of the present invention includes in the alternative embodiment a plurality of computer programmed modules that control the processor of a computer and enable it to execute the tasks described below and needed to create the 3D model. In the exemplary alternative embodiment, the computer programmed modules of the 3D model builder application are written in the C++ computer language and can be used on computers for which a C++ compiler is supported. However, in other embodiments the computer programmed modules could be written in other computer programmed languages, such as Java, which would provide the same functionality as described herein.

Figure 43:
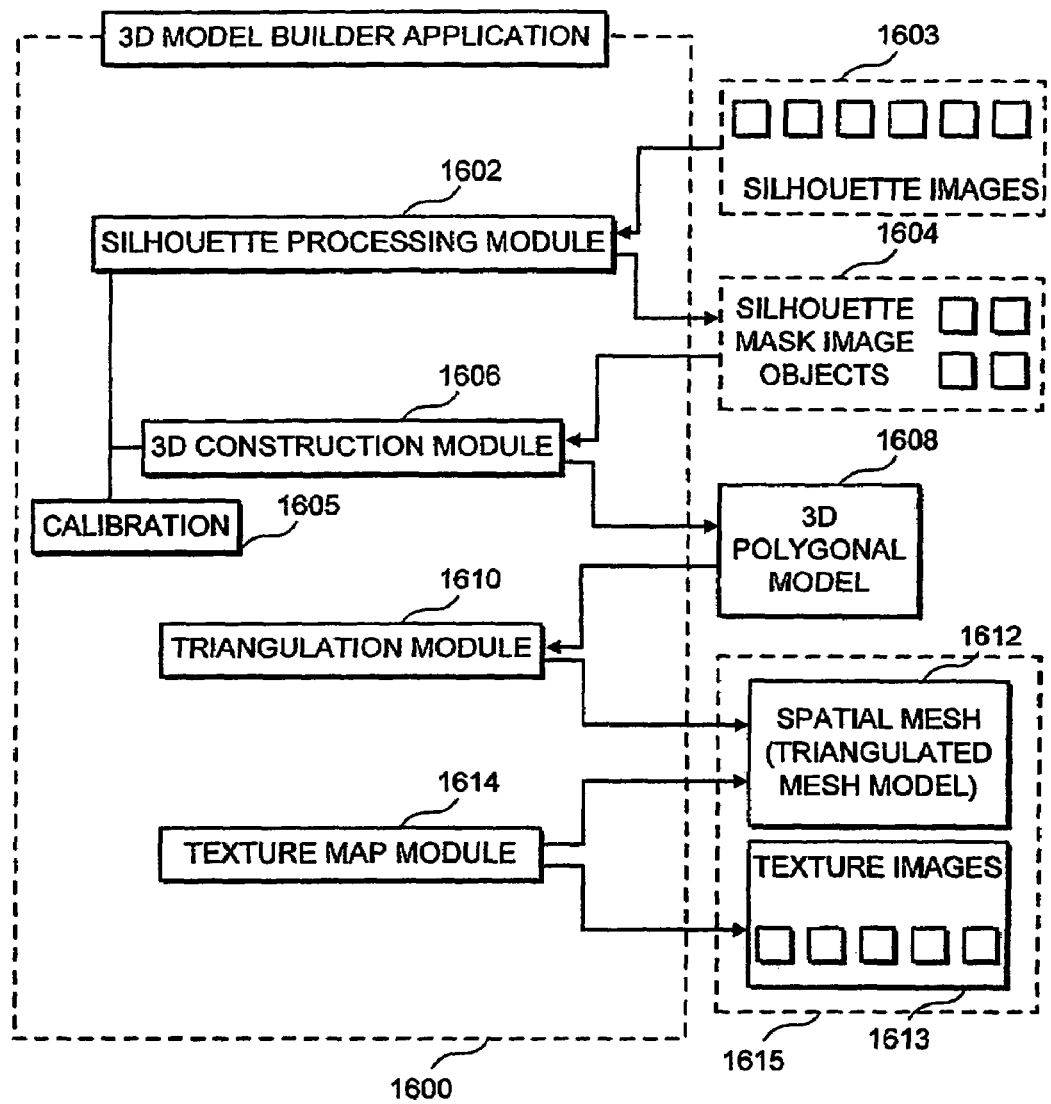
FIG. 43 depicts an exemplary set of computer programmed elements included in a 3D model builder application 100 of the present invention.

FIG. 43 depicts an exemplary set of computer programmed elements included in one alternative 3D model builder application 1600 of the present invention. It is noted that the processing of the 3D model builder application 1600 could be performed on the computer 10 of the image capturing system or, alternatively the computer programmed elements of the 3D model builder application 1600 could be stored and operated on another computer that is remote to the computer 10.

Referring to FIG. 43, a silhouette processing module 1602 accepts as input the plurality of collected silhouette images 1603 (such as the images collected above with reference to FIGS. 2-4). The silhouette processing module 1602 (as described in further detail below) processes the images to identify those pixel points in each silhouette image that would describe the object 4, separating such pixels from those which would describe the background. For each silhouette image object, there are separate data objects which contain the coordinates of the polygons that outline the boundaries of each silhouettes found in the given image(cf. 1603). In FIG. 43 a set of representative silhouette mask image objects are shown at 1604. The silhouette mask image objects 1604 show the contours of the object 4 from a given photographic view and identify the masses of pixels within those contours that make up the object 4. For each vertex of a polygonally-shaped silhouette, the silhouette processing module 1602 also calculates a 3D, X, Y, Z coordinates that reveals the real-world spatial location of that point. To compute those 3D coordinates, the system of the present invention uses values for the camera 2's focal length and the rotating turntable 6's axis of rotation 5 (which it determines through a calibration procedure 1605).

The 3D model builder application 1600 also includes a 3D construction module 1606 which uses the information contained in the plurality of silhouette mask image objects 1604 to construct a 3D polygonal model 1608 of the object. It is noted that in the present invention the 3D construction module 1606 uses an analytic approach to determine the 3D model based on the silhouette data; the module 1606 finds the areas of intersection of the silhouette outlines and by these intersections determines the three dimensional boundaries of the object 4. The approach of the present invention permits boundaries of the 3D model to be determined with a high degree of accuracy. Thus, with the system of the present invention, it is not necessary to use a volumetric cube approach which relies on a fixed-size grid in making the model. The output from the 3D construction module 1606 is a 3D polygonal model 1608. The 3D polygonal model 1608 describes the object 4 with a series of polygonal which are not necessarily triangles.

After 3D model construction, the 3D model builder application 1600 provides a triangulation module 1610 to create a triangulated mesh model 1612 (a mesh containing only triangular faces) from the 3D polygonal model 1608. A representative triangulated mesh model (spatial mesh) is depicted at 1612, constructed from the 3D polygonal model 1608. Additionally the 3D model builder application 1600 provides a texture mapping module 1614, which uses the texture map images 1613 (collected as described above) and associates specific pixel points in the images with the specific vertices of the triangles in the triangulated mesh model 1612. The triangulated mesh model 1612 together with the texture map images 1613 are included in the completed 3D model 1615 of the object 4.

Procedures for each of the silhouette processing module 1602, the 3D construction module 1606 (with the associated calibration module 1605), the triangulation module 1610 and texture mapping module 1614 are described in further detail below. It is noted that after execution of such procedures, 3D model builder application 1600 outputs a mesh model of the 3D object, such as a triangulated mesh model 1612, which can be stored in one of a number of 3D VRML formats such as the MetaStream format of MetaStream Corporation, or any other format which combines a 3D mesh geometry with texture information for display.

It is noted that the MetaStream format permits a multi-resolution display of a mesh model (multi-resolution allows a 3D model to be displayed at different levels of detail resolution). The mesh construction system and method of the present invention (in the alternative embodiment) is suitable for the creation of 3D object models which have such multi-resolution display capabilities. For more information concerning the construction of 3D mesh models with multi-resolution display capabilities the reader is directed to the following patents which are hereby expressly incorporated by reference: U.S. Pat. Nos. 5,886,702, 5,945,996, and 6,208,347.

In addition, there are alternative techniques for mesh construction which permit color and/or texture model included within the geometry (3D coordinates) of the mesh model. One such format is that described in U.S. Pat. No. 6,208,347, in which texture data is incorporated to the mesh model of the object. In an alternative embodiment, the triangulated mesh model of the present invention can incorporate color and other texture data within the mesh model. For example, in such an embodiment the texture mapping module of the present invention would be configured to associate additional data points containing color or other texture information into the mesh model. For more information concerning such an alternative technique for mesh construction, the reader is directed to the following application which is hereby expressly incorporated by reference herein U.S. Pat. No. 6,208,347.

A description of each of the modules of the 3D model builder application 1600 (of the alternative embodiment) is now presented.

A. Silhouette Processing Module (Alternative Embodiment)

As stated above, the silhouette processing module 1602 creates from each silhouette image (cf. 1603), a corresponding silhouette mask image object (cf. 1604) which contains a polygonally-shaped silhouette which bounds those pixels in the corresponding image that describe the object 4. In the exemplary embodiment, the silhouette processing module 1602 executes a background subtraction process which determines the object's silhouette outline boundaries in each captured image—even where the color of the object nearly matches the color of the background. Additionally, and as noted above, the silhouette processing module 1602 provides reliable silhouettes even when the lighting from the photo flash light sources are different in each image. It has been determined that given two different images of the same object and same background, there may be a large difference in the light intensity of the two images. The light intensity of two images might be different due to the light intensity variations of light sources (flashes). The present invention determines, on the fly, a set of coefficients which enables the present invention to separate background pixels from object pixels even in situations where the light intensity varies from photo to photo.

FIG. 44 presents a diagram of the computer programmed elements of the silhouette processing module 1602 of the present invention. Included is a background mask procedure 1652, an initial silhouette processing module 1654, a coefficient determination module 1656, a background subtraction module 1658 a small cluster removal module 1660, a polygonal shape building module 1668, a 3D coordinate building module 1670 and a silhouette mask writing module 1672. Each of these programmed elements is now described.

1. Background Masking and Silhouette Image Masking

The silhouette processing module 1602 begins by processing one of the background images (see e.g. FIG. 7) and one of the silhouette images (e.g. 1603) to determine a set of coefficients which will be used in later processing.

Figure 45:
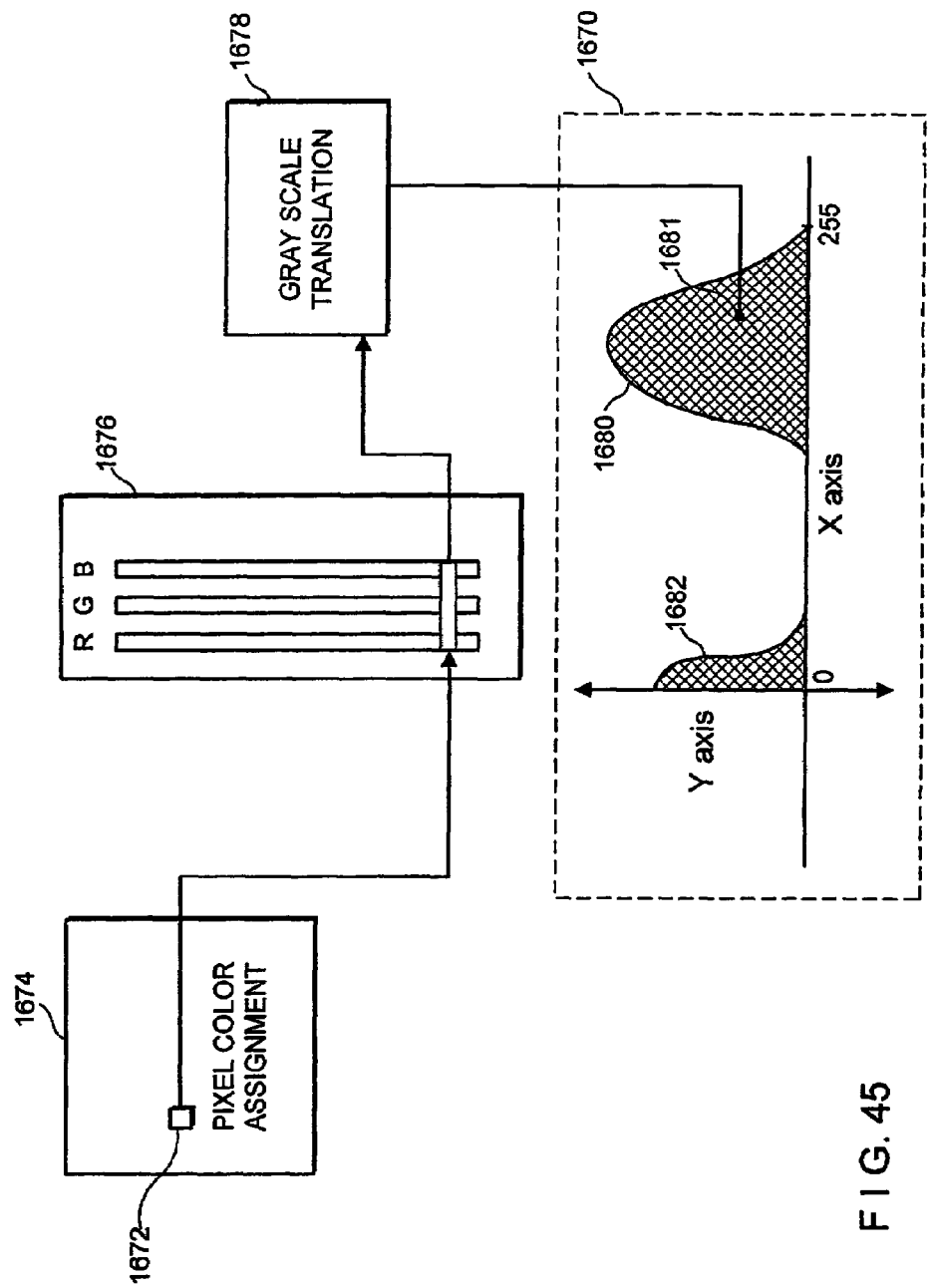
FIG. 45 depicts an exemplary histogram mapped from a background image in the alternative embodiment of the silhouette processing module.

The background mask procedure 1652 examines the background image for the presence of unwanted objects/bad or noisy pixels. The procedure employs a thresholding technique to mask out the pixels which are darker than a given intensity value. To threshold, the background mask procedure 1652 builds a histogram to group the light intensities of each pixel in the background image. In the exemplary embodiment, a histogram for the background image can be built as the file containing the background image is read into the memory of the computer. The data for each pixel in the file contains a color assignment which points to a location on a palette (contained in the file) which holds the red, green and blue (RGB) color settings for that color. In the background mask procedure 1552, the computer reads the RGB color channel settings and computes a grayscale equivalent for that color. In the exemplary embodiment, the grayscale maps the color assignments to one of 256 values (a value between 0 and 255). The histogram determines the distribution of pixels assignment along this scale. FIG. 45 depicts an exemplary histogram 1670 mapped from a background image. The 0 to 255 grayscale is charted along the x axis. The number of pixels for each grayscale increment is charted on the y axis.

A pixel color assignment 1672 from the background image file 1674 maps to a set of RGB color settings in a color palette 1676 contained in the background image file. As those values are read into the memory of the computer, a translation formula 1678 is applied to the RGB color settings to obtain a grayscale value for that pixel (0 to 255) that value is then mapped to the histogram scale 1670. There are many techniques currently available for building histograms of the pixel intensities within an image.

Referring to FIG. 45, the exemplary histogram 1670 for the background image has two significant areas. Area 1680 shows the distribution of pixels having an intensity which is that of middle gray (those values indicated pixels that describe the background). Area 1682 shows a distribution of pixels having an intensity which is that of black or near black (those values indicate pixels that would be anomalies, such as dirt or shadows). The background mask procedure 1652, after building the histogram 1670 then determines a threshold for the background image. Pixels which fall below the threshold will be masked so they will not be included in further calculations. In the exemplary embodiment, the background mask procedure 1652 sets the threshold by computing the midpoint between the highest distribution values in area 1680 and 1682. Picking this midpoint value provides a conservative method for determining what is a pixel that describes the background and what is a pixels describe an anomaly.

Once the threshold value is determined the background mask procedure 1652 constructs a masking frame to mask off those pixels which have values that fall below the threshold. FIG. 46 depicts a portion of the background image 1684 with an anomaly 1686 (such as a speck of dirt) and also a portion of the background masking image 1688 with a mask 1690 created for the anomaly. The mask 1690 blocks those pixels which might contain images of dirt or other anomalies from being included in any analysis of the background calculation coefficients.

Continuing with the process to determine the coefficients, and referring again to FIG. 44, the initial silhouette processing module 1654 prepares one of the silhouette images for use in the coefficient determination module (described below), a procedure that determines processing coefficients (k and S). The initial silhouette processing module 1654 processes one of the silhouette images to locate—to a rough approximation—those pixels which are thought to describe the image of the object and not the background.

To construct the rough object mask for the chosen silhouette, the initial silhouette processing module 1654 builds a histogram for the selected silhouette. The procedure employs the thresholding technique described above to mask out the pixels which are darker than a given intensity value (and are thus considered to belong to the object 4). Using a procedure substantially similar to that described above (with respect to FIGS. 45 and 46), the background mask procedure 1652 builds a histogram to group the light intensities of each pixel in the silhouette image. The histogram determines the distribution of pixels intensities similar to that described above. FIG. 47 depicts an exemplary histogram 1700 mapped from the selected silhouette image. The 0 to 255 grayscale (showing intensity) is charted along the x axis. The number of pixels for each grayscale increment is charted on the y axis.

The exemplary histogram 1700 for the silhouette image has two significant areas. Area 1702 shows the distribution of pixels having an intensity which is that of middle gray (those values indicate pixels that describe the background). Area 1704 shows a distribution of pixels having an intensity which is that of black or near black (those values indicate pixels that would be those thought to describe the object 4). The black/near black pixels could also include small anomalies such as images of dirt. The initial silhouette processing module 1654, after building the histogram 1700 then determines a threshold 1706 for the silhouette image. Pixels which fall below the threshold will be masked—they will not be included in further calculations. In the exemplary embodiment, the initial silhouette processing module 1654 sets the threshold by computing the midpoint between the highest distribution values in areas 1702 and 1704. Picking this midpoint value provides a conservative method for determining what pixel describe the background and what pixels describe the objects. In alternative embodiments, the initial silhouette processing module 1654 determines the threshold by other approaches such as by other statistical functions.

Figure 48:
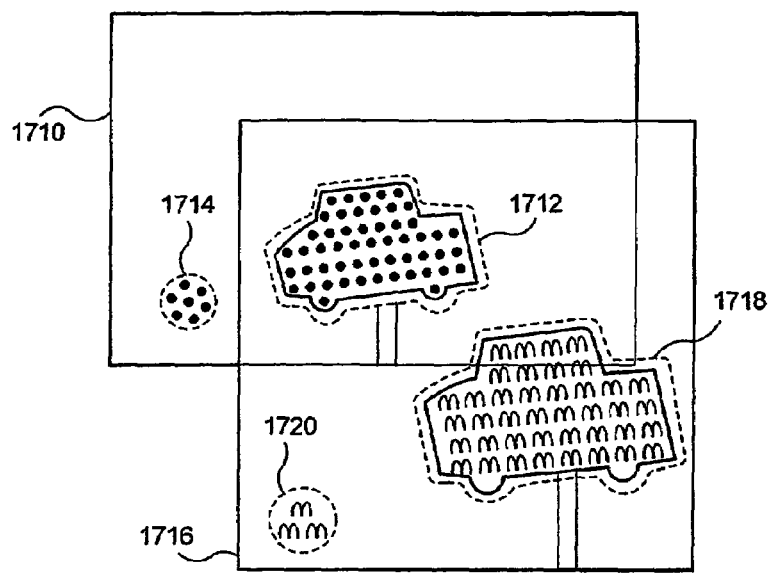
FIG. 48 depicts a portion of a silhouette image with an area of dark colored pixels representing the object and an anomaly and also a portion of the silhouette masking image.

Once the threshold value 1706 is determined, the initial silhouette processing module 1654 constructs a masking frame to mask off those pixels which have values that fall below the threshold. FIG. 48 depicts a portion of the silhouette image 1710 with an area of dark colored pixels representing the object (area 1712) and an anomaly 1714 (such as a speck of dirt) depicted and also a portion of the silhouette masking image 1716 with a mask created for the object (area 1718) and the anomaly (area 1720). The mask 1716 blocks those pixels which might describe the object or the anomaly from being included in any analysis the background calculation coefficients.

2. Determining Coefficients (Alternative Embodiment)

Referring again to FIG. 44 the coefficient determination module 1656 uses the masked background and silhouette images to determine the coefficients for background subtraction. The coefficient processing module 1656 uses a minimization process to find the coefficients of k (a scaling factor) and S (an offset). In the exemplary embodiment, this process takes each unmasked pixel in the background image and attempts to pair each of those pixels with its corresponding pixel from the selected silhouette image. If the corresponding pixel in the silhouette is also unmasked, the coefficient processing module 1656 then uses the intensity values (0-255) of each of those pixels in the pixel pair to solve the following function:

$$\min \Sigma (bg_i \cdot k + S - obj_i)^2$$

and also to determine $$\sigma (\text{standard deviation}).$$

Where $bg_i$ represents the intensity value (0-255) of each background pixel used and $obj_i$ represents the intensity value (0-255) of each pixel used from the silhouette image.

Figure 49:
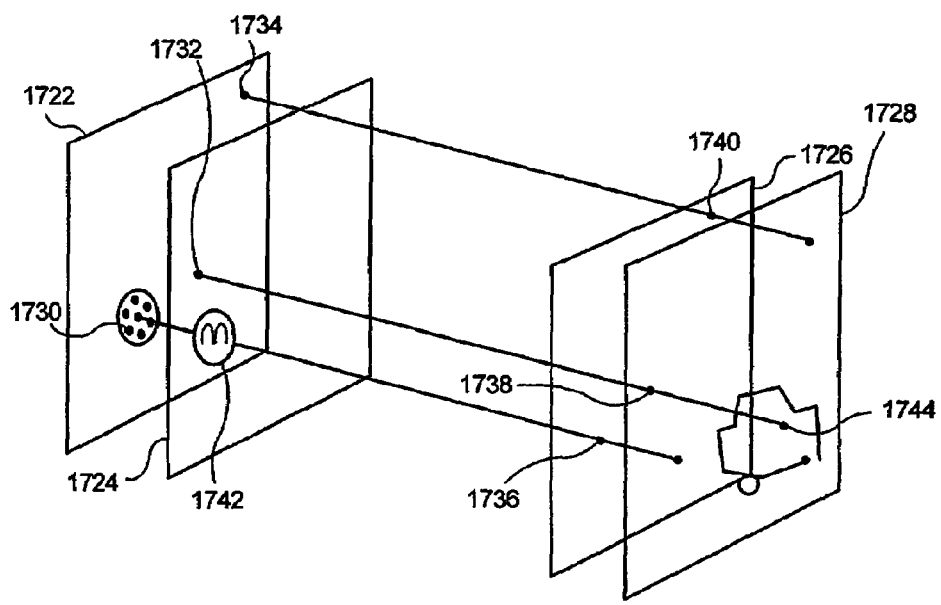
FIG. 49 provides a graphic representation of the coefficient determination module's selection process for locating pixel pairs in the alternative embodiment.

FIG. 49 provides a graphic representation of the coefficient determination module 1656's selection process for locating pixel pairs. FIG. 49 shows a background image 1722 and its corresponding background image mask 1724. Also depicted is the silhouette image 1726 and its corresponding silhouette image mask 1728 created by the initial silhouette processing module 1654. In this example, the coefficient processing module 1656 examines three pixels on the background image (pixels 1730 and 1734) to determine if those pixels and their corresponding pairs (1736 and 1740) from the silhouette image 1726 will be included in the calculation of the minimum function. In this example, only one pixel pair will be included in the calculations. Pixel pair 1730/1736 will not be included, because pixel 1730 (on the background image) is a masked pixel. The background image mask at 1742 has masked pixel 1730 as it represents an anomaly (such as a speck of dirt). Pixel pair 1732-1738 also will not be included in the minimum calculation, because pixel 1738 (on the silhouette image) is a masked pixel. The silhouette image mask at 1744 has masked pixel 1738 that represents a pixel from the object. Pixel pair 1734/1740, on the other hand, will be included in the minimum calculation, because neither pixel is masked.

Following the above described technique, the coefficient processing module 1656's examines each unmasked pixel in the background image. If it can be paired with a corresponding pixel in the initial silhouette image the intensity values for the pixel and its pair are used to solve the minimum function. It is noted that there are many different techniques and software packages available for solving an equation for minimum values and statistical deviation.

3. Background Subtraction (Alternative Embodiment)

With the coefficients k and S and the standard deviation $\sigma$ determined, the background subtraction module 1658 processes the pixels in each silhouette image, comparing them to corresponding pixels in the background image to locate to an accurate approximation those pixels that describe the object. The background subtraction module 1658 broadly separates the pixels that describe the object from the pixels that describe the background by creating a separate silhouette mask image for each input silhouette image. In the silhouette mask image, the pixels describing the background are assigned one value (such as the RGB color white) and the pixels describing the object are assigned another value (such as the RGB color black). After further processing (such as clusterization and polygonal shape recognition described below) the final group of pixels is written and stored in a file.

Figure 50:
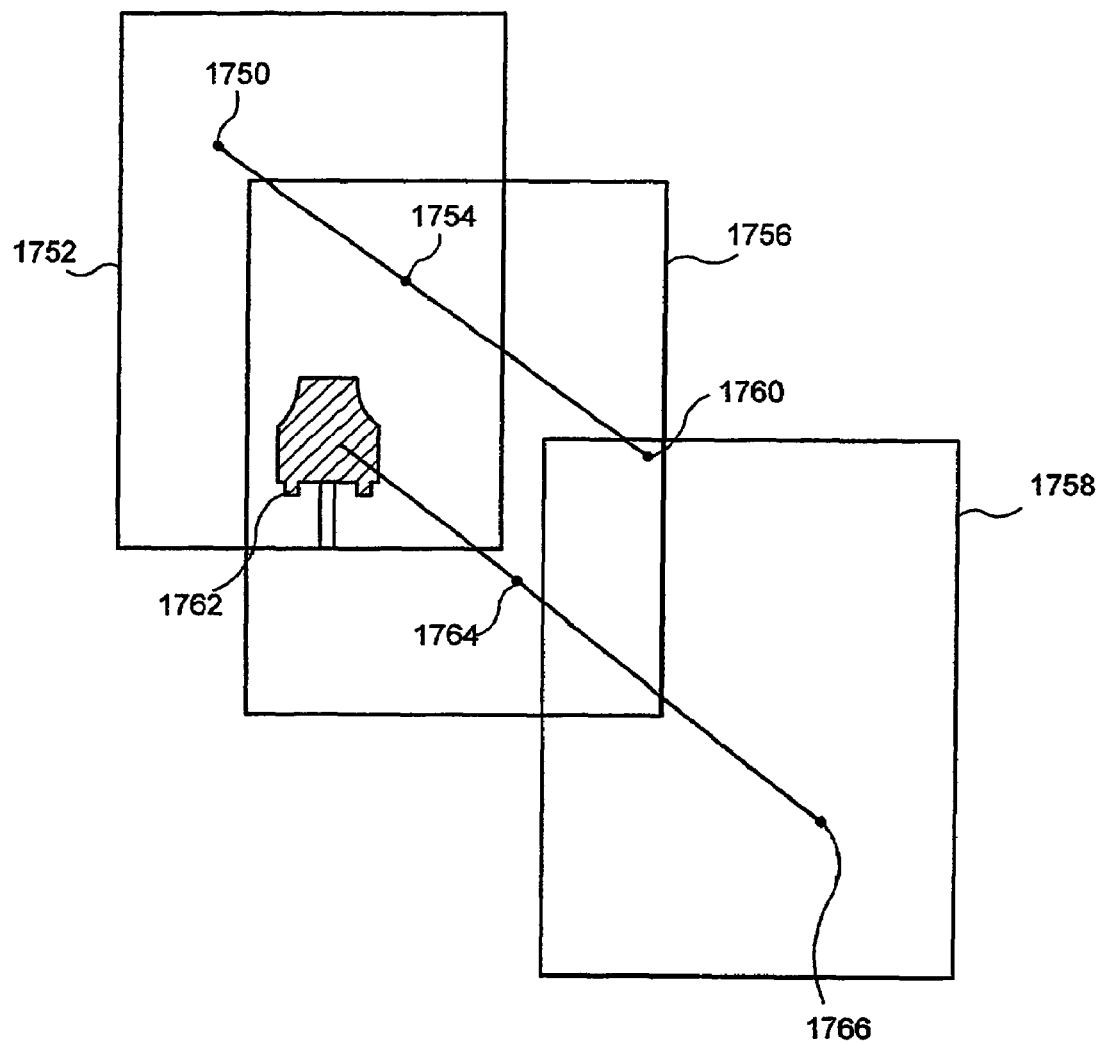
FIG. 50 depicts a comparison of pixels in a given silhouette image by the background subtraction module of the alternative embodiment.

To locate the object-descriptive pixels in a given silhouette image, the background subtraction module 1658 executes a procedure to compare each pixel in the silhouette image. Such a comparison is represented in FIG. 50. In that figure, the background subtraction module 1658 examines a pixel 1750 of a silhouette image 1752 to determine whether it describes the object or the background. To make this determination, the background subtraction module 1658 obtains the intensity value for the pixel in question (pixel 1750) and it also obtains the intensity value for the corresponding pixel (pixel 1754) in the background image (depicted as 1756). Having obtained a silhouette image and a background intensity value for the pixel in question, the background subtraction module 1658 then "subtracts" the silhouette intensity value from the background intensity value according to a deterministic formula which adjusts for such factors as the varying intensities of the background lighting. In the exemplary embodiment, the process compares the intensity values according to the following formula:

$$bg_i \cdot k + S - obj_i - 3 \cdot \sigma$$

where k, S and $\sigma$ are the coefficients determined above, $bg_i$ is the intensity value (0-255) of each background pixel used and $obj_i$ represents the intensity value (0-255) of each pixel used in the silhouette image being processed. If the result of the equation is a value that is less than zero, then the pixel on the silhouette image is thought to be one that describes the object because the pixel in the silhouette is darker than its counterpart in the background image. If the result of the equation is a value that is greater than or equal to zero, then the pixel on the silhouette image is thought to be one that describes the background. Based on the result of the equation; the background subtraction module 1658 then places a value in a new image frame, the silhouette mask image (e.g. 1603), in the corresponding location of that pixel. If the result is greater than or equal to zero, the background subtraction module 1658 places a value (such as the RGB assignment for the color white) in the location for the pixel in question to indicate that the pixel describes the background. In FIG. 50 an indication such as "W" is placed in a frame for the silhouette mask image 1758 at the location (1760) corresponding to the silhouette pixel in question. In the example, the "W" indicates an RGB color assignment for white, as the pixel comparison for pixels 1750 and 1754 returned a result that was greater than zero. However, in FIG. 50 the background subtraction module 1658 also compares silhouette image pixel 1762 with its background image counterpart, pixel 1764. In the comparison of the intensity values for those pixels, the equation above yielded a result that was less than zero, thus, the background subtraction module 1658 will place an indication such as "B" (for black) in the frame for the silhouette mask image 1758 at location 1766.

The background subtraction module 1658 processes each pixel in a given silhouette image and in turn processes each silhouette image in the same manner. Thus, for each silhouette image the background subtraction module 1658 creates a separate image frame containing the B/W indications of the silhouette image mask.

4. Processing of Silhouettes for Clusters and Polygonal Geometry

Before the silhouette mask images are stored in a file, each is subject to further processing. As artifacts may still appear in the silhouette mask images, the small cluster removal module 1660 (see FIG. 44) attempts to remove small clusters of pixels that are not part of the larger object. Included as part of the small cluster removal module 1660, a clusterization submodule 1662 establishes connectivity between like pixels in the silhouette mask image and groups each discrete region of foreground and background pixels into clusters and stores data on the number of pixels that are part of each cluster. A small cluster removal submodule 1664 then removes the small clusters. In the exemplary embodiment, clusters of less than e.g. 100 pixels are removed from the image.

FIG. 51 depicts an exemplary silhouette image mask 1770 and identifies a number of cluster areas with in the image. A first cluster group 1772 represents all dark colored "object" pixels which form the silhouette of the object. However, within that mass there is a second cluster 1774 of light colored "background" pixels which show a hole in the object for the open car window. A third cluster group 1776 represents a group of pixels which have been identified by the background subtraction module 1658 as light colored "background" pixels, but in truth those pixels process as white because of an anomaly (such as glare from the lens). Another cluster group is seen at 1778; it also represents an anomaly. A fifth cluster group in FIG. 51 is the large set of light colored "background" pixels 1780 which surround the object cluster 1772 and anomaly cluster 1778. The clusterization submodule 1662 of the present invention processes the pixels of the image to associate them within one cluster group. Thereafter, the small cluster removal submodule 1664 will alter the silhouette mask image and "remove" those clusters which are determined to be "small."

Figure 52:
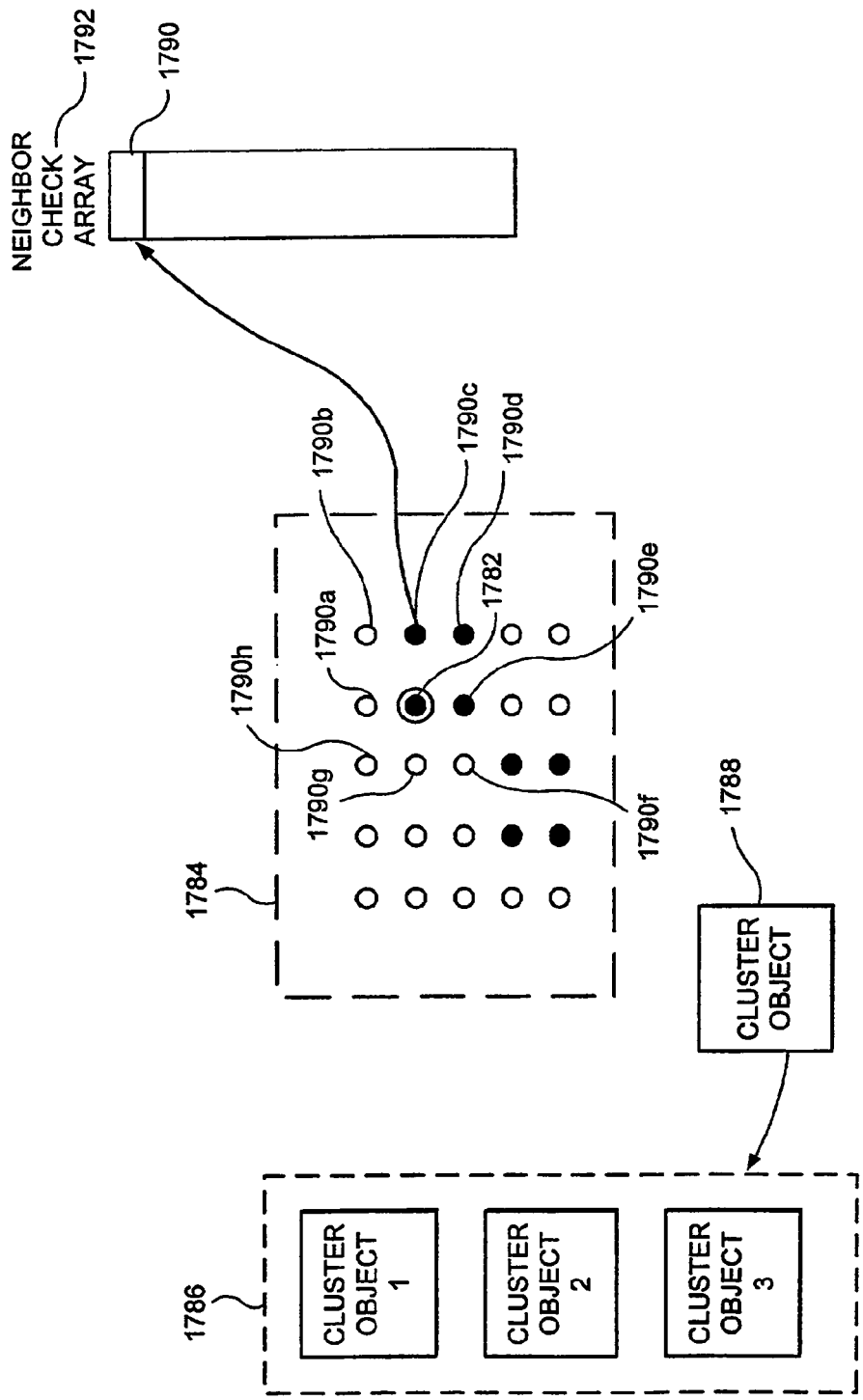
FIG. 52 provides a representation of the steps of a clusterization process of the alternative embodiment of the present invention.

FIG. 52 provides a representation of the steps of a clusterization process of the present invention. In such an exemplary embodiment, the clusterization module 1662 begins the processing for a given pixel 1782 (such as a dark colored "object" pixel) within a section of an exemplary silhouette mask image 1784 and checks to determine if the pixel 1782 has not already been associated with an existing cluster. In the exemplary embodiment each cluster (when discovered by the module) is represented as a C++ defined object. The cluster objects of the present invention contain an array for maintaining a list of associated vertices, an indication of whether the cluster is for "object" or "background" pixels and also an accessor function (e.g. boolean in Cluster(Pixel p)) which returns either true or false depending on whether the pixel is already found and identified as being part of the cluster. FIG. 52 shows at 1786 those cluster objects which have been created thus far in the processing. Assume for purposes of this example that pixel 1782 is not in any of the clusters that have been identified so far in processing.

If no existing cluster contains the pixel in question, the clusterization module 1662 creates a new cluster object 1788 and sets this new cluster as one for "object" pixels. Then the clusterization module 1662 then adds the location of pixel 1782 to the list of pixels that are associated with this cluster (and increments a counter to count this pixel as the first pixel). The clusterization module 1662 also adds this cluster object 1788 to the list of existing clusters 1786. Thus, a new cluster is found.

Then the clusterization module 1662 executes a procedure to determine whether each of the neighboring pixels should belong to this new cluster. Starting from the location of the first pixel, pixel 1782, the clusterization module 1662 moves in a clockwise or counterclockwise direction (e.g. counterclockwise in the exemplary embodiment) to each of the pixels that are adjacent to that pixel (e.g. pixels 1790*a-h*). For each of these neighboring pixels (1790*a-h*) the clusterization module 1662 determines whether that neighboring pixel should be included within the current cluster. (In the exemplary embodiment where a given pixel is a neighbor to a pixel that is opposite to its own color, that pixel can also be designated as a "border" pixel, i.e. a pixel that describes the contour outline of the silhouette. For example, pixel 790*c* should be included in the cluster because it is also a dark colored "object" pixel and pixel 1790*a* should not be included in the cluster because it is a light colored "background" pixel.

For each neighboring pixel that should be associated with the cluster, the clusterization module 1662 adds the location of the pixel in question (e.g., the location of pixel 1790*d*) to the list of pixels that are associated with this cluster and increments a counter to count this pixel as part of the total number of pixels in the cluster. The clusterization module 1662 also adds the location of this new neighboring pixel to a list of cluster pixels, the neighbors of which will also be checked to see if they belong to the cluster (and have not already been included). In FIG. 52, pixel 1790*c* is added to a representative neighbor check array 1792. For each of the pixels listed on the neighbor check array 1792, the clusterization module 1662 executes the procedure described above to determine whether each of the neighboring pixels of those neighbors that should belong to this new cluster (and have not already been added) are in fact added. When the neighbor list is exhausted, all of the pixels belonging to the cluster have been identified. For the clusterization module 1662 there are a number of techniques that are currently available for identifying the pixels in an image with cluster groups.

After clusterization, the small cluster removal submodule 1664 works to remove small clusters. In the exemplary embodiment, this process 1664 examines each of the cluster objects created by the clusterization module 1662 and, if the number of pixels associated with that cluster is below a predetermined threshold (e.g. 100 pixels), the small cluster removal submodule 1664 will reverse the color assignment for each of the pixels in that cluster. If the pixels of the small cluster in question were originally darkly colored "object" pixels, the small cluster removal submodule 1664 will set those pixels to be light colored "background" pixels (and thus remove or "kill" the small cluster). If the pixels of the small cluster in question were originally light colored "background" pixels, the small cluster removal submodule 1664 will set those pixels to be dark colored "object" pixels.

Figure 53:
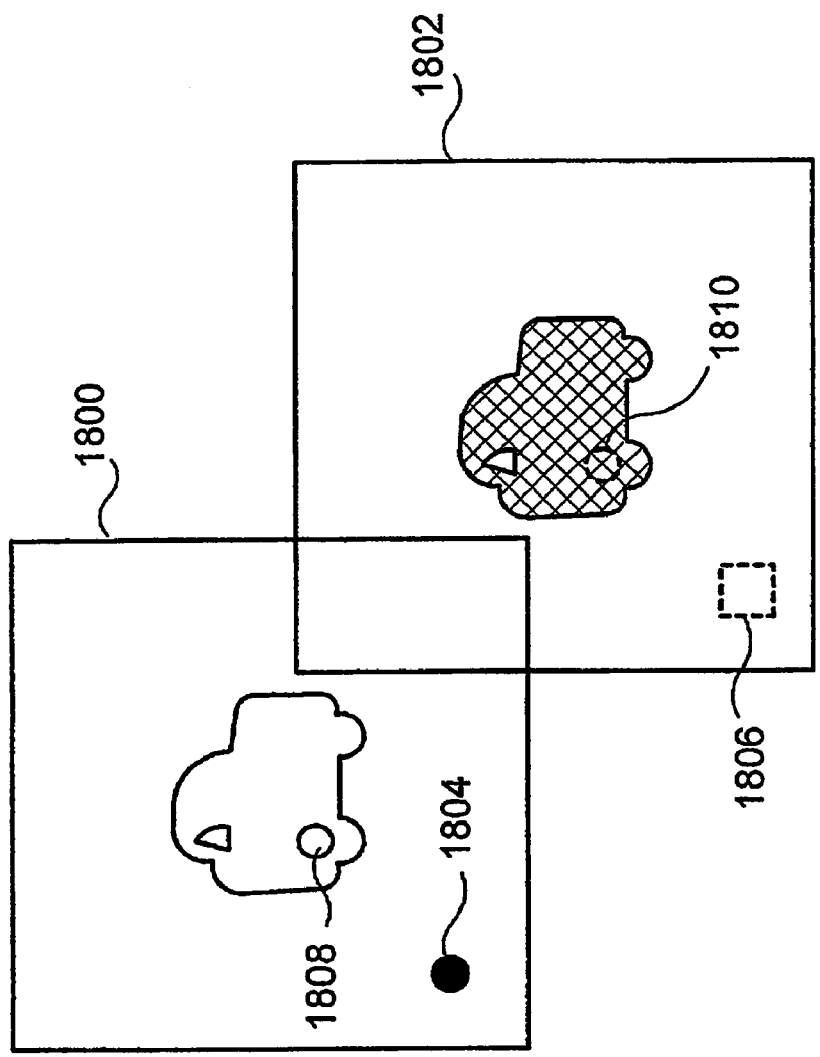
FIG. 53 presents a graphic representation of the process of the clusterization process of the alternative embodiment of the present invention; this module 164.

FIG. 53 presents a graphic representation of the process of the small cluster removal submodule 1664. A silhouette masking image is depicted—both before small cluster removal at 1800 and after small cluster removal at 1802. The silhouette masking image at 1800 (before removal) shows a number of clusters. One cluster, 1804, is a small cluster (containing less than 100 pixels) that is colored as dark "object" pixels, even though, in reality, it describes an anomaly. After the processing of the small cluster removal submodule 1664 the pixels of that cluster 1804 have been set to the light colored "background" pixels and are thus removed as can be seen at 1806. Another cluster, 1808, is a small cluster (containing less than 100 pixels) that is colored as light "background" pixels, even though, in reality, it describes an anomaly. After the processing of the small cluster removal submodule 1664, the pixels of that cluster 1808 have been set to the dark colored "object" pixels and are thus altered as can be seen at 1810.

5. Building a Polygonal Shape from the Pixel Data in the Silhouette Mask Image

After small cluster removal, the polygonal shape building module 1668 builds a polygonal shape out of the boundaries of the remaining clusters. It also calculates 3D X, Y, Z coordinates for each of the vertices that it identifies. For the polygonal shape building module 1668, there are a number of techniques that are currently available for determining a polygonal shape.

Figure 54A:
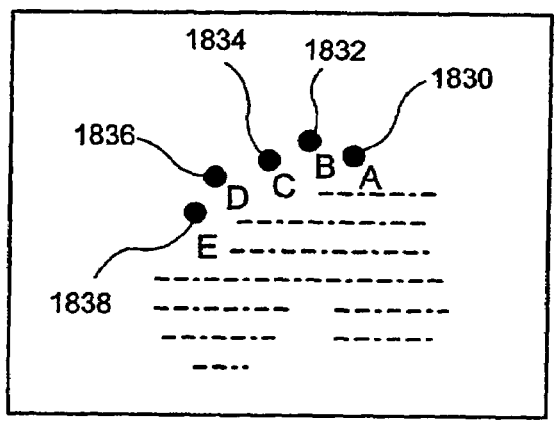
FIGS. 54a-d depicts the progression of the polygonal shape module in the alternative embodiment as it proceeds along the boarder pixels of an exemplary silhouette mask image.

In the exemplary embodiment, the polygonal shape building module 1668 of the present invention uses a technique which proceeds in a direction (e.g. clockwise or counterclockwise), examining the pixels along the border of the image to determine whether they should be included as a vertex in the polygon. The procedure uses a threshold value E (epsilon) to determine the significance of each border point and determine whether it should be included as a vertex in the polygon. FIGS. 54*a-d* depict the progression of the polygonal shape building module 1668 as it proceeds (in a counterclockwise direction) along the border pixels of an exemplary silhouette mask image. As stated above, a border pixel within a cluster is a pixel for which one of its adjacent neighbors has a color setting that is opposite to that of its other neighbors. During the clusterization process, it is possible to identify those pixels of a given cluster that are border pixels. The polygonal shape building module 1668 processes those border pixels moving in a direction (e.g., counterclockwise) around the border. FIG. 54*a* shows a silhouette mask image including border pixels 1830 (pixel A), 1832 (pixel B), 1834 (pixel C), 1836 (pixel D) and 1838 (pixel E).

Figure 54B:
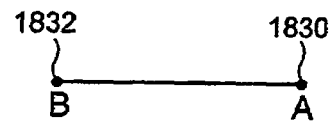

In FIG. 54*b* the polygonal shape building module 1668 begins processing at pixel A (1830). In the exemplary embodiment the polygonal shape is represented as a C++ defined object. The C++ class defines the polygonal object as having an array (an ordered list) which lists the vertices of the polygon (in a counterclockwise order). The polygonal shape building module 1668 adds pixel A (1830) to the list of vertices of the polygon and retrieves (from the cluster list determined above) the next border point, pixel B (1832). As there is no current edge from point A (1830) the polygon shape building module 1668 draws an initial edge starting at pixel A (1830) and having its current end point at pixel B (1832). This edge is considered a temporary edge, subject to change as the polygonal shape building module 1668 examines additional border points.

Figure 54C:
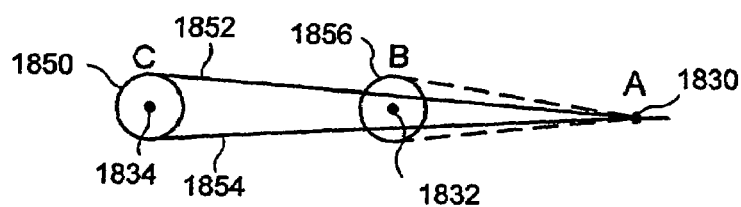

In FIG. 54*c* the polygonal shape building module 1668 examines the next border point, pixel C (1834). At this juncture the polygon shape building module 1668 must determine whether the line segment from pixel A (1830) should have its end point at pixel B (1832) as determined above or the end point should be moved to pixel C (1834). To make this determination the polygon shape building module 1668 calculates a circle 1850 having radius E about the new point C and it further calculates two tangent lines 1852 and 1854 beginning at point A and intersecting circle 1850 to form a cone shape. Then the polygonal shape building module 1668 calculates a second circle 1856 having a radius E about pixel B (1832). The polygonal shape building module 1668 then determines whether the lines 1852 and 1854 intersect the circle 1856. If so, then it is determined that point B (1832) is not significant to the shape of the polygon and it is possible to construct an edge from pixel A (1830) to pixel C (1834) and omit pixel B (1832). The line segment AC becomes the current segment from pixel A.

Figure 54D:
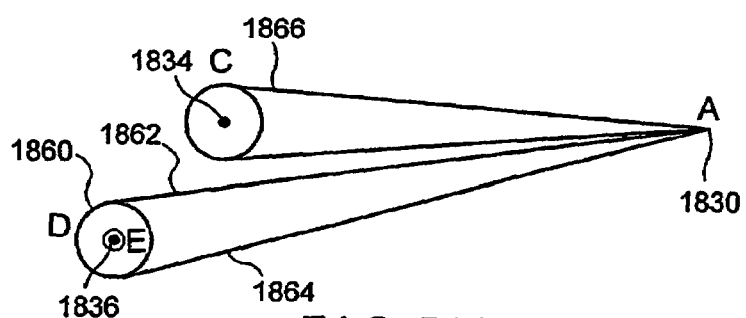

In FIG. 54*d* the polygonal shape building module 1668 examines the next border point, pixel D (1836). At this juncture the polygonal shape building module 1668 must determine whether the line segment from pixel A (1830) should have its end point at pixel C (1834) as determined above or the end point should be moved to pixel D (1836). To make this determination the polygonal shape building module 1668 again calculates a circle 1860 having radius E about the new point D (1836) and it further calculates two tangent lines 1862 and 1864 beginning at point A (1830) and an intersecting circle 1860 to form a cone shape. Then the polygonal shape building module 1668 calculates a second circle 1866 having a radius E about pixel C (1834). The polygonal shape building module 1668 then determines whether the lines 1862 and 1864 intersect the circle 1866.

In this case (FIG. 54*d*), the lines do not intersect, thus it is determined that pixel C (1834) is significant to the polygonal shape. Accordingly, the polygonal shape building module 1668 adds pixel C to the list of vertices in the polygonal object. Further the polygonal shape building module 1668 moves to point C and then begin the process to determine an endpoint for a line segment beginning at this new point. The polygonal shape building module 1668 retrieves (from the cluster list determined above) the next border point, pixel D (1836). As there is no current edge from point C (1834) the polygonal shape building module 1668 draws an initial edge starting at pixel C (1834) and having its current end point at pixel D (1836). This edge is considered a temporary edge.

Figure 55:
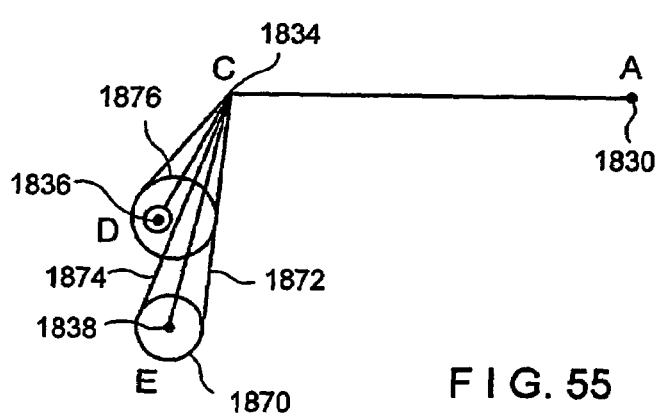
FIG. 55 depicts the function of the polygon shape module in the alternative embodiments as its further examines the boarder points of a point cluster.

In FIG. 55 the polygonal shape building module 1668 examines the next border point, pixel E (1838). At this juncture the polygonal shape building module 1668 must determine whether the line segment from pixel C (1834) should have its end point at pixel D (1836) as determined above or the end point should be moved to pixel E (1838). To make this determination the polygonal shape building module 1668 calculates a circle 1870 having radius E about the new point E (1838) and it further calculates two tangent lines 1872 and 1874 beginning at point C (1834) and intersecting circle 1870 to form a cone shape. Then, the polygonal shape building module 1668 calculates a second circle 1876 having radius E about pixel D (1836). The polygonal shape building module 1668 then determines whether the lines 1872 and 1874 intersect the circle 1876. If so, then it is determined that point D (1836) is not significant to the shape of the polygon and it is possible to construct the edge from pixel C (1834) to pixel E (1838) and omit pixel D (1836). The line segment CE becomes the current segment from pixel C.

This process continues for each of the border points until the last border point is examined and a line segment is connected again to pixel A (1830). After such processing the polygon object will contain a list of vertex points for the polygon that are ordered in a counterclockwise direction.

6. Generating 3D Coordinates (Alternative Embodiment)

Once the polygonal shape building module 1668 has generated vertices for each object-related shape in a silhouette mask image, the 3D coordinate module 1670 determines a 3D X, Y, Z real world spatial coordinate for each of those vertices. This module also associates those 3D coordinates with each vertex of the polygon so that for each vertex of the polygon, the procedure stores the values of the X, Y, Z coordinates as well as the x, y location of the vertex in the silhouette mask image object (e.g. 1604).

In the exemplary embodiment, the 3D coordinate module 1670 of the present invention determines 3D coordinates by a triangulation process. An example of a similar triangulation process is described in U.S. Pat. No. 6,044,170, the entire disclosure of which is expressly incorporated herein by reference.

To calculate X, Y, Z coordinates, the 3D coordinate module 1670 uses values for the focal length L of the camera 2 (FIG. 1) and the rotating turntable 6's axis of rotation. A method for determining the focal length and other calibration parameters are described in, for example, U.S. Pat. No. 5,991,437, the entire disclosure of which is expressly incorporated herein by reference.

7. Writing Data to a File

After the processes of the polygonal shape building module 1668 and the 3D coordinate module 1670, the system of the present invention outputs the data concerning each polygon to a file and stores it for subsequent processing.

The silhouette processing module 1602, with its related background masking module 1652, initial silhouette processing module 1654, coefficient processing module 1656, background subtraction module 1658, small cluster removal module 1660, polygonal shape building module 1668 and 3D coordinate module 1670, continues processing as describe above for each silhouette image. Thus, upon completion of the silhouette processing module 1602, there will be a file (containing polygon and 3D coordinate information) that corresponds to each silhouette image. Each of the silhouette images is processed in the manner described until there is a silhouette mask image that corresponds to each of the silhouette images.

B. Combining the Silhouette Polygons to Construct the 3D Model (Alternative)

Referring again to FIG. 43, the 3D model building application 1600 of the present invention includes the 3D construction module 1606 which creates a three-dimensional model of the object 4 using the information contained in the plurality of silhouette mask images. It is noted that in this alternative embodiment of the present invention, the 3D construction module 1606 uses an analytic approach to determine the 3D model based on the silhouette data; the 3D construction module 1606 finds the areas of intersection of the silhouette outlines and by these intersections determines the three dimensional boundaries of the object 4.

FIG. 56 presents a diagram of the computer programmed elements of the 3D construction module 1606 of the present invention in the alternative embodiment. An initial 3D object building module 1902 (which uses a maximum length determination module 1904) creates from one of the silhouette images processed above an initial (rough) 3D model 1906 to represent the object 4 (which will be, through later processing, transformed into a refined 3D polygonal model 1608, see also FIG. 43, and thereafter into a final triangulated 3D mesh model 1612, see FIG. 43). The initial (rough) 3D model 1906 (and all subsequent refinements of that model which transform it into the 3D polygonal model 1608) includes for information storage a data structure 1910 (containing face information) and a list of vertices 1912 that make up the model of the object 4. Using these data structures, the system can output and manipulate images of the 3D polygonal model 1608.

A refining module 1916 (which uses a number of procedures, 1918-1924) processes the remaining silhouette images to further refine the initial (rough) 3D model 1906. The 3D polygonal model 1608 that results from this refinement procedure consists of a series of interconnected polygonal faces. It is not guaranteed that at the end of this procedure each face will be a triangle. Instead, it is more likely that each face will be a polygon having more vertices than three. As noted above, the mesh triangulation module 1610 (see also, FIG. 43) further refines the 3D polygonal model 1608 to further transform it such that each face of the mesh has only three vertices and is in fact a triangle.

A texture map module 1614 (see also FIG. 43) selects a specific image from the group of available texture map images to associate the vertices of a given face of the 3D polygonal model 1608 to selected points within the texture map images. Thus, for each vertex in the list of vertices 1912 of the data structure of the 3D mesh model there will be a 3D X, Y, Z coordinate (providing a real-world three dimensional location for the point in space) and also a 2D x, y coordinate (providing a corresponding location on a selected texture map image). Each of these programmed elements is now described in further detail.

1. Constructing the Rough 3D Model (Initial State)

Figure 57:
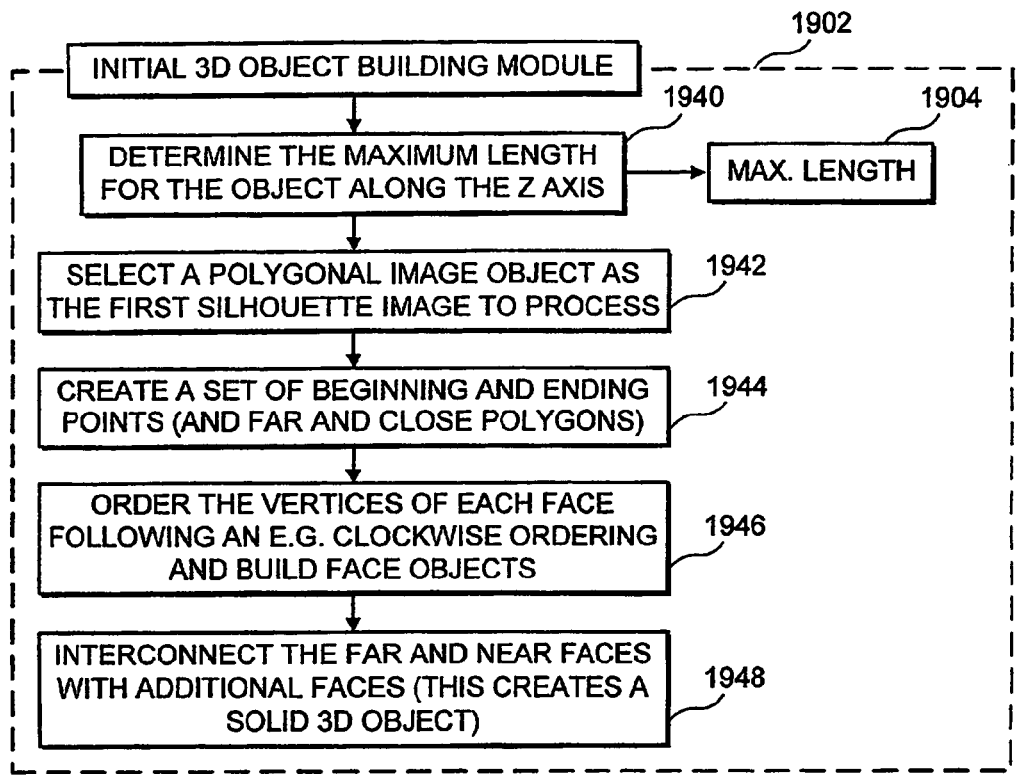
FIG. 57 depicts an exemplary process flow diagram for the initial 3D object building module in the alternative embodiment of the present invention.

As noted above, the initial 3D object building module 1902 creates from one of the silhouette images (processed above) the initial (rough) 3D model 1906 to represent the object 4. FIG. 57 depicts an exemplary process flow diagram for the initial 3D object building module 1902 of the present invention in the alternative embodiment.

In step 1940 the initial 3D object building module 1902 begins the building process by determining a value L which represents the maximum possible length of the object along the Z axis. Step 1940 calls the maximum length determination module 1904—that module 1904 determines the L value based on the calibration parameters. In determining the L value, it is observed that since the object 4 was rotated 360 degrees on the rotating turntable 6, the object's size cannot exceed twice the distance from the center of rotation to the camera (otherwise the object would have hit the camera during rotation). Thus, the object 4, at the most, could not have a maximum length that is more than two times the distance from the axis of rotation 8 to the focal point of the camera 2.

Using parameters (obtained during the calibration procedure 1605 (FIG. 43)), the system calculates a distance value D which represents the distance from the focal point of the camera 2 to the axis of rotation 8 of the rotating turntable 6. In the calibration procedure 1605, the system of the present invention uses a fitting procedure to calibrate the focal length. As part of the fitting procedure, the system of the present invention solves a system of simultaneous equations to find the parameters that best solve the set of triangulation equations for a given shape (such as a square on a checkerboard) whose dimensions are known. One of the lengths in the triangulation equation solving process is the length from the focal point to the shape on the calibration object (which is close to the axis of rotation). In the calibration procedure 1605, the system of the present invention also rotates the calibration shape a known amount, such as 90 degrees. Using these parameters it is possible to find the center of the axis of rotation 8. The maximum length value L is 2 times the value D (L=2*D).

After step 1940, the initial 3D object building module 1902 proceeds to step 1942 to select one of the polygonal silhouette image objects (created with the silhouette processing module 1602). The initial 3D object building module 1902 creates the initial (rough) 3D model 1906 with this polygon silhouette data object. It is noted that the initial (rough) 3D model 1906 can be constructed using any one of the polygonal silhouette images. For purposes of the exemplary alternative embodiment, the initial 3D object building module 1902 selects the first polygon silhouette that was captured.

Figure 58:
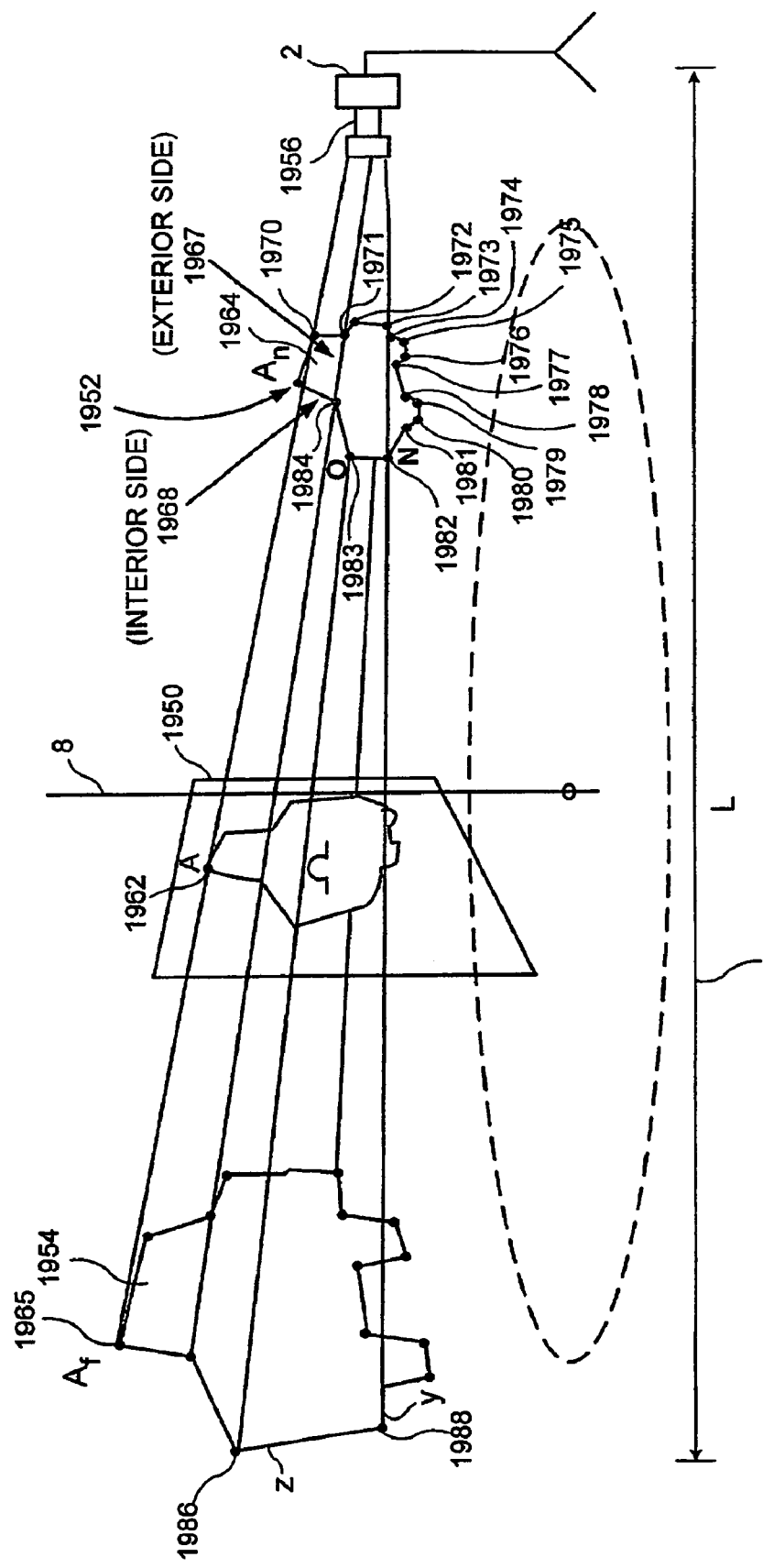
FIG. 58 depicts a 2D projection of a polygon silhouette and also shows images of the near and far polygon faces created by the projection process of the alternative embodiment of the present invention.

With an initial polygonal silhouette image identified, the initial 3D object building module 1902 proceeds in step 1944 to determine the points of a conical projection of the selected polygon silhouette and from this projection determines "near" and "far" polygon faces that will serve as the first two faces of the initial 3D model. FIG. 58 depicts a 2D projection of a polygon silhouette 1950 and also shows images of the near and far polygon faces (1952 and 1954, respectively) created by conical projection. In FIG. 58, the contour occupied by the silhouette is shown as Ω. In the present invention, it is observed that an entire space for the object 4 can be bounded in space in a cone which projects from the focal point 1956 of the camera 2 through the points of the polygon silhouette 1950. The beginning and end of the cone can be cropped—the area of the cone that bounds the object 4 will be within a circle 1958 having its center point at the axis of rotation 8 (see also FIG. 1) and a diameter of length L (determined above).

Referring again to FIG. 57, in step 1944 the initial 3D object building module 1902 executes a procedure (e.g. a loop) to examine each point of the selected polygon silhouette (e.g. silhouette 1950, FIG. 58) and for each such point determines a corresponding point for the near and far faces. For example and referring to the image in FIG. 58, the initial 3D object building module 1902 computes an equation for the line from the 3D X, Y, Z location of the focal point 1956 to the 3D location of one of the points (e.g. point A 1962) of the polygon silhouette 1950. Based on that equation, the initial 3D object building module 1902 computes corresponding 3D X, Y, Z points for the near face (e.g. point A(n) 1964 and point A(f) 1965). The initial 3D object building module 1902 continues in this fashion to compute near and far point locations corresponding to each of the points of the polygon silhouette 1950.

Continuing in step 1944 of FIG. 57, the initial 3D object building module 1902 adds the 3D X, Y, Z values for each computed near and far face vertex onto the list of vertices 1912 (of FIG. 56). The initial 3D object building module 1902 next proceeds in step 1946 to build a face object for each of the near and far faces. In the exemplary embodiment, a face object includes data structures (e.g. arrays) to hold information concerning the face's vertices and also other faces of the object which are "neighbors" to the current face (and as such share an edge with the current face). In the exemplary embodiment the vertices of each face are stored in an order (e.g clockwise).

The ordering of the vertices gives each face an "exterior" and "interior" side. This ordering enables later processes of the present invention to determine whether a given face is being viewed/and or evaluated from the exterior or interior of the object. In the exemplary embodiment, the system of the present invention orders the vertices of each face in a clockwise direction where the clockwise direction represents a view of the face from its "exterior" side. For example, in FIG. 58 near polygon face 1952 has an exterior side 1967 and an interior side 1968. As viewed from exterior side 1967, the vertices of the near polygon face 1952 follow a clockwise direction around the perimeter of the face from vertex A(1964) to vertex B(1970) to vertex C(1971) to vertex D(1972) to vertex E(1973) to vertex F (1974) to vertex G(1975) to vertex H(1976) to vertex I(1977) to vertex J(1978) to vertex K(1979) to vertex L(1980) to vertex M(1981) to vertex N(1982) to vertex O(1983) to vertex P(1984).

In building the face object for this near face, the initial 3D object building module 1902 loads the face object with references to its vertices. The vertices follow the clockwise ordering (as described above) as if they were being viewed from that face's exterior. For the far face, the initial 3D object building module 1902 will also load its respective face object with references to its vertices and those vertices will also follow the clockwise ordering as if they were being viewed from that face's exterior. Following this procedure, an exemplary face object in the alternative embodiment includes the following data:

Face
vertices [ ] an array of n pointer to actual vertices on the vertex list where n is the number of vertices in the polygon (following a clockwise ordering as if the face was viewed from the exterior);
neighbors [ ] an array of n pointers providing references to those other face objects which are "neighbors" to the current face and thus share an edge with the current face. This array maintains an ordering of neighboring faces that corresponds to the ordering of the array "vertices[ ]" such that, e.g., neighbor[0] contains a reference to the face that shares the edge defined by vertices[0] and vertices[1]. (Initially, these references are set to null. References to neighboring faces are later created and linked as described below.)

Other data such as normal data for the vertices and the corners can also be stored in the face data object. To complete step 1946 of FIG. 57, the initial 3D object building module 1902 adds references to the newly created near and far face objects to the face list 1910 of the initial (rough) 3D model 1906.

In step 1948 of FIG. 57, the initial 3D object building module 1902 proceeds to build additional faces to enclose the space between the near and far faces. In this step, the initial 3D object building module 1902 begins a loop to process pairs of vertices from each of the near and far faces and creates a new face object that has as its vertices those four points. For example, referring to FIG. 58, the initial 3D object building module 1902 will process the pair of points creating edge N-O (points 1982 and 1983) from the near face and the pair of points creating edge Y-Z (points 1988 and 1986) from the far face to create a new face object. In this procedure, the initial 3D object building module 1902 creates a new face object and loads it with references to the four vertices. The loading procedure is performed as described above. The vertices follow the clockwise ordering (as described above) as if they were being viewed from the new face's exterior side. In the example of FIG. 58 the vertices of the new face would have the ordering (O-N-Y-Z).

In step 1948 of FIG. 57, the initial 3D object building module 1902 also makes links to associate the new face object to its neighboring faces (those faces which share an common edge with the new face). For example, in FIG. 58 after creating the new face object (O-N-Y-Z) the initial 3D object building module 1902 will make references in this new face object and also in the near and far faces to link the faces as neighbors. In the near face object, the initial 3D object building module 1902 places a reference to the new object in the neighbor array slot which corresponds to edge N-O. In the far face object, the initial 3D object building module 1902 places a reference to the new object in the neighbor array slot which corresponds to edge Y-Z. In the new face object, the initial 3D object building module 1902 places a reference to the far face object in the neighbor array slot which corresponds to edge Y-Z and a reference to the near face object in the neighbor array slot which corresponds to edge O-N.

Figure 59:
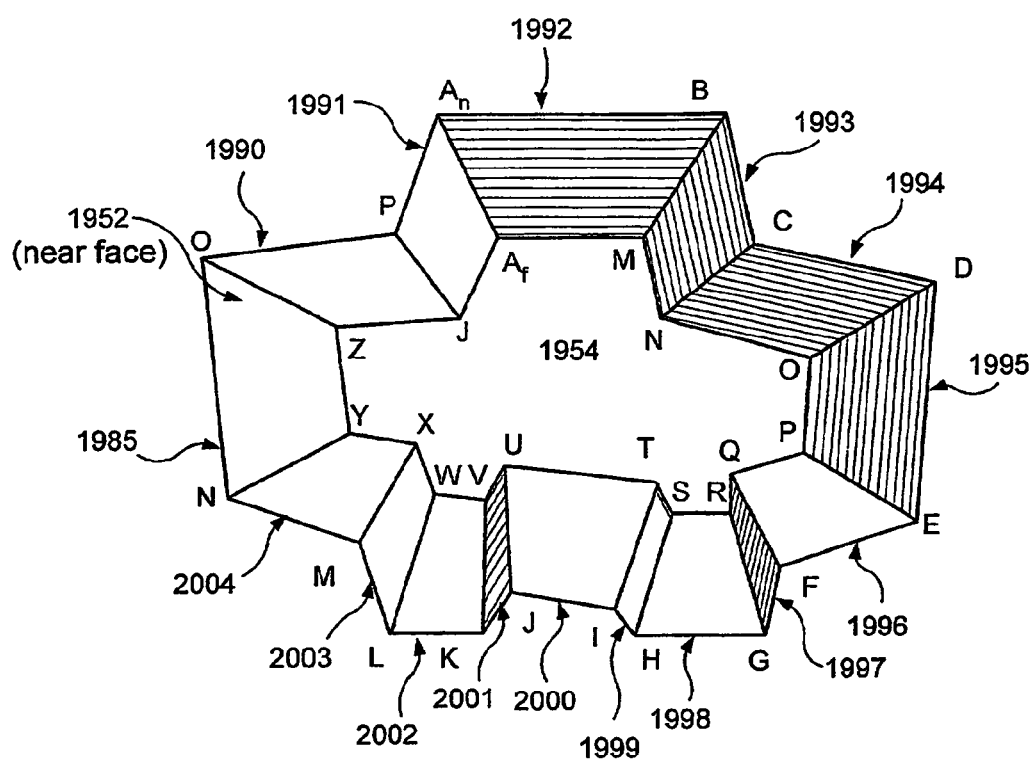
FIG. 59 depicts a second view of the near and far faces from an initial (rough) 3D model of the alternative embodiment of the present invention.

In step 1948, the initial 3D object building module 1902 continues processing as described above, creating additional faces for each point pair on each of the near and far faces. In the exemplary embodiment, the module 1902 moves clockwise around the near face (and at the same time counterclockwise around the far face) creating new faces. FIG. 59 depicts a second view of the near and far faces 1952 and 1954 showing face 1985 (described above) and a set of additional new faces 1990-2004. It is noted that as each additional face 1990-2004 is created, the initial 3D object building module 1902 will create associations to link that new face to that which was previously created. For example, after face 1990 is created, the initial 3D object building module 1902 creates a neighbor link between face 1990 and face 1985 along the edge that contains points O-Z in each of those faces. When the initial 3D object building module 1902 creates the final face (e.g., 2004), it creates neighbor links to both the most recently created face (e.g. 2003) and also the first face created (e.g. 1985).

After completing the process described above, the initial 3D object building module 1902 will have created an initial 3D model from a single silhouette image. It will be further refined with further processing of additional silhouette images as described below.

2. The 3D Refining Module (Alternative Embodiment)

Figures 60A, 60B:
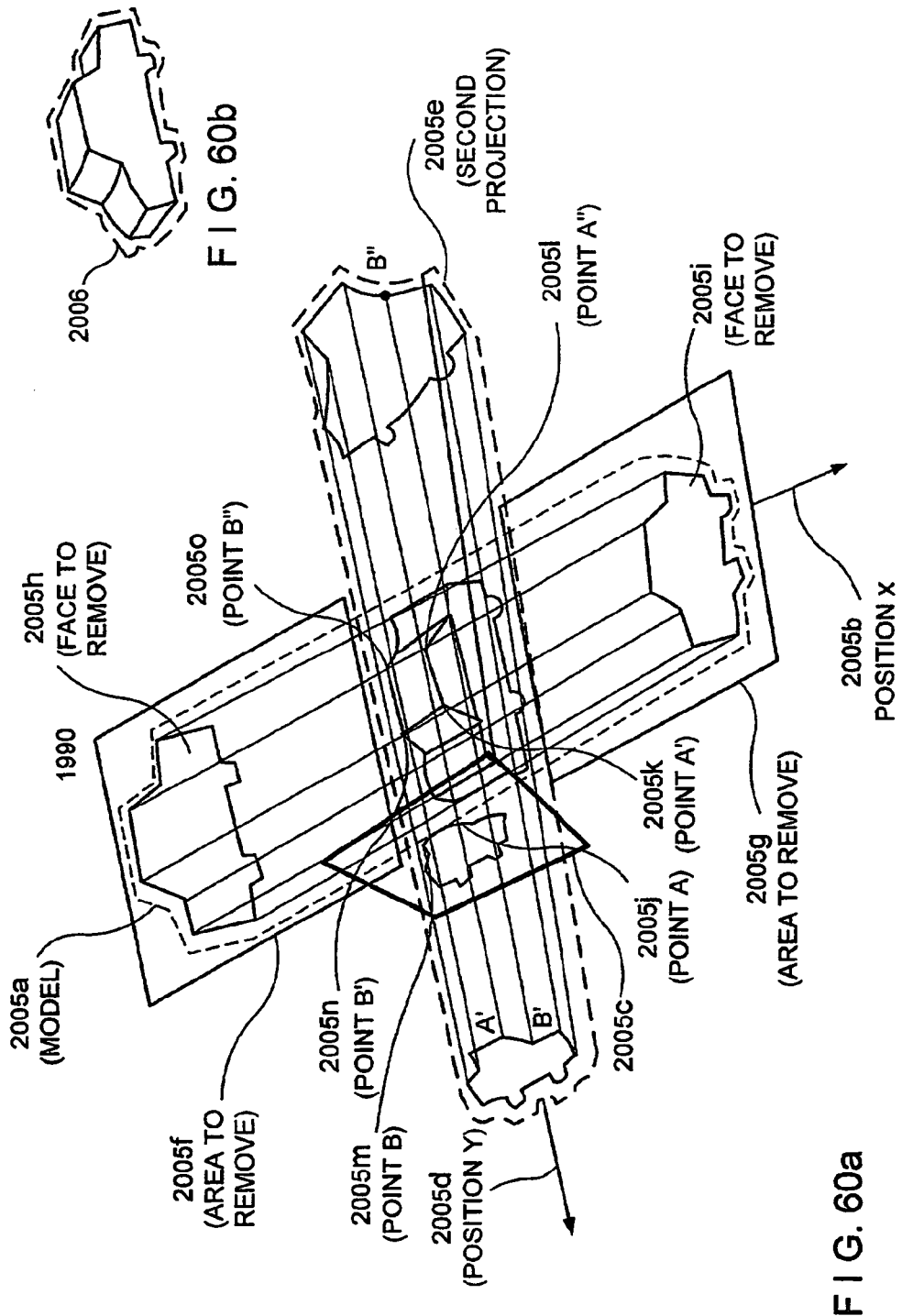
FIGS. 60a-60b provide a visual depiction of the process of refining the initial (rough) 3D model in the alternative embodiment of the present invention.

Referring back to FIG. 56, the 3D refining module 1916 processes the remaining silhouette images to strip excess area from the initial (rough) 3D model 1906 and shape that initial model into one that represents the 3D object. FIGS. 60*a* and 60*b* provide a visual depiction of the process of model refinement. FIG. 60*a* shows the initial (rough) 3D model at 2005*a*. It is noted that the 3D model was created using a silhouette captured by the camera 2 when the rotating turntable 6 was at position x (2005*b*). With the 3D refining module 1916, the system and method of the present invention processes additional silhouette images, such as silhouette image 2005*c*. As depicted in FIG. 60*a* this second silhouette image was captured by the camera 2 when the rotating turntable 6 was at position y (2005*d*). Because of the rotating turntable 6's positioning, it can be seen that each of the silhouette images captured by the camera 2 creates a set of views of the object 4 as if the camera 2 was rotated in a circle about the object 4.

To refine the initial (rough) 3D model (2005*a*) based on the second silhouette 2005*c*, the system and method of the present invention uses a procedure (described in further detail below) that in effect creates a second conical projection (using the second silhouette 2005*c*) and then projects that second conical projection through the initial (rough 3D) model (2005*a*). In FIG. 60*a*, conical projection 2005*e*, which was created from silhouette 2005*c*, is shown projected through the initial 3D (rough) model 2005*a*. The system and method of the present invention then refines the initial 3D model based on the points of intersection. For example, in FIG. 60*a*, the system and method of the present invention will clip areas 2005*f* and 2005*g* from the initial (rough) 3D model 2005*a*. As will be described in further detail below the system and method of the present invention adjusts the vertex coordinates of each current face of the 3D model (and also adds new faces as needed) so that areas 2005*f* and 2005*g* can be removed from the model. FIG. 60*b* depicts the initial (rough) 3D model (see 2006) after the refinement with silhouette 2005*c*. The 3D refining module 1916 of the present invention processes each of the remaining silhouette images in this fashion, using them to trim excess area from the initial (rough) 3D model (2005*a*).

In performing the process described above the system and method of the present invention in the alternative embodiment does not perform the calculations needed to trim in 3D. Instead, it is observed that computer processing time can be saved by using a two-dimensional projection of the 3D object in order to determine the points of intersection between the 3D model and the silhouette in question.

Figure 61:
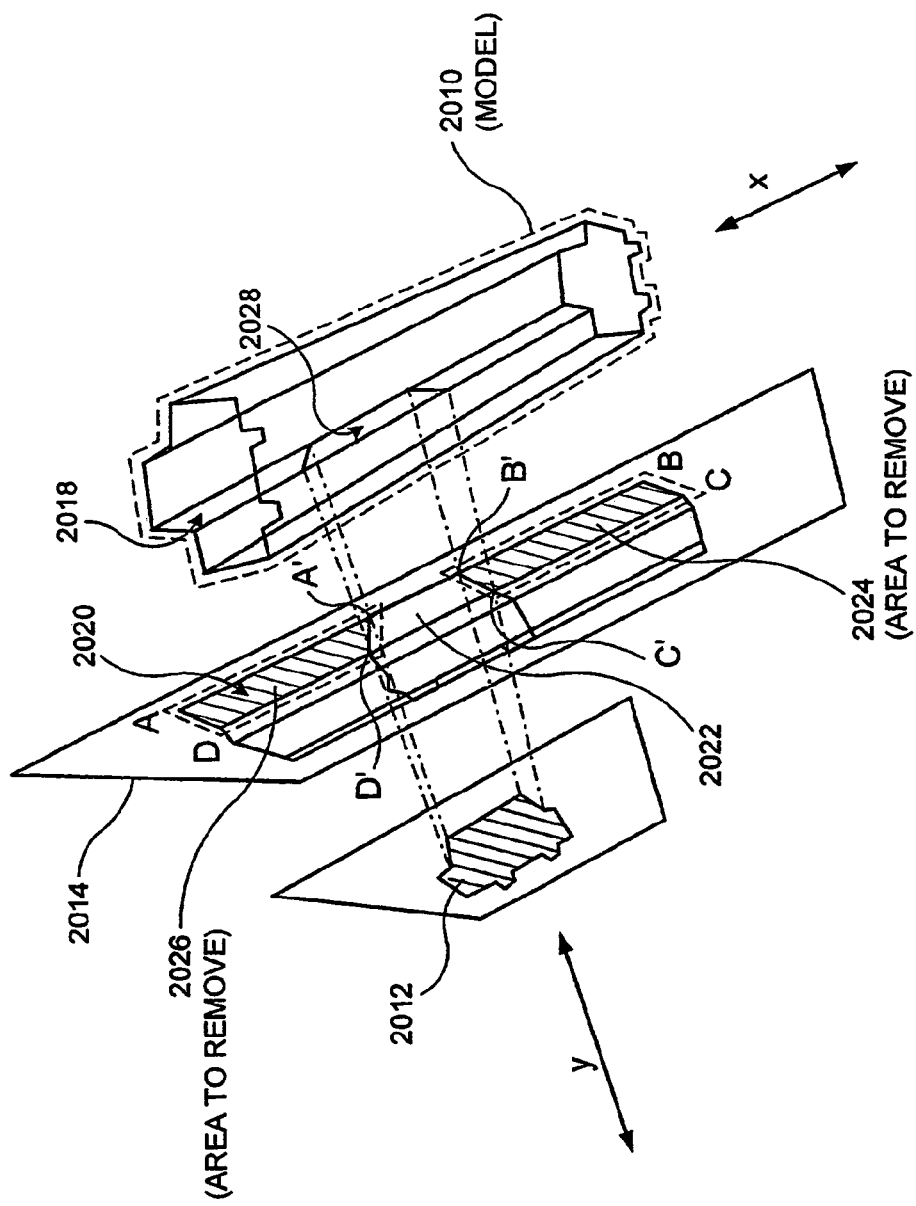
FIG. 61 provides a graphic representation of the use of a 2D projection in the object trimming process.

FIG. 61 provides a graphic representation of the use of a 2D projection in the object trimming process. In FIG. 61 the initial (rough) 3D model is depicted at 2010 and the silhouette used for the trimming process is depicted at 2012. A two-dimensional plane 2014 contains a 2D projection of the initial (rough) 3D model (2010). Each face of the initial (rough) 3D model (2010) is projected upon the two-dimensional plane 2014. The two-dimensional plane 2014 is parallel to the plane of silhouette 2012. Thus, the two-dimensional plane 2014 computes the projection of the faces of the 3D-model from the point of view of the silhouette 2012. The system and method of the present invention then intersects the points of the silhouette image 2012 with the faces of the initial (rough) 3D model (2010) that have been projected on the two-dimensional plane. Using the 2D x, y coordinates that are contained on the 2D plane 2014 for the silhouette image and each of the faces of the initial (rough) 3D model (2010), the system of the present invention in the alternative embodiment executes a process to refine the existing mesh faces.

For example in FIG. 61, the system and method of the present invention projects face 2018 from the initial (rough) 3D model 2010 on the two-dimensional plane at 2020. Face 2020, as projected, has points A, B, C and D. Silhouette image 2012 intersects projected face 2020 and the area of overlap is bounded by the shape 2022, having points A', B', C' and D'. Face 2020 is adjusted to reflect this overlap. The system removes areas 2024 and 2026. Then, when the face has been refined on the two-dimensional plane, the system generates new three-dimensional coordinates for the new face projection 2022. The 3D coordinates for this face will serve to update model face 2018. Face 2018 is thus revised after this procedure to become the smaller face 2028. As each of the faces are further processed, the entire 3D model will be so refined.

Figure 62:
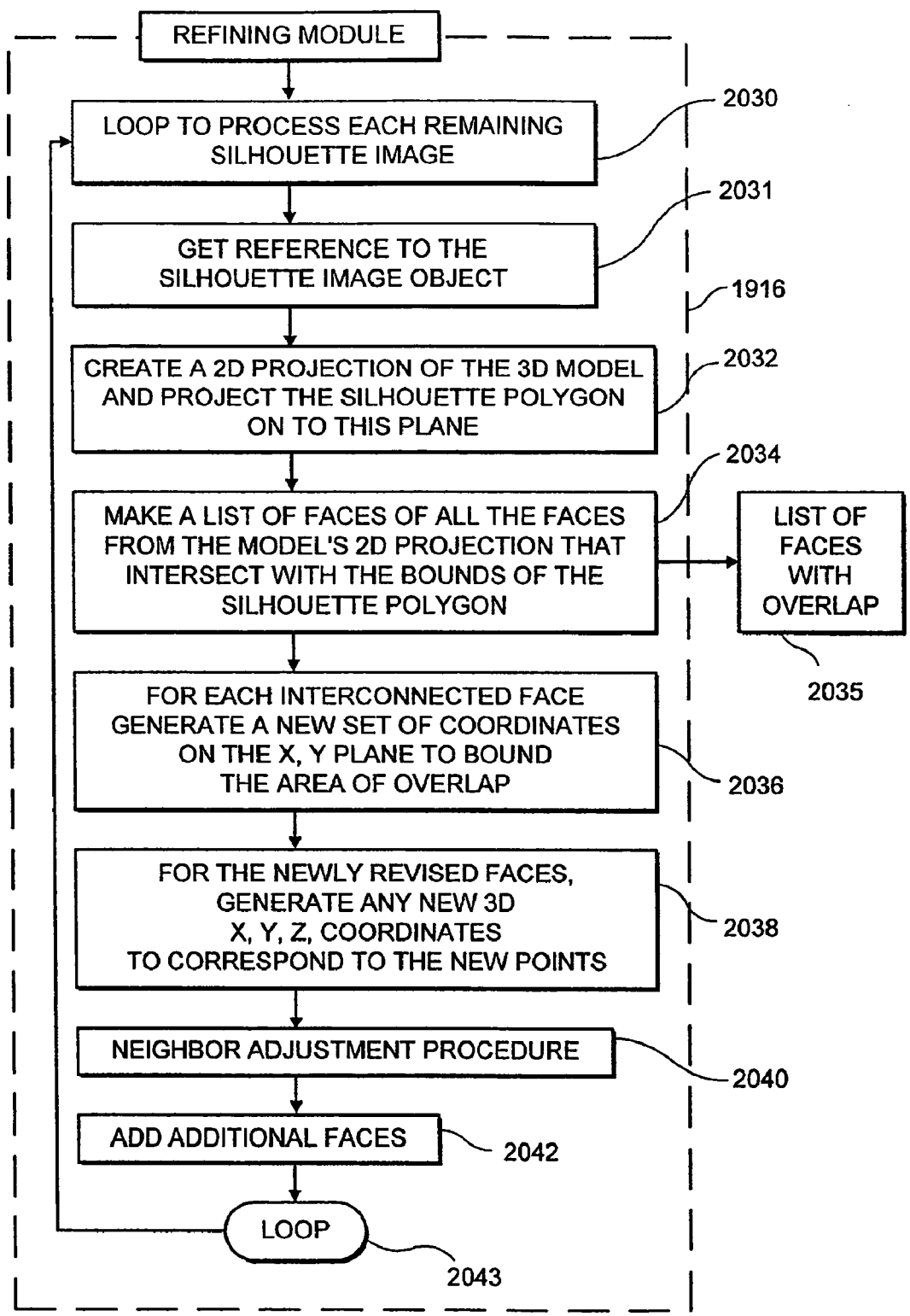
FIG. 62 depicts an exemplary process flow for the 3D refining module in the alternative embodiment of the present invention.

FIG. 62 depicts an exemplary process flow for the 3D refining module 1916 in the alternative embodiment. In step 2030, the 3D refining module 1916 begins a loop to process each of the remaining silhouette images. In step 2031 the 3D refining module 1916 selects one of the remaining silhouette images and begins processing.

i) Making a 2D Projection of a Face (Alternative Embodiment)

In step 2032, the 3D refining module 1916 creates a two-dimensional projection of the initial 3D model. The projection maps each face of the 3D model to the plane that contains the 2D x, y coordinates of the selected silhouette. The projection shows the 3D model from the position of the camera 2 when it captured the silhouette. In step 2032 the 3D refining module 1916 loops to process each face of the 3D model. The looping procedure creates an x, y coordinate that maps each vertex of each face onto the 2D projection plane.

It is noted that there are many known techniques to create a 2D projection of a 3D object model. Video games and other processes use projection techniques and such processes would be suitable for the process of creating a 2D projection of the 3D model in step 2032.

ii) Creating a List of Faces that Intersect the Silhouette on 2D Projection (Alternative)

With the 2D projection built, the 3D refining module 1916 in step 2034 (of FIG. 62) creates a list of those faces which are overlapped by the selected silhouette image. For this procedure, it is understood that the silhouette will overlap a face of the 3D model when either a vertex of the polygon silhouette falls within the bounds of the face or an edge of the polygon silhouette crosses the bounds of the face in question.

To create the list of overlapped faces, the 3D refining module 1916 in step 2034 executes a loop to examine each 2D face projection and determine which (if any) of the vertices of the silhouette image lie within the bounds of that 2D face projection. It is noted that there are a number a processes that are known in the art to determine whether a point with coordinates x, y lies within the bounds of a shape on a two-dimensional plane. For example, it is possible to view the face in question as consisting of a number of overlapping triangles, such as triangle made up of an edge of the face and an opposite vertex. For each triangle, it is then possible to determine whether the point in question lies within such a triangle. If the point lies within one of those triangles, then the point does fall within the bounds of the object. Such a technique would be suitable for finding whether a vertex from the silhouette image lies within a given 2D projection of a model face.

In step 2034, the 3D refining module 1916 processes each 2D face projection. For each 2D face projection, the 3D refining module 1916 loops in step 2034 to examine each vertex of the silhouette image, performing the procedure described above to determine whether that vertex in question lies within the bounds of the 2D face projection. If one of the vertices of the silhouette image is found to lie within the bounds of a given 2D face projection then the 3D refining module 1916 adds a data reference to this face projection onto an overlap list (shown in FIG. 62 at 2035) along with other information concerning the x, y silhouette vertex as described in further detail below.

Figure 63:
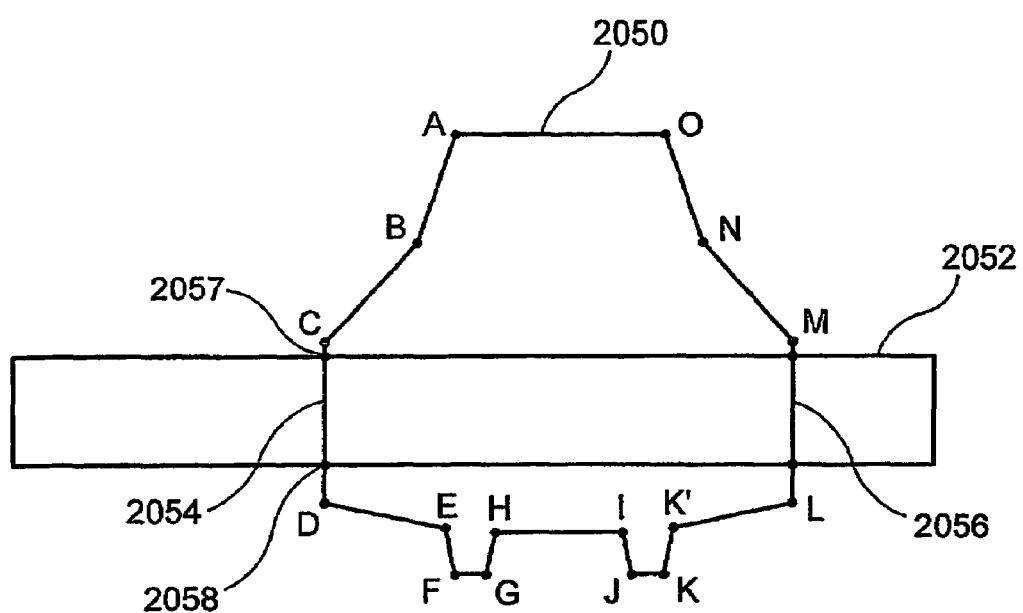
FIG. 63 depicts a polygon silhouette which overlaps a 2D face projection where no vertices of the polygon silhouette lie within the bounds of the face projection.

In step 2034, it is noted that the silhouette image might overlap the 2D face projection in such a way that no vertex of the silhouette image would lie within the bounds of the 2D face projection. Such an overlap would occur, for example, when the beginning and ending vertices of one edge of the silhouette image lie outside of the bounds of the 2D face projection but the length of the edge travels through the given 2D face projection. Such a case is depicted in FIG. 63 where the polygon silhouette 2050 overlaps 2D face projection 2052 but no vertices of polygon silhouette 2050 lie within the bounds of the face projection 2052. In FIG. 63 edges CD 2054 and LM 2056 overlap 2D face projection 2052.

To include such intersections, the 3D refining module 1916 in step 2034 executes an additional procedure in those cases where no vertex of the silhouette image is found to lie with the bounds of the face in question. In the additional procedure, the 3D refining module 1916 executes an additional loop to examine each edge of the face in question and determine if one of the edges of the silhouette image intersects it. In this additional procedure, the 3D refining module 1916 follows the clockwise ordering of the vertices of the face. Beginning from a first edge of the face and, then, for this edge, comparing it to each of the edges of the silhouette image to determine whether the two edges intersect. It is noted that processes for determining line segment intersection are known and any such or similar technique is acceptable for this process of the present invention. For purposes of an exemplary embodiment, the process for determining line segment intersection determines a line equation for each of the line segments in question and then (if their slopes are not such that the lines are parallel) solves those equation simultaneously to determine their point of intersection. If the point of intersection lies within the area bounded by the segments, then the two line segments intersect.

If an intersection is found, the 3D refining module 1916 saves the x, y coordinates of this point of intersection and then processes the other edges of the face projections to determine if the silhouette segment in question intersects in one or two places. If the 3D refining module 1916 finds a second point of intersection for this segment of the silhouette, the 3D refining module 1916 saves also the x, y coordinates of this second point of intersection. In saving this data, the 3D refining module 1916 stores a data reference to the face projection in question onto an overlap list (shown in FIG. 62 at 2035) along with data concerning the new x, y intersection points (i.e. either one or two) as described below.

Figure 64:
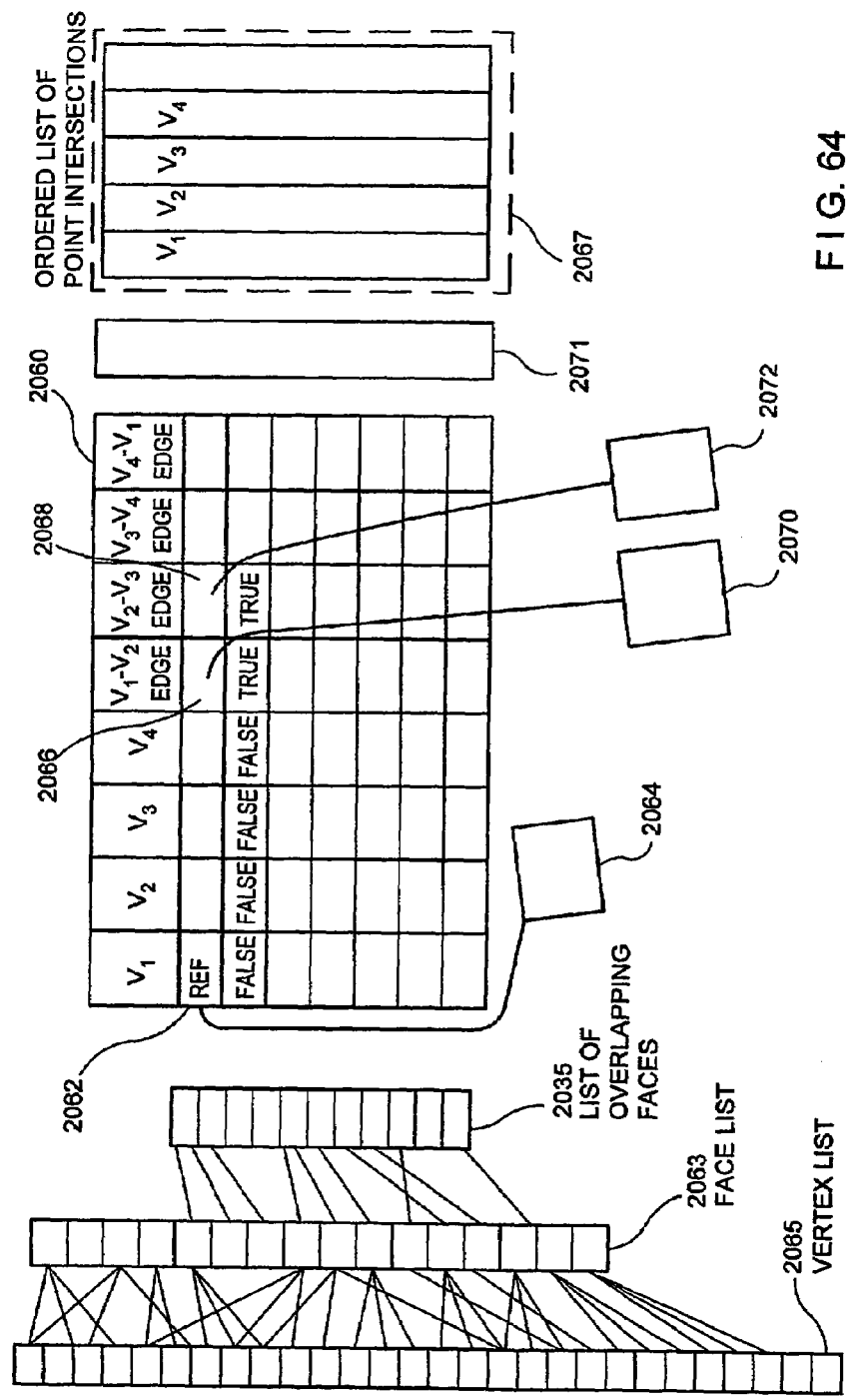
FIG. 64 depicts an exemplary structure containing the silhouette image overlap information in the alternative embodiment.

As noted above, the 3D refining module 1916 in step 2034 builds a list of those faces which have areas that overlap the silhouette image currently being processed. In the exemplary embodiment, many different types of data structures (such as dynamically allocated arrays, data tables and linked lists) are available and are suitable for embodiments of the present invention. For purposes of an exemplary alternative embodiment the intersection list of the present invention would hold a data reference to each face projection plus a reference to each of the vertices and edges of the silhouette image which intersect the 2D face projection. FIG. 64 depicts an exemplary structure containing the silhouette image overlap information. In FIG. 64 a two-dimensional dynamically allocated array 2060 contains entries with rows corresponding to each projected face of the 3D object and columns corresponding to the vertices of the silhouette image (in the example vertices V1-V4) and, in addition, vertices that might be created through each edge intersection. The table 2060 is initialized to contain only null (or empty) references. The two-dimensional array is also associated with an array which stores references to those faces that overlap the silhouette (the overlapping list) 2035. References on that list 2035 point back to the face list 2063 (which is an array holding references to all of the face data objects which make up the mesh model).

Additionally, the system maintains a vertex list containing references to all of the 3D data points which are used to form faces in the 3D model.

When the 3D refining module 1916 determines that a vertex of the silhouette image lies within the bounds of a given face the module in step 2034 makes an entry in the table 2060. The entry in table 2060 provides a link (such as a pointer) to a data object which contains the vertex's x, y coordinates and, in addition entries for that vertex's corresponding three-dimensional 3D real world X, Y, Z coordinates (that are determined in a procedure described below). For example, referring to FIG. 64, the entry at 2062 (row 0, column 0) in data table 2060 provides a reference to data object 2064. That object 2064 contains entries for (or, alternatively, a data reference to) the x, y coordinates of that silhouette vertex (V1) and, in addition, entries for (or, alternatively, a data reference to) the 3D real world X, Y, Z coordinates for that silhouette point (as determined below).

Where an edge of the silhouette image intersects a face with no vertex intersections, the 3D refining module 1916 in step 2034 (of FIG. 62) determines (as described above) those points where the silhouette image edge segment intersects the edges of the face in question. Those points are also stored in the data table 2060. For example, in FIG. 64, entries at locations 2066 (row 1, column 4) and 2068 (row 1, column 5) show that the silhouette edge between V1 and V2 intersects 2D projection face 2 at two locations. Each of those locations 2066 and 2068 contain a reference to data objects 2070 and 2072 (respectively). Those data objects 2070 and 2072 contain entries for (or, alternatively, a data reference to) the x, y coordinates of the points of intersection and, in addition, entries for (or, alternatively, a data reference to) the 3D real world X, Y, Z coordinates for that silhouette point (as determined below).

iii) Determining 3D Coordinates for Each New Point of Intersection (Alternative)

Referring again to FIG. 62, the 3D refining module 1916 proceeds to step 2038 after completion of the data table concerning the overlapping faces 2060. In step 2038 the 3D refining module 1916 determines a 3D real world, X, Y, Z coordinate for each of the points referenced in the data table concerning the overlapping faces 2060. This process uses the 3D coordinates of the currently existing faces to determine a 3D coordinate for those points from the data table 2060 concerning the overlapping faces. To perform this process, the 3D refining module 1916 loops through each of the faces that have been identified on the list of overlapping faces 2035. For each identified face, the 3D refining module 1916 accesses the 3D coordinates (not the 2D projection coordinates) to compute an equation for a three-dimensional plane that would best fit those points.

It is noted that there are a number of methods available and known in the art for determining the equation for a plane that passes through a group of points. With the coefficients for the plane equation determined, the 3D refining module 1916 translates the 2D coordinates of the bounded silhouette points (from the 2D projection plane) into an X, Y coordinate pair that would exist on the 3D plane of the face. The new X, Y values are input into the plane equation determined above to create a final Z coordinate for the silhouette point. The 3D refining module 1916 in step 2038 (of FIG. 62) proceeds in this fashion to create a 3D X, Y, Z coordinate for each point of the silhouette image that was found to intersect the face (e.g. see 2062, FIG. 64) and/or also those edge points (e.g. 2066 and 2068, FIG. 64) that were created in step 2034. After it computes the 3D X, Y, Z coordinate values for the points in question, the 3D refining module 1916 in step 2038 stores those values (such as in the data objects, e.g. 2064, 2070, 2072 created above).

It is noted that each vertex of the silhouette image may intersect a number of faces of the 3D model. Thus, during processing step 2036. (of FIG. 62), each vertex of the silhouette image may generate a number of new 3D vertices which will be added to the 3D model. The process of generating 3D coordinates may be thought of as "drilling" the silhouette vertex through the 3D model. And as the "drilling" process intersects each plane of the 3D model, the 3D refining model 1916 generates a new 3D model point which will be used to refine the 3D model.

iv) Refining the Existing Faces (Alternative Embodiment)

After the computing 3D X, Y, Z coordinates, the 3D refining module 1916 proceeds in step 2038 to refine those faces of the 3D model that were "overlapped" by the silhouette image. For each of those faces that were identified on the list of overlapped faces 2035, the 3D refining module 1916 will now redefine the boundary points of those faces. In performing the process of step 2038, the 3D refining module 1916 works again using the 2D projections of the 3D model faces and the silhouette image.

Figure 65A:
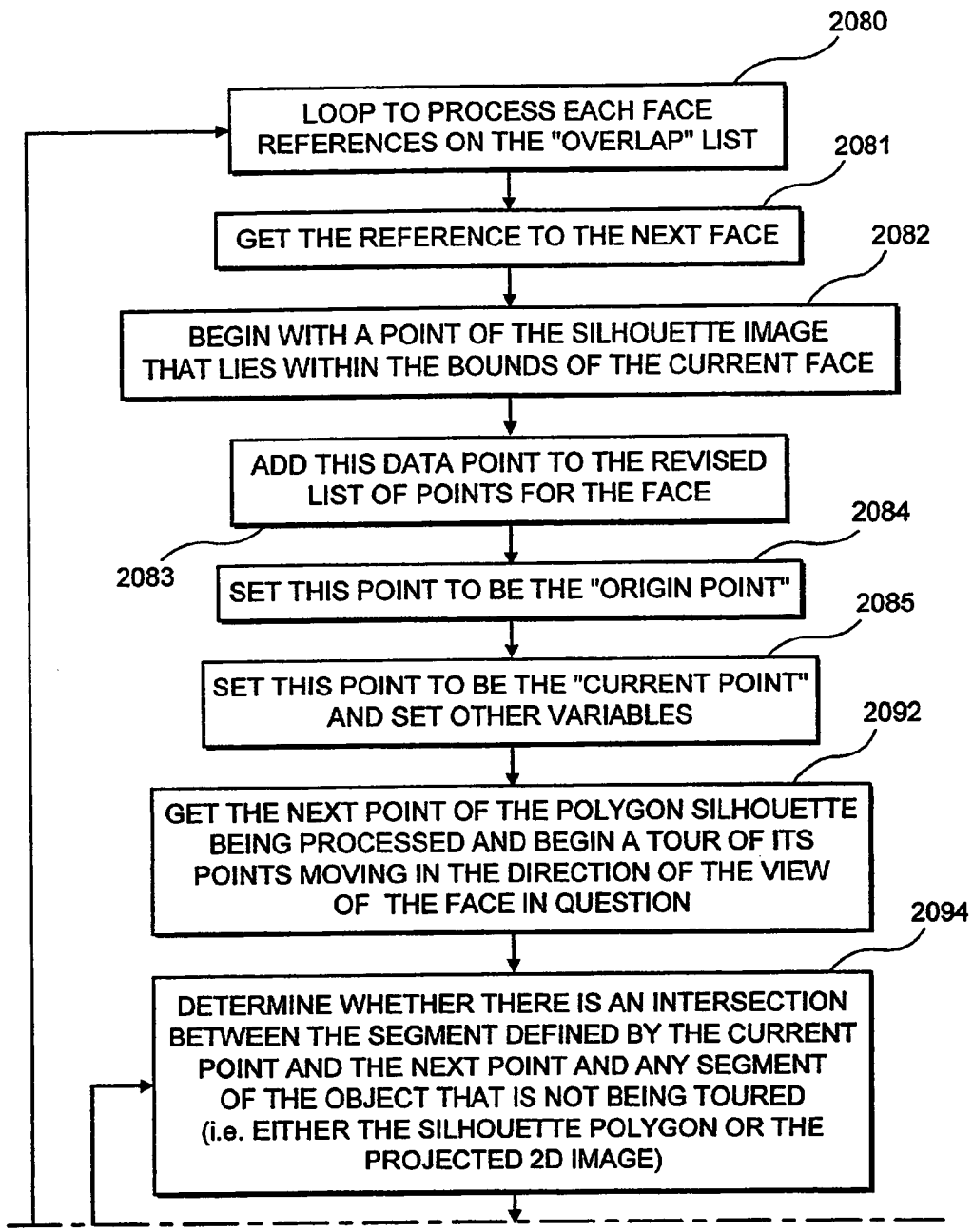
FIG. 65 depicts and exemplary process flow for the refining step of the 3D refining module in the alternative embodiment.
Figure 65B:
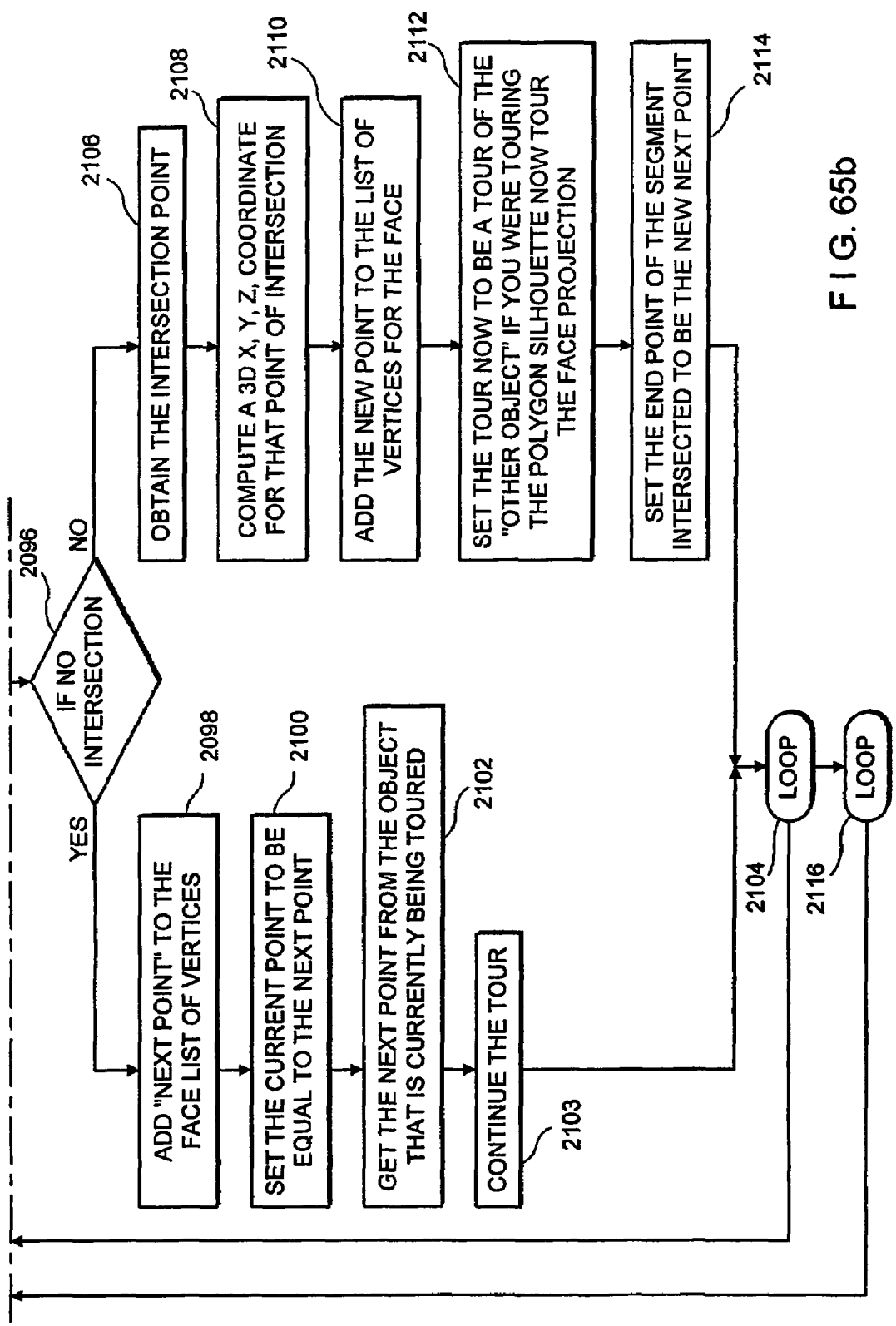

FIG. 65 depicts an exemplary process flow for the refining step 2038 (of FIG. 62) in the alternative embodiment. In FIG. 65, the 3D refining module 1916 begins in step 2080 a loop to process each face projection on the list of overlapping faces 2035. In step 2081, the 3D refining module 1916 selects one of the face projections. For this face, the 3D refining module 1916 locates one of the silhouette vertices found to be within the bounds of the 2D face projection. (For example, in FIG. 64, entry 2064 provides a reference to silhouette vertex V1 which was found to be within the bounds of face 1). In step 2083, the 3D refining module 1916 adds a reference to the 3D coordinates that correspond to this point (see 2064, FIG. 64) into a new data object that will contain a list of points that shall redefine the bounds of the face.

Following step 2083, the 3D refining module 1916 performs some steps in advance of a loop (described below) to tour the vertices of the silhouette image and the 2D face projection. In step 2084, the 3D refining module 1916, loads an "original point" data object with a reference to the silhouette point located in step 2083. In step 2085, the 3D refining module 1916 also loads a "current point" data object with a reference to the silhouette point located in step 2083 (the same point which is currently the original point). In step 2085 the 3D refining module 1916 also sets a variable to "silhouette" so that the "tour" will begin with a examination of the vertices of the silhouette image. It is noted here that during the tour, the 3D refining module 1916 will shift at various times from examining the vertices of the "silhouette" to examining the vertices of the "projection". The variable set in step 2085 determines which vertices will be followed during any part in the "tour."

To tour the vertices of the silhouette image and the 2D face projection, the 3D refining module 1916 will follow a path either clockwise or counterclockwise which shall maintain the projection's "view" of the object. If the 2D projection captures a view of the face from the exterior (See FIG. 61, for example face projection 2022), the 3D refining module 1916 will perform its tour of the vertices following a clockwise direction. If the view of the 2D projection has captured the face in an image as taken from its interior view, then the 3D refining module 1916 will proceed in a counterclockwise direction (e.g. following the list of vertices as loaded into the silhouette object). In step 2032 (of FIG. 62) when the 2D projection of the face was initially created, the 3D refining module 1916 determined whether the projection represented a view of the object from its interior or exterior. In step 2085 (before beginning the loop), the 3D refining module 1916 sets a direction variable to be equal to view of the face projection (i.e. either "interior" or "exterior").

Based on that interior or exterior setting, the 3D refining module in step 2092 selects a "next point" to be used in the processing loop (described below). The "current point" and "next point" variables form one edge of the silhouette image with serves as the basis for beginning the "tour" of point vertices. If the direction set in step 2085 is "exterior," the 3D refining module 1916 will select a point from the silhouette image that is adjacent to the "current point" moving in a clockwise direction. Alternatively, if the direction set is "interior" then the 3D refining module 1916 will select a point from the silhouette image that is adjacent to the "current point" moving in a clockwise direction. With a current and next point selected from the silhouette object, the 3D refining module 1916 then begins (in steps 2094-2104) its tour to refine the shape object.

The tour begins with a looping step 2094. The 3D refining module 1916 will loop through the vertices of the silhouette image and the selected 2D face projection, for example, until the point loaded into the "next point" variable is equivalent to the "original point". Within this loop the 3D refining module 1916 processes as follows.

In step 2094 the 3D refining module 1916 determines whether there is any intersection between the line segment defined by the "current point" and the "next point" and any edge of the 3D model that is not currently being "toured." For example, since the variable set in step 2085 indicated that the tour was currently examining the vertices of the silhouette, the segment defined by the "current point" and "next point" will be compared to the edges of the 2D face projection (i.e. the object that is not the silhouette). In this step 2094, the 3D refining module 1916 executes a loop to examine each segment of the object that is not being "toured" (in this case the face projection) and compares it to the current point/next point segment to determine if a point of intersection exists. This looping procedure will continue until either all segments of the object are examined or until a first point of intersection is found. In comparing each segment the 3D refining module 1916 in step 2094 follows in substantial similarity to the procedure described above with regard to FIGS. 61 and 62.

If in step 2096, no point of intersection was found, the 3D refining module 1916 in step 2098 proceeds to continue the tour along its current path (e.g. the path of the silhouette vertices). In step 2098, the 3D refining module 1916 adds a reference to the 3D X, Y, Z coordinates that corresponds to the "next point" on the list of vertices for the revised face. In step 2100, the 3D refining module 1916 then loads the "next point" into the "current point" variable in order to continue the tour. Then, in step 2102, the 3D refining module 1916 moves in the designated direction (e.g., clockwise or counterclockwise as indicated by the variable in step 2085) to select the next point from the object being "toured" (in this case the silhouette). With that next point loaded, the 3D refining module 1916 continues the tour in step 2103. The system loops in step 2104 and returns to step 2094 to again perform the procedure described above.

If in step 2096, there was a point of intersection found, the 3D refining module 1916 in steps 2106-2114 proceeds to perform some additional steps to alter the "tour" so that it will proceed upon a different path (e.g. the path of the 2D face projection). In step 2106, the 3D refining module 1916 obtains the x, y coordinates of the point of intersection. It is noted that the point of intersection determined in step 2094 is a 2D x, y coordinate located on the 2D projection plane. In step 2108, the 3D refining module 1916 generates if needed a 3D X, Y, Z coordinate for the point of intersection. To generate the 3D X, Y, Z, coordinate, the 3D refining module 1916 uses the processes described above (see, e.g., FIG. 44, step 1670).

In step 2110 the 3D refining module 1916 adds a reference to the 3D X, Y, Z coordinates of the intersection point to the list of revised points for the face in question. In step 2112 the 3D refining module 1916 also sets the "tour" variable (set in step 2085) to the other object. In the example described above, since the tour variable of step 2085 was set to "silhouette" it will now be set to "2D projection." In step 2114, the 3D refining module 1916 then determines a "next" point that will allow further processing. As mentioned above, if the direction set in step 2085 is "exterior", the 3D refining module 1916 selects a point from the new object that is adjacent to the "current point" moving in a clockwise direction. Alternatively, if the direction set is "interior" then the 3D refining module 1916 will select a point from the new object that is adjacent to the "current point" moving in a clockwise direction. With a current and next point now reselected, the 3D refining module 1916 loops in step 2104 and returns to step 2094 to continue the tour of the vertices of the other object (in this case the 2D projection).

Processing of each face with a silhouette overlap continues as described above until each of the faces are processed. In FIG. 65 the 3D refining module 1916 performs steps 2081-2114 for a given 2D face projection and then loops in step 2116 to process another 2D face projection until all of the faces referenced in the overlapping list 2035 are redefined.

Figure 66:
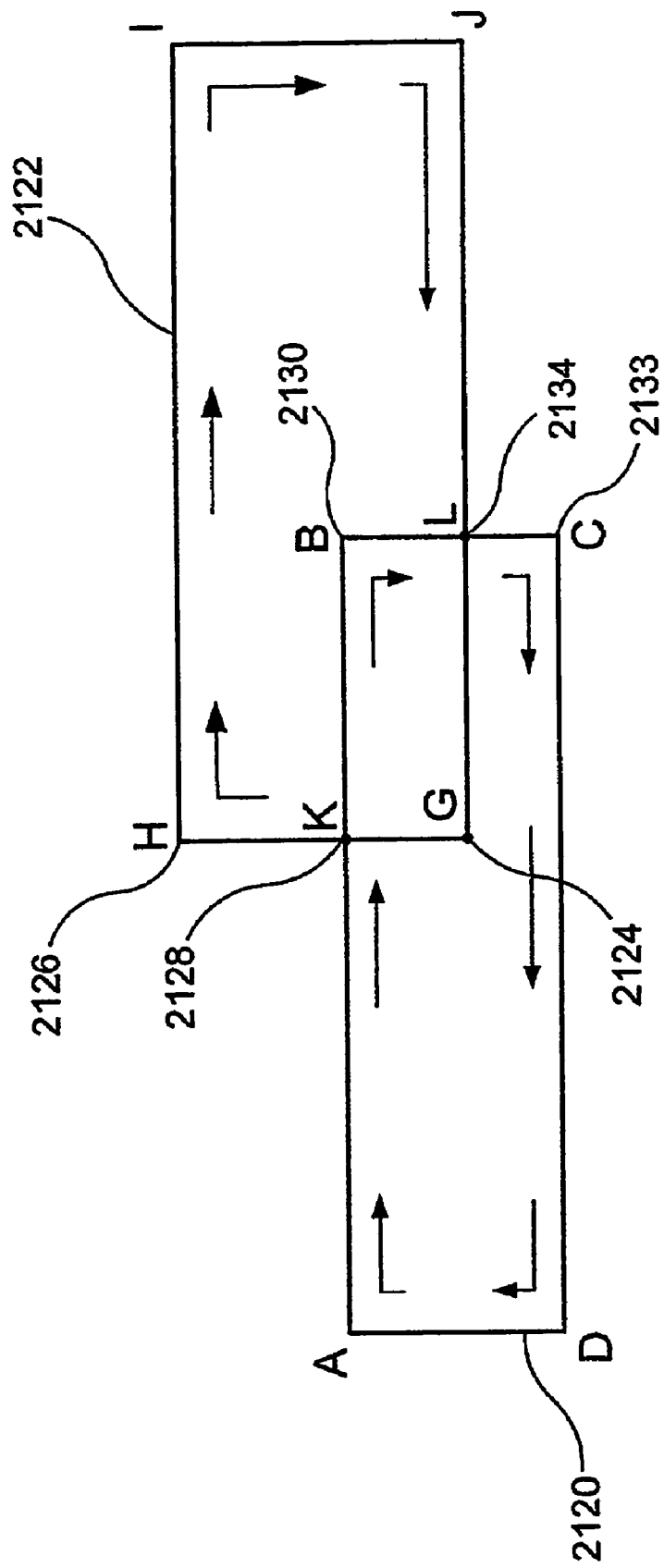
FIG. 66 provides a visual representation of the process of refinement by the 3D refining module of the alternative embodiment.

FIG. 66 provides a visual representation of the process of refinement described above. In FIG. 66, a 2D face projection A-B-C-D is shown at 2120. A silhouette image G-H-I-J is shown at 2122. The projections are viewed from the external side so the tour will follow a clockwise direction. To begin the tour described above, the 3D refining module 1916 begins at point G 2124 (adding this point to the revised data object) and then proceeds in a clockwise direction to find next point H 2126. The 3D refining module 1916 then determines whether edge GH intersects an edge of the 2D face projection. The 3D refining module 1916 finds that an intersection exists at point K 2128. Given that intersection, the 3D refining module 1916 adds point K 2128 to the revised data list, and then sets the "tour" variable to proceed through the vertices of the 2D projection of the current face. The 3D refining module 1916 sets the current point to be point K 2128 and then sets the next point to be the next clockwise point along the 2D projection point B 2130.

The 3D refining module 1916 next examines edge KB to determine whether that edge intersects with an edge of the silhouette image 2122. As no intersection exists, the 3D refining module 1916 adds point B 2130 onto the revised list of points for the face. The 3D refining module 1916 also sets the current point to be point B 2130 and continues in the clockwise direction to find the next point on the 2D projection—point C 2133.

The 3D refining module 1916 then determines whether edge BC intersects an edge of the silhouette image 2122. The 3D refining module 1916 finds that an intersection exists at point L 2134. Given the case of an intersection, the 3D refining module 1916 adds point L 2134 to the revised list of points for the face, and then sets the "tour" variable to proceed again through the vertices of the silhouette. The 3D refining module 1916 sets the current point to be point L 2134 and then sets the next point to be the next clockwise point along the 2D projection: point G 2124.

The 3D refining module 1916 next examines edge LG to determine whether that edge intersects with an edge of the 2D projection 2120. As no intersection exists the 3D refining module 1916 sets the current point to be point G 2124 and that setting causes the loop to stop processing.

v) Reconnecting the Revised Faces to Form a New 3D Model (Alternative)

Referring again to FIG. 62, the 3D refining module 1916 (after it has created in step 2038 a revised list of points for each face intersected by the silhouette image) proceeds to step 2040. In this step 2040, the 3D refining module 1916 redefines the "neighbor" relationships for each face whose vertices have been re-defined. Recall that in the exemplary embodiment, a face object for the 3D model included data structures (e.g. arrays) to hold information concerning the face's vertices and also other faces of the object which are "neighbors" to the current face (and as such share an edge with the current face). In the exemplary object, the neighbor array provides references to those other face objects which are "neighbors" to the current face and thus share an edge with the current face.

After the refining procedure in steps 2036-2038, the 3D refining procedure 1916 will have altered the vertices of a given face and those of its "neighbors." However, even though the vertices of those faces have been altered, some of the "neighbor" relationships will still exist (those which still share edges even though the edges may have different vertices). The process in step 2040 serves to adjust those edges and eliminate references to those faces which have been "clipped" because they were not intersected with the silhouette image.

Figure 67:
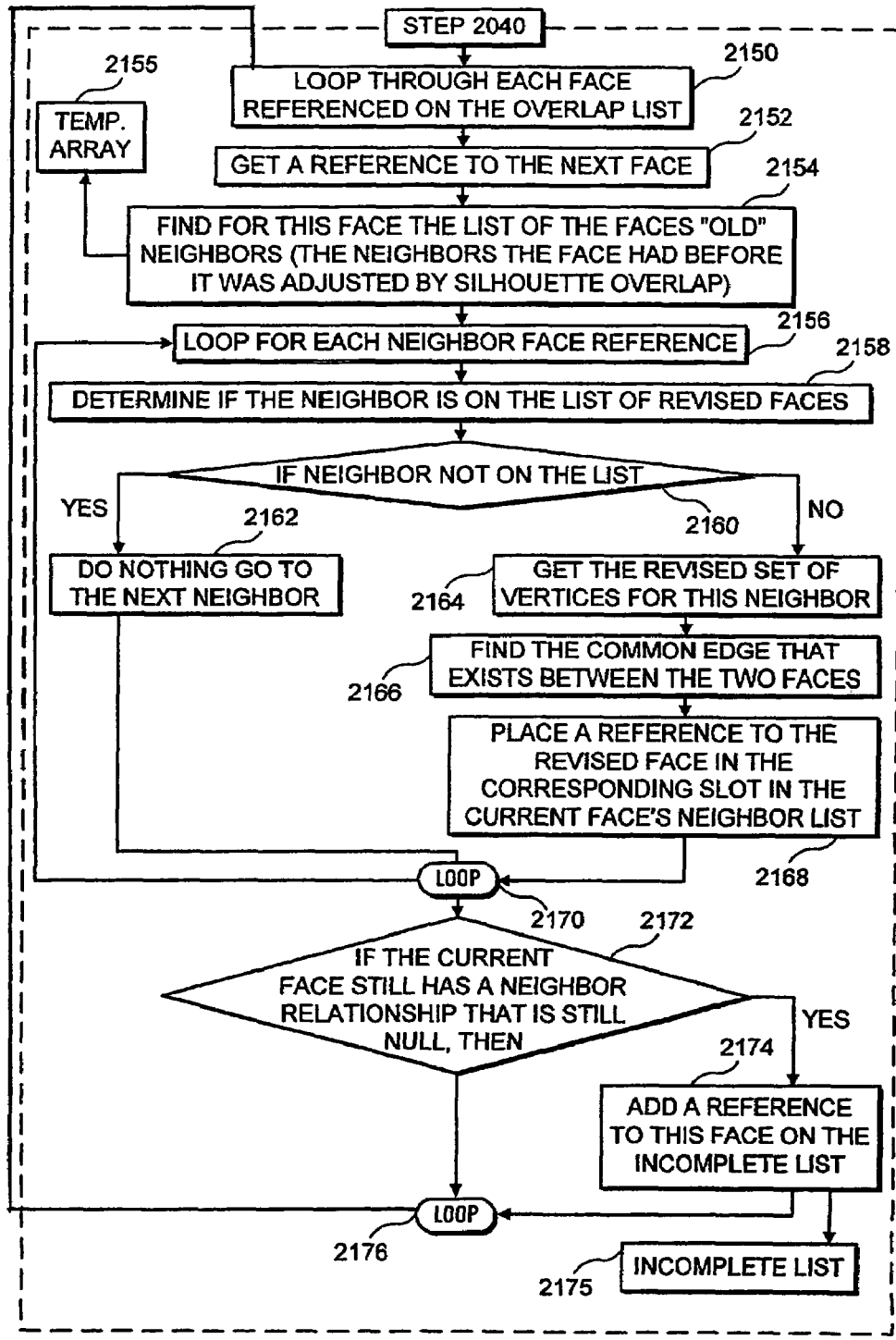
FIG. 67 depicts an exemplary process flow for the neighbor adjustment procedure of step 2040.

FIG. 67 depicts an exemplary process flow for the neighbor adjustment procedure of step 2040 in the alternative embodiment. In step 2150, the 3D refining module 1916 begins a loop to process each face that is referenced on the overlap list 2035. In step 2152, the 3D refining module 1916 obtains a reference to the face object containing the face information "the current face object". In the exemplary embodiment, the face object at this point contains a revised list of data points and an "outdated" list of neighbor references. In step 2152, the 3D refining module 1916 also obtains a reference to the revised face object (the data object which contains the list of vertices and neighbor information). In step 2154, the 3D refining module 1916 reads the list of references from the neighbor array of the face data object into a temporary array 2155 (which will be used for further processing). Additionally, the 3D refining module 1916 clears the entries in the neighbor array for the face data object (setting the slots of the array to null).

In step 2156, the 3D refining module 1916 begins a loop to process each reference to a neighbor that was copied into temporary array 2155. In step 2156, the 3D refining module 1916 obtains a reference to the face data object identified as a "neighbor" of the current face. In step 2158, the 3D refining module 1916 performs a check to determine if the reference neighbor face is also one of the faces that has been overlapped by the silhouette image (and hence a face that is referenced by the overlap list 2035). If in step 2160 a reference to this face does not appear on the overlap list 2035, the 3D refining module 1916 will do nothing in step 2162 (and this face will be clipped from the model as it does not fall within the area defined by the silhouette).

If in step 2160 the 3D refining module 1916 does find that a reference to the neighboring face does appear on the overlap list 2035, the 3D refining module 1916 executes a set of procedures to adjust the neighbor list of the face obtained in step 2152. In step 2164 the 3D, refining module 1916 accesses the list of vertices in this neighbor and the list of vertices in the current face and in step 2166 compares them to find an new edge between them which shares a pair of vertices. In this step 2166 it is possible that the neighbor face may store a vertex pair (and call it "AB") and the current face may store this same vertex pair (but call it "BA") and the pair will still be considered a match. It is observed that for any neighbor that exists on the overlap list 2035 there will be a shared edge, even if one or both of the vertices for that edge has been altered in the refining process described above.

When the edge is identified, the 3D refining module 1916 in step 2168 will place a reference to the neighboring face data object in the neighbor array for the current face object. As noted above the data object for each face maintains in the neighbor array an ordering of neighboring faces that corresponds to the ordering of the vertices array such that, e.g., neighbor[0] contains a reference to the face that shares the edge defined by vertices[0] and vertices[1]. Thus, the 3D refining module 1916 places the reference in the neighbor array slot which corresponds to the shared pair of vertices identified in step 2168.

After the processing of steps 2158-2168, the 3D refining module 1916 loops in step 2170 and proceeds in step 2156 to process the next neighbor object from the temporary array 2155. When all of the neighbor references have been processed, as described above, the 3D refining module 1916 proceeds to step 2172. In step 2172, the 3D refining module 1916 checks to determine if any of the slots in the neighbor array for the current face are still set to null (meaning that there is a opening in the model which will have to be filled with a new face, as described below). If in step 2172 the 3D refining module 1916 determines that a neighbor slot is still set to null, the 3D refining module 1916 in step 2174 places a reference to this face on an incomplete list 2175. The faces referenced on this list will be further processed as described below.

After the checking procedure of steps 2172-2176, the 3D refining module 1916 loops in step 2176 and returns to step 2150 to continue processing the next face object referenced on the overlap list 2035 until all such face objects have been processed as described above.

vi) Replacing Clipped Faces with Additional, New Faces (Alternative Embodiment)Upon completion of the neighbor adjustment procedure in step 2040 (of FIG. 62), the 3D refining module 1916 in step 2042 executes a final procedure to create additional faces to replace those faces that have been clipped. A face could be clipped if there was no area of that face (when projected in 2D, see, e.g., FIG. 60*a*, for example the "end" faces in areas 2005*f* and 2005*g*) which overlaps the projection of the silhouette image. In general, a face that is clipped is one that is largely perpendicular/orthogonal to the plane of the silhouette image and which lies outside of the area of the silhouette when on the 2D projection plane. For example, in FIG. 60*a* the removal of areas 2005*f* and 2005*g* causes the clipping of "end" faces 2005*h* and 2005*i*. The clipping of such faces creates gaps in the 3D model. The procedure of step 2042 creates additional faces so that the finished 3D model does not have such gaps.

It is noted that the procedure to insert points into the model based on the silhouette image causes the creation of gaps and the clipping of extraneous faces. As described above, the 3D refining module 1916 operates to trim each face (and remove excess area) by inserting new 3D X, Y, Z coordinates into a face based on intersections with the x, y coordinates of a silhouette image. These new 3D X, Y, Z coordinates when inserted (e.g, following the procedure in step 1916) serve to redefine the bounds of that face and trim excess areas from its boundary. For a given x, y silhouette coordinate, the 3D refining module 1916 creates a set of new 3D X, Y, Z coordinates to insert into the model. The 3D refining module 1916 determines the coordinates for those new 3D X, Y, Z coordinates in the "drilling" process described above with reference to FIGS. 60*a-b*. For example, referring to FIG. 60*a*, silhouette point A (2005*j*) creates additional points A' (2005*k*) and A" (2005*l*). Silhouette point B (2005*m*) creates additional points B' (2005*n*) and B" (2005*o*).

It is also noted that as the 3D refining module 1916 "drills" each x, y silhouette coordinate, and creates each new 3D X, Y, Z coordinates, it also stores an ordered list of those new coordinates (see 2067 in FIG. 64). For each x, y silhouette coordinate, the 3D refining module 1916 stores a list of references to those 3D X, Y, Z coordinates created from the "drilling" of that 2D coordinate. Within the list the coordinate references are also ordered according to their distance from the camera 2 (from the point of view of the camera 2 when it was in the position of capturing the silhouette in question). For example, referring to FIG. 60*a*, the camera 2 is seen to be in position 2005*d* for the capturing of silhouette 2005*c* and the "drilling" of silhouette point A 2005*j* yields two 3D coordinates A' 2005*k* and A" 2005*l*. In the ordered list above a reference to point A' 2005*k* is stored ahead of the reference to point A" 2005*l*, because the coordinates of point A' 2005*k* would be closer to the camera 2 in position 2005*d* than point A" 2005*l*.

It is also observed that because the silhouette points are used to trim and refine the shape of the 3D model (and redefine the boundaries of the model faces), these points will in general form new edges for the model. And where the gaps occur from the clipping of excess areas, those gaps will be bounded by edges that have as their vertices the 3D X, Y, Z points created from the silhouette point "drilling".

For example referring to FIG. 60*a*, as the removal of area 2005*g* caused the clipping of face 2005*i*, the new 3D X, Y, Z coordinates created from silhouette point A (2005*j*) can be used to construct edge A'-A" that will replace part of face 2005*i* (which was clipped). The remaining drilled vertices allow the system of the present invention to construct additional faces.

Figure 68:
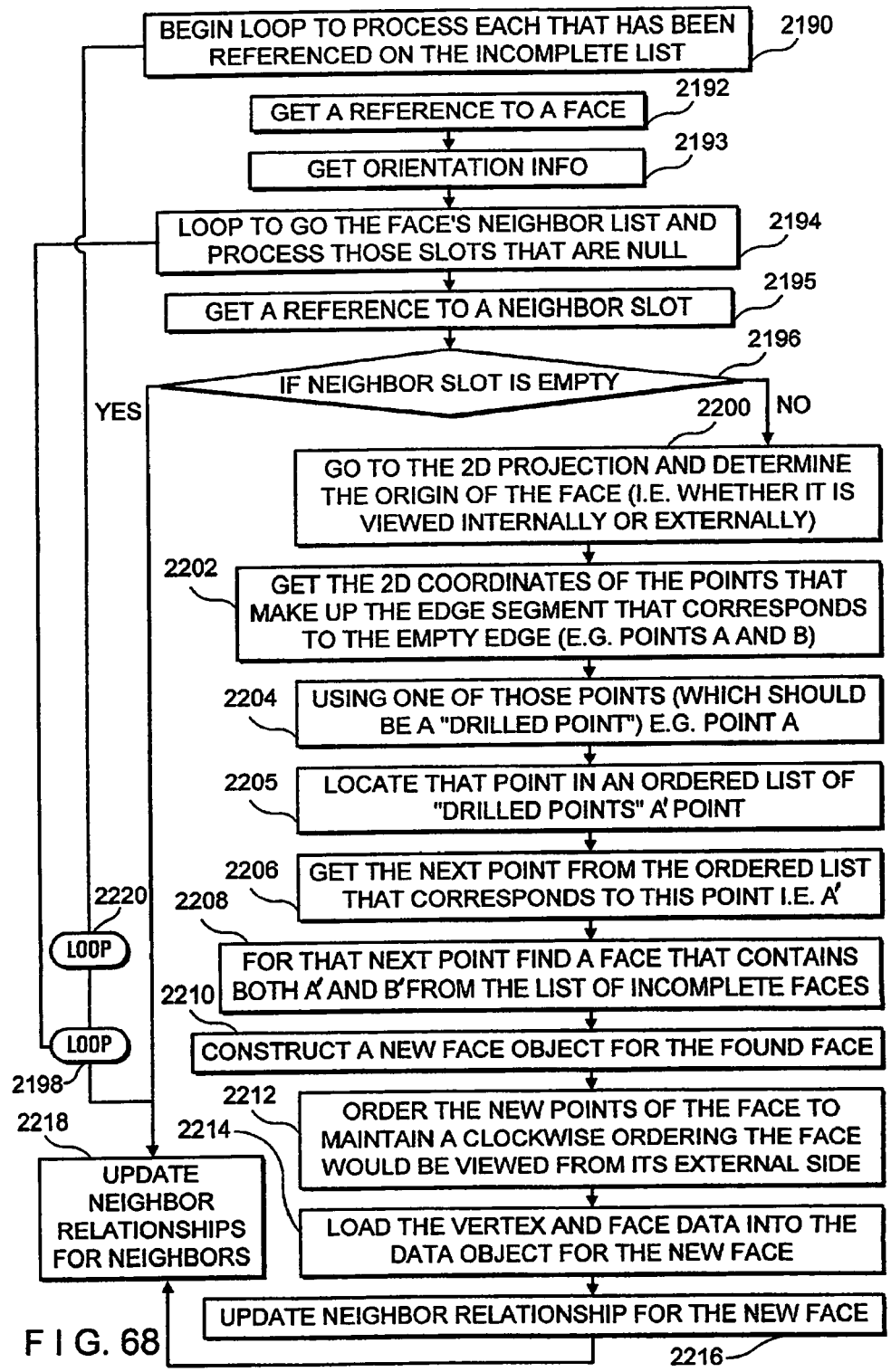
FIG. 68 depicts an exemplary process flow for the construction of additional faces to replace clipped faces in the alternative embodiment.

FIG. 68 depicts an exemplary process flow for the face construction process of step 2042 of the 3D refining module 1916. In step 2190, the 3D refining module 1916 begins a loop to process each model face that is referenced on the incomplete list 2175. In step 2192 the 3D refining module 1916 gets a reference to one of the incomplete faces ("the current incomplete face"). In step 2193, the 3D refining module 1916 accesses additional information (e.g. from the overlap list 2035 and from the data table concerning the overlapping faces 2060) to obtain the orientation of the face, the point of view of the camera 2 when capturing the silhouette (and projecting the 3D model) and whether the face is being viewed from the "external" or "internal" side.

In step 2194 the 3D refining module 1916 begins a second loop to examine each of the neighbor references on the neighbor array of the current face to locate the neighbor references that are currently set to null (empty). There could be one or more neighbor references that are null on any current incomplete face. In step 2195 the 3D refining module 1916 examines a neighbor reference. If in step 2196 the reference is not empty the 3D refining module 1916 proceeds to step 2198 and loops, returning again to step 2194 to retrieve the next neighbor reference. If in step 2196 the neighbor reference is null, the system proceeds in steps 2200-2218 to find another face that also contains a suitable match for this edge and construct a new face between those edges.

In step 2200 the 3D refining module 1916 accesses the list of vertices for the current incomplete face and locates a reference to the two vertices which form the current edge with no neighbor ("edge point 1" and "edge point 2"). It is noted that these edge points should be references to 3D X, Y, Z coordinates that have been "drilled" from the processing of an x, y silhouette point. The references to the edge points are loaded into the edge point 1 and edge point 2 variables so that the clockwise ordering of these vertices in the list of vertices for the current face is maintained.

In step 2202 the 3D refining module 1916 selects one of the edge points (e.g. and for purposes of description edge point 1) and begins a process to find a corresponding "drilled" coordinate to match with that edge point. In step 2204, the 3D refining module 1916 accesses the 2D projection data structure and locates a reference to the silhouette point from which, it was created. With the silhouette point identified, the 3D refining module 1916 can then locate edge point 1's place within the ordered list of drilled points that are associated with that silhouette point. Based on the points location within the list, the 3D refining module 1916 then selects a "next point" from the other points referred to in the ordered list of points 2067.

In step 2206 the 3D refining module 1916 selects the next point for edge point 1. If the orientation of the current incomplete face (as determined in step 2193) is "external," the 3D refining module 1916 will select from the list of ordered points the next point moving down in the list (i.e. the next point that is "farther away from the camera" in the ordered list). If the orientation of the current incomplete face (as determined in step 2193) is "internal," the 3D refining module 1916 will select from the list of ordered points the next point moving up in the list (i.e. the next point that is "closer to the camera" in the ordered list). The 3D refining module 1916 then loads a reference to this point into a variable (e.g. "edge point 1\*").

Using edge point 1\* the 3D refining module 1916 can now seek a face that contains an edge that would serve as a companion to edge point 1/point 2 (a "companion face"). In step 2208, the 3D refining module 1916 locates from the list of incomplete faces a face that contains: 1) edge point 1\* as one of its vertices; and 2) a point ("edge point 2\*") that was created for the "drilling" of the same silhouette coordinate that created edge point 2. To complete this process, the 3D refining module 1916 in step 2208 loops through the list of remaining incomplete faces, checking their entries on the overlap list 2035 (and the associated entries on the data table concerning the overlapping faces 2060) to determine whether those faces have edge point 1\* as one of its vertices. If a reference to edge pont 1\* is found in the face, then the 3D refining module 1916 in step 2208 checks the other points on the data table to determine if a point drilled from the same silhouette point as edge point 2 is found (a point 2\*). If such match is found, the system has located a companion face.

Additionally, it is noted that the 3D refining module 1916 could perform additional checks to ensure that the face selected will serve as a suitable companion face. One such check would be to check that the new points edge point 1\* and edge point 2\* form an edge within the newly found face (such that they are adjacent to each other in the list of points for the face). After the face has passed that check, the 3D refining module 1916 could also determine the edge formed by edge point 1\* and edge point 2\* has no neighbor (such that the neighbor array assignment for that edge in the companion face is set to null (empty)).

In a third check, the 3D refining module 1916 could determine that the orientation of the newly found companion face is opposite to that of the current incomplete face. For example, if the orientation of the current incomplete face is "external" (i.e. the 2D projection of the current incomplete face provides an external view of that face) then the companion face should have an "internal" orientation (such that the 2D projection of the current incomplete face provides an internal view of that face).

With the companion face found, the 3D refining module 1916 in step 2210 creates a new data object for the new face. As described above, the data object for the face contains an array to hold the ordered list of vertices and an array to hold a list of references to the faces that will be neighbors and share an edge with this new face.

In step 2212, the 3D refining module 1916 orders the vertices for the face. The vertices will be edge point 1, edge point 2, edge point 1\* and edge point 2\*, but the question here is how will they be ordered. The system and method of the present invention maintains a ordering of the data points for each face, using in the exemplary embodiment a clockwise order of the vertices of each face as if that face was being viewed from its external side. The ordering information contained in the current incomplete face and the companion face provides sufficient information to order the points of the new face.

Figure 69:
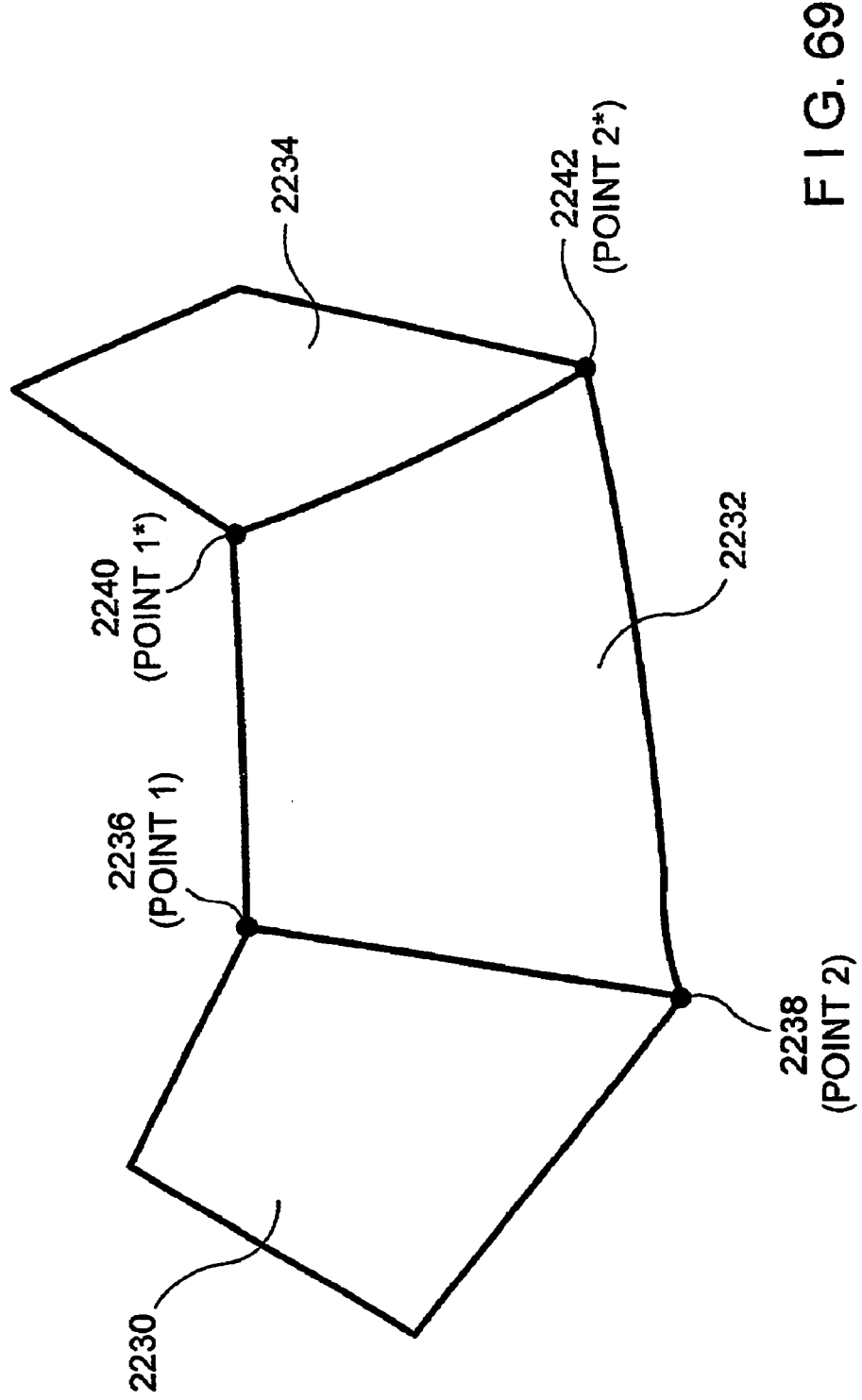
FIG. 69 depicts an ordering for the point of the new face after the construction of an additional face that replaces a clipped face in the alternative embodiment.

FIG. 69 depicts an ordering for the points of the new face. FIG. 69 depicts the current incomplete face at 2230, the new face at 2232 and the companion face at 2234. FIG. 69 also depicts the vertices for the new face edge point 1 (at 2236), edge point 2 (at 2238), edge point 1\* (at 2240) and edge point 2\* (at 2242). In FIG. 69 each of the faces 2232-2234 are viewed from their external side. Assuming a clockwise ordering between the points edge point 1 and edge point 2 (which was determined during the loading of the edge points in step 2200), the 3D refining module 1916 in step 2212 (of FIG. 68) determines a clockwise ordering for the new face, such as edge point 1 (2236), edge point 1\* (2240), edge point 2\* (2242) and edge point 2 (2238). With the order of the points of the new face established, the 3D refining module 1916 in step 2214 loads the vertex array of the data object for the face with references to those data points.

With the ordering of the vertices for the new face defined, the 3D refining model 1916 proceeds to add neighbor references for this new face. In step 2216, the 3D refining module 1916 locates the neighbor array slot in the current incomplete face that corresponds to edge point 1/point 2 and adds a reference to the new face. Likewise, in step 2216, the 3D refining module 1916 locates the neighbor array slot in the companion face that corresponds to edge point 1\*/point 2\* and adds a reference to the new face. In the neighbor array for the new face, the 3D refining module 1916 adds a reference to the current incomplete face at the slot which corresponds to edge point 1/point 2 and a reference to the companion face at the slot which corresponds to edge point 1\*/point 2\*.

In step 2218 the 3D refining module 1916 locates the other faces that are the neighbors of this new face (and as such share an edge with the new face). In this step 2218, the 3D refining module 1916 searches for one face that shares the edge point 1/point 1\* and one face that shares the edge point 2/point 2\*. To complete this process, the 3D refining module 1916 in step 2218 loops through the list of remaining incomplete faces, checking their entries on the overlap list 2035 (and the associated entries on the data table concerning the overlapping faces 2060) to determine whether those faces contain one of those two vertex pairs. If a face having one of those edges is located (a "found face"), the 3D refining module 1916 in step 2218 locates the neighbor array slot in the new face that corresponds to the found edge and adds a reference to the found face. In the neighbor array for the found face, the 3D refining module 1916 also adds a reference to the new face at the slot which corresponds to edge in question.

In step 2218 the 3D refining module 1916 loops to find a neighbor for both of the remaining edges, but it is possible that a neighbor for one (or both) of those edge might not be found. For example, during the initial processing of the extra faces, a situation might occur wherein the edge in question follows a gap area and the face that might join that edge may not have yet been created. If a neighbor cannot be found for the edge in question, the 3D refining module 1916 in step 2218 sets the neighbor slot for that edge to null and places a reference to this new face on the incomplete list 2175.

After completing the face creation process of steps 2200-2218, the 3D refining module 1916 loops in step 2220 and returns in step 2194 to process further edges of the current incomplete face. When all incomplete edges have been processed as described above, the 3D refining module 1916 loops in step 2124 to process the remaining faces in the incomplete list 2175.

Upon completion of the procedure described above with reference to FIG. 68, the process of adding additional faces of step 2042 (of FIG. 62) is now complete. The silhouette in question has now been fully processed and the 3D model has been altered to incorporate the object data contained in the silhouette image. Referring to FIG. 62, the 3D refining module 1916 loops in step 2043 and returns in step 2030 to process another silhouette following the steps of 2032-2042 and their related sub-steps (see FIGS. 62-69 and the related description). The 3D refining module 1916 continues as described above processing each silhouette image and refining the 3D model accordingly. The 3D refining module 1916 upon its completion in the alternative embodiment creates a 3D polygonal model (1608) which closely models the object 4. The output of the 3D refining module 1916 is a model consisting of a number of polygonal faces. The 3D polygonal model 1608 after such processing in the alternative embodiment is not a triangulated mesh model. The system uses the procedures of the triangulation module 110 (FIG. 10) and the texture map module 114 (FIG. 10) to build a triangulated mesh model from the 3D polygonal model 1608 created by this alternative embodiment.

VI. Additional Information

The description of presented alternative embodiment of the present invention can be found in pending U.S. Provisional Application No. 60/192,506 filed on Mar. 28, 2000. The entire description of that provisional application (including without limitation all text and figure drawings) is expressly incorporated by reference herein for purposes of describing the present invention.

V. Conclusion

The invention continues as described above. The above described embodiment of the invention is meant to be representative only, as certain changes may be made therein without departing from the clear teachings of the invention. Accordingly, reference should be made to the following claims which alone define the invention.

The invention claimed is:

1. A method for identifying a silhouette contour of an object that is depicted within an a first image, the first image comprised of a plurality of pixels with each pixel containing a light intensity value that describes either the object or a background, the silhouette contour of the object comprised of a group of pixels which describe one contour of the object's shape, the method comprising the steps of:
   a. identifying within the first image a set of pixels which describe the object by comparing the light intensity value of the pixels of the first image against the light intensity values of a second image, separate from the first image, which depicts the background but not the object;
   b. locating one pixel which does not describe the object;
   c. moving sequentially through the light intensity values of the pixels of the first image to locate a first pixel which describes the object, that pixel being a first pixel in a cluster of pixels which describe the object; and
   d. identifying from the point of said first pixel those other pixels of the cluster which lie on the perimeter of the cluster.

2. The method of claim 1 further comprising the steps of:
   capturing the first image of the object in front of the background; and capturing the second image of the background without the object.

3. The method of claim 2 wherein the capturing of the second image occurs at a different time than the capturing of the first image.

4. A method for identifying a contour of an object depicted in an a first image, the first image comprised of a plurality of pixels with each pixel containing a light intensity value that describes either the object or a background, the silhouette contour of the object comprised of a group of pixels which describe one contour of the object's shape, the method comprising the steps of:
   a. identifying within the first image a set of pixels which describe the object by comparing the light intensity value of the pixels of the first image against the light intensity values of a second image, separate from the first image, which depicts the background but not the object;
   b. locating one pixel which does not describe the object; c. moving sequentially through the values of the pixels of the first image to locate a first pixel which describes the object that pixel being a first pixel in a cluster of pixels which describe the object; and
   d. identifying from the point of said first pixel those other pixels of the cluster which lie on the perimeter of the cluster.

5. The method of claim 4 further comprising the steps of:
   capturing the first image of the object in front of the background; and capturing the second image of the background without the object.

6. The method of claim 5 wherein the capturing of the second image occurs at a different time than the capturing of the first image.

7. A method for creating a polygonally shaped silhouette contour of an object depicted in ~ a first image, the first image comprised of a plurality of pixels with each pixel containing a light intensity value that describes either the object or a background, the polygonally-shaped silhouette contour of the object comprising the vertices of a polygon shape which describe one contour of the object, the method comprising the steps of:
   a. identifying within the first image a set of pixels which describe the object by comparing the light intensity value of the pixels of the first image against the light intensity values of a second image, separate from the first image, in which is depicted the background but not the object;

b. locating a first pixel which describes the object that pixel being a pixel on the perimeter of a cluster of pixels which describe the object;
c. identifying from the point of said first pixel those other pixels of the cluster which lie on the perimeter of the cluster;
d. storing a list of those pixels which lie on the perimeter of the cluster; e. selecting from the list of pixels which lie on the perimeter of the cluster a set of pixels such that the edges of a polygon made from those pixels deviates by no more than a predetermined distance epsilon from the set of pixels which make up said perimeter of the cluster; and
f. storing the selected set of pixels as the vertices of the silhouette contour polygon.

8. The method of claim 7 further comprising the steps of: capturing the first image of the object in front of the background; and capturing the second image of the background without the object.

9. The method of claim 8 wherein the capturing of the second image occurs at a different time than the capturing of the first image.

10. An article of manufacture comprising a computer-readable medium having stored thereon instructions adapted to be executed by a processor, the instructions which, when executed, define a series of steps for identifying a silhouette contour of an object that is depicted within a first image, the first image comprised of a plurality of pixels with each pixel containing a light intensity value that describes either the object or a background, the silhouette contour of the object comprised of a group of pixels which describe one contour of the object's shape, the steps comprising:
a. identifying within the first image a set of pixels which describe the object by comparing the light intensity value of the pixels of the first image against the light intensity values of a second image, separate from the first image, which depicts the background but not the object;
b. locating one pixel which does not describe the object;
c. moving sequentially through the light intensity values of the pixels of the first image to locate a first pixel which describes the object, that pixel being a first pixel in a cluster of pixels which describe the object; and
d. identifying from the point of said first pixel those other pixels of the cluster which lie on the perimeter of the cluster.

11. The article of manufacture of claim 10, the steps further comprising:
capturing the first image of the object in front of the background; and
capturing the second image of the background without the object.

12. The article of manufacture of claim 11 wherein the capture of the second image occurs at a different time than the capture of the first image.

13. An article of manufacture comprising a computer-readable medium having stored thereon instructions adapted to be executed by a processor, the instructions which, when executed, define a series of steps for identifying a contour of an object depicted in a first image, the first image comprised of a plurality of pixels with each pixel containing a light intensity value that describes either the object or a background, the silhouette contour of the object comprised of a group of pixels which describe one contour of the object's shape, the steps comprising:
a. identifying within the first image a set of pixels which describe the object by comparing the light intensity value of the pixels of the first image against the light intensity values of a second image, separate from the first image, which depicts the background but not the object;
b. locating one pixel which does not describe the object;
c. moving sequentially through the values of the pixels of the first image to locate a first pixel which describes the object that pixel being a first pixel in a cluster of pixels which describe the object; and
d. identifying from the point of said first pixel those other pixels of the cluster which lie on the perimeter of the cluster.

14. The article of manufacture of claim 13, the steps further comprising:
capturing the first image of the object in front of the background; and
capturing the second image of the background without the object.

15. The article of manufacture of claim 14 wherein the capturing of the second image occurs at a different time than the capturing of the first image.

16. An article of manufacture comprising a computer-readable medium having stored thereon instructions adapted to be executed by a processor, the instructions which, when executed, define a series of steps for creating a polygonally shaped silhouette contour of an object depicted in a first image, the first image comprised of a plurality of pixels with each pixel containing a light intensity value that describes either the object or a background, the polygonally-shaped silhouette contour of the object comprising the vertices of a polygon shape which describe one contour of the object, the steps comprising:
a. identifying within the first image a set of pixels which describe the object by comparing the light intensity value of the pixels of the first image against the light intensity values of a second image, separate from the first image, in which is depicted the background but not the object;
b. locating a first pixel which describes the object that pixel being a pixel on the perimeter of a cluster of pixels which describe the object;
c. identifying from the point of said first pixel those other pixels of the cluster which lie on the perimeter of the cluster;
d. storing a list of those pixels which lie on the perimeter of the cluster; and
e. selecting from the list of pixels which lie on the perimeter of the cluster a set of pixels such that the edges of a polygon made from those pixels deviates by no more than a predetermined distance epsilon from the set of pixels which make up said perimeter of the cluster and storing the selected set of pixels as the vertices of the silhouette contour polygon.

17. The article of manufacture of claim 16, the steps further comprising:
capturing the first image of the object in front of the background and capturing the second image of the background without the object.

18. The article of manufacture of claim 17 wherein the capturing of the second image occurs at a different time than the capturing of the first image.

* * * * *